US009520027B2

(12) United States Patent
Fujisawa et al.

(10) Patent No.: US 9,520,027 B2
(45) **Date of Patent: *Dec. 13, 2016**

(54) GAMING MACHINE, GAMING SYSTEM, AND GAMING METHOD

(71) Applicants: Universal Entertainment Corporation, Tokyo (JP); Aruze Gaming America, Inc., Las Vegas, NV (US)

(72) Inventors: Masumi Fujisawa, Tokyo (JP); Hiroki Munakata, Tokyo (JP); Kenji Enokido, Tokyo (JP); Takehisa Itagaki, Tokyo (JP); Masaya Honda, Tokyo (JP); Daisyun Okamoto, Tokyo (JP)

(73) Assignees: UNIVERSAL ENTERTAINMENT CORPORATION, Tokyo (JP); ARUZE GAMING AMERICA, INC., Las Vegas, NV (US)

(*) Notice: Subject to any disclaimer, the term of this patent is extended or adjusted under 35 U.S.C. 154(b) by 159 days.

This patent is subject to a terminal disclaimer.

(21) Appl. No.: 13/892,375

(22) Filed: May 13, 2013

(65) Prior Publication Data

US 2014/0335946 A1 Nov. 13, 2014

(51) Int. Cl.
*A63F 9/24* (2006.01)
*A63F 13/00* (2014.01)
*G07F 17/32* (2006.01)

(52) U.S. Cl.
CPC ........... *G07F 17/3258* (2013.01); *G07F 17/32* (2013.01); *G07F 17/326* (2013.01); *G07F 17/3267* (2013.01)

(58) Field of Classification Search
CPC .... G07F 17/32; G07F 17/326; G07F 17/3267; G07F 17/3258
USPC ........................................................ 463/16, 42
See application file for complete search history.

(56) References Cited

U.S. PATENT DOCUMENTS

| | | | | |
|---|---|---|---|---|
| 6,224,482 | B1 * | 5/2001 | Bennett | 463/20 |
| 6,988,947 | B2 * | 1/2006 | Baerlocher et al. | 463/20 |
| 7,780,520 | B2 * | 8/2010 | Baerlocher | 463/25 |
| 7,874,904 | B2 * | 1/2011 | Randall | 463/16 |
| 2002/0183105 | A1 * | 12/2002 | Cannon et al. | 463/16 |

(Continued)

OTHER PUBLICATIONS

Liu, Jonathan H., "Board Game Review: The Game of Life Zapped Edition" from www.wired.com published Feb. 26, 2012 retrieved on Nov. 2, 2014 from Internet at <http://archive.wired.com/geekdad/2012/02/game-of-life-zapped/>.*

*Primary Examiner* — Jason Skaarup
*Assistant Examiner* — Ryan Hsu
(74) *Attorney, Agent, or Firm* — Lex IP Meister, PLLC

(57) ABSTRACT

In a gaming machine, a display displays a jackpot challenge for providing a progressive payout. A controller executes each round of a game, determines an event to be performed in each round, determines whether a determined event belongs to predetermined events capable of providing any one icon of a plurality of icons, performs the determined event and determine a result of a performed event, obtains an icon of the performed event when the performed event belongs to the predetermined events and the result of the performed event is to award the icon of the performed event to a player, triggers the jackpot challenge when the plurality of icons are obtained, and executes the jackpot challenge to determine whether to award the progressive payout to the player.

18 Claims, 172 Drawing Sheets

(56) References Cited

U.S. PATENT DOCUMENTS

| | | | | |
|---|---|---|---|---|
| 2003/0069073 | A1* | 4/2003 | Okada | 463/42 |
| 2004/0053661 | A1* | 3/2004 | Jones et al. | 463/16 |
| 2004/0106454 | A1* | 6/2004 | Walker et al. | 463/42 |
| 2004/0166913 | A1* | 8/2004 | Shinoda | 463/1 |
| 2005/0055113 | A1* | 3/2005 | Gauselmann | 700/91 |
| 2005/0119047 | A1* | 6/2005 | Olive | 463/27 |
| 2006/0009283 | A1* | 1/2006 | Englman et al. | 463/29 |
| 2007/0066400 | A1* | 3/2007 | Kogo | 463/42 |
| 2008/0058067 | A1 | 3/2008 | Okada | |
| 2008/0058072 | A1 | 3/2008 | Okada | |
| 2008/0102934 | A1* | 5/2008 | Tan | 463/25 |
| 2008/0287175 | A1* | 11/2008 | Kusuda et al. | 463/17 |
| 2009/0117970 | A1* | 5/2009 | De Waal et al. | 463/20 |
| 2010/0124988 | A1* | 5/2010 | Amos et al. | 463/27 |
| 2011/0034239 | A1* | 2/2011 | Collette et al. | 463/26 |

* cited by examiner

FIG. 12

| CODE | REEL 1 | REEL 2 | REEL 3 | REEL 4 | REEL 5 |
|---|---|---|---|---|---|
| 0 | MONKEY | DRAGON | SWORD | DRAGON | SWORD |
| 1 | CYCLOPS | RAFT | POT | RAFT | BIRD |
| 2 | RAFT | SNAKE | BONUS | SNAKE | POT |
| 3 | BONUS | WILD | RAFT | WILD | BONUS |
| 4 | SNAKE | POT | DRAGON | WHALE | RAFT |
| 5 | DRAGON | MONKEY | SNAKE | SWORD | CYCLOPS |
| 6 | WHALE | CYCLOPS | CYCLOPS | BIRD | SWORD |
| 7 | BONUS | SWORD | WHALE | POT | BONUS |
| 8 | RAFT | MONKEY | BONUS | MONKEY | RAFT |
| 9 | POT | BIRD | RAFT | BIRD | DRAGON |
| 10 | WILD | SWORD | SWORD | WHALE | SNAKE |
| 11 | RAFT | MONKEY | WILD | POT | WILD |
| 12 | WHALE | DRAGON | MONKEY | BIRD | MONKEY |
| 13 | BONUS | POT | BONUS | SNAKE | SNAKE |
| 14 | POT | MONKEY | RAFT | RAFT | BONUS |
| 15 | DRAGON | CYCLOPS | CYCLOPS | BIRD | POT |
| 16 | WHALE | WHALE | SWORD | WHALE | RAFT |
| 17 | SNAKE | MONKEY | SNAKE | RAFT | WILD |
| 18 | BONUS | BIRD | BONUS | BIRD | WHALE |
| 19 | SWORD | POT | SWORD | SNAKE | POT |
| 20 | CYCLOPS | RAFT | MONKEY | MONKEY | BONUS |
| 21 | POT | BIRD | BIRD | BIRD | MONKEY |
| 22 | DRAGON | MONKEY | SWORD | SWORD | POT |
| 23 | WHALE | POT | SNAKE | WHALE | BONUS |
| 24 | BONUS | CYCLOPS | BONUS | CYCLOPS | RAFT |
| 25 | SNAKE | RAFT | RAFT | MONKEY | WHALE |
| 26 | POT | POT | SWORD | RAFT | DRAGON |
| 27 | BONUS | DRAGON | BONUS | BIRD | |
| 28 | WHALE | MONKEY | SNAKE | POT | |
| 29 | SWORD | SWORD | CYCLOPS | SWORD | |
| 30 | BIRD | | | | |
| 31 | WHALE | | | | |
| 32 | CYCLOPS | | | | |
| 33 | SNAKE | | | | |
| 34 | DRAGON | | | | |
| 35 | WHALE | | | | |

FIG. 13

| SYMBOL | 1KIND | 2KIND | 3KIND | 4KIND | 5KIND |
|---|---|---|---|---|---|
| WILD | 0 | 0 | 100 | 250 | 500 |
| BIRD | 0 | 0 | 50 | 150 | 300 |
| DRAGON | 0 | 0 | 25 | 100 | 250 |
| CYCLOPS | 0 | 0 | 25 | 100 | 250 |
| WHALE | 0 | 0 | 10 | 30 | 150 |
| SNAKE | 0 | 0 | 10 | 30 | 150 |
| MONKEY | 0 | 0 | 10 | 30 | 150 |
| SWORD | 0 | 0 | 5 | 20 | 100 |
| POT | 0 | 0 | 5 | 20 | 100 |
| RAFT | 0 | 0 | 5 | 20 | 100 |

FIG. 19

| SPINNING SPEED | CLOCKWISE | COUNTERCLOCKWISE |
|---|---|---|
| LOW SPEED | RIGHT SLOW SPIN TABLE 1 | LEFT SLOW SPIN TABLE 1 |
| | RIGHT SLOW SPIN TABLE 2 | LEFT SLOW SPIN TABLE 2 |
| | RIGHT SLOW SPIN TABLE 3 | LEFT SLOW SPIN TABLE 3 |
| MIDDLE SPEED | RIGHT AVERAGE SPIN TABLE 1 | LEFT AVERAGE SPIN TABLE 1 |
| | RIGHT AVERAGE SPIN TABLE 2 | LEFT AVERAGE SPIN TABLE 2 |
| | RIGHT AVERAGE SPIN TABLE 3 | LEFT AVERAGE SPIN TABLE 3 |
| HIGH SPEED | RIGHT FAST SPIN TABLE 1 | LEFT FAST SPIN TABLE 1 |
| | RIGHT FAST SPIN TABLE 2 | LEFT FAST SPIN TABLE 2 |
| | RIGHT FAST SPIN TABLE 3 | LEFT FAST SPIN TABLE 3 |

FIG. 23

| ID | RESULT | SELECTION PROBABILITY |
|---|---|---|
| 0 | 50 | 32.00% |
| 1 | 100 | 18.00% |
| 2 | 150 | 18.00% |
| 3 | 200 | 10.00% |
| 4 | 300 | 6.00% |
| 5 | WHEEL | 14.00% |
| 6 | GOLDEN RUDDER | 2.00% |
| TOTAL | | 100% |

FIG. 25

| ID | PAYOUT | SELECTION PROBABILITY |
|---|---|---|
| 0 | 50 | 16.67% |
| 1 | 100 | 16.67% |
| 2 | 150 | 16.67% |
| 3 | 200 | 16.67% |
| 4 | 250 | 16.67% |
| 5 | 300 | 16.67% |
| TOTAL | | 100% |

FIG. 27

| ID | RESULT | SELECTION PROBABILITY |
|---|---|---|
| 0 | 50 | 34.00% |
| 1 | 100 | 20.00% |
| 2 | 150 | 16.00% |
| 3 | 200 | 10.00% |
| 4 | 300 | 6.00% |
| 5 | WHEEL | 14.00% |
| 6 | GOLDEN RUDDER | 0% |
| TOTAL | | 100% |

FIG. 28A

| ID | RESULT | PAYOUT | SELECTION PROBABILITY |
|---|---|---|---|
| 0 | LOSS | 0 | 70.00% |
| 1 | WIN | 400 | 30.00% |
| TOTAL | | | 100% |

FIG. 28B

| ID | RESULT | PAYOUT | SELECTION PROBABILITY |
|---|---|---|---|
| 0 | LOSS | 0 | 50.00% |
| 1 | WIN | 300 | 50.00% |
| TOTAL | | | 100% |

FIG. 28C

| ID | RESULT | PAYOUT | SELECTION PROBABILITY |
|---|---|---|---|
| 0 | LOSS | 0 | 30.00% |
| 1 | WIN | 200 | 70.00% |
| TOTAL | | | 100% |

FIG. 28D

| DETERMINATION | EFFECTS |
|---|---|
| LOSS | CREDIT OF ZERO APPEARS FROM TREASURE BOX |
| WIN WITH ICON | CREDITS APPEAR FROM TREASURE BOX |
| WIN WITHOUT ICON | GOLDED SWORD APPEAR FROM TREASURE BOX AND BATTLE WIN |

FIG. 35

| ID | PAYOUT | SELECTION PROBABILITY |
|---|---|---|
| 0 | 300 | 8.89% |
| 1 | 310 | 7.78% |
| 2 | 320 | 5.56% |
| 3 | 330 | 5.56% |
| 4 | 340 | 5.56% |
| 5 | 350 | 5.56% |
| 6 | 360 | 5.56% |
| 7 | 370 | 4.44% |
| 8 | 380 | 4.44% |
| 9 | 390 | 3.33% |
| 10 | 400 | 3.33% |
| 11 | 410 | 3.33% |
| 12 | 420 | 3.33% |
| 13 | 430 | 3.33% |
| 14 | 440 | 3.33% |
| 15 | 450 | 3.33% |
| 16 | 460 | 3.33% |
| 17 | 470 | 2.22% |
| 18 | 480 | 2.22% |
| 19 | 490 | 2.22% |
| 20 | 500 | 2.22% |
| 21 | 510 | 1.11% |
| 22 | 520 | 1.11% |
| 23 | 530 | 1.11% |
| 24 | 540 | 1.11% |
| 25 | 550 | 1.11% |
| 26 | 560 | 1.11% |
| 27 | 570 | 1.11% |
| 28 | 580 | 1.11% |
| 29 | 590 | 1.11% |
| 30 | 600 | 1.11% |
| TOTAL | | 100.00% |

FIG. 36

| | NUMBER OF REMAINING COCONUTS | | | | | | |
|---|---|---|---|---|---|---|---|
| REMAINING PAYOUT | 60～51 | 50～41 | 40～31 | 30～21 | 20～11 | 10～2 | 1 |
| 1000～955 | 5 | 10 | 20 | 30 | 40 | 50 | REMAINING PAYOUT |
| 950～905 | 5 | 10 | 20 | 30 | 40 | 50 | REMAINING PAYOUT |
| 900～855 | 5 | 10 | 20 | 30 | 40 | 50 | REMAINING PAYOUT |
| 850～805 | 5 | 10 | 15 | 20 | 40 | 50 | REMAINING PAYOUT |
| 800～755 | 5 | 10 | 15 | 20 | 30 | 50 | REMAINING PAYOUT |
| 750～705 | 5 | 10 | 15 | 20 | 30 | 50 | REMAINING PAYOUT |
| 700～655 | 5 | 10 | 15 | 20 | 30 | 50 | REMAINING PAYOUT |
| 650～605 | 5 | 10 | 10 | 20 | 30 | 50 | REMAINING PAYOUT |
| 600～555 | 5 | 10 | 10 | 20 | 20 | 50 | REMAINING PAYOUT |
| 550～505 | 5 | 10 | 10 | 10 | 20 | 50 | REMAINING PAYOUT |
| 500～455 | 5 | 5 | 10 | 10 | 20 | 40 | REMAINING PAYOUT |
| 450～405 | 5 | 5 | 10 | 10 | 20 | 40 | REMAINING PAYOUT |
| 400～355 | 5 | 5 | 5 | 10 | 10 | 30 | REMAINING PAYOUT |
| 350～305 | 5 | 5 | 5 | 10 | 10 | 30 | REMAINING PAYOUT |
| 300～255 | 5 | 5 | 5 | 10 | 10 | 20 | REMAINING PAYOUT |
| 250～205 | 5 | 5 | 5 | 5 | 10 | 20 | REMAINING PAYOUT |
| 200～155 | 5 | 5 | 5 | 5 | 10 | 10 | REMAINING PAYOUT |
| 150～105 | 5 | 5 | 5 | 5 | 10 | 10 | REMAINING PAYOUT |
| 100～55 | 5 | 5 | 5 | 5 | 5 | 10 | REMAINING PAYOUT |
| 55～5 | 5 | 5 | 5 | 5 | 5 | 5 | REMAINING PAYOUT |

FIG. 39

| ID | PAYOUT 1 | PAYOUT 2 | PAYOUT 3 | PAYOUT 4 | PAYOUT 5 | SELECTION PROBABILITY |
|---|---|---|---|---|---|---|
| 0 | ○ | × | × | × | × | 2.00% |
| 1 | × | ○ | × | × | × | 2.00% |
| 2 | × | × | ○ | × | × | 2.00% |
| 3 | × | × | × | ○ | × | 2.00% |
| 4 | × | × | × | × | ○ | 2.00% |
| 5 | ○ | ○ | × | × | × | 2.00% |
| 6 | ○ | × | ○ | × | × | 2.00% |
| 7 | ○ | × | × | ○ | × | 2.00% |
| 8 | ○ | × | × | × | ○ | 2.00% |
| 9 | × | ○ | ○ | × | × | 2.00% |
| 10 | × | ○ | × | ○ | × | 2.00% |
| 11 | × | ○ | × | × | ○ | 2.00% |
| 12 | × | × | ○ | ○ | × | 2.00% |
| 13 | × | × | ○ | × | ○ | 2.00% |
| 14 | × | × | × | ○ | ○ | 2.00% |
| 15 | ○ | ○ | ○ | × | × | 4.00% |
| 16 | ○ | ○ | × | ○ | × | 4.00% |
| 17 | ○ | ○ | × | × | ○ | 4.00% |
| 18 | ○ | × | ○ | ○ | × | 6.00% |
| 19 | ○ | × | ○ | × | ○ | 4.00% |
| 20 | ○ | × | × | ○ | ○ | 4.00% |
| 21 | × | ○ | ○ | ○ | × | 6.00% |
| 22 | × | ○ | ○ | × | ○ | 4.00% |
| 23 | × | ○ | × | ○ | ○ | 4.00% |
| 24 | × | × | ○ | ○ | ○ | 4.00% |
| 25 | ○ | ○ | ○ | ○ | × | 4.00% |
| 26 | ○ | ○ | ○ | × | ○ | 4.00% |
| 27 | ○ | ○ | × | ○ | ○ | 4.00% |
| 28 | ○ | × | ○ | ○ | ○ | 4.00% |
| 29 | × | ○ | ○ | ○ | ○ | 4.00% |
| 30 | ○ | ○ | ○ | ○ | ○ | 6.00% |
| TOTAL | | | | | | 100.00% |

FIG. 40

PATTERN DETERMINATION TABLE

| ID | PATTERN | SELECTION PROBABILITY |
|---|---|---|
| 0 | PATTERN 1 | 20.00% |
| 1 | PATTERN 2 | 20.00% |
| 2 | PATTERN 3 | 20.00% |
| 3 | PATTERN 4 | 20.00% |
| 4 | PATTERN 5 | 20.00% |
| TOTAL | | 100.00% |

PAYOUT OF EACH PATTERN

| | PAYOUT 1 | PAYOUT 2 | PAYOUT 3 | PAYOUT 4 | PAYOUT 5 |
|---|---|---|---|---|---|
| PATTERN 1 | 30 | 30 | 80 | 80 | 120 |
| PATTERN 2 | 30 | 30 | 80 | 80 | 150 |
| PATTERN 3 | 30 | 30 | 80 | 80 | 200 |
| PATTERN 4 | 30 | 30 | 80 | 80 | 250 |
| PATTERN 5 | 30 | 30 | 80 | 80 | 300 |

FIG. 43A

| ID | NUMBER OF OPTIONS | SELECTION PROBABILITY |
|---|---|---|
| 0 | 3 | 33.33% |
| 1 | 4 | 33.33% |
| 2 | 5 | 33.33% |
| TOTAL | | 100.00% |

FIG. 43B

3 OPTIONS

| ID | OPTION | PAYOUT |
|---|---|---|
| 0 | OPTION 1 | 0 |
| 1 | OPTION 2 | 50 |
| 2 | OPTION 3 | 200 |
| AVERAGE PAYOUT | | 83.3 |

4 OPTIONS

| ID | OPTION | PAYOUT |
|---|---|---|
| 0 | OPTION 1 | 0 |
| 1 | OPTION 2 | 50 |
| 2 | OPTION 3 | 100 |
| 3 | OPTION 4 | 200 |
| AVERAGE PAYOUT | | 87.5 |

5 OPTIONS

| ID | OPTION | PAYOUT |
|---|---|---|
| 0 | OPTION 1 | 0 |
| 1 | OPTION 2 | 50 |
| 2 | OPTION 3 | 100 |
| 3 | OPTION 4 | 150 |
| 4 | OPTION 5 | 200 |
| AVERAGE PAYOUT | | 100 |

FIG. 46A

| ID | NUMBER OF OPTIONS | SELECTION PROBABILITY |
|---|---|---|
| 0 | 4 | 33.33% |
| 1 | 5 | 50.00% |
| 2 | 6 | 16.67% |
| TOTAL | | 100.00% |

FIG. 46B

4 OPTIONS

| ID | OPTION | PAYOUT |
|---|---|---|
| 0 | OPTION 1 | 0 |
| 1 | OPTION 2 | 100 |
| 2 | OPTION 3 | 150 |
| 3 | OPTION 4 | 200 |
| AVERAGE PAYOUT | | 112.5 |

5 OPTIONS

| ID | OPTION | PAYOUT |
|---|---|---|
| 0 | OPTION 1 | 0 |
| 1 | OPTION 2 | 100 |
| 2 | OPTION 3 | 150 |
| 3 | OPTION 4 | 200 |
| 4 | OPTION 5 | 300 |
| AVERAGE PAYOUT | | 150 |

6 OPTIONS

| ID | OPTION | PAYOUT |
|---|---|---|
| 0 | OPTION 1 | 0 |
| 1 | OPTION 2 | 100 |
| 2 | OPTION 3 | 150 |
| 3 | OPTION 4 | 200 |
| 4 | OPTION 5 | 250 |
| 5 | OPTION 6 | 300 |
| AVERAGE PAYOUT | | 166.7 |

FIG. 49

| No | OPTION | PAYOUT |
|---|---|---|
| 0 | OPTION 1 | END |
| 1 | OPTION 2 | END |
| 2 | OPTION 3 | END |
| 3 | OPTION 4 | 30 |
| 4 | OPTION 5 | 30 |
| 5 | OPTION 6 | 30 |
| 6 | OPTION 7 | 30 |
| 7 | OPTION 8 | 30 |
| 8 | OPTION 9 | 30 |
| 9 | OPTION 10 | 30 |
| 10 | OPTION 11 | 30 |
| 11 | OPTION 12 | 50 |
| 12 | OPTION 13 | 50 |
| 13 | OPTION 14 | 50 |
| 14 | OPTION 15 | 50 |
| 15 | OPTION 16 | 50 |
| 16 | OPTION 17 | 100 |
| 17 | OPTION 18 | 100 |
| 18 | OPTION 19 | 100 |
| 19 | OPTION 20 | 100 |
| AVERAGE PAYOUT | | 222.5 |

FIG. 50B
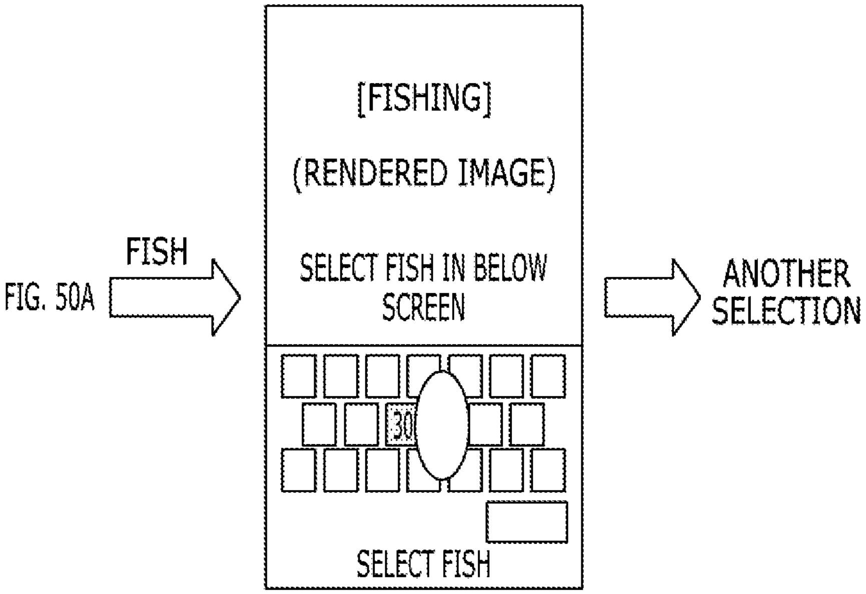
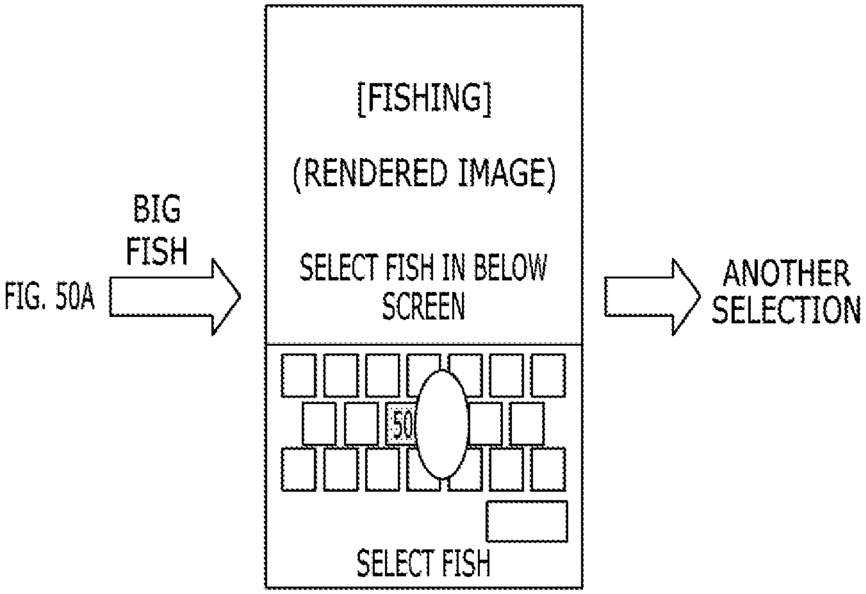

FIG. 52

| No | OPTION | PAYOUT |
|---|---|---|
| 0 | OPTION 1 | 100 |
| 1 | OPTION 2 | 50 |
| 2 | OPTION 3 | 30 |
| 3 | OPTION 4 | END |
| AVERAGE PAYOUT | | 45 |

FIG. 54A

| No | UPPER POSITION | SELECTION PROBABILITY | AVERAGE PAYOUT |
|---|---|---|---|
| 0 | ROUTE 1 | 16.67% | 60 |
| 1 | ROUTE 2 | 16.67% | 60 |
| 2 | ROUTE 3 | 16.67% | 75 |
| 3 | ROUTE 4 | 16.67% | 75 |
| 4 | ROUTE 5 | 16.67% | 90 |
| 5 | ROUTE 6 | 16.67% | 90 |
| EXPECTED VALUE | | | 75 |

| No | LOWER POSITION | SELECTION PROBABILITY | AVERAGE PAYOUT |
|---|---|---|---|
| 0 | ROUTE 7 | 12.50% | 190 |
| 1 | ROUTE 8 | 12.50% | 190 |
| 2 | ROUTE 9 | 25.00% | 205 |
| 3 | ROUTE 10 | 25.00% | 205 |
| 4 | ROUTE 11 | 12.50% | 310 |
| 5 | ROUTE 12 | 12.50% | 310 |
| EXPECTED VALUE | | | 227.5 |

| No | LEFT POSITION | SELECTION PROBABILITY | AVERAGE PAYOUT |
|---|---|---|---|
| 0 | ROUTE 1 | 12.50% | 60 |
| 1 | ROUTE 2 | 12.50% | 60 |
| 2 | ROUTE 3 | 12.50% | 75 |
| 3 | ROUTE 4 | 12.50% | 75 |
| 4 | ROUTE 5 | 12.50% | 90 |
| 5 | ROUTE 6 | 12.50% | 90 |
| 6 | ROUTE 7 | 12.50% | 150 |
| 7 | ROUTE 8 | 12.50% | 150 |
| EXPECTED VALUE | | | 93.75 |

| No | RIGHT POSITION | SELECTION PROBABILITY | AVERAGE PAYOUT |
|---|---|---|---|
| 0 | ROUTE 9 | 25.00% | 175 |
| 1 | ROUTE 10 | 25.00% | 175 |
| 2 | ROUTE 11 | 12.50% | 205 |
| 3 | ROUTE 12 | 12.50% | 205 |
| 4 | ROUTE 13 | 6.25% | 265 |
| 5 | ROUTE 14 | 6.25% | 265 |
| 6 | ROUTE 15 | 6.25% | 295 |
| 7 | ROUTE 16 | 6.25% | 295 |
| EXPECTED VALUE | | | 208.75 |

FIG. 54B

| No | UPPER POSITION | SELECTION PROBABILITY | AVERAGE PAYOUT |
|---|---|---|---|
| 0 | ROUTE 7 | 12.50% | 190 |
| 1 | ROUTE 8 | 12.50% | 190 |
| 2 | ROUTE 9 | 25.00% | 205 |
| 3 | ROUTE 10 | 25.00% | 205 |
| 4 | ROUTE 11 | 12.50% | 310 |
| 5 | ROUTE 12 | 12.50% | 310 |
| | EXPECTED VALUE | | 227.5 |

| No | LOWER POSITION | SELECTION PROBABILITY | AVERAGE PAYOUT |
|---|---|---|---|
| 0 | ROUTE 1 | 16.67% | 60 |
| 1 | ROUTE 2 | 16.67% | 60 |
| 2 | ROUTE 3 | 16.67% | 75 |
| 3 | ROUTE 4 | 16.67% | 75 |
| 4 | ROUTE 5 | 16.67% | 90 |
| 5 | ROUTE 6 | 16.67% | 90 |
| | EXPECTED VALUE | | 75 |

| No | LEFT POSITION | SELECTION PROBABILITY | AVERAGE PAYOUT |
|---|---|---|---|
| 0 | ROUTE 9 | 25.00% | 175 |
| 1 | ROUTE 10 | 25.00% | 175 |
| 2 | ROUTE 11 | 12.50% | 205 |
| 3 | ROUTE 12 | 12.50% | 205 |
| 4 | ROUTE 13 | 6.25% | 265 |
| 5 | ROUTE 14 | 6.25% | 265 |
| 6 | ROUTE 15 | 6.25% | 295 |
| 7 | ROUTE 16 | 6.25% | 295 |
| | EXPECTED VALUE | | 208.75 |

| No | RIGHT POSITION | SELECTION PROBABILITY | AVERAGE PAYOUT |
|---|---|---|---|
| 0 | ROUTE 1 | 12.50% | 60 |
| 1 | ROUTE 2 | 12.50% | 60 |
| 2 | ROUTE 3 | 12.50% | 75 |
| 3 | ROUTE 4 | 12.50% | 75 |
| 4 | ROUTE 5 | 12.50% | 90 |
| 5 | ROUTE 6 | 12.50% | 90 |
| 6 | ROUTE 7 | 12.50% | 150 |
| 7 | ROUTE 8 | 12.50% | 150 |
| | EXPECTED VALUE | | 93.75 |

FIG. 55A

UPPER POSTION

| | | | | | | | | | | | | | | | |
|---|---|---|---|---|---|---|---|---|---|---|---|---|---|---|---|
| ROUTE 1 | LEFT | DOWN | DOWN | DOWN | | | | | | | | | | | |
| ROUTE 2 | RIGHT | DOWN | DOWN | DOWN | | | | | | | | | | | |
| ROUTE 3 | LEFT | DOWN | DOWN | RIGHT | DOWN | | | | | | | | | | |
| ROUTE 4 | RIGHT | DOWN | DOWN | LEFT | DOWN | | | | | | | | | | |
| ROUTE 5 | LEFT | LEFT | DOWN | RIGHT | DOWN | DOWN | | | | | | | | | |
| ROUTE 6 | RIGHT | RIGHT | DOWN | LEFT | DOWN | DOWN | | | | | | | | | |
| ROUTE 7 | LEFT | LEFT | DOWN | RIGHT | RIGHT | DOWN | DOWN | | | | | | | | |
| ROUTE 8 | RIGHT | RIGHT | DOWN | LEFT | LEFT | DOWN | DOWN | | | | | | | | |
| ROUTE 9 | LEFT | DOWN | DOWN | RIGHT | UP | RIGHT | UP | UP | | | | | | | |
| ROUTE 10 | RIGHT | DOWN | DOWN | LEFT | UP | LEFT | UP | UP | | | | | | | |
| ROUTE 11 | LEFT | LEFT | DOWN | DOWN | RIGHT | UP | RIGHT | DOWN | RIGHT | UP | UP | RIGHT | DOWN | DOWN | DOWN |
| ROUTE 12 | RIGHT | RIGHT | DOWN | DOWN | LEFT | UP | LEFT | DOWN | LEFT | UP | UP | LEFT | DOWN | DOWN | DOWN |

FIG. 55B

LOWER POSTION

| | | | | | | | | | | | | | | | | |
|---|---|---|---|---|---|---|---|---|---|---|---|---|---|---|---|---|
| ROUTE 1 | LEFT | UP | UP | UP | | | | | | | | | | | | |
| ROUTE 2 | RIGHT | UP | UP | UP | | | | | | | | | | | | |
| ROUTE 3 | LEFT | UP | UP | RIGHT | UP | | | | | | | | | | | |
| ROUTE 4 | RIGHT | UP | UP | LEFT | UP | | | | | | | | | | | |
| ROUTE 5 | LEFT | LEFT | UP | RIGHT | UP | UP | | | | | | | | | | |
| ROUTE 6 | RIGHT | RIGHT | UP | LEFT | UP | UP | | | | | | | | | | |
| ROUTE 7 | LEFT | LEFT | UP | RIGHT | RIGHT | UP | UP | | | | | | | | | |
| ROUTE 8 | RIGHT | RIGHT | UP | LEFT | LEFT | UP | UP | | | | | | | | | |
| ROUTE 9 | LEFT | UP | UP | RIGHT | DOWN | RIGHT | DOWN | DOWN | | | | | | | | |
| ROUTE 10 | RIGHT | UP | UP | LEFT | DOWN | LEFT | DOWN | DOWN | | | | | | | | |
| ROUTE 11 | LEFT | LEFT | UP | UP | RIGHT | DOWN | RIGHT | UP | RIGHT | DOWN | DOWN | RIGHT | UP | UP | UP | |
| ROUTE 12 | RIGHT | RIGHT | UP | UP | LEFT | DOWN | LEFT | UP | LEFT | DOWN | DOWN | LEFT | UP | UP | UP | |

FIG. 55C

LEFT POSTION

| | | | | | | | | | | | | | | |
|---|---|---|---|---|---|---|---|---|---|---|---|---|---|---|
| ROUTE 1 | RIGHT | UP | RIGHT | UP | | | | | | | | | | |
| ROUTE 2 | RIGHT | DOWN | RIGHT | DOWN | | | | | | | | | | |
| ROUTE 3 | RIGHT | UP | RIGHT | RIGHT | UP | | | | | | | | | |
| ROUTE 4 | RIGHT | DOWN | RIGHT | RIGHT | DOWN | | | | | | | | | |
| ROUTE 5 | RIGHT | UP | RIGHT | RIGHT | RIGHT | UP | | | | | | | | |
| ROUTE 6 | RIGHT | DOWN | RIGHT | RIGHT | RIGHT | DOWN | | | | | | | | |
| ROUTE 7 | RIGHT | UP | RIGHT | RIGHT | RIGHT | DOWN | DOWN | LEFT | LEFT | DOWN | | | | |
| ROUTE 8 | RIGHT | DOWN | RIGHT | RIGHT | RIGHT | UP | UP | LEFT | LEFT | UP | | | | |
| ROUTE 9 | RIGHT | UP | RIGHT | DOWN | DOWN | DOWN | | | | | | | | |
| ROUTE 10 | RIGHT | DOWN | RIGHT | UP | UP | UP | | | | | | | | |
| ROUTE 11 | RIGHT | UP | RIGHT | RIGHT | DOWN | LEFT | DOWN | DOWN | | | | | | |
| ROUTE 12 | RIGHT | DOWN | RIGHT | RIGHT | UP | LEFT | UP | UP | | | | | | |
| ROUTE 13 | RIGHT | UP | RIGHT | RIGHT | RIGHT | DOWN | DOWN | LEFT | UP | LEFT | DOWN | DOWN | | |
| ROUTE 14 | RIGHT | DOWN | RIGHT | RIGHT | RIGHT | UP | UP | LEFT | DOWN | LEFT | UP | UP | | |
| ROUTE 15 | RIGHT | UP | RIGHT | RIGHT | RIGHT | DOWN | DOWN | LEFT | UP | LEFT | DOWN | LEFT | LEFT | LEFT |
| ROUTE 16 | RIGHT | DOWN | RIGHT | RIGHT | RIGHT | UP | UP | LEFT | DOWN | LEFT | UP | LEFT | LEFT | LEFT |

FIG. 55D

RIGHT POSTION

| | | | | | | | | | | | | | | |
|---|---|---|---|---|---|---|---|---|---|---|---|---|---|---|
| ROUTE 1 | LEFT | UP | LEFT | UP | | | | | | | | | | |
| ROUTE 2 | LEFT | DOWN | LEFT | DOWN | | | | | | | | | | |
| ROUTE 3 | LEFT | UP | LEFT | LEFT | UP | | | | | | | | | |
| ROUTE 4 | LEFT | DOWN | LEFT | LEFT | DOWN | | | | | | | | | |
| ROUTE 5 | LEFT | UP | LEFT | LEFT | LEFT | UP | | | | | | | | |
| ROUTE 6 | LEFT | DOWN | LEFT | LEFT | LEFT | DOWN | | | | | | | | |
| ROUTE 7 | LEFT | UP | LEFT | LEFT | LEFT | DOWN | DOWN | RIGHT | RIGHT | DOWN | | | | |
| ROUTE 8 | LEFT | DOWN | LEFT | LEFT | LEFT | UP | UP | RIGHT | RIGHT | UP | | | | |
| ROUTE 9 | LEFT | UP | LEFT | DOWN | DOWN | DOWN | | | | | | | | |
| ROUTE 10 | LEFT | DOWN | LEFT | UP | UP | UP | | | | | | | | |
| ROUTE 11 | LEFT | UP | LEFT | LEFT | DOWN | RIGHT | DOWN | DOWN | | | | | | |
| ROUTE 12 | LEFT | DOWN | LEFT | LEFT | UP | RIGHT | UP | UP | | | | | | |
| ROUTE 13 | LEFT | UP | LEFT | LEFT | LEFT | DOWN | DOWN | RIGHT | UP | RIGHT | DOWN | DOWN | | |
| ROUTE 14 | LEFT | DOWN | LEFT | LEFT | LEFT | UP | UP | RIGHT | DOWN | RIGHT | UP | UP | | |
| ROUTE 15 | LEFT | UP | LEFT | LEFT | LEFT | DOWN | DOWN | RIGHT | UP | RIGHT | DOWN | RIGHT | RIGHT | RIGHT |
| ROUTE 16 | LEFT | DOWN | LEFT | LEFT | LEFT | UP | UP | RIGHT | DOWN | RIGHT | UP | RIGHT | RIGHT | RIGHT |

FIG. 57

| No | OPTION | PAYOUT |
|---|---|---|
| 0 | OPTION 1 | 50 |
| 1 | OPTION 2 | 100 |
| 2 | OPTION 3 | 200 |
| 3 | OPTION 4 | START OVER |
| AVERAGE PAYOUT | | 87.5 |

FIG. 62A

| ID | ON/OFF | SELECTION PROBABILITY |
|---|---|---|
| 0 | OFF | 60.00% |
| 1 | ON | 40.00% |
| TOTAL | | 100% |

FIG. 62B

| ID | REEL 1 | REEL 2 | REEL 3 | REEL 4 | REEL 5 | SELECTION PROBABILITY |
|---|---|---|---|---|---|---|
| 0 | \WI | \WI | \WI | \WI | WI | 18.18% |
| 1 | \WI | \WI | \WI | WI | \WI | 18.18% |
| 2 | \WI | \WI | WI | \WI | \WI | 18.18% |
| 3 | \WI | WI | \WI | \WI | \WI | 21.82% |
| 4 | WI | \WI | \WI | \WI | \WI | 23.64% |
| 5 | \WI | \WI | WI | WI | WI | 0 |
| 6 | \WI | WI | \WI | WI | WI | 0 |
| 7 | \WI | WI | WI | \WI | WI | 0 |
| 8 | \WI | WI | WI | WI | \WI | 0 |
| 9 | WI | \WI | \WI | WI | WI | 0 |
| 10 | WI | \WI | WI | \WI | WI | 0 |
| 11 | WI | \WI | WI | WI | \WI | 0 |
| 12 | WI | WI | \WI | \WI | WI | 0 |
| 13 | WI | WI | \WI | WI | \WI | 0 |
| 14 | WI | WI | WI | \WI | \WI | 0 |
| 15 | \WI | \WI | \WI | WI | WI | 0 |
| 16 | \WI | \WI | WI | \WI | WI | 0 |
| 17 | \WI | \WI | WI | WI | \WI | 0 |
| 18 | \WI | WI | \WI | \WI | WI | 0 |
| 19 | \WI | WI | \WI | WI | \WI | 0 |
| 20 | \WI | WI | WI | \WI | \WI | 0 |
| 21 | WI | \WI | \WI | \WI | WI | 0 |
| 22 | WI | \WI | \WI | WI | \WI | 0 |
| 23 | WI | \WI | WI | \WI | \WI | 0 |
| 24 | WI | WI | \WI | \WI | \WI | 0 |
| TOTAL | | | | | | 100% |

FIG. 63

| ID | REEL 1 | REEL 2 | REEL 3 | REEL 4 | REEL 5 | SELECTION PROBABILITY |
|---|---|---|---|---|---|---|
| 0 | \WI | \WI | \WI | \WI | WI | 0 |
| 1 | \WI | \WI | \WI | WI | \WI | 0 |
| 2 | \WI | \WI | WI | \WI | \WI | 0 |
| 3 | \WI | WI | \WI | \WI | \WI | 0 |
| 4 | WI | \WI | \WI | \WI | \WI | 0 |
| 5 | \WI | \WI | WI | WI | WI | 0 |
| 6 | \WI | WI | \WI | WI | WI | 0 |
| 7 | \WI | WI | WI | \WI | WI | 0 |
| 8 | \WI | WI | WI | WI | \WI | 0 |
| 9 | WI | \WI | \WI | WI | WI | 0 |
| 10 | WI | \WI | WI | \WI | WI | 0 |
| 11 | WI | \WI | WI | WI | \WI | 0 |
| 12 | WI | WI | \WI | \WI | WI | 0 |
| 13 | WI | WI | \WI | WI | \WI | 0 |
| 14 | WI | WI | WI | \WI | \WI | 0 |
| 15 | \WI | \WI | \WI | WI | WI | 11.90% |
| 16 | \WI | \WI | WI | \WI | WI | 11.90% |
| 17 | \WI | \WI | WI | WI | \WI | 5.95% |
| 18 | \WI | WI | \WI | \WI | WI | 17.86% |
| 19 | \WI | WI | \WI | WI | \WI | 11.90% |
| 20 | \WI | WI | WI | \WI | \WI | 5.95% |
| 21 | WI | \WI | \WI | \WI | WI | 17.86% |
| 22 | WI | \WI | \WI | WI | \WI | 5.95% |
| 23 | WI | \WI | WI | \WI | \WI | 5.95% |
| 24 | WI | WI | \WI | \WI | \WI | 4.76% |
| TOTAL | | | | | | 100% |

FIG. 64

| COED | REEL 1 | REEL 2 | REEL 3 | REEL 4 | REEL 5 |
|---|---|---|---|---|---|
| 0 | MONKEY | WHALE | SWORD | RAFT | SWORD |
| 1 | RAFT | POT | POT | SNAKE | RAFT |
| 2 | SWORD | MONKEY | RAFT | WHALE | POT |
| 3 | WILD | SWORD | SNAKE | SWORD | MONKEY |
| 4 | WHALE | POT | MONKEY | POT | RAFT |
| 5 | RAFT | MONKEY | RAFT | MONKEY | SNAKE |
| 6 | POT | WILD | POT | WHALE | MONKEY |
| 7 | SWORD | WHALE | WILD | POT | POT |
| 8 | RAFT | SNAKE | SNAKE | RAFT | SNAKE |
| 9 | POT | POT | SWORD | SNAKE | RAFT |
| 10 | SWORD | RAFT | MONKEY | WHALE | WHALE |
| 11 | SNAKE | SNAKE | SNAKE | RAFT | SWORD |
| 12 | POT | POT | POT | WILD | MONKEY |
| 13 | SWORD | RAFT | MONKEY | SWORD | RAFT |
| 14 | WHALE | SWORD | SNAKE | WHALE | POT |
| 15 | RAFT | POT | WHALE | MONKEY | WILD |
| 16 | SWORD | RAFT | SWORD | RAFT | RAFT |
| 17 | SNAKE | SNAKE | SNAKE | POT | SWORD |
| 18 | MONKEY | POT | MONKEY | SWORD | WHALE |
| 19 | WHALE | RAFT | RAFT | MONKEY | SNAKE |
| 20 | SWORD | MONKEY | SNAKE | WHALE | MONKEY |
| 21 | RAFT | SWORD | SWORD | RAFT | RAFT |
| 22 | WHALE | POT | WHALE | POT | SNAKE |
| 23 | SNAKE | WHALE | SNAKE | SWORD | SWORD |
| 24 | SWORD | SWORD | SWORD | MONKEY | WHALE |
| 25 | WHALE | POT | RAFT | POT | RAFT |
| 26 | POT | WHALE | MONKEY | RAFT | SWORD |
| 27 | SNAKE | MONKEY | SNAKE | MONKEY | WHALE |
| 28 | SWORD | SWORD | RAFT | SWORD | POT |
| 29 | WHALE | POT | WHALE | POT | SNAKE |
| 30 | SNAKE | WHALE | SNAKE | SNAKE | SWORD |
| 31 | SWORD | SWORD | SWORD | MONKEY | WHALE |
| 32 | WHALE | POT | RAFT | POT | RAFT |
| 33 | POT | RAFT | MONKEY | SNAKE | SNAKE |
| 34 | SWORD | MONKEY | SNAKE | MONKEY | WHALE |

FIG. 66A

| ID | ON/OFF | SELECTION PROBABILITY |
|---|---|---|
| 0 | OFF | 62.00% |
| 1 | ON | 38.00% |
| TOTAL | | 100% |

FIG. 66B

| ID | NUMBER OF WILD SYMBOLS | SELECTION PROBABILITY |
|---|---|---|
| 0 | 2 | 45.00% |
| 1 | 3 | 26.00% |
| 2 | 4 | 18.00% |
| 3 | 5 | 8.00% |
| 4 | 6 | 3.00% |
| TOTAL | | 100% |

FIG. 67

| ID | NUMBER OF WILD SYMBOLS | SELECTION PROBABILITY |
|---|---|---|
| 0 | 2 | 0 |
| 1 | 3 | 0 |
| 2 | 4 | 100% |
| 3 | 5 | 0 |
| 4 | 6 | 0 |
| TOTAL | | 100% |

FIG. 68

| CODE | REEL 1 | REEL 2 | REEL 3 | REEL 4 | REEL 5 |
|---|---|---|---|---|---|
| 0 | MONKEY | MONKEY | SWORD | RAFT | SWORD |
| 1 | RAFT | WHALE | POT | SNAKE | RAFT |
| 2 | SWORD | POT | RAFT | WHALE | POT |
| 3 | WHALE | MONKEY | SNAKE | SWORD | MONKEY |
| 4 | RAFT | SWORD | MONKEY | POT | RAFT |
| 5 | POT | POT | RAFT | MONKEY | SNAKE |
| 6 | SWORD | MONKEY | POT | WHALE | MONKEY |
| 7 | RAFT | WHALE | SNAKE | POT | POT |
| 8 | POT | SNAKE | SWORD | RAFT | SNAKE |
| 9 | SWORD | POT | MONKEY | SNAKE | RAFT |
| 10 | SNAKE | RAFT | SNAKE | WHALE | WHALE |
| 11 | POT | SNAKE | POT | RAFT | SWORD |
| 12 | SWORD | POT | MONKEY | SWORD | MONKEY |
| 13 | WHALE | RAFT | SNAKE | WHALE | SNAKE |
| 14 | RAFT | MONKEY | WHALE | MONKEY | POT |
| 15 | SWORD | SWORD | SWORD | RAFT | RAFT |
| 16 | SNAKE | SNAKE | SNAKE | POT | SWORD |
| 17 | MONKEY | POT | MONKEY | SWORD | WHALE |
| 18 | WHALE | RAFT | RAFT | MONKEY | SNAKE |
| 19 | SWORD | MONKEY | POT | WHALE | MONKEY |
| 20 | RAFT | SWORD | SWORD | RAFT | RAFT |
| 21 | WHALE | POT | SNAKE | MONKEY | SNAKE |
| 22 | SNAKE | WHALE | POT | SWORD | SWORD |
| 23 | SWORD | SWORD | RAFT | POT | WHALE |
| 24 | POT | POT | MONKEY | RAFT | RAFT |
| 25 | RAFT | WHALE | SNAKE | MONKEY | SWORD |
| 26 | SNAKE | RAFT | RAFT | SWORD | WHALE |
| 27 | WHALE | SWORD | WHALE | POT | SNAKE |
| 28 | RAFT | POT | SNAKE | SNAKE | SWORD |
| 29 | SWORD | WHALE | RAFT | MONKEY | WHALE |
| 30 | WHALE | SWORD | MONKEY | POT | RAFT |
| 31 | POT | POT | SNAKE | SNAKE | SNAKE |
| 32 | SWORD | RAFT | RAFT | MONKEY | WHALE |

FIG. 70

| CODE | REEL 1 | REEL 2 | REEL 3 | REEL 4 | REEL 5 |
|---|---|---|---|---|---|
| 0 | MONKEY | SWORD | MONKEY | RAFT | SWORD |
| 1 | RAFT | WHALE | RAFT | SNAKE | RAFT |
| 2 | SWORD | SNAKE | POT | WHALE | POT |
| 3 | POT | POT | WILD | SWORD | MONKEY |
| 4 | WHALE | WILD | SNAKE | POT | RAFT |
| 5 | RAFT | SNAKE | SWORD | MONKEY | WILD |
| 6 | POT | POT | MONKEY | WILD | MONKEY |
| 7 | SWORD | RAFT | SNAKE | POT | POT |
| 8 | RAFT | MONKEY | POT | RAFT | SNAKE |
| 9 | POT | POT | MONKEY | SNAKE | RAFT |
| 10 | SWORD | RAFT | SNAKE | WHALE | WHALE |
| 11 | SNAKE | WILD | WHALE | RAFT | SWORD |
| 12 | RAFT | POT | WILD | WILD | MONKEY |
| 13 | SWORD | RAFT | SNAKE | SWORD | RAFT |
| 14 | WHALE | MONKEY | MONKEY | WHALE | POT |
| 15 | RAFT | SWORD | POT | MONKEY | WILD |
| 16 | SWORD | POT | SNAKE | RAFT | RAFT |
| 17 | SNAKE | WHALE | SWORD | POT | SWORD |
| 18 | MONKEY | WILD | WILD | SWORD | WHALE |
| 19 | WHALE | POT | SNAKE | MONKEY | SNAKE |
| 20 | SWORD | WHALE | SWORD | WHALE | MONKEY |
| 21 | RAFT | RAFT | RAFT | RAFT | RAFT |
| 22 | WHALE | MONKEY | MONKEY | POT | SNAKE |
| 23 | SNAKE | POT | SNAKE | SWORD | SWORD |
| 24 | SWORD | WHALE | RAFT | MONKEY | WHALE |
| 25 | RAFT | SWORD | WHALE | POT | RAFT |
| 26 | POT | POT | SNAKE | RAFT | SWORD |
| 27 | SWORD | MONKEY | WILD | MONKEY | WHALE |
| 28 | SNAKE | WHALE | RAFT | SWORD | RAFT |
| 29 | WHALE | POT | MONKEY | POT | SNAKE |
| 30 | RAFT | MONKEY | SWORD | MONKEY | SWORD |
| 31 | SWORD | SWORD | POT | SNAKE | WHALE |
| 32 | WHALE | POT | WILD | POT | RAFT |
| 33 | POT | MONKEY | SNAKE | MONKEY | SNAKE |

FIG. 73

| No | PAYOUT | SELECTION PROBABILITY | | | | | | | | | |
|---|---|---|---|---|---|---|---|---|---|---|---|
| | | 1 BET | 2 BET | 3 BET | 4 BET | 5 BET | 6 BET | 7 BET | 8 BET | 9 BET | 10 BET |
| 0 | 300 | 5% | 5% | 0 | 0 | 0 | 0 | 0 | 0 | 0 | 0 |
| 1 | 500 | 59% | 11% | 4% | 0 | 0 | 0 | 0 | 0 | 0 | 0 |
| 2 | 1000 | 33% | 60% | 46% | 32% | 27% | 22% | 17% | 12% | 7% | 2% |
| 3 | 3000 | 2% | 21% | 44% | 56% | 51% | 46% | 41% | 36% | 31% | 26% |
| 4 | 10000 | 1% | 3% | 6% | 12% | 22% | 32% | 42% | 52% | 62% | 72% |
| TOTAL | | 100% | 100% | 100% | 100% | 100% | 100% | 100% | 100% | 100% | 100% |
| EXPECTED VALUE | | 800 | 1600 | 2400 | 3200 | 4000 | 4800 | 5600 | 6400 | 7200 | 8000 |

FIG. 74

| BET | PROBABILITY |
|---|---|
| 1 | 1.00% |
| 2 | 2.00% |
| 3 | 3.00% |
| 4 | 4.00% |
| 5 | 5.00% |
| 10 | 10.00% |

FIG. 77B
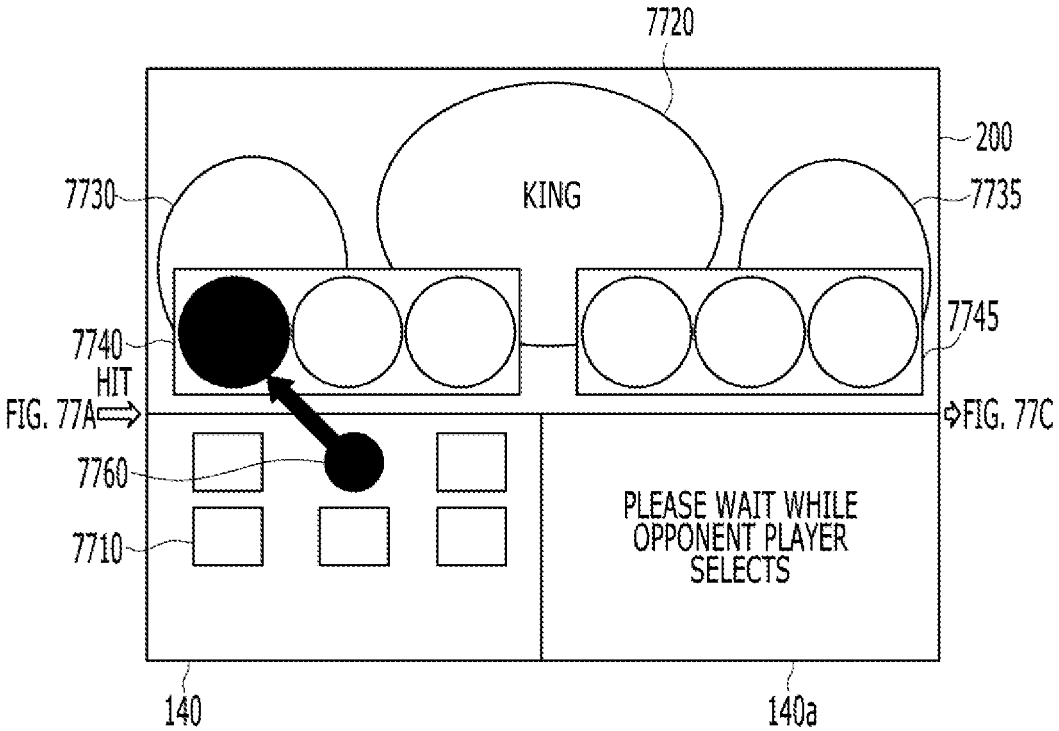
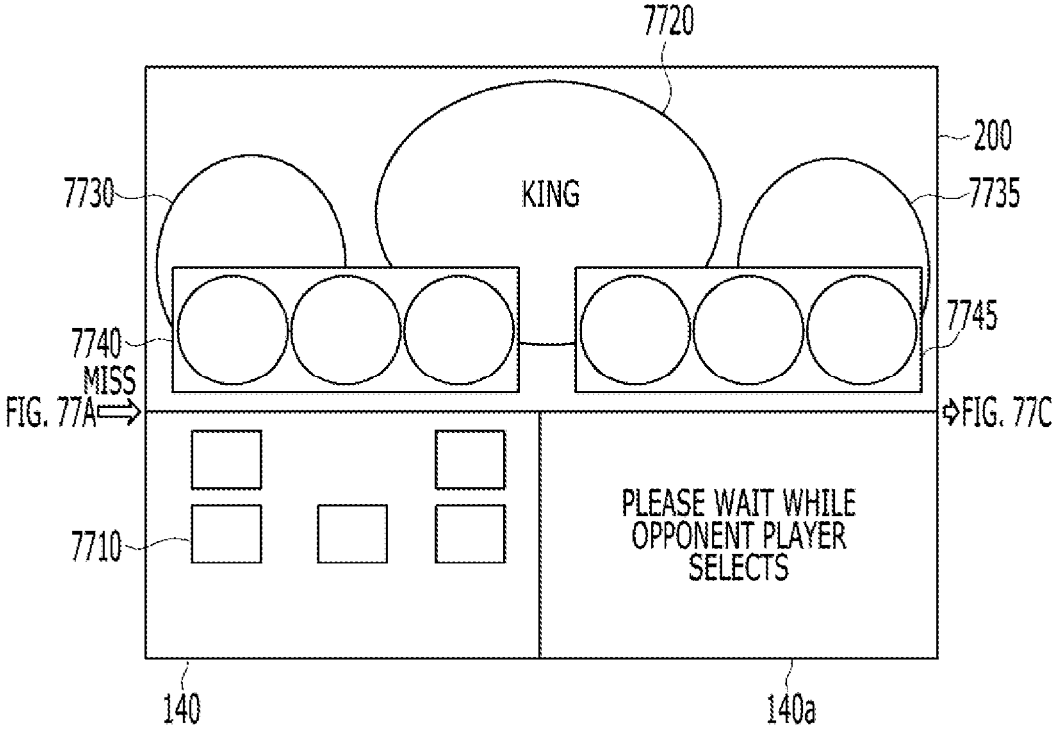

FIG. 80

| RANKING | PAYOUT | SELECTION PROBABILITY |
|---|---|---|
| NO. 1 | 1000 | 20.0% |
| NO. 2 | 700 | 20.0% |
| NO. 3 | 400 | 20.0% |
| NO. 4 | 300 | 20.0% |
| NO. 5 | 100 | 20.0% |
| AVERAGE PAYOUT | 500 | 100.0% |

FIG. 82A

| NO | PAYOUT | SELECTION PROBABILITY |
|---|---|---|
| 0 | 300 | 9.09% |
| 1 | 340 | 9.09% |
| 2 | 380 | 9.09% |
| 3 | 420 | 9.09% |
| 4 | 460 | 9.09% |
| 5 | 500 | 9.09% |
| 6 | 540 | 9.09% |
| 7 | 580 | 9.09% |
| 8 | 620 | 9.09% |
| 9 | 660 | 9.09% |
| 10 | 700 | 9.09% |

FIG. 82B

| NO | PATTERN 1 | PATTERN 2 | PATTERN 3 |
|---|---|---|---|
| 1 | 4% | 15% | 4% |
| 2 | 8% | 6% | 4% |
| 3 | 14% | 16% | 4% |
| 4 | 5% | 15% | 7% |
| 5 | 21% | 12% | 10% |
| 6 | 9% | 16% | 18% |
| 7 | 31% | 24% | 25% |
| 8 | 14% | 41% | 33% |
| 9 | 58% | 32% | 71% |
| 10 | 100% | 100% | 100% |

FIG. 88A

| POSITION | | MAP 1 | MAP 2 | MAP 3 | MAP 4 | MAP 5 |
|---|---|---|---|---|---|---|
| 0 | START | 0.097% | 1.077% | 0.802% | 0.238% | 0.100% |
| 1 | | 0.097% | 1.531% | 0.598% | 0.159% | 0.515% |
| 2 | | 0.160% | 1.158% | 0.146% | 0.159% | 0.452% |
| 3 | | 0.160% | 1.158% | 0.845% | 0.992% | 0.789% |
| 4 | | 0.611% | 1.689% | 1.299% | 2.017% | 0.585% |
| 5 | | 0.239% | 1.687% | 1.644% | 1.848% | 1.503% |
| 6 | | 1.453% | 1.707% | 2.026% | 1.785% | 1.642% |
| 7 | | 1.284% | 1.601% | 0.155% | 2.237% | 0.880% |
| 8 | | 1.008% | 1.591% | 0.519% | 0.167% | 0.736% |
| 9 | | 0.656% | 0.579% | 0.582% | 0.443% | 0.283% |
| 10 | | 0.203% | 0.604% | 0.413% | 0.356% | 0.656% |
| ... | | | | | | |
| 52 | | 1.514% | 1.226% | 1.575% | 1.632% | 1.378% |
| 53 | TURNING | 0.940% | 0.479% | 0.591% | 1.027% | 0.773% |
| 54_L | | 0.522% | 0.886% | 0.796% | 0.073% | 0.881% |
| 55_L | | 0.237% | 0.886% | 0.796% | 0.277% | 0.881% |
| ... | | | | | | |
| 61_L | | 1.701% | 0.370% | 0.504% | 0.176% | 0.943% |
| 62_L | | 1.968% | 0.370% | 0.298% | 0.591% | 0.769% |
| 54_R | | 0.881% | 0.060% | 0.881% | 1.910% | 0.094% |
| 55_R | | 0.886% | 0.069% | 0.881% | 1.910% | 0.032% |
| ... | | | | | | |
| 61_R | | 2.074% | 0.263% | 0.611% | 0.194% | 0.837% |
| 62_R | | 1.968% | 0.370% | 0.298% | 0.591% | 0.769% |
| 63 | | 2.136% | 0.370% | 0.298% | 1.772% | 0.973% |
| ... | | | | | | |
| 100 | | 6.250% | 6.250% | 6.250% | 6.250% | 6.250% |
| 101 | GOAL | - | - | - | - | - |

FIG. 88B

| POSITION | | MAP 1 | MAP 2 | MAP 3 | MAP 4 | MAP 5 |
|---|---|---|---|---|---|---|
| 0 | START | 1.347% | 2.327% | 2.052% | 1.488% | 1.350% |
| 1 | | 1.347% | 2.781% | 1.848% | 1.409% | 1.765% |
| 2 | | 1.410% | 2.408% | 1.396% | 1.409% | 1.702% |
| 3 | | 1.410% | 2.408% | 2.095% | 2.242% | 2.039% |
| 4 | | 1.861% | 2.939% | 2.549% | 3.267% | 1.835% |
| 5 | | 1.489% | 2.937% | 2.894% | 3.098% | 2.753% |
| 6 | | 2.703% | 2.957% | 3.276% | 3.035% | 2.892% |
| 7 | | 2.534% | 2.851% | 1.405% | 3.487% | 2.130% |
| 8 | | 2.258% | 2.841% | 1.769% | 1.417% | 1.986% |
| 9 | | 1.906% | 1.829% | 1.832% | 1.693% | 1.533% |
| 10 | | 1.453% | 1.854% | 1.663% | 1.606% | 1.906% |
| ... | | | | | | |
| 52 | | 2.764% | 2.476% | 2.825% | 2.882% | 2.628% |
| 53 | TURNING | 2.190% | 1.729% | 1.841% | 2.277% | 2.023% |
| 54_L | | 1.772% | 2.136% | 2.046% | 1.323% | 2.131% |
| 55_L | | 1.487% | 2.136% | 2.046% | 1.527% | 2.131% |
| ... | | | | | | |
| 61_L | | 2.951% | 1.620% | 1.754% | 1.426% | 2.193% |
| 62_L | | 3.218% | 1.620% | 1.548% | 1.841% | 2.019% |
| 54_R | | 2.131% | 1.310% | 2.131% | 3.160% | 1.344% |
| 55_R | | 2.136% | 1.319% | 2.131% | 3.160% | 1.282% |
| ... | | | | | | |
| 61_R | | 3.324% | 1.513% | 1.861% | 1.444% | 2.087% |
| 62_R | | 3.218% | 1.620% | 1.548% | 1.841% | 2.019% |
| 63 | | 3.386% | 1.620% | 1.548% | 3.022% | 2.223% |
| ... | | | | | | |
| 100 | | 7.500% | 7.500% | 7.500% | 7.500% | 7.500% |
| 101 | GOAL | - | - | - | - | - |

FIG. 93

| No | PAYOUT | SELECTION PROBABILITY | | | | | | | | | |
|---|---|---|---|---|---|---|---|---|---|---|---|
| | | 1 BET | 2 BET | 3 BET | 4 BET | 5 BET | 6 BET | 7 BET | 8 BET | 9 BET | 10 BET |
| 0 | 500 | 30% | 10% | 2% | 0 | 0 | 0 | 0 | 0 | 0 | 0 |
| 1 | 1000 | 51% | 17% | 12% | 8% | 2% | 0 | 0 | 0 | 0 | 0 |
| 2 | 3000 | 8% | 46% | 19% | 14% | 6% | 0 | 0 | 0 | 0 | 0 |
| 3 | 5000 | 4% | 14% | 40% | 22% | 8% | 32% | 28% | 24% | 20% | 16% |
| 4 | 10000 | 4% | 7% | 18% | 44% | 69% | 44% | 41% | 38% | 35% | 32% |
| 5 | PROGRESSIVE | 3% | 6% | 9% | 12% | 15% | 24% | 31% | 38% | 45% | 52% |
| TOTAL | | 100% | 100% | 100% | 100% | 100% | 100% | 100% | 100% | 100% | 100% |

FIG. 102A

VERSUS EVENT DETERMINATION TABLE 1

| ID | EVENT | SELECTION PROBABILITY |
|---|---|---|
| 1 | CAMEL RACE | 12.50% |
| 2 | BATTLE | 12.50% |
| 3 | TREASURE ISLAND | 12.50% |
| 4 | KING'S AWARD | 12.50% |
| 5 | ROC'S EGG | 12.50% |
| 6 | ROC SHOOTING | 12.50% |
| 7 | BOATING | 12.50% |
| 8 | COCONUT DROPPING | 12.50% |
| TOTAL | | 100% |

FIG. 102B

VERSUS EVENT DETERMINATION TABLE 2

| ID | EVENT | SELECTION PROBABILITY |
|---|---|---|
| 1 | CAMEL RACE | 16.67% |
| 2 | BATTLE | 16.67% |
| 3 | TREASURE ISLAND | 16.67% |
| 4 | KING'S AWARD | 16.67% |
| 5 | ROC'S EGG | 0 |
| 6 | ROC SHOOTING | 0 |
| 7 | BOATING | 16.67% |
| 8 | COCONUT DROPPING | 16.67% |
| TOTAL | | 100% |

GAMING MACHINE, GAMING SYSTEM, AND GAMING METHOD

BACKGROUND (a) Field

The present invention generally relates to a gaming machine, a gaming system, and a gaming method.

(b) Description of the Related Art

A conventional gaming machine includes a display arranged with a plurality of symbols. The gaming machine rearranges the symbols in a game, and awards a payout to a player according to the combination of rearranged symbols (for example, United State Patent Application Publication No. 2008/0058067 and United State Patent Application Publication No. 2008/0058072). The player can start another game after one game ends.

However, in the conventional gaming machine, although the games are repeatedly executed, there is no continuity of the games. Since the conventional gaming machine does not provide the continuity of the games, it is difficult to attract a player's interest in a game.

SUMMARY

An aspect of the present invention provides a gaming machine, a gaming system, and a gaming method for providing continuity of games.

Another aspect of the present invention provides a gaming machine including a display and a controller. The display displays a jackpot challenge for providing a progressive payout. The controller executes each round of a game, determines an event to be performed in each round, determines whether a determined event belongs to predetermined events capable of providing any one icon of a plurality of icons, performs the determined event and determine a result of a performed event, obtains an icon of the performed event when the performed event belongs to the predetermined events and the result of the performed event is to award the icon of the performed event to a player, triggers the jackpot challenge when the plurality of icons are obtained, and executes the jackpot challenge to determine whether to award the progressive payout to the player.

The controller may receive a bet betted by the player in each round, determine a selection probability of the progressive payout based on an average bet per round until the jackpot challenge is triggered, and determine whether to award the progressive payout to the player based on the selection probability.

The controller may calculate the average bet per round based on a value that is obtained by dividing a sum of bets betted by the player until the jackpot challenge is triggered by a number of the rounds executed until the jackpot challenge is triggered.

The controller may calculate the average bet per round by dividing the value by predetermined credits corresponding to a default bet.

The controller may receive a bet betted by the player in each round, determine a selection probability of the progressive payout based on a sum of bets betted by the player until the jackpot challenge is triggered, and determine whether to award the progressive payout to the player based on the selection probability.

The display may display a plurality of icon areas that correspond to the plurality of icons, respectively, and the controller may fill a corresponding icon area of the icon areas with an obtained icon when obtaining the icon of the performed event.

The gaming machine may further include a second display. The controller may execute a battle between the character of the player and a character corresponding to the icon of the performed event in the second display when the performed event belongs to the predetermined events, and obtain the icon of the performed event when the character of the player defeats the character corresponding to the icon.

The controller may move a character of the gaming machine to a destination cell in each round and to determine the event of each round.

The gaming machine may further include a second display, and the controller may display a wheel including a plurality of digits in the second display when each round is executed, determine any one digit from among the plurality of digits when the wheel is slid by the player on the second display, stop the wheel in the display to indicate the determined digit, and move the character by the determined digit.

The display may be shared by a neighbor gaming machine of the gaming machine.

According to yet another aspect of the present invention, a gaming system including a plurality of main displays, a common display and a controller is provided. The plurality of main displays are provided for a plurality of players, and each main display displays images of a game for a corresponding player. The common display is provided for the main displays. The controller executes each round of the game for each player, determines an event to be performed for the corresponding player in each round, determines whether a determined event belongs to predetermined events capable of providing any one icon of the plurality of icons, performs the determined event and determine a result of a performed event, awards an icon of the performed event to a player of the performed event when the performed event belongs to the predetermined events and the result of the performed event is to award the icon of the performed event, triggers the jackpot challenge for a certain player when the certain player obtain the plurality of icons, and executes the jackpot challenge on the common display to determine whether to award the progressive payout to the certain player.

The controller may receive a bet betted by the certain player in each round, determine a selection probability of the progressive payout based on an average bet per round of the certain player until the jackpot challenge is triggered, and determine whether to award the progressive payout to the certain player based on the selection probability.

The controller may receive a bet betted by the certain player in each round, determine a selection probability of the progressive payout based on a sum of bets betted by the certain player until the jackpot challenge is triggered, and determine whether to award the progressive payout to the certain player based on the selection probability.

The common display may display a plurality of icon areas each of the player, the plurality of icon areas corresponding to the plurality of icons, respectively, and the controller may fill a corresponding icon area of the icon areas for the player of the performed event with an obtained icon when the icon of the performed event awarded to the player of the performed event.

The controller may execute a battle between the character of the player and a character corresponding to the icon of the performed event in the main display for the player of the performed event when the performed event belongs to the predetermined events, and obtain the icon of the performed event when the character of the player defeats the character corresponding to the icon.

According to yet another aspect of the present invention, a gaming method by a controller of a gaming machine is provided. The method includes executing each round of a game, determining an event to be performed in each round, determining whether a determined event belongs to predetermined events capable of providing any one icon of the plurality of icons, performing the determined event and determining a result of a performed event, obtaining an icon of the performed event when the performed event belongs to the predetermined events and the result of the performed event is to award the icon of the performed event to a player, triggering the jackpot challenge when the plurality of icons are obtained, and executing the jackpot challenge to determine whether to award the progressive payout to the player.

The method may further include receiving a bet betted by the player in each round, determining a selection probability of the progressive payout based on an average bet per round until the jackpot challenge is triggered, and determining whether to award the progressive payout to the player based on the selection probability.

The method may further include receiving a bet betted by the player in each round, determining a selection probability of the progressive payout based on a sum of bets betted by the player until the jackpot challenge is triggered, and determining whether to award the progressive payout to the player based on the selection probability.

The method may further include displaying on a display a plurality of icon areas that correspond to the plurality of icons, respectively, and filling a corresponding icon area of the icon areas with an obtained icon when obtaining the icon of the performed event.

The method may further include executing a battle between the character of the player and a character corresponding to the icon of the performed event when the performed event belongs to the predetermined events, and obtaining the icon of the performed event when the result of the performed event is the character corresponding to the icon defeated by the character of the player defeats.

BRIEF DESCRIPTION OF THE DRAWINGS

FIG. 12 shows an example of symbol sequences of reels for a base game according to an embodiment of the present invention.

FIG. 13 shows an example of a payout table for a base game according to an embodiment of the present invention.

FIG. 19 shows an example of a spin table determination table according to an embodiment of the present invention.

FIG. 23 shows an example of a payout determination table for a treasure box event 1 shown in FIG. 22.

FIG. 25 shows an example of a payout determination table for a treasure box event 1 shown in FIG. 24.

FIG. 27 shows an example of a payout determination table for a treasure box event 2.

FIG. 28A shows an example of a payout determination table for a treasure box event 3.

FIG. 28B shows an example of a payout determination table for a treasure box event 4.

FIG. 28C shows an example of a payout determination table for a treasure box event 5.

FIG. 28D shows an example of effects determination table in a treasure box event 3, 4, or 5.

FIG. 35 shows an example of a payout determination table for a coconut catching event shown in FIG. 34A to FIG. 34C.

FIG. 36 shows an example of a payout distribution table for a coconut catching event shown in FIG. 34A to FIG. 34C.

FIG. 39 shows an example of a payout determination table for a coconut palm kicking event shown in FIG. 38A and FIG. 38B.

FIG. 40 shows an example of a pattern determination table for a coconut palm kicking event shown in FIG. 38A and FIG. 38B.

FIG. 43A shows an example of an option determination table for a treasure map event shown in FIG. 42A and FIG. 42B.

FIG. 43B shows an example of a payout determination table for a treasure map event shown in FIG. 42A and FIG. 42B.

FIG. 46A shows an example of an option determination table for a goods trade event shown in FIG. 45A and FIG. 45B.

FIG. 46B shows an example of a payout determination table for a goods trade event shown in FIG. 45A and FIG. 45B.

FIG. 49 shows an example of a payout determination table for a treasure box discovery event shown in FIG. 48A to FIG. 48C.

FIG. 50A, FIG. 50B and FIG. 50C show an example of a rendering picture at a fishing event determined in a bonus round.

FIG. 52 shows an example of a payout determination table for a caving event shown in FIG. 51A to FIG. 51C.

FIG. 54A and FIG. 54B show examples of rolling pattern tables for a big ball rolling event shown in FIG. 53A to FIG. 53C.

FIG. 55A, FIG. 55B, FIG. 55C and FIG. 55D show a route specification table for a big ball rolling event shown in FIG. 53A to FIG. 53C.

FIG. 57 shows an example of a payout determination table for a bridge event shown in FIG. 56A to FIG. 56C.

FIG. 62A shows an example of an expansion determination table for an expanded WILD free game event shown in FIG. 61A and FIG. 61B.

FIG. 62B shows an example of an expanded reel determination table for an expanded WILD free game event shown in FIG. 61A and FIG. 61B.

FIG. 63 shows an example of another expanded reel determination table for an expanded WILD free game event shown in FIG. 61A and FIG. 61B.

FIG. 64 shows an example of symbol sequences of reels for an expanded WILD free game event shown in FIG. 61A and FIG. 61B.

FIG. 66A shows an example of an expansion determination table for a scattered WILD free game event shown in FIG. 65A and FIG. 65B.

FIG. 66B shows an example of a number determination table for a scattered WILD free game event shown in FIG. 65A and FIG. 65B.

FIG. 67 shows an example of another number determination table for a scattered WILD free game event shown in FIG. 65A and FIG. 65B.

FIG. 68 shows an example of symbol sequences of reels for a scattered WILD free game event shown in FIG. 65A and FIG. 65B.

FIG. 70 shows an example of symbol sequences of reels for a WILD re-spin free game event shown in FIG. 69A to FIG. 69D.

FIG. 73 shows an example of a payout determination table for a goal point event shown in FIG. 72A and FIG. 72B.

FIG. 74 shows an example of a versus event determination table according to an embodiment of the present invention.

FIG. 77A, FIG. 77B and FIG. 77C show an example of a rendering picture at a king's award event determined in a versus event.

FIG. 80 shows an example of a ranking determination table for a camel race event shown in FIG. 79A to FIG. 79C.

FIG. 82A shows an example of a payout determination table for a boating event shown in FIG. 81A to FIG. 81D.

FIG. 82B shows an example of a distribution pattern table for a boating event shown in FIG. 81A to FIG. 81D.

FIG. 88A and FIG. 88B show examples of mysterious bonus determination tables for a mysterious bonus game according to an embodiment of the present invention.

FIG. 93 shows an example of a payout determination table for a jackpot challenge shown in FIG. 92A to FIG. 92C.

FIG. 102A and FIG. 102B show examples of versus event determination tables for a versus event triggering process shown in FIG. 101.

DETAILED DESCRIPTION

Figure 1:
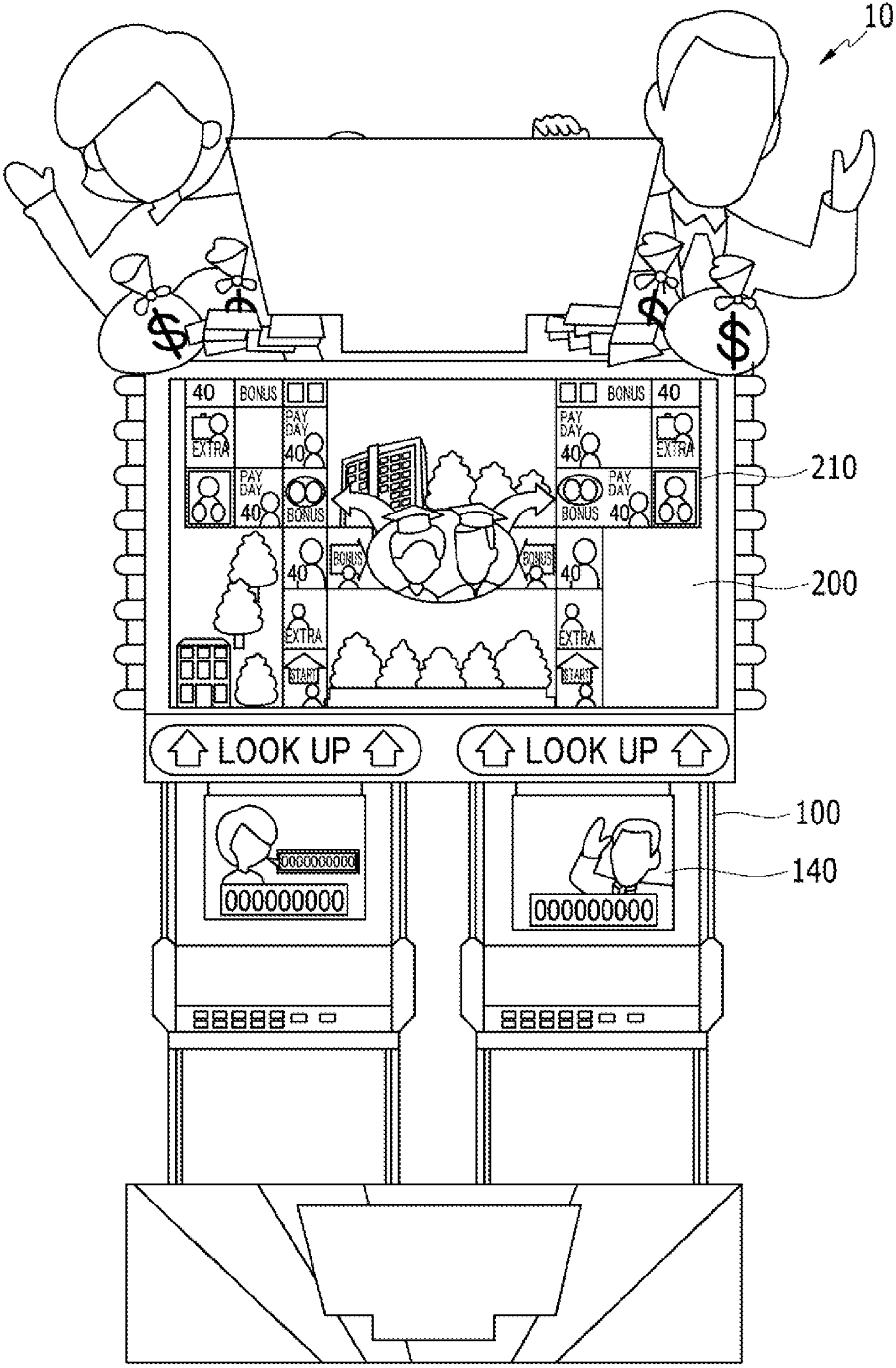
FIG. 1 is a front view of a gaming system according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A gaming machine, a gaming system, and a gaming method thereof according to embodiments of the present invention are described in detail with reference to the accompanying drawings.

FIG. 1 is a front view of a gaming system according to an embodiment of the present invention, and FIG. 2A, FIG. 2B, FIG. 2C, FIG. 2D and FIG. 2E are a flowchart of a gaming method according to various embodiments of the present invention.

Referring to FIG. 1, a gaming system 10 includes a plurality of gaming machines 100 and a common display 200 installed on the gaming machines 100. The gaming machines 100 are disposed side by side, and are connected via a wire or wireless network. Each gaming machine 100 includes a main display 140 disposed below the common display 200.

In another embodiment, each gaming machine 100 may include a top display installed on the main display 140. In this case, the common display 200 of the gaming system 10 is replaced by top displays of the gaming machines 100 forming the gaming system 10.

The common display 200 displays at least part of a map 210 including a plurality of cells forming courses in a bonus game. Each of characters corresponding to players of the gaming machines 100 moves along the courses of the map 210 in each round of the bonus game. The cells may represent various events. The main display 140 displays images for a base game and the bonus game.

Figure 2A:
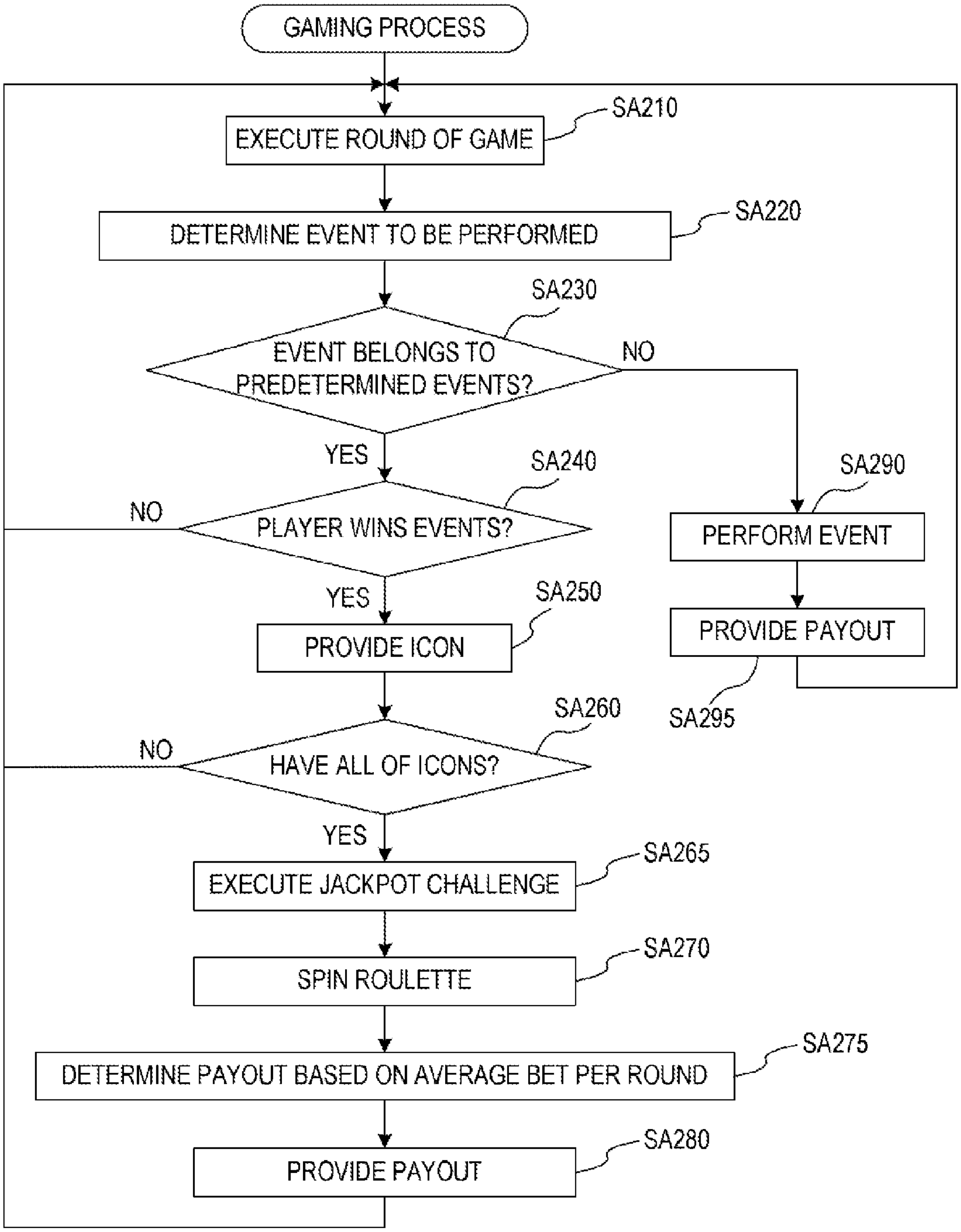
FIG. 2A, FIG. 2B, FIG. 2C, FIG. 2D, FIG. 2E are a flowchart of a gaming method according to various embodiments of the present invention.

Referring to FIG. 1 and FIG. 2A, a gaming machine 100 in which a predetermined game is triggered repeatedly executes a round of the predetermined game (SA210). The predetermined game may be a bonus game that will be described in below. When each round is executed, the gaming machine 100 determines an event of each round (SA220).

Further, the gaming machine 100 determines whether the determined event belongs to predetermined events (SA230). The predetermined events may be treasure box events 3, 4 and 5, and battle events 1, 2 and 3 that will be described in below, and are events capable of an icon of an opponent character such as Cyclops, a giant snake, or a skeleton gladiator. In the predetermined events, the icon of the opponent may be provided to the player as the result of the event. For example, a battle between a character of the gaming machine 100 and the opponent character may be provided while the event is performed. When the character of the gaming machine 100 defeats the opponent character, the icon of the opponent character is awarded. That is, when a player of the gaming machine 100 wins the event, the icon is awarded as a profit.

When the event belongs to the predetermined events (SA230: YES), the gaming machine 100 determines whether the player wins the event (SA240). When the player wins the event (SA240: YES), the gaming machine 100 provides the icon of the opponent character for the event (SA250).

Next, the gaming machine 100 determines whether the player obtains all icons of a plurality of opponent characters (SA260). When the player obtains all icons (SA260: YES), the gaming machine 100 triggers and executes a jackpot challenge (SA265). In the jackpot challenge, the gaming machine 100 displays roulette on the top display 120 or the common display 200, and spins the roulette (SA270). The gaming machine 100 determines a payout of the jackpot challenge based on a selection probability determined by an average BET per round, and stops the roulette to indicate the determined payout (SA275). In this case, as higher the average BET per round is, higher a probability of a progressive payout to be selected is. Alternatively, the selection probability may be determined by accumulated BET amounts. That is, as higher the accumulated BET amounts are, higher a probability of a progressive payout to be selected is. Next, the controller awards the determined payout to the player (SA280).

On the other hand, when the event does not belong to the predetermined events (SA230: NO), the gaming machine 100 performs the event (SA290), and provides a payout according to a result of the event (SA295).

As described above, according to an embodiment of the present invention, since the player can challenge a jackpot when obtaining all icons of a plurality of opponent characters that are provided in some rounds, the player can continuously play a plurality of rounds. Further, since whether the progressive payout of the jackpot challenge is provided or not is determined by the average BET per round, the player can expect to receive the progressive payout if betting high BETs in each round.

Figure 2B:
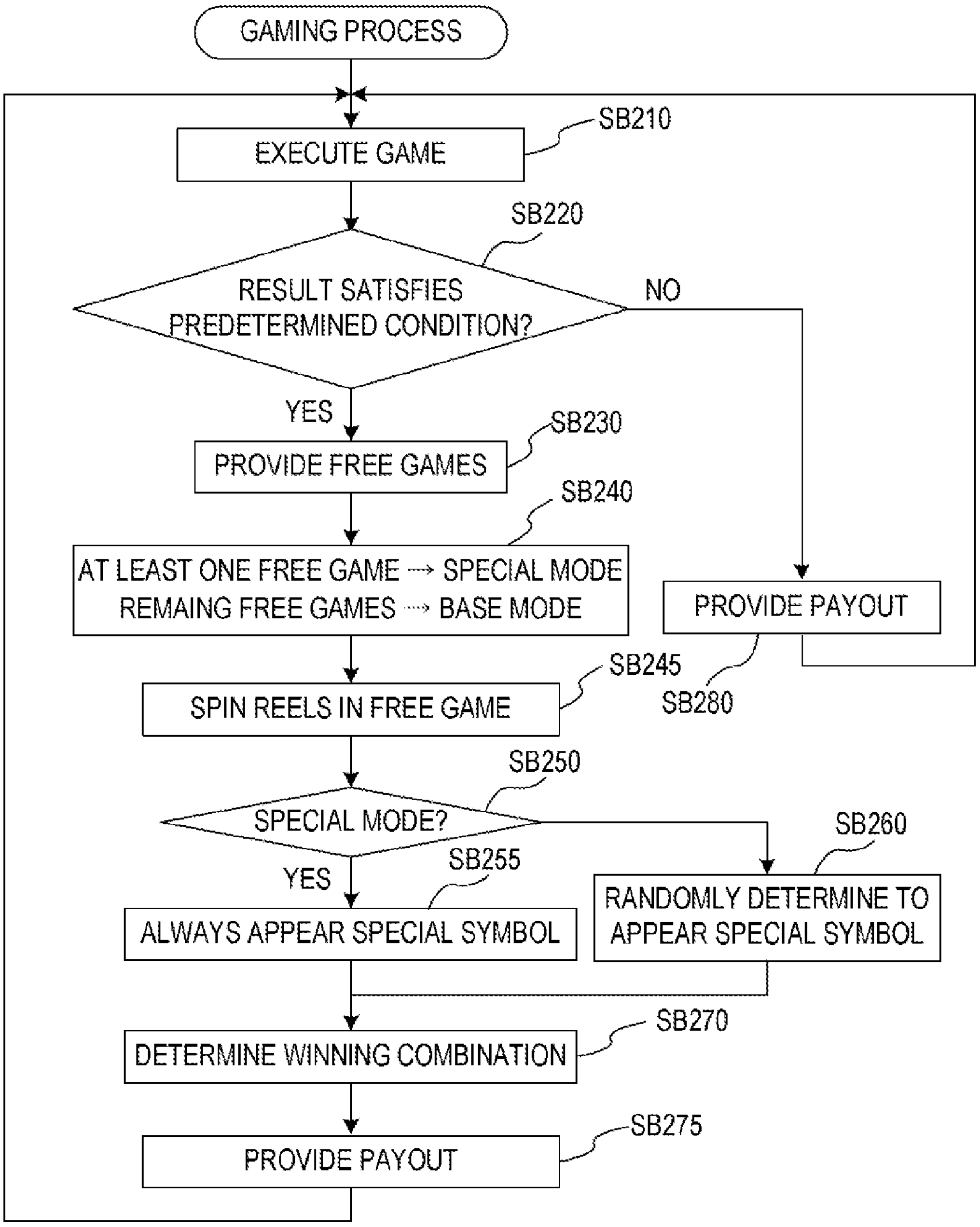

Referring to FIG. 1 and FIG. 2B, a gaming machine 100 execute a game (SB210). The game may be a basic game, or a bonus game that is triggered in the basic game. When the game is the bonus game, the gaming machine 100 repeatedly executes a round of the bonus game. When each round is executed, the gaming machine 100 may determine an event of each round.

Further, the gaming machine 100 determines whether a result of the game satisfies a predetermined condition (SB220). If the game is the bonus game, the gaming machine 100 may determine whether the result of the game satisfies the predetermined condition by determining whether the determined event belongs to a predetermined event. The predetermined event may be a free game type event such as an expanded WILD free game event or a scattered WILD free game event that will be described in below, and is an event capable of providing a plurality of free games. In the predetermined event, the free games are provided to the player, and the player can perform the free games without betting additional credits.

When the result satisfies to the predetermined condition (SB220: YES), the gaming machine 100 provides a plurality of free games (SB230). Further, the gaming machine 100 determines at least one free game to a special mode from among the plurality of free game, and determines remaining free games to a base mode (SB240). In each free game, the gaming machine spins a plurality of reels to rearrange a plurality of symbols on a main display 140 (SB245).

When the free game is in the special mode (SB250: YES), the gaming machine 100 rearrange the plurality of symbols to always appear at least one special symbol on the main display 140 (SB255). The special symbol may be a symbol that is substituted to a certain symbol to combine with the certain symbol appeared on the main display and establishes the winning combination of the certain symbols. The special symbol may be a WILD symbol.

When the free game is in the base mode (SB250: NO), the gaming machine 100 rearrange the plurality of symbols to randomly determine at least one special symbol on the main display 140 (SB260).

Next, the gaming machine 100 determines a winning combination of the symbols rearranged on the main display 140 in each free game (SB270), and provides a payout according to the winning combination (SB275).

On the other hand, when the result does not satisfy the predetermined condition (SB220: NO), the gaming machine 100 provides a payout according to a result of the game (SB280).

As described above, according to an embodiment of the present invention, since the special symbol is always appeared in at least one free game when the event provided in the round is the free game type event, the player can obtain a higher payout according to the special symbol. Accordingly, the player can continuously play a plurality of rounds to select a round in which the free game type event is provided.

Figure 2C:
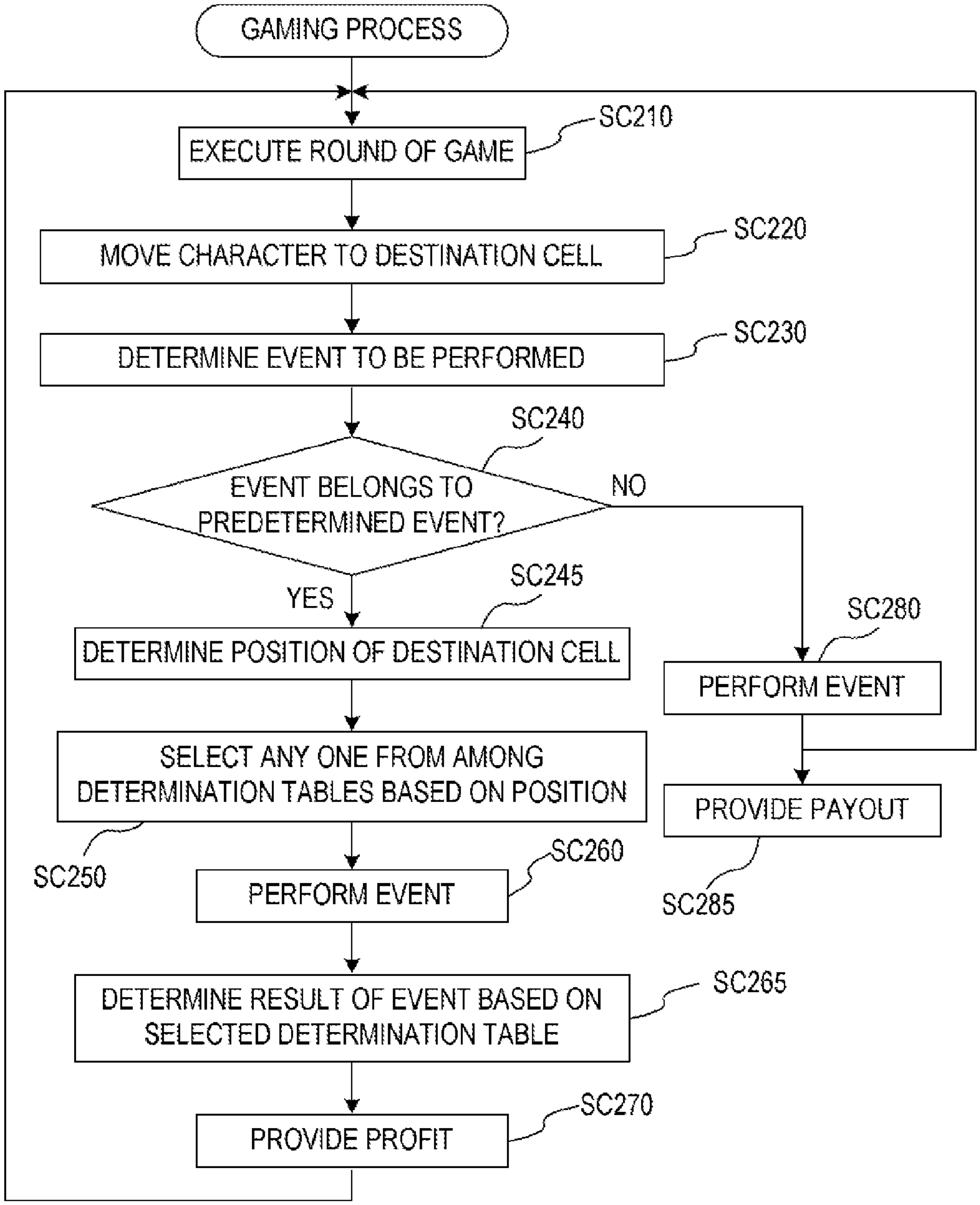

Referring to FIG. 1 and FIG. 2C, a gaming machine 100 in which a predetermined game is triggered repeatedly executes a round of the predetermined game (SC210). The predetermined game may be the bonus game. When each round is executed, the gaming machine 100 moves a character of a player to a destination cell in each round (SC220), and determines an event to be performed in each round (SC230).

Further, the gaming machine 100 determines whether the determined event belongs to predetermined events (SC240). The predetermined events may be treasure box events 1, 2, 3, 4 and 5 that will be described in below, and are events for appearing an object that is randomly determined when the event is performed. The object may be a payout, a character, or another event.

When the event belongs to the predetermined events (SC240: YES), the gaming machine 100 determines a position of the destination cell (SC245). The gaming machine 100 selects any one determination table from among a plurality of determination tables based on the position of the destination cell (SC250). Each determination table represents mappings between a plurality of results and selection probabilities. The results or the selection probabilities are different in different determination tables. The plurality of determination table may be payout determination table for the treasure box events 1, 2, 3, 4 and 5.

Next, the gaming machine 100 performs the event (SC260), and determines a result of the performed event based on the selected determination table (SC265). Further, the gaming machine awards a profit corresponding to the result of the performed event to the player (SC270).

On the other hand, when the event does not belong to the predetermined events (SC240: NO), the gaming machine 100 performs the event (SC280), and provides a payout according to a result of the event (SC285).

The plurality of cells for the map may include first cells and second cells that are nearer to a goal point of the map than the first cells. The gaming machine may select a first determination table from among the plurality of determination tables when the destination cell belongs to the first cells, and may select a second determination table from among the plurality of determination tables when the destination cell belongs to the second cells. In this case, the first determination table includes a result for moving the character to the goal point, and the second determination table does not include the result for moving the character to the goal point.

The plurality of cells of the map may include a predetermined cell on which an opponent character is depicted. The gaming machine 100 may select any one determination table from among determination tables that exclude a determination table for appearing the opponent character from the plurality of determination tables when the part of the map that is displayed on the common display 200 or the top display 120 includes the predetermined cell.

Since there is no need to directly move the character to goal point in the destination cell that is near to the goal point, the determination table for moving the character to the goal point is excluded. Accordingly, the player cannot worry about moving the goal point without performing other events when being closed to the goal point. Further, when the part of map displayed on the display includes a cell on which a certain opponent character is depicted, the player cannot be interested in the appearance of the opponent character if the same opponent character appears from the treasure box. Accordingly, the determination table for appearing the certain opponent character is excluded.

Figure 2D:
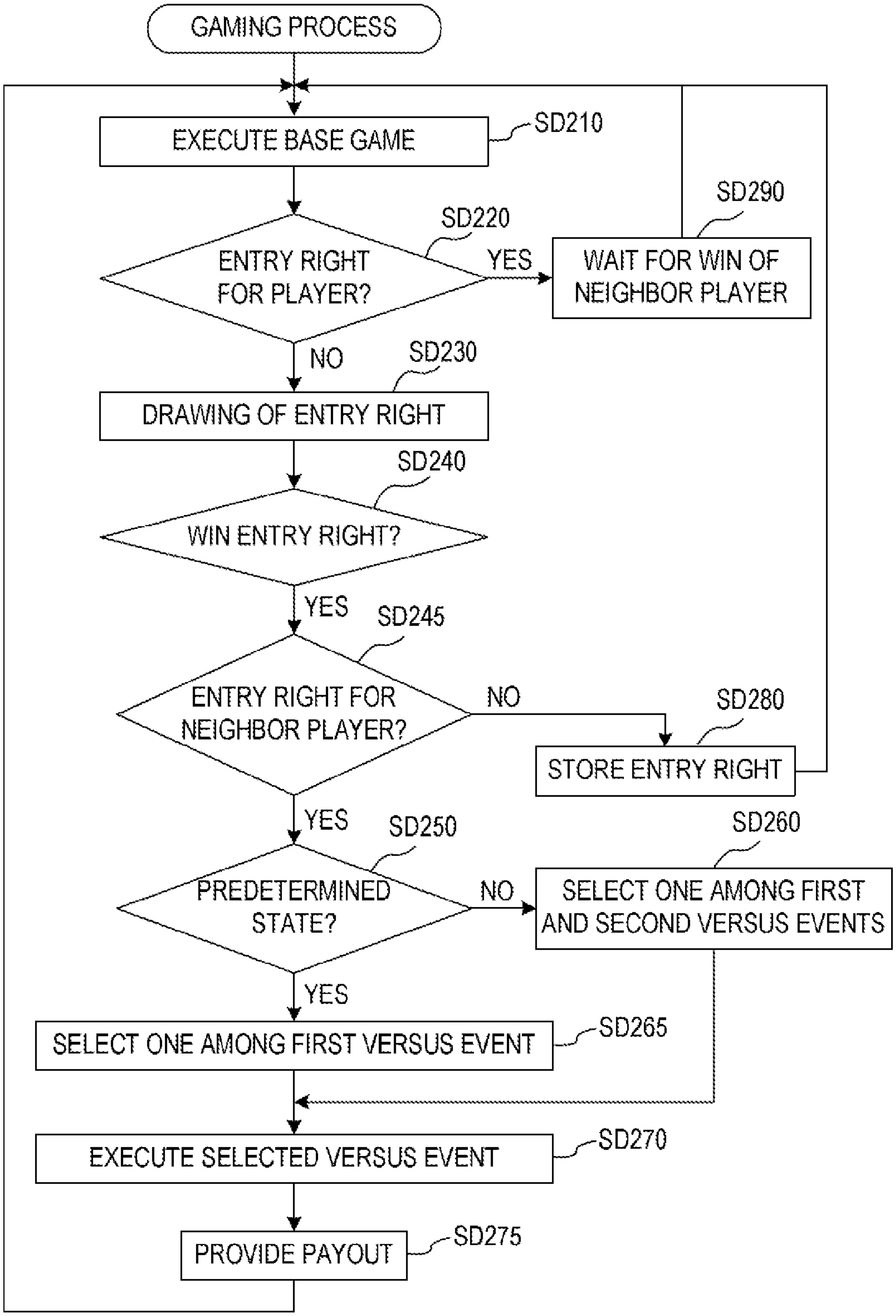

Referring to FIG. 1 and FIG. 2D, each gaming machine 100 displays an image for a base game in the main display 140, and executes the base game according to an input of a corresponding player (SD210). For example, each gaming machine 100 may display a plurality of reels including a plurality of symbols, and spin the reels to rearrange the symbols according to the input of the corresponding player.

When the base game for the player is executed, the gaming machine 100 or the gaming system 10 determines whether the player, i.e., the gaming machine 100 has an entry right for entering for a versus event (SD220). If the player does not have the entry right (SD220: NO), the gaming machine 100 or the gaming system 10 performs drawing (i.e., lottery) of the entry right (SD230). Further, the gaming machine 100 randomly determines a result of the base game. The versus event is a game in which the players of the gaming machines 100 forming the gaming system 10 perform a same game to obtain an award of the same game.

Next, if the player wins the entry right in the drawing (SD240: YES), the gaming machine 100 or the gaming system 10 determines whether a neighbor player, i.e., a neighbor gaming machine 100*a* has the entry right (SD245). If the neighbor player has the entry right when the player has the entry right (SD245: YES), the gaming machine 100 or the gaming system 10 determines a state of the neighbor gaming machine 100*a* (SD250).

When the neighbor gaming machine 100*a* is not in a predetermined state (SD250: NO), the gaming machine 100 or the gaming system 10 selects any one versus event from among at least one first versus event and at least one second versus event (SD260). When the neighbor gaming machine 100*a* is in the predetermined state (SD250: YES), the gaming machine 100 or the gaming system 10 selects any one versus event from among only the at least one first versus event (SD265). In this case, the second versus event may include an event that selects any one player of the player and the neighbor player and then is performed for only the selected player. The first versus event may include an event in which the player and the neighbor player alternately select any one option from among a plurality of options to determine win, or an event in which the player and the neighbor player compete on a same screen to determine win. Further, the predetermined state may include a state in which the neighbor gaming machine 100*a* performs a predetermined game using the common display 200.

Next, the gaming machine 100 or the gaming system 10 executes the selected versus event after the base game ends, and determine a winner among the player and the neighbor player (SD270). The gaming machine 100 or the gaming system 10 provides a payout of the versus event to the winner (SD275).

If the neighbor player does not the entry right when the player has the entry right (SD245: NO), the gaming machine 100 or the gaming system 10 stores the entry right of the player in a memory (SD280).

If the player has the entry right when the base game is executed (SD220: YES), the gaming machine 100 or the gaming system 10 does not perform drawing of the entry right for the player and waits until the neighbor player wins the entry right (SD290).

As described above, according to an embodiment of the present invention, the gaming machine or the gaming system can provide the player with the versus event for competing with the neighbor player, thereby attracting the player's interest. Further, since the entry right for the versus event is determined by the drawing and is stored until the entry right is exhausted by executing the versus event, the gaming machine or the gaming system can make the player continuously play the game to obtain the entry right or to enter for the versus event. Furthermore, while the predetermined game using the common display is performed in the neighbor player, the gaming machine or the gaming system does not perform the event for only one player. As a result, the predetermined game of the neighbor player can be unaffected by the player.

Figure 2E:
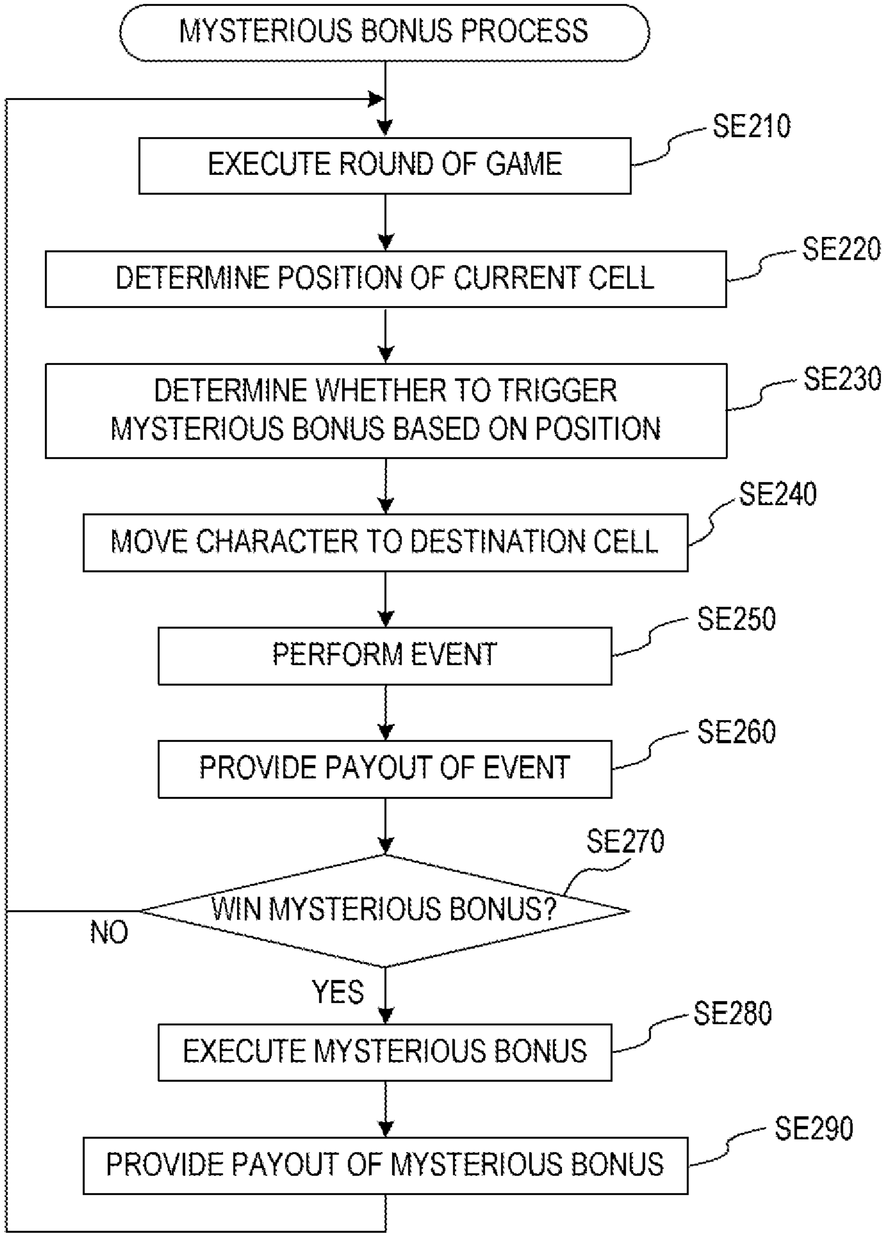

Referring to FIG. 1 and FIG. 2E, a gaming machine 100 in which a predetermined game is triggered repeatedly executes a round of the predetermined game (SE210). The predetermined game may be the bonus game. When each round is executed, the gaming machine 100 determines a position of a current cell at which a character for the player is located in the executed bonus round (SE220).

Next, the gaming machine 100 determines whether to trigger a mysterious bonus game with a triggering probability in each round (SE230). The triggering probability is determined by information including a position of the current cell in each bonus round. Next, the gaming machine 100 moves the character from the current cell to a destination cell (SE240). The gaming machine 100 performs an event set the destination cell (SE250), and provides a payout according to a result of the performed event (SE260).

When the mysterious bonus game is determined to be triggered (SE270: YES), the gaming machine 100 executes the mysterious bonus game on the common display 200 or the top display 120 (SE280), and provides a payout according to the mysterious bonus game (SE290).

On the other hand, the gaming machine 100 or the gaming system 10 may execute a versus event when both the gaming machine 100 and a neighbor gaming machine 100*a* have an entry right of the versus event. The versus event is an event in which the player of the gaming machine 100 and a neighbor player of the neighbor gaming machine 100*a* perform a same game to obtain an award of the same game. When the gaming machine 100 does not have the entry right, the gaming machine 100 or the gaming system 10 performs drawing of the entry right for the gaming machine 100 each time a base game is executed. The base game is a game for triggering the predetermined game (the bonus game). The gaming machine 100 or the gaming system 10 executes the versus event if the neighbor gaming machine 100*a* has the entry right when the gaming machine 100 wins the entry right in the drawing. The gaming machine 100 or the gaming system 10 stores the entry right if the neighbor gaming machine 100*a* does not have the entry right when the gaming machine 100 wins the entry right in the drawing, When the gaming machine 100 has the entry right, the gaming machine 100 or the gaming system 10 does not perform drawing of the entry right. Instead, the gaming machine 100 or the gaming system 10 may set the triggering probability for the mysterious bonus game of the case that the gaming machine 100 has the entry right to be higher than the triggering probability for the mysterious bonus game of the case that the gaming machine 100*a* does not have the entry right.

As described above, according to an embodiment of the present invention, since the player can obtain a mysterious bonus game in a certain round, the player can continuously play a plurality of rounds. Further, since the triggering probability of mysterious bonus game becomes higher the when the player has the entry right of the versus event, the gaming machine can provide another profit instead of performing drawing of the entry right.

Next, a structure of a gaming machine according to an embodiment of the present invention will be described with reference to FIG. 3 to FIG. 6.

Figure 3:
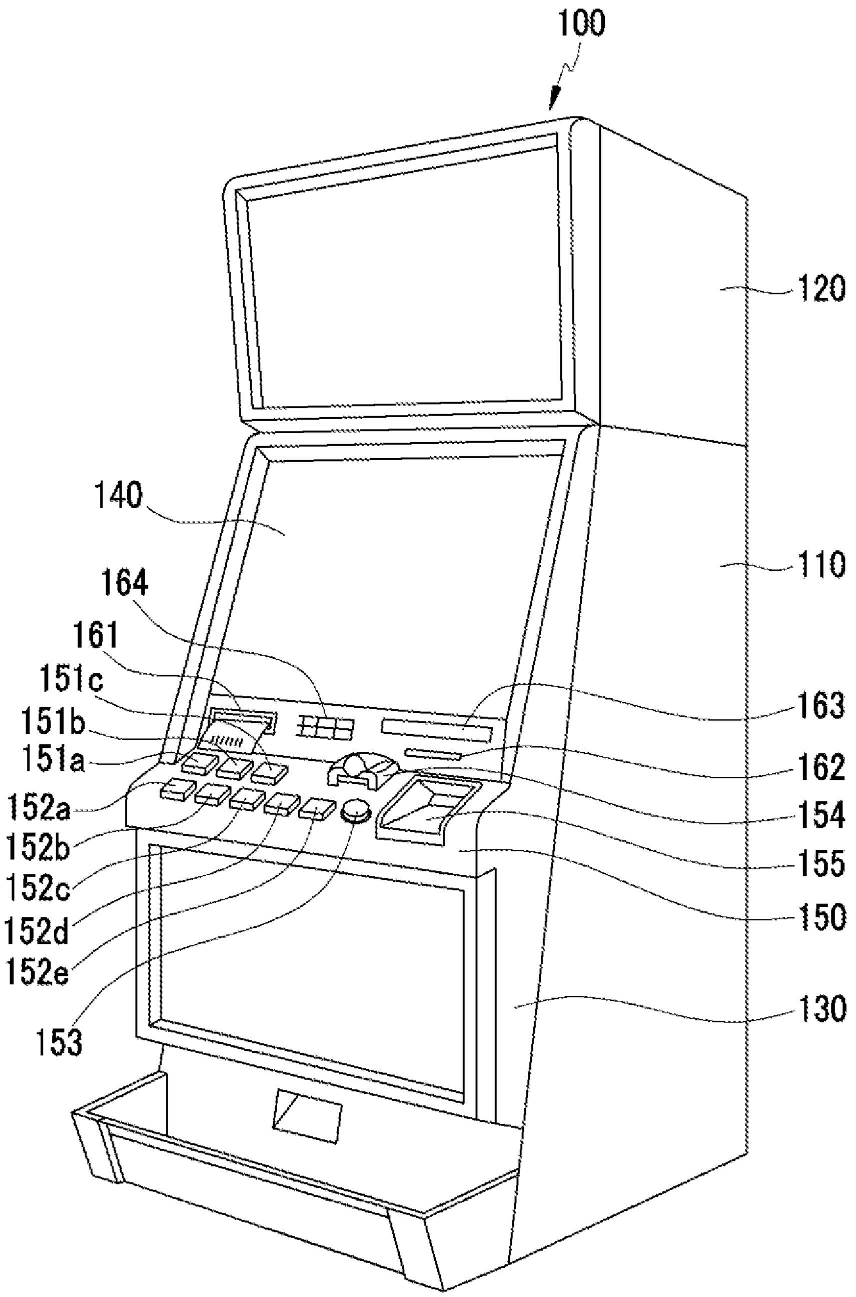
FIG. 3 is a perspective view of a gaming machine according to an embodiment of the present invention.
Figure 4:
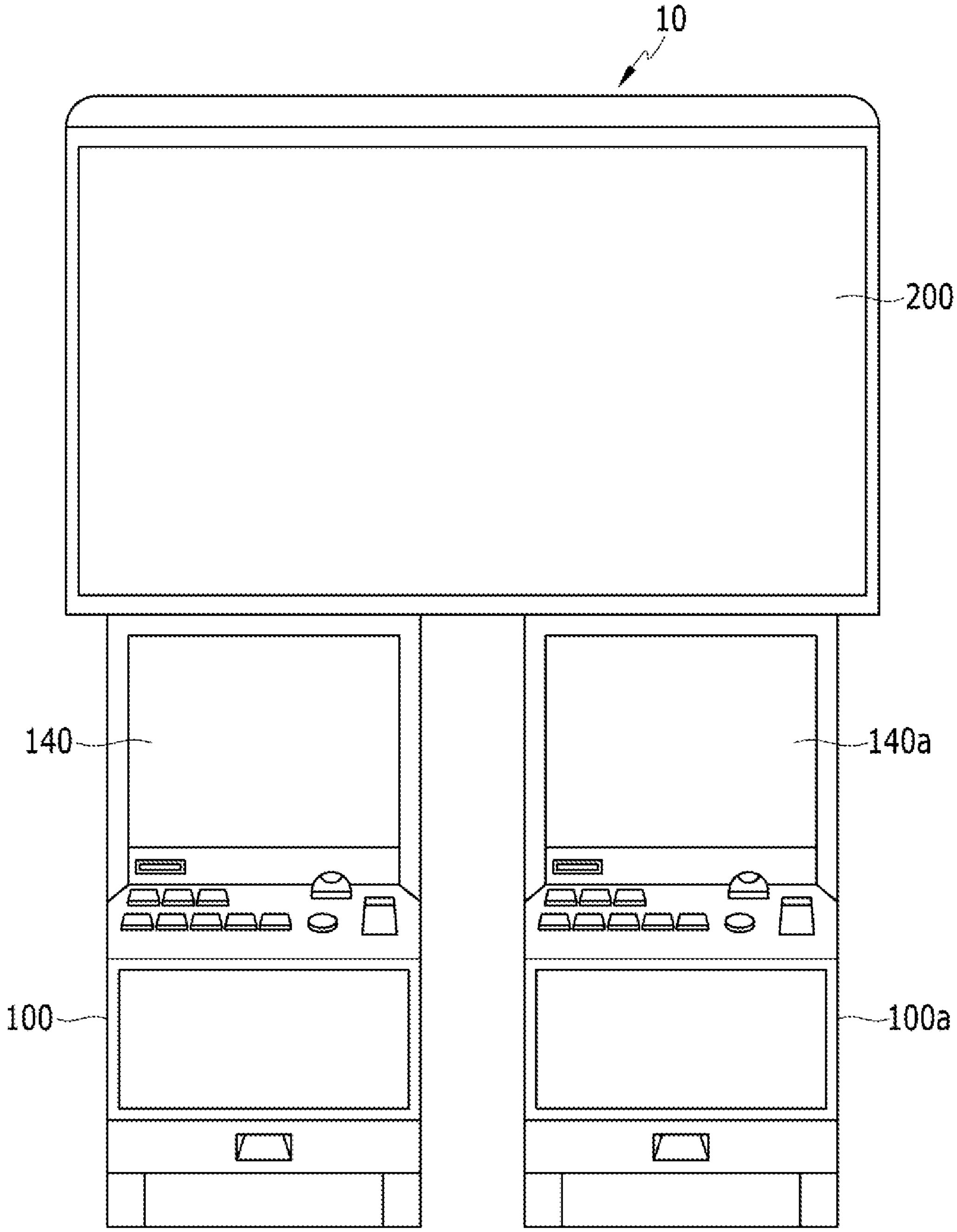
FIG. 4 is a schematic front view of a gaming system according to an embodiment of the present invention.
Figure 5:
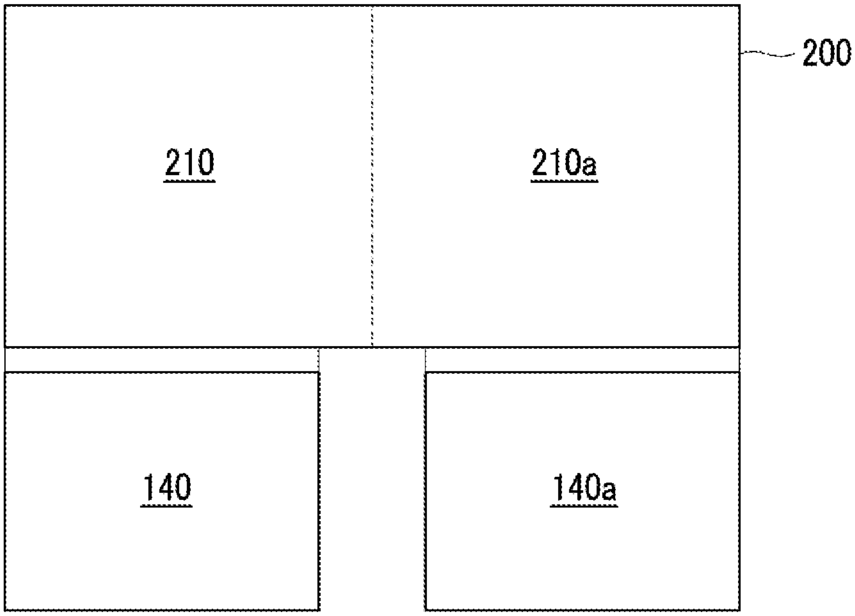
FIG. 5 shows a common display and main displays of a gaming system according to an embodiment of the present invention.
Figure 6:
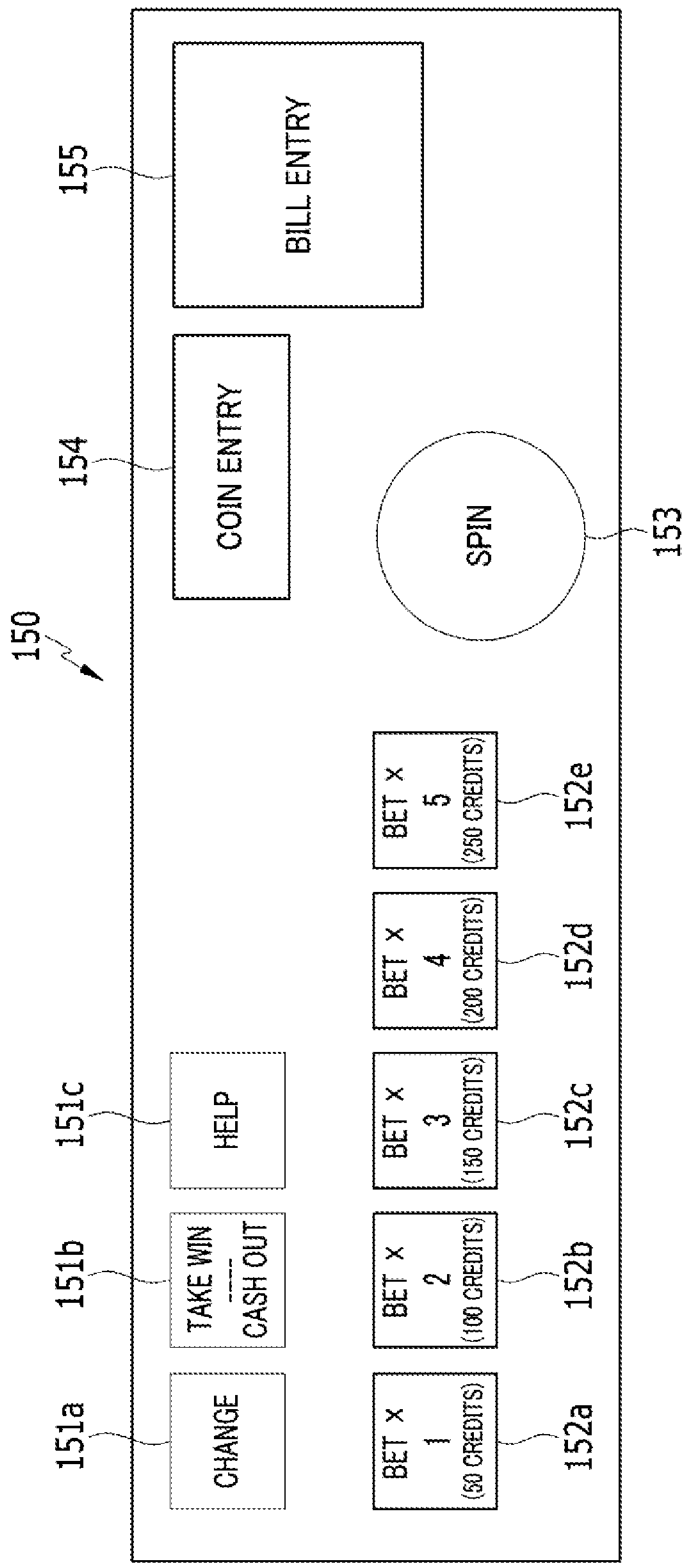
FIG. 6 shows a control panel of a gaming machine according to an embodiment of the present invention.

FIG. 3 is a perspective view of a gaming machine according to an embodiment of the present invention, FIG. 4 is a schematic front view of a gaming system according to an embodiment of the present invention, FIG. 5 shows a common display and main displays of a gaming system according to an embodiment of the present invention, and FIG. 6 shows a control panel of a gaming machine according to an embodiment of the present invention.

In a gaming machine 100 according to an embodiment of the present invention, a coin, a bill or a ticket having a barcode is used as a gaming medium. Alternatively, credit-related data such as money data, stored in a smart card may be used as the gaming medium.

Referring to FIG. 3, a gaming machine 100 includes a cabinet 110, a top display 120 installed at an upper side of the cabinet 110, and a main door 130 provided on a front face of the cabinet 110.

The top display 120 is installed on the cabinet 110 of the gaming machine 100. The top display 120 includes a display panel for displaying a variety of information. An example of the display panel may be a liquid crystal display (LCD) panel or an organic light emitting diode (OLED) panel. The top display 120 displays images related to a bonus game or images related to a versus event.

As shown in FIG. 4, in another embodiment, one top display 200 may be installed on the cabinets of at least two adjacent gaming machines 100 and 100*a*, and may be shared by the adjacent gaming machines 100 and 100*a*. That is, one top display 200 is a common display of the adjacent gaming machines 100 and 100*a*. The common display 200 and the adjacent gaming machines 100 and 100*a* forms a gaming system 10. In this case, the common display 200 and the main displays 140 and 140*a* of the two gaming machines 100 and 100*a* are disposed as shown in FIG. 5. The common display 200 includes a top display portion 210 corresponding to the gaming machine 100 and a top display portion 210*a* corresponding to the gaming machine 100*a*.

Referring to FIG. 3 again, the gaming machine 100 further includes a main display 140 provided on the main door 130. The main display 140 includes a display panel for displaying a variety of information, and the display panel may be a touch screen panel that enables a player to interact with the gaming machine 100 by touching areas on a screen. An example of the display panel may be an LCD panel or an OLED panel. The main display 140 displays a display window including video reels for scroll-displaying and arranging a plurality of symbols in a base game, and displays a variety of game-related information or images as required. This embodiment exemplifies a case where the main display 140 electrically displays a plurality of symbols in fifteen display blocks formed by five columns and three rows. Further, a payline is generated by connecting five display blocks that are placed on the five columns, respectively. For example, a total of 30 paylines may be generated. The paylines are configured to establish a variety of winning combinations.

In addition, in a bonus game, the main display 140 displays images related to the bonus game. The images related to the bonus game include a die image and an image for throwing the die.

The gaming machine 100 further includes a control panel 150 disposed below the main display 140. The control panel 150 includes a variety of buttons 151*a*-151*c*, 152*a*-152*e*, and 153, a coin entry 154, and a bill entry 155.

The control panel 150, as shown in FIG. 6, includes a change button 151*a*, a take win button 151*b*, and a help button 151*c* that are disposed at an upper stage in a left side region toward the panel. The control panel 150 further includes BET×1 button 152*a*, a BET×2 button 152*b*, BET×3 button 152*c*, a BET×4 button 152*d*, and BET×5 button 152*e* that are disposed at a middle stage in a left side region. The control panel 150 further includes a coin entry 154 and a bill entry 155 that are disposed at an upper stage in a right side region toward the panel, and a spin button 153 that is disposed at a lower stage in a right side region.

The change button 151*a* is an operating button to be used when a player wants to leave a seat or when a player wants to request the staffs in a gaming facility to exchange money. The take win button 151*b* is a cash out button used to add the credit data relating to credits obtained in a variety of games to the credit data that is stored in the smart card or output the bill or the ticket corresponding to the total credits. The help button 151*c* is a button to be used in a case where a game operation method or the like is unclear, and when the help button 151*c* is pressed, a variety of help information is displayed on the main display 140.

The BET×1 button 152*a* is a button to be used when player's current credits are betted on a one-by-one basis for each winning payline every time the button is pressed. In this embodiment, an amount of 1 BET may correspond to 50 credits. The BET×2 button 152*b* is a button for starting a game in 2 BETs for each winning payline. In addition, the BET×3 button 152*c* is a button for starting a game by placing 3 BETs for each winning payline. Further, the BET×4 button 152*d* is a button for starting a game by placing 4 BETs for each winning payline. Furthermore, the BET×5 button 152*e* is a button for starting a game by placing 5 BETs for each winning payline. Therefore, a BET amount to for winning paylines is determined by pressing any one of the BET×1 button 152*a*, the BET×2 button 152*b*, the BET×3 button 152*c*, the BET×4 button 152*d*, and the BET×5 button 152*e*. If the player bets N BETs by pressing the BET×N button, default credits (for example 50 credits) of the winning paylines are multiplied by N such that the multiplied credits are awarded to the player. Further, the player can bet (N+M) BETs by continuously pressing the BET×N button and the BET×M button. At this time, the gaming machine 100 may restrict an upper limit of the BET amount, and the upper limit of the BET amount may be 10 BETs.

The spin button 153 is an operating button to be used when scrolling symbols in the base game and when throwing the die or selecting any situation in the bonus game. The coin entry 154 is configured to accept the coin in the cabinet 110. The bill entry 155 is configured to validate whether the entered bill is legitimate or not and to accept a legitimate bill in the cabinet 110. Further, the bill entry 155 can accept the ticket having the barcode.

Referring to FIG. 3 again, a ticket printer 161, a card reader 162, a data display 163, and a keypad 164 are provided below the main display 140.

The ticket printer 161 prints, on a ticket, a barcode having encoded data containing credit-value, date and time, identification number of a gaming machine 100, or the like, and issues the ticket 161*a* having the barcode attached thereto. A player can play a game in another gaming machine with the ticket 161*a* having the barcode, or exchange the ticket 161*a* having the barcode for bills or the like at a change booth or the like of the game arcade.

The card reader 162 reads/writes data from/to a smart card. The smart card is carried by a player, and stores therein data for identifying the player, data relating to the history of games played by the player, or the like.

The data displayer 163 includes a fluorescent display or the like, and displays the data read by the card reader 162 and the data input by the player through the keypad 164. The keypad 164 is for entering instructions or data relating to issuing of the ticket or the like. Further, the gaming machine 100 may further include a speaker (not shown) for outputting effect sounds.

Figure 7:
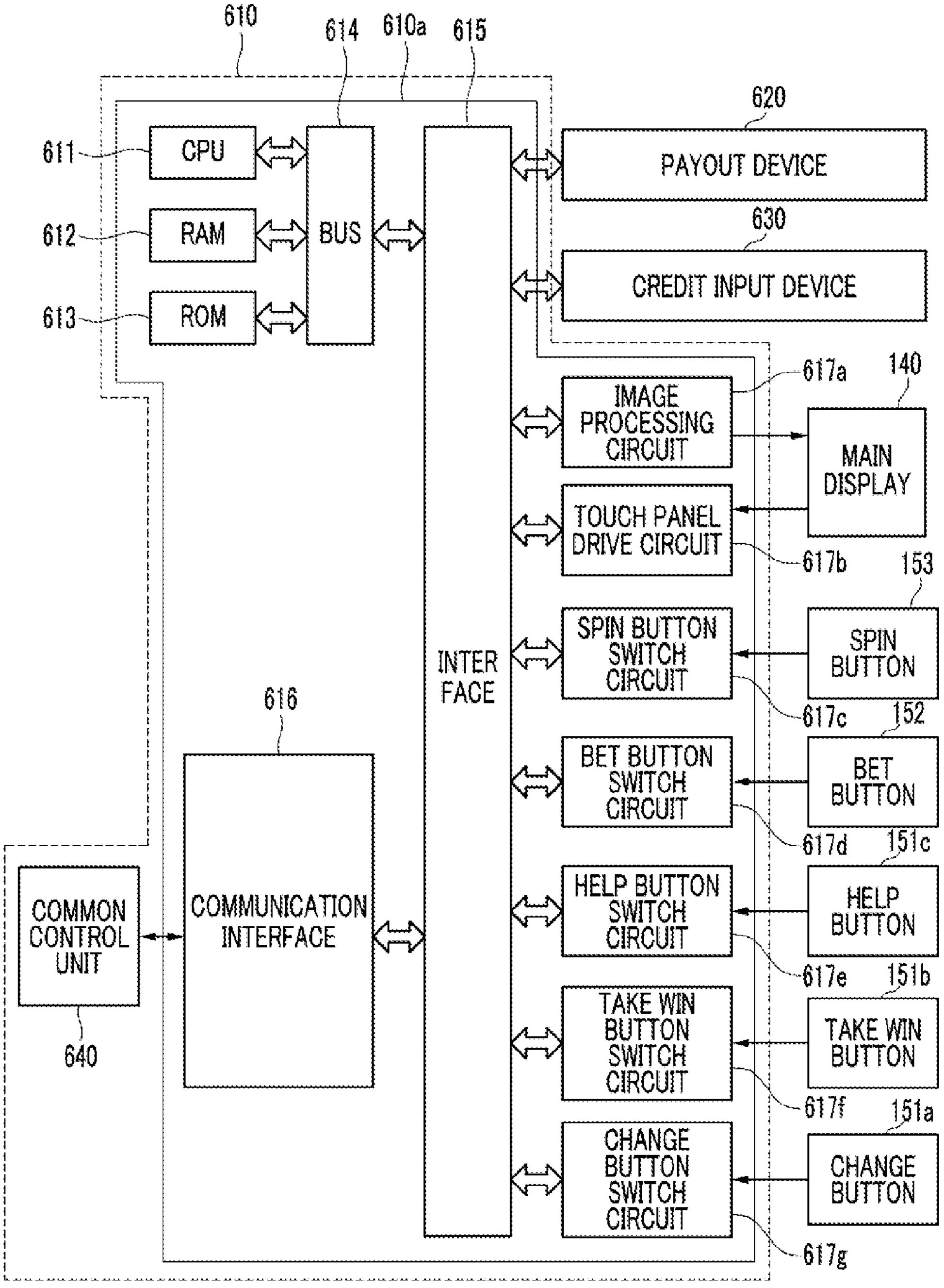
FIG. 7 is a schematic block diagram of a gaming machine according to an embodiment of the present invention.
Figure 8:
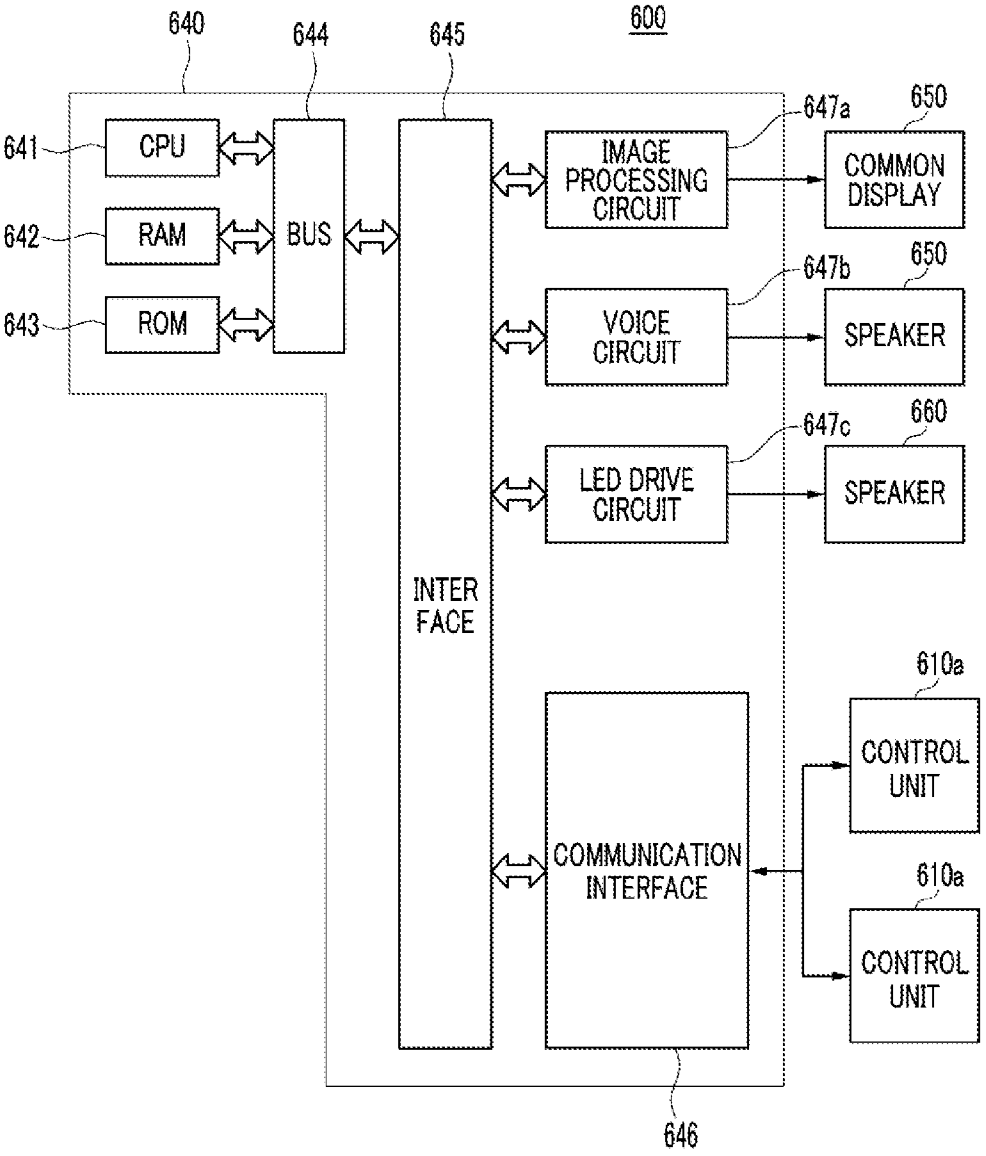
FIG. 8 is a schematic block diagram of a common unit of a gaming system according to an embodiment of the present invention.

FIG. 7 is a schematic block diagram of a gaming machine according to an embodiment of the present invention, and FIG. 8 is a schematic block diagram of a common unit of a gaming system according to an embodiment of the present invention.

Referring to FIG. 7, a gaming machine 100 includes a controller 610, a payout device 620, a credit input device 630, a main display 140, and a plurality of button 151*a*, 151*b*, 151*c*, 152, and 153.

The controller 610 includes a control unit 610*a* and a common control unit 640. The control unit 610*a* includes a control processing unit (CPU) 611, a random access memory (RAM) 612, a storage device 613, a bus 614, an interface 615, a communication interface 616, and a plurality of circuits.

The storage device 613 may a read only memory (ROM), and stores a variety of programs for performing processing that is required to control the gaming machine 100, table data, and image data. The RAM 612 temporarily stores the number of credits accumulated in the gaming machine 100 or a variety of data computed by the CPU 611. The bus 614 transfers data between the CPU 611, the RAM 612, and the storage device 613.

The CPU 611 is connected via the interface 615, to the payout device 620, the credit input device 630, the plurality of circuits, and the communication interface 616. The plurality of circuits include an image processing circuit 617*a*, a touch panel drive circuit 617*b*, a spin button switch circuit 617*c*, a plurality of BET button switch circuits 617*d*, a help button switch circuit 617*e*, a take win button switch circuit 617*f*, and a change button switch circuit 617*g*.

The main display 140 is connected to the image processing circuit 617*a* and the touch panel drive circuit 617*b*, the spin button 153 is connected to the spin button switch circuit 617*c*, and the BET button switch circuits 617*d* are connected to a plurality of BET buttons 152, for example BET×1, BET×2, BET×3, BET×4, and BET×5 buttons (152*a* to 152*e* of FIG. 6). The help button 151*c* is connected to the help button switch circuit 617*e*, the take win button 151*b* is connected to the take win button switch circuit 617*f*, and the change button 151*a* is connected to the change button switch circuit 617*g*. Each of the switch circuits 617*a* to 617*g* outputs a signal to the CPU 611 when a corresponding button is pressed.

The common control unit 640 is connected to the communication interface 616. The common control unit 640 is shared by the gaming machine 100 and a neighbor gaming machine 100*a*. In another embodiment, the common control unit 640 may be not shared by the two gaming machines 100 and 100*a*, and each gaming machine may have own common control unit.

Various button switch circuit 617*c* to 617*g* may include a pressure sensor (not shown), and may be configured to be able to sense strength of a player's operation for a corresponding button.

The payout device 620 performs payout processing based on a control signal from the CPU 611. The payout processing may include payout of gaming media such as coins, bills, chips or tickets, or liquidation of cards such as credit cards.

The credit input device 630 accepts input of gaming media such as coins, bills, chips or tickets, or cards such as credit cards, and an input amount is stored in the RAM 612 with a predetermined amount being one credit. The credit input device 630 may be a coin entry (154 of FIG. 3) or a bill entry (155 of FIG. 3).

Referring to FIG. 8, the gaming system includes a common unit 600 shared by the adjacent gaming machines 100. In another embodiment, the common unit may be not shared by the adjacent gaming machines 100, and each gaming machine 100 may have own common unit.

The common unit 600 includes a common control unit (640 of FIG. 7), a common display 200, a speaker 650, and a light emitting device 660.

The common control unit 640 includes a CPU 641, a RAM 642, a storage device 643, a bus 644, an interface 645, a communication interface 646, a plurality of circuits 647.

The storage device 643 may a ROM, and stores a variety of programs for performing processing that is required to control the gaming machine 100, table data, and image data. In particular, the storage device 643 includes map pattern data for generating a map of a bonus game. The RAM 22 642 temporarily stores a variety of data computed by the CPU 641. The bus 644 transfers data between the CPU 641, the RAM 642, and the storage device 643.

The CPU 641 is connected via the interface 645 to plurality of circuits 647 and the communication interface 646. The plurality of circuits 647 include an image processing circuit 647*a*, a voice circuit 647*b*, and an light emitting device drive circuit 647*c*.

The common display 200 is connected to the image processing circuit 647*a*, and the speaker 650 is connected to the voice circuit 647*b*. The light emitting device 660 is connected to the light emitting device drive circuit 647*c*, and may include a plurality of light emitting diodes (LEDs).

The communication interface 646 is connected to control units (610*a* of FIG. 7) of the adjacent gaming machines 100.

The CPU 641 controls a game based on the programs stored in the storage device 643 and a variety of signals received from the gaming machines 100, displays an image on the common display 200 in accordance with the progress of a game, outputs a sound from the speaker 650, and lights the LEDs 660.

In an embodiment, the CPU 611 or 641 of the controller 610 executes a variety of processes relating to a game, and a result of the processing are stored in each of the RAMs 612 and 642.

Next, a base game executed in a gaming machine according to an embodiment of the present invention will be described with reference to FIG. 9, FIG. 10, FIG. 11, FIG. 12, and FIG. 13.

Figure 9:
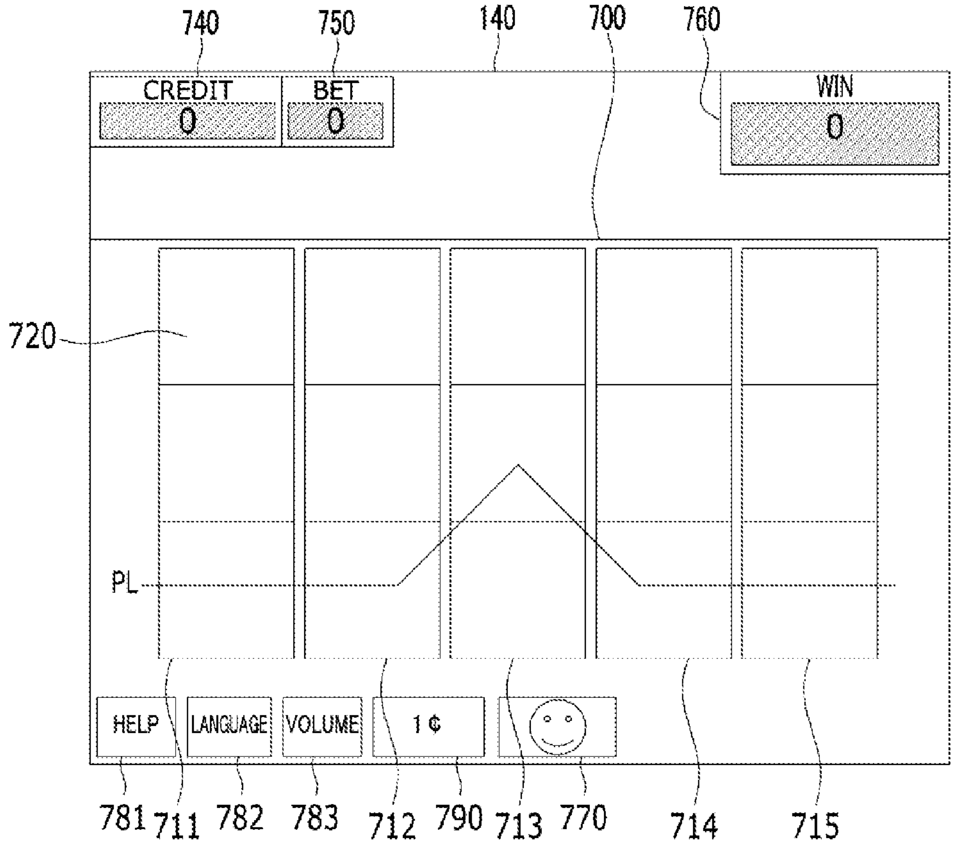
FIG. 9 shows an example of a display picture of a base game according to an embodiment of the present invention.
Figure 10:
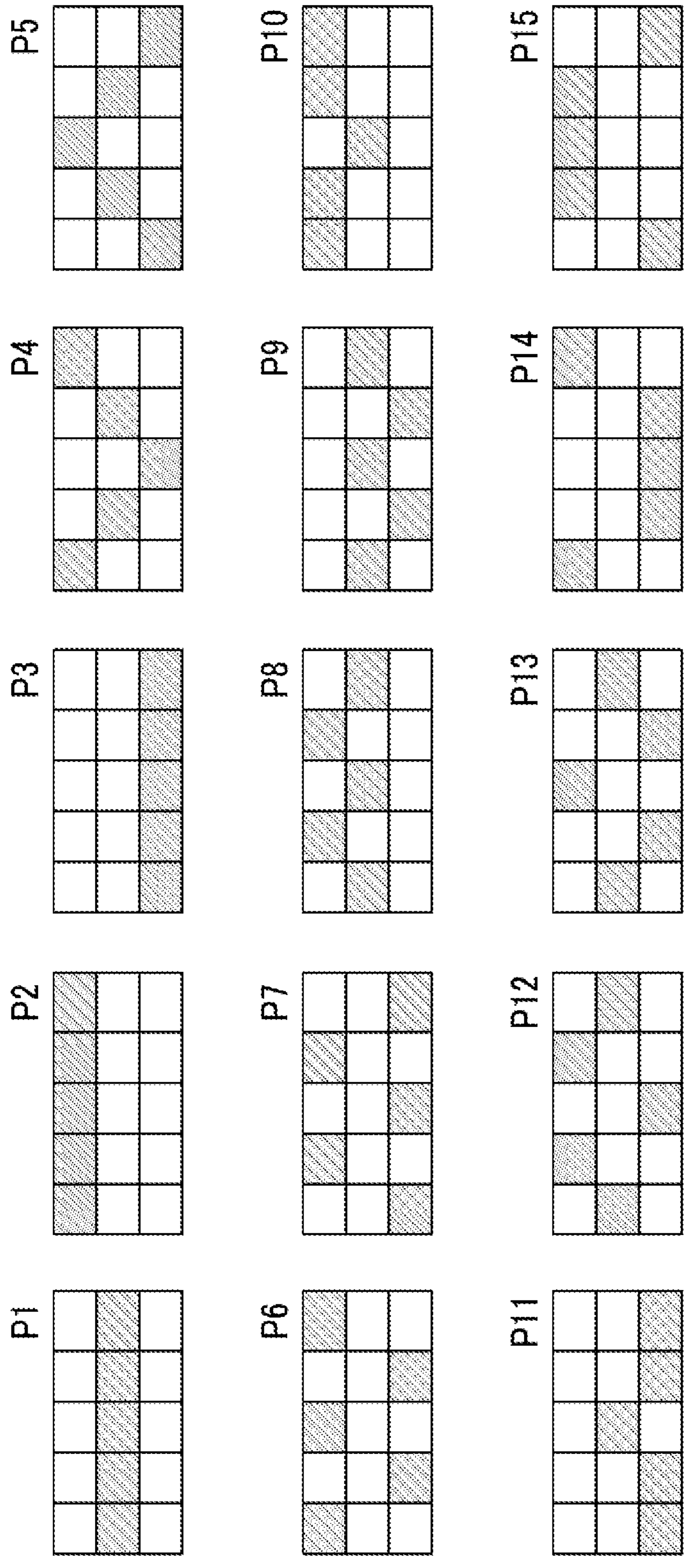
FIG. 10 and FIG. 11 show examples of paylines of a base game according to an embodiment of the present invention.
Figure 11:
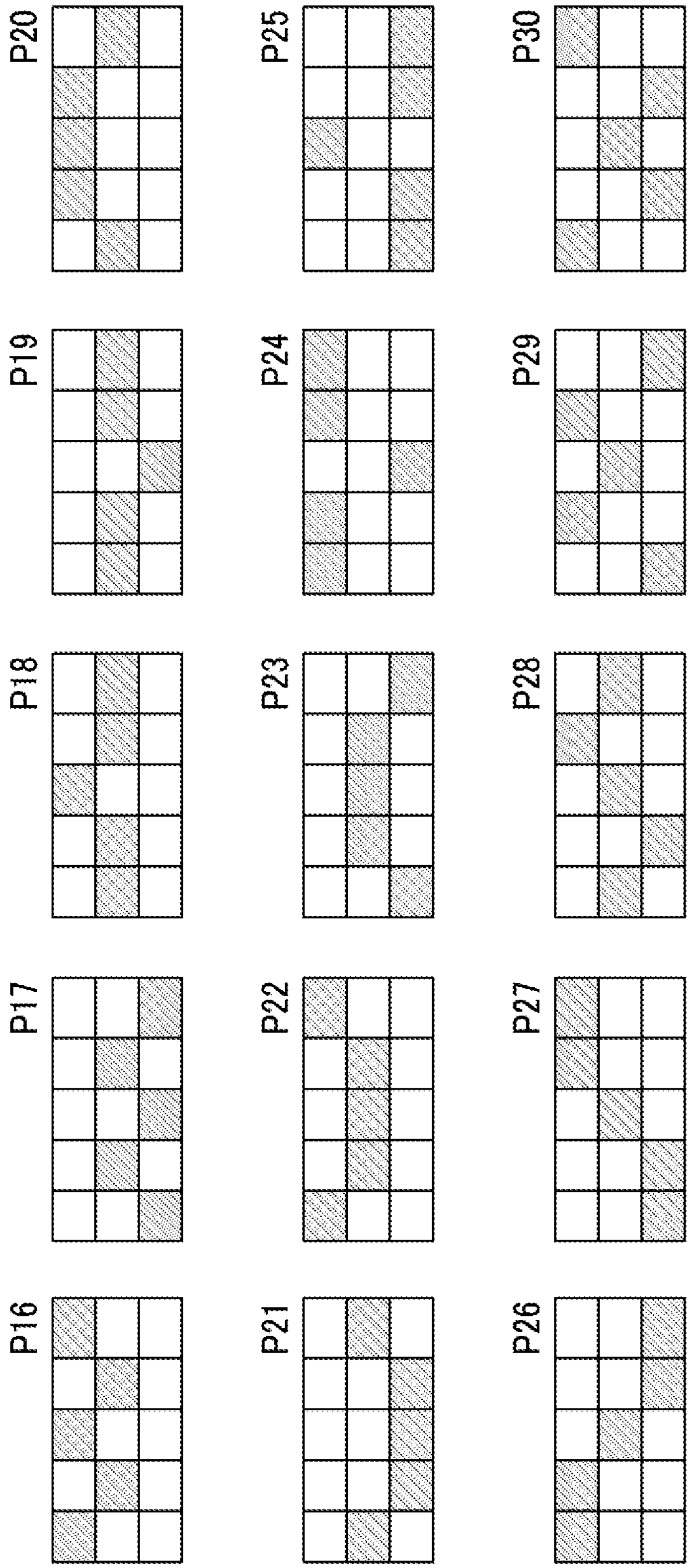
Figure 14:
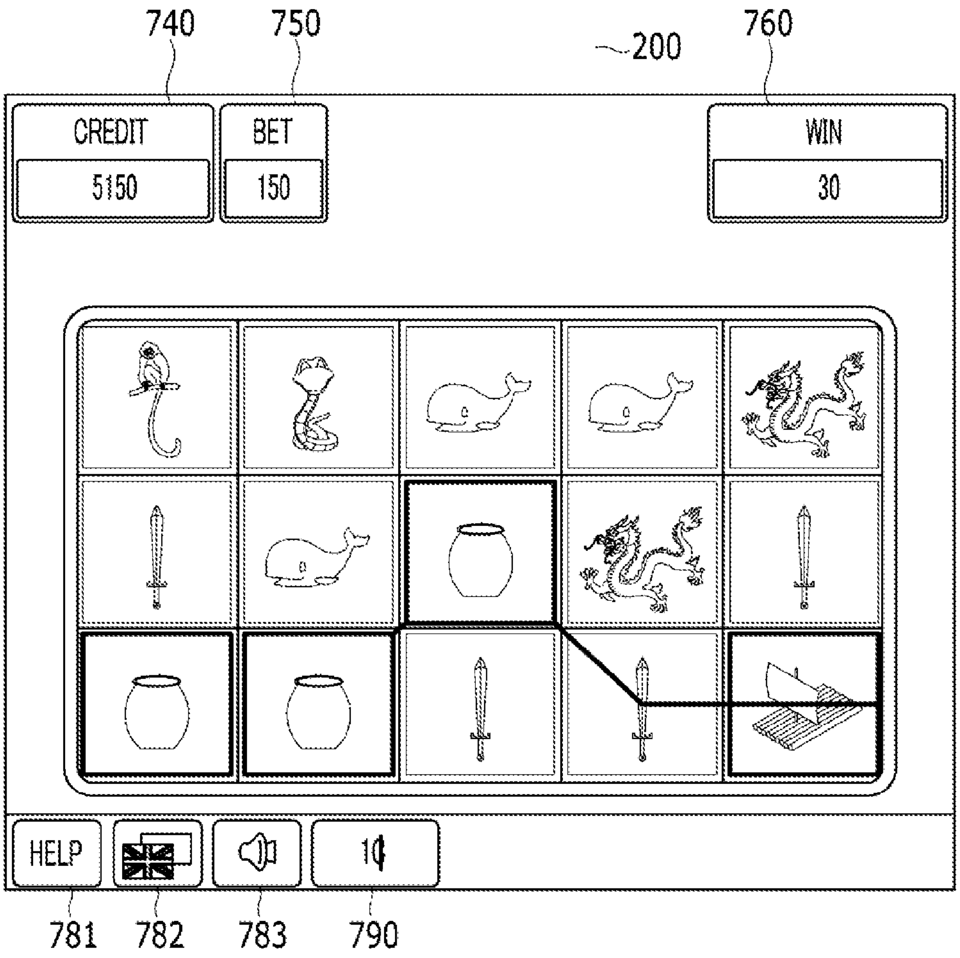
FIG. 14 and FIG. 15 show examples of pictures displayed in a bonus game according to an embodiment of the present invention.
Figure 15:
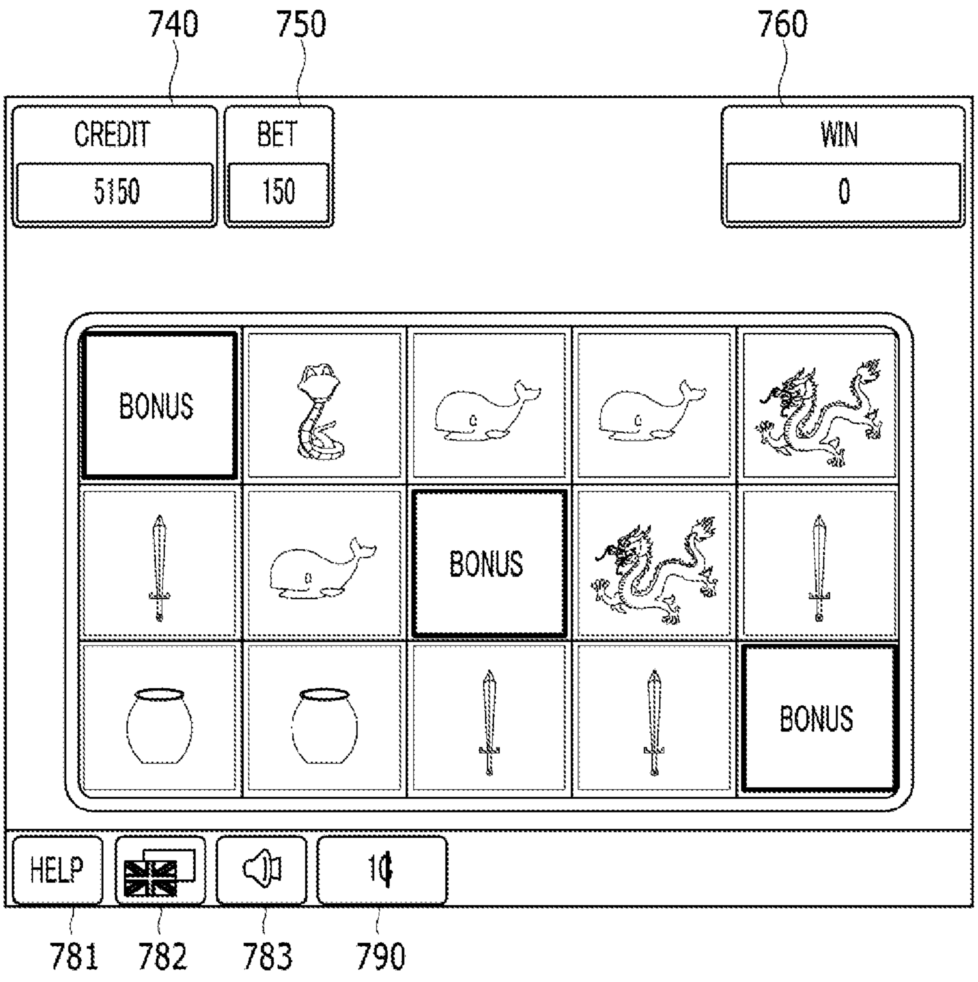

FIG. 9 shows an example of a display picture of a base game according to an embodiment of the present invention, FIG. 10 and FIG. 11 show examples of paylines of a base game according to an embodiment of the present invention, FIG. 12 shows an example of symbol sequences of reels for a base game according to an embodiment of the present invention, FIG. 13 shows an example of a payout table for a base game according to an embodiment of the present invention, and FIG. 14 and FIG. 15 show examples of pictures displayed in a bonus game according to an embodiment of the present invention.

Referring to FIG. 9, a display window 700 including video reels 711 to 715 is displayed in a main display (140 of FIG. 3). The display window 700 includes fifteen display blocks 720 in five columns and three rows. In other words, each of the video reels 711 to 715 includes three display blocks 720. A plurality of symbols are displayed on the video reels 711 to 715 for displaying the base game, and are formed into symbol sequences. Three continuous symbols in the symbol sequence are respectively displayed (arranged) on an upper block (the first row), a middle block (the second row), and a lower block (the third row) of a display area of each of the video reels 711 to 715, so as to form a symbol matrix having five columns and three rows in the display window 700. Each of the video reels 711 to 715 can enable three display blocks 720 to integrally change speed while moving downward to be displayed (scroll-displayed), so as to carry out the rearrangement that stops the symbols displayed in each display block 720 after spinning the symbols in a vertical direction.

Further, a payline PL is generated by connecting five display blocks that are placed on the five columns, respectively. When a combination of the symbols on the payline PL in a game satisfies a predetermined condition, a player wins the game. For example, if all the symbols in a combination are the same, the gaming machine 100 awards a prize to the player. Such a combination of the symbols that provides a win is referred to as a "winning combination." The payline PL shown in FIG. 9 is merely an example, and various paylines may be drawn and two or more paylines may be selected by a player. In this example, thirty paylines P1 to P30 may be generated as shown in FIG. 10 and FIG. 11.

A payline P1, P2 or P3 shown in FIG. 10 connects five blocks in the second, first, or third row, respectively. A payline P4, P5, P12, P13, P29, or P30 shown in FIG. 10 or FIG. 11 connects two blocks on one row in the first and fifth columns, two blocks on another row in the second and fourth columns, and one block on yet another row in the third columns. A payline P6, P7, P8, P9, P16, or P17 shown in FIG. 10 or FIG. 11 connects three blocks on one row in the first, third, and fifth columns, and two blocks on another row in the second and fourth columns. A payline P10, P11, P18, P19, P24, or P25 shown in FIG. 10 or FIG. 11 connects fourth blocks on one row in the first, second, third, and fifth columns, and one block on another row in the third column. A payline P14, P15, P20, P21, P22, or P23 shown in FIG. 10 or FIG. 11 connects two blocks on one row in the first and fifth columns, and three blocks on another row in the second, third, and fourth columns. Further, a payline P26 connecting upper blocks in the first and second columns, a middle block in the third column, and lower blocks in the fourth and fifth columns, and a payline P27 connecting lower blocks in the first and second columns, a middle block in the third column, and upper blocks in the fourth and fifth columns are shown in FIG. 11.

In this embodiment, the case in which the gaming machine 100 is a video slot machine is described, but mechanical reels may replace a part of the video reels 711 to 715 in the gaming machine 100.

Referring to FIG. 12, a symbol sequence including a plurality of symbols is marked on each of the reels 31*a* to 31*e*. Each symbol in the symbol sequence may be assigned to a code. The symbols may include symbols depicted as, for example, BIRD, DRAGON, CYCLOPS, WHALE, SNAKE, MONKEY, SWORD, POT, RAFT, and BONUS. The BONUS symbol may be a scatter symbol. The symbols may further include WILD symbol that establishes its own winning combination, or may be substituted to a certain symbol to combine with the certain symbol of the payline and establish the winning combination. In an example shown in FIG. 12, the symbol sequence of the first reel 31*a* include MONKEY, CYCLOPS, RAFT, BONUS, SNAKE, DRAGON, WHALE, BONUS, RAFT, POT, WILD, RAFT, WHALE, BONUS, POT, DRAGON, WHALE, SNAKE, BONUS, SWORD, CYCLOPS, POT, DRAGON, WHALE, BONUS, SNAKE, POT, BONUS, WHALE, SWORD, BIRD, WHALE, CYCLOPS, SNAKE, DRAGON, and WHALE to which codes ranging from 0 to 35 are respectively assigned, and a range of random numbers corresponding to a probability of a symbol of each code to be selected is assigned to each code. The symbol sequence of the second reel 31*b* include DRAGON, RAFT, SNAKE, WILD, POT, MONKEY, CYCLOPS, SWORD, MONKEY, BIRD, SWORD, MONKEY, DRAGON, POT, MONKEY, CYCLOPS, WHALE, MONKEY, BIRD, POT, RAFT, BIRD, MONKEY, POT, CYCLOPS, RAFT, POT, DRAGON, MONKEY, and SWORD to which codes ranging from 0 to 29 are respectively assigned, and a range of random numbers corresponding to a probability of a symbol of each code to be selected is assigned to each code. While it is shown in the example in FIG. 12 that the number of symbols included in the symbol sequence of the first reel 31*a* that the number of symbols including in the symbol sequence of the first reel 31*a* is different from the number of symbols included in the symbol sequence of the second reel 31*b*, the number of symbols in the symbol sequence of the reels 31*a* to 31*e* may be equal to or different from each other. A gaming machine spins the reels 31*a* to 31*e* according to a player's input, and randomly determines a code for each of the reels 31*a* to 31*e* based on the random numbers assigned to each code. After a certain time period elapses, the gaming machine stops each of the reels 31*a* to 31*e* to locate the symbol corresponding to the determined code at one row (for example, the middle row) of the symbol matrix. Accordingly, the symbols are rearranged in the symbol matrix.

Various winning combinations are predetermined for all symbols. In this example, the winning combinations refer to cases where three or more same symbols are continuously arranged on the paylines PL from the first column. A payout value according to the winning combination varies according to the number of continuous same symbols forming the winning combination and/or the type of symbols forming the winning combination. In this example, the payout value may be determined by a basic payout value of a payout table shown in FIG. 13. In FIG. 13, n KIND denotes that the number of the same symbols which are continuously arranged from the first column is n. The payout value according to the winning combination is determined by multiplying the basic payout value corresponding to the winning combination by a magnitude of the BET amount. For example, as shown in FIG. 14, if the player bets 3 BETs by pressing the BET×3 button (152*c* of FIG. 6) and three WHALE symbols forms the winning combination, 30 credits are awarded to the player.

Regardless of the payline PL, when a combination of symbols displayed on the video reels 711 to 715 satisfies a predetermined condition, a bonus game is triggered. In this embodiment, as shown in FIG. 15, when BONUS symbols with a number greater than a predetermined number (for example, 3) are displayed on the video reels 711 to 715, the bonus game is triggered.

Referring to FIG. 9 again, a credit display section 740 and a bet display section 750 are displayed on the left side at the upper part of the main display 140, and a win display section 760 is displayed at the right side.

The credit display section 740 displays a player's current credits, and the bet display section 750 displays a bet amount in a current unit game. The bet amount may be displayed as the credits. The win display section 760 displays a payout value of credits at a winning combination.

Further, a character select button 770 is displayed on lower part of the main display 140. The character select button 770 is used to select or change a character of a player for the bonus game, and is operated by touching the character select button 770.

Various buttons 781, 782, and 783 for setting the gaming machine 100 may be displayed on the lower part of the main display 140, and are operated by a touch of the player. The various buttons 781, 782, and 783 includes a help button 781, a language button 782, and a volume button 783. The help button 781, if touched, displays help information on the main display 140. The language button 782, if touched, switches a language of the gaming machine 100 from one language to the other language. The volume button 783, if touched, increases and decreases a volume outputted from the gaming machine 100. Furthermore, a denomination display section 790 may be displayed on the lower part of the main display 140. The denomination display section 790 displays a current denomination.

Figure 16:
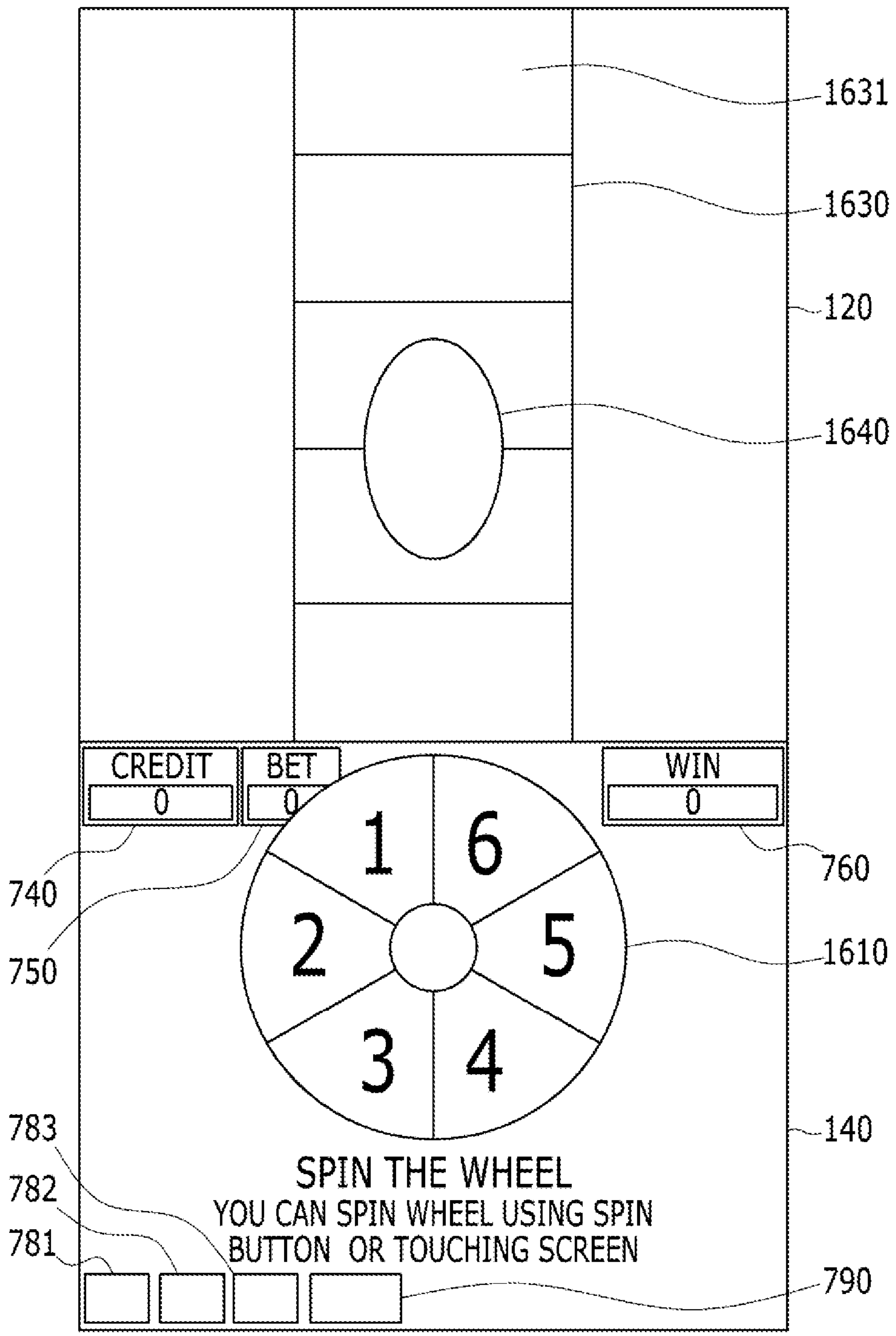
FIG. 16 shows an example of a picture displayed at a start of a bonus round in a bonus game according to an embodiment of the present invention.

Next, a bonus game triggered in a base game according to embodiments of the present invention will be described with reference to FIG. 16 to FIG. 73. In FIG. 16 to FIG. 73, processes of the bonus game according to a player's operation in one gaming machine of a gaming system are described, but similar operations may be performed in accordance with a neighbor player's operation in a neighbor gaming machine of the gaming system. Further, a pair of a top display (120 of FIG. 4) and a main display (140 of FIG. 4 or 5) is shown in FIG. 16 to FIG. 73, but the top display 120 may be a top display portion (210 of FIG. 4) of a common display (200 of FIG. 5). Furthermore, images or effects displayed or rendered in the top display 120 or data related to the top display 120 may be controlled by a common control unit (640 of FIG. 6A or 6B) of a controller, and images or effects displayed or rendered in the main display 140 or data related to the main display 140 may be controlled by control units (610*a* of FIG. 6A) of the controller.

Bonus Game

First, a bonus game triggered when a predetermined condition is satisfied in a base game is described with reference to FIG. 16 to FIG. 19.

Figure 17:
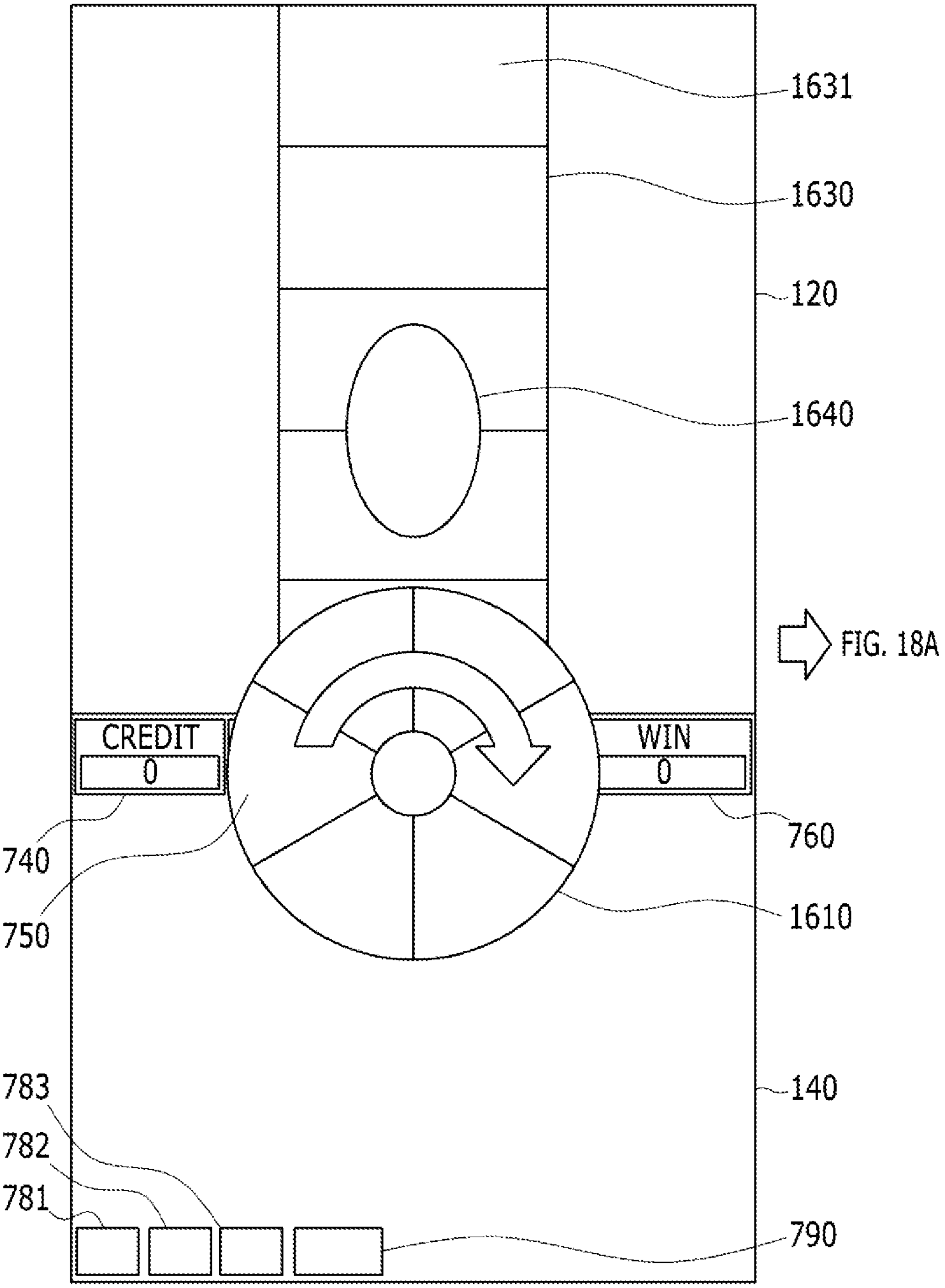
FIG. 17 shows an example of a picture representing spinning of a wheel in a bonus round of a bonus game according to an embodiment of the present invention.
Figure 18A:
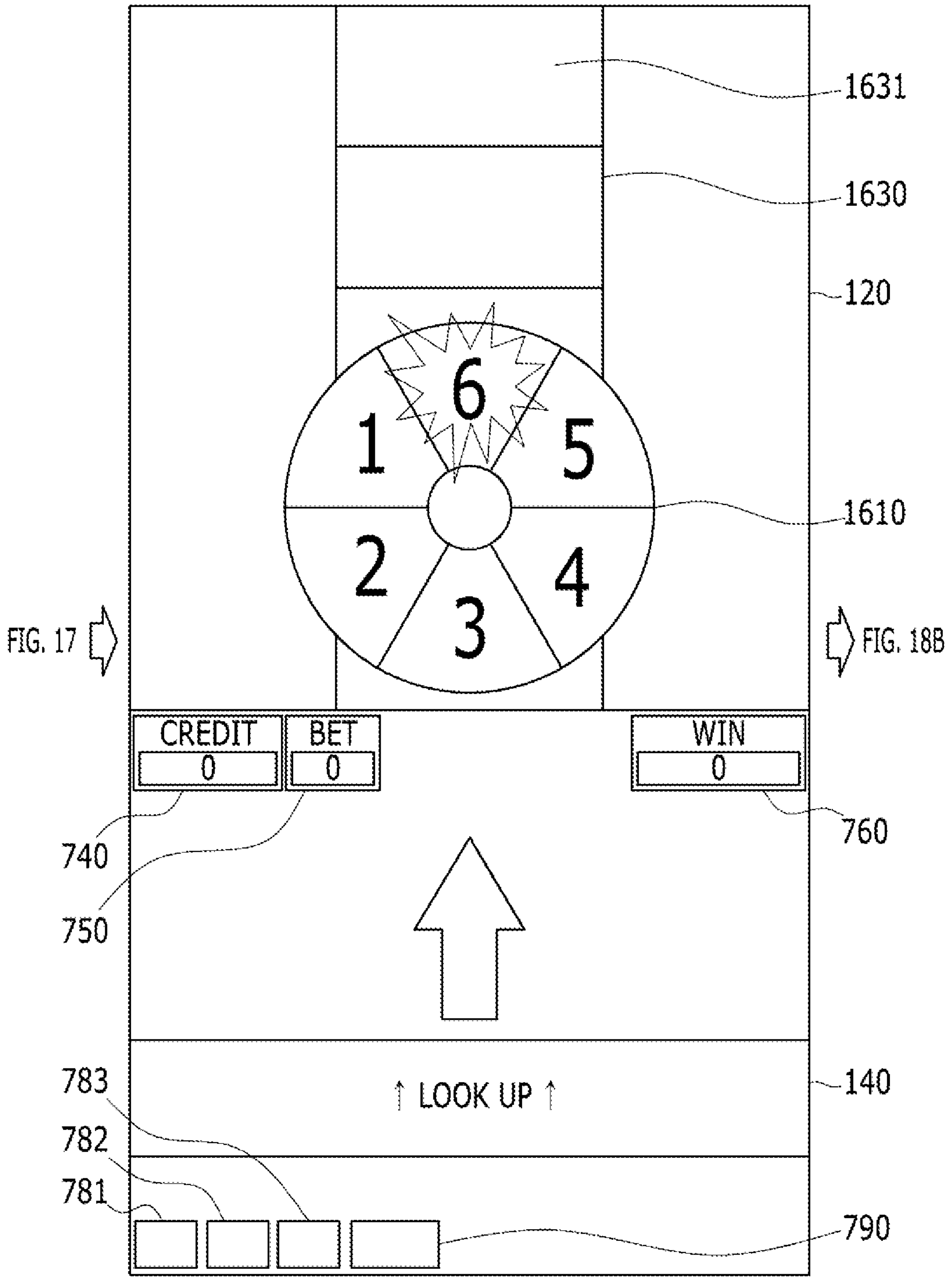
FIG. 18A, FIG. 18B and FIG. 18C show an example of a picture representing a movement of a character in a bonus round of a bonus game according to an embodiment of the present invention.
Figure 18B:
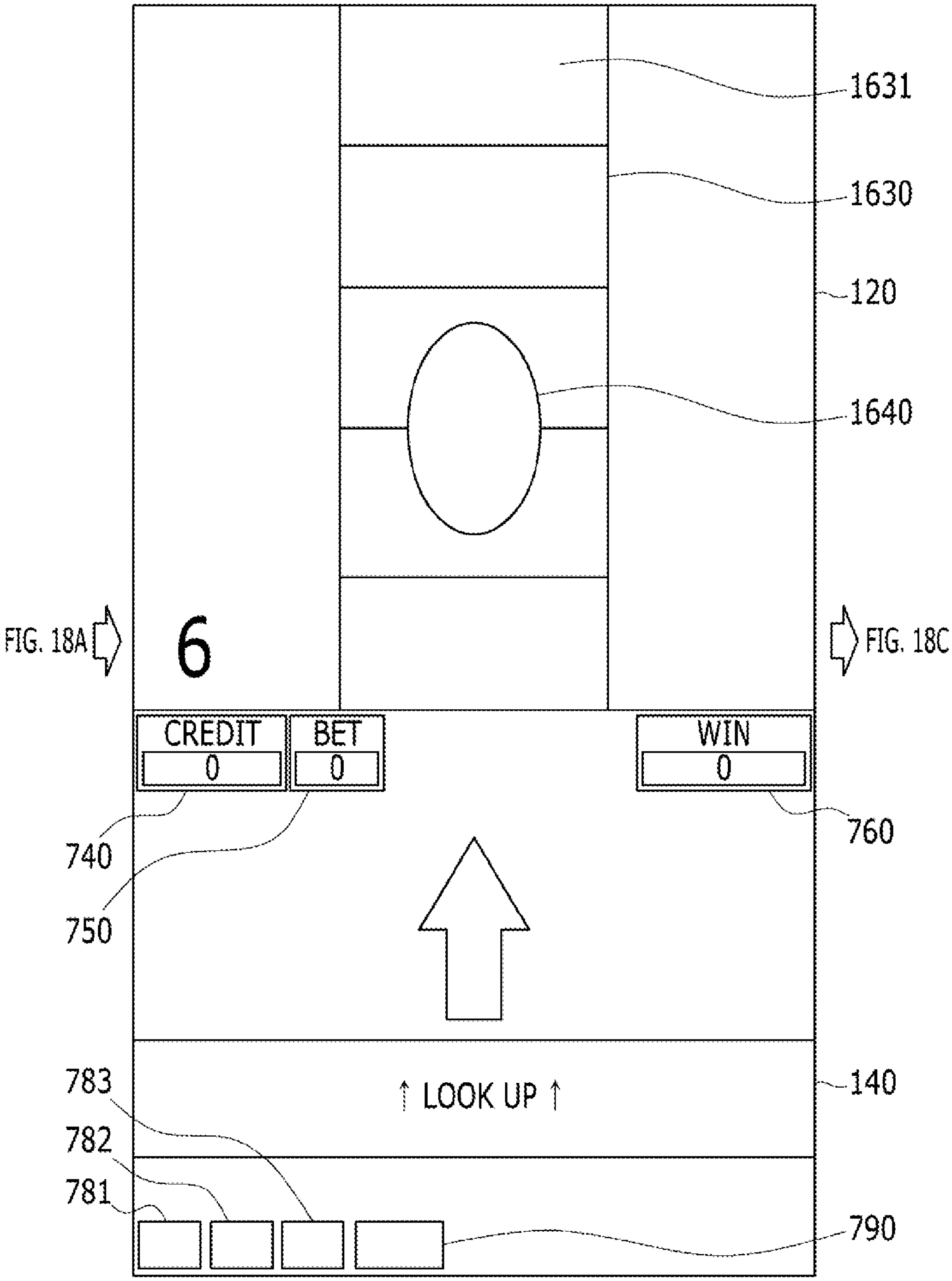
Figure 18C:
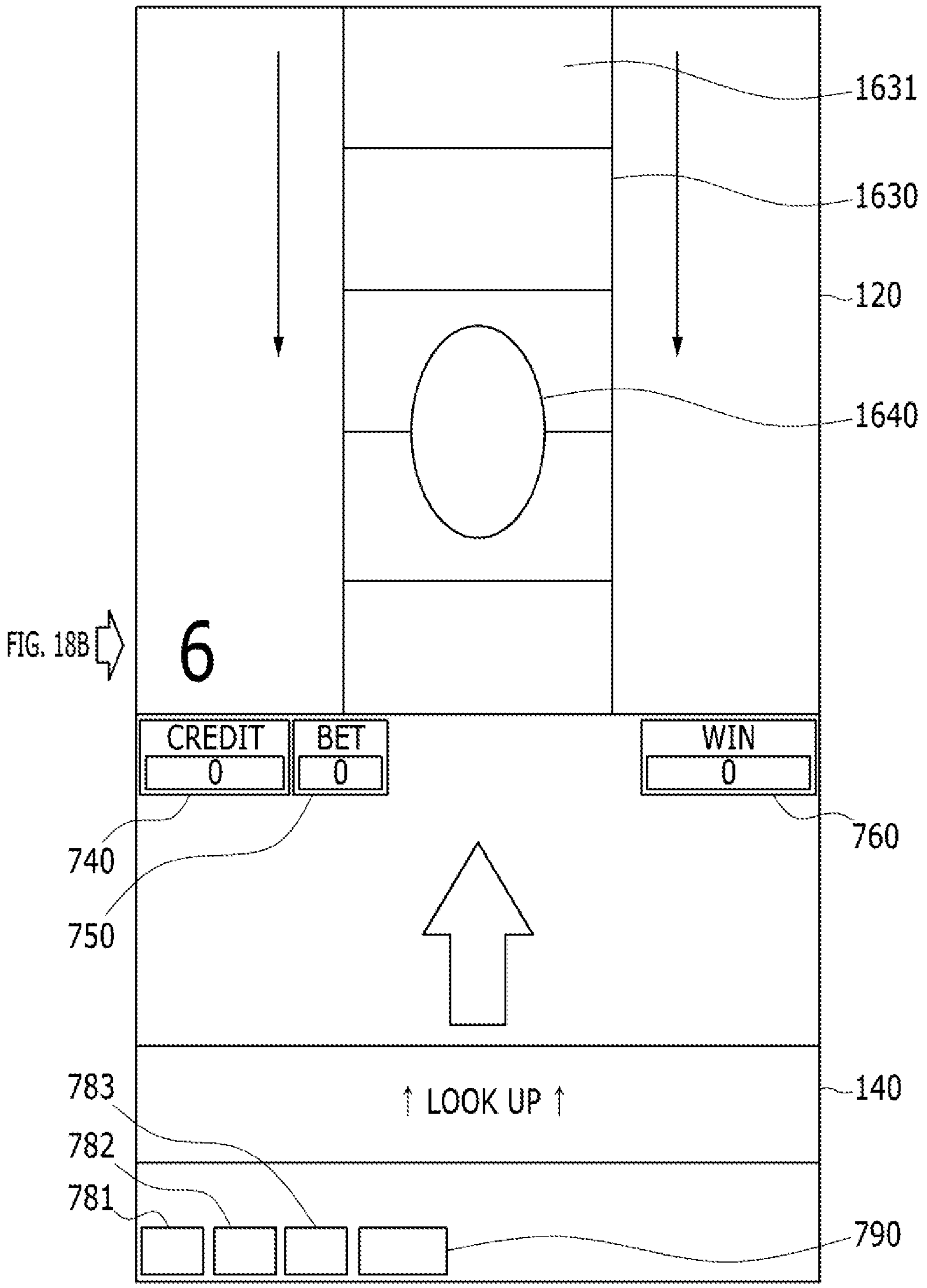

FIG. 16 shows an example of a picture displayed at a start of a bonus round in a bonus game according to an embodiment of the present invention, FIG. 17 shows an example of a picture representing spinning of a wheel in a bonus round of a bonus game according to an embodiment of the present invention, FIG. 18A, FIG. 18B and FIG. 18C show an example of a picture representing a movement of a character in a bonus round of a bonus game according to an embodiment of the present invention, and FIG. 19 shows an example of a spin table determination table according to an embodiment of the present invention.

Start of Bonus Round

Referring to FIG. 16, if a bonus game in the base game is triggered, a bonus round of the bonus game starts. In the bonus game, a plurality of bonus rounds may be performed. In each bonus round, an image for spinning a wheel 1610 is displayed in a main display 140 and a display window including a map 1630 is displayed in a top display 120. Further, a map that is the same as the map 1630 or a part of the map 1630 may be displayed as a background in the main display 140. The map 1630 may be randomly determined from among a plurality of maps.

In the image for spinning the wheel 1610, a player can spin the wheel 1610 by pressing a spin button (153 of FIG. 3) of a gaming machine 100 or by touching an area where the wheel 1610 is displayed in the main display 140. The wheel 1610 may be partitioned into six areas, and one, two, three, four, five, and six digits may be assigned to the six areas. At this time, an image that a finger image is spinning in clockwise or counterclockwise direction along with the wheel 1610 may be displayed on the main display 140, in order to indicate the player to move a finger in the clockwise or counterclockwise direction with continuously touching a screen of the main display 140. In the display window, the map 1630 includes a plurality of cells 1631. The plurality of cells 1631 forms courses, and a character 1640 corresponding to the player can move along the courses. If the map 1630 is not totally displayed in the top display 120, the map 1630 may be scrolled up or down according to the character's movement. In this case, the common display 200 may render the scroll of the map 1630 such that the character walks in the screen. The total map includes a start cell of a start point from which the character starts and a goal cell of a goal point. Further, any one of a plurality of events may be set to each of some cells 1631. Some cells 1631 may be turning points for selecting any one course among a plurality of courses.

Further, a top display 120 or a top display portion (210*a* of FIG. 6) of a neighbor gaming machine 100*a* displays a display window that is symmetric to the display window of the gaming machine 100. In this case, two maps included in the display windows of the two gaming machines may share the goal point.

A character select button 770 of the main display 140 may be activated when the character locates at the start point, and may be inactivated when the character does not locate at the start point.

Spinning of Wheel

If the player presses the spin button 220 or slides the finger with touching the area where the wheel 1610 is displayed, the image of the wheel 1610 moves from the main display 140 to the top display 120 while the wheel 1610 are spinning as shown in FIG. 17. Before spinning the wheel 1610, the player can change BETs for current bonus round by pressing any one of BET×1 button (152*a* of FIG. 5), BET×2 button (152*b* of FIG. 5), BET×3 button (152*c* of FIG. 5), BET×4 button (152*d* of FIG. 5), and BET×5 button (152*e* of FIG. 5). Further, the game machine 100 randomly determines a digit, and displays in the top display 120 an image that the wheel 1610 is stopped at a position where an area corresponding to the determined digit is located at a topmost part of the wheel 1610. In an example shown in FIG. 17, the determined digit is six.

Next, as shown in FIG. 18, effects that an image for the determined digit moves from the wheel 1610 to a predetermined area (for example, a lower left area) of the top display 120 and the image for the wheel 1610 is disappeared are rendered on the top display 120. Subsequently, the character 1640 moves by the determined digit such that the character 1640 moves from a current cell to a destination cell. When the character 1640 is moving from the current cell to the destination cell, the map 1630 may be scrolled down in the top display 120.

In FIG. 17 and FIG. 18, an image or a text for indicating the player to look the top display 120, for example, "LOOK UP" is displayed in the main display 140. Further, a map that is the same as the map 1630 or a part of the map 1630 may be displayed as a background in the main display 140.

In a certain embodiment, when the player slides the finger with touching the area where the wheel 1610 is displayed, the gaming machine 100 may determine a speed at which the wheel 1610 spins based on a speed at which the player slides the finger with touching the area. The speed at which the wheel 1610 spins may be proportional to the speed at which the player slides the finger. Further, the player may select a spinning direction of the wheel 1610 by sliding the finger in a clockwise direction or a counterclockwise direction. Then, the gaming machine 100 renders effects that the wheel 1610 spins according to the determined direction and speed.

In a certain embodiment, for determining the digit, the gaming machine 100 may store a plurality of spin tables in a memory. The memory may be a RAM (612 or 642 of FIG. 7 or 8), a ROM (613 or 643 of FIG. 7 or 8), or other storage devices. Each of the plurality of spin tables may correspond to a combination of any one of a plurality of spinning speeds of the wheel 1610 and a spinning direction of the wheel 1610 as shown in FIG. 19. Alternatively, each of the plurality of spin tables may correspond to only any one of a plurality of spinning speeds. Accordingly, the game machine 100 may select any one of the plurality of spin tables based on the spinning speed of the wheel 1610 and/or the spinning direction of the wheel 1610. The plurality of spinning speeds may include a low speed, a middle speed, and a high speed. In this case, when two or more spin tables correspond to one spinning speed, any one spin table may be randomly determined from among the two or more spin tables. The spinning direction may be either a clockwise direction or a counterclockwise direction. Each spin table matches any one digit among one to six and a range of random numbers. Accordingly, the controller may generate a random number, and determine the digit based on the random number and the selected spin table. Each spin table stores a plurality of digits and a range of random numbers corresponding to each of the digits. The range of random numbers corresponding to each number may be determined based on a selection probability of each digit. In this case, the selection probability of each digit may be 16.67%.

In a certain embodiment, the wheel 1610 may start to spin when the player takes off his or her finger from the screen of the top display 120. Further, when a period during which the player slides the finger with touching the screen of the top display 120 exceeds a predetermined time (for example, 15 seconds), the wheel 1610 may start to spin even though the player does not take off the finger from the screen. Furthermore, when the player touches the finger on the screen during a period that is shorter than a predetermined time (for example, 0.01 second), the wheel 1610 does not start to spin even though the player takes off the finger from the screen.

As described above, the gaming machine 100 can provide the wheel which can spin in the clockwise or the counterclockwise by the touch of the player or whose spinning speed can be varied by the touch of the player. Therefore, the player can feel like he or she spins the real wheel to determine the digit. As a result, the player can be continuously interested in the game.

Various Events

When the character arrives at a destination cell according to the digit indicated by the wheel 1610, an event set to the destination cell starts and images for the event are rendered in the top display 120 and/or the main display 140. The event may be one of a plurality of types. In a certain embodiment, the plurality of types include a payout type, a start over type, a free game type, a turning point type, and a goal point type. In a certain embodiment, the events may be related to a story, for example, "Sinbad the Sailor."

Payout Effects

Figure 20:
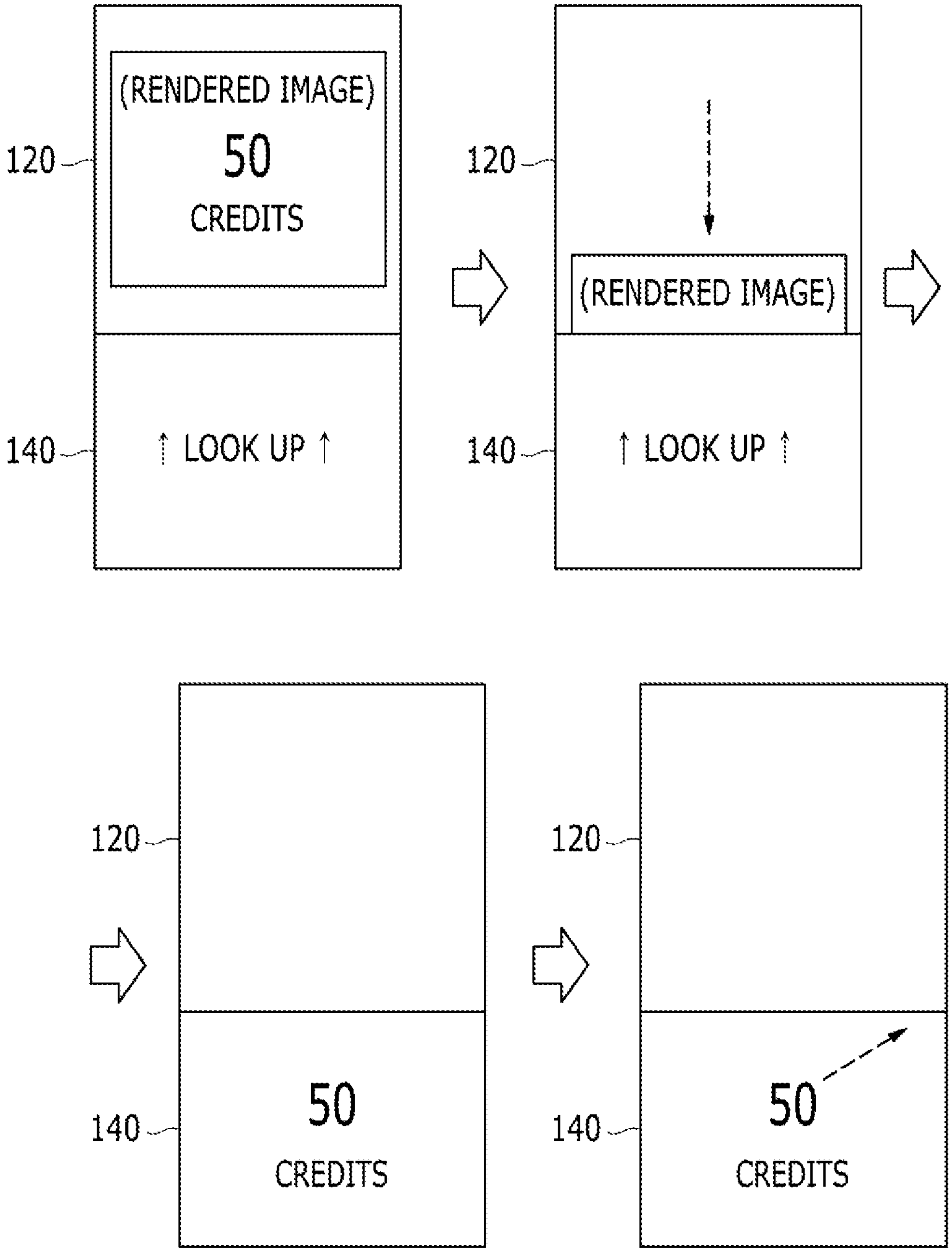
FIG. 20 shows an example of a payout rendering determined by an event in a bonus round of a bonus game according to an embodiment of the present invention.
Figure 21:
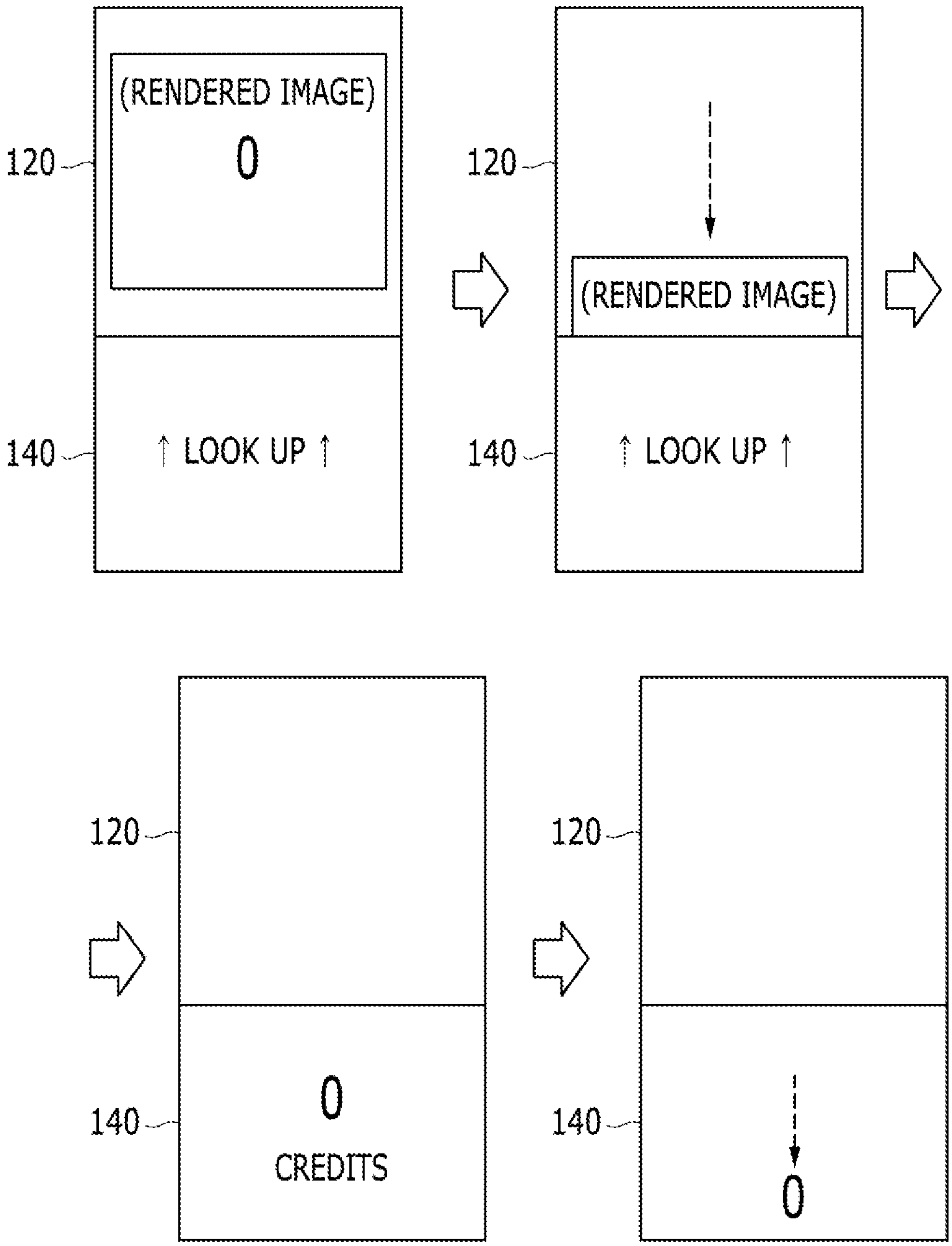
FIG. 21 shows an example of no payout rendering determined by an event in a bonus game according to an embodiment of the present invention.

FIG. 20 shows an example of a payout rendering determined by an event in a bonus round of a bonus game according to an embodiment of the present invention, and FIG. 21 shows an example of no payout rendering determined by an event in a bonus game according to an embodiment of the present invention.

When the character corresponding to the player of the gaming machine 100 arrives at a certain cell, an event set to the arrived cell is performed. The top display 120 displays an image corresponding to the event set to the arrived cell, and then displays credits awarded to the player according to a result of the event, as shown in FIG. 20. At this time, the awarded credits are determined by multiplying the credit value determined in the event by a current BET. For example, if the credit value determined in the event is 50 credits and the player presses BET×3 button (152*c* of FIG. 5), the awarded credits are 150 credits. Subsequently, the gaming machine 100 scrolls down the image rendered on the top display 120. In this case, the main display 140 displays the image for indicating "LOOK UP".

Next, the gaming machine 100 displays the awarded credits on a center area of the main display 140, and then moves the awarded credits to a win display section 760 of the main display 140, as shown in FIG. 20. Further, the awarded credits are added to the current credits of the player, and the added credits are shown in a credit display section 740 of the main display 140. Next, the gaming machine 100 displays images for a next bonus round as shown in FIG. 16. In this case, the destination cell becomes a current cell of the next bonus round.

On the other hand, when a payout determined in the event set to the arrived cell may be zero. In this case, the top display 120 displays an image corresponding to the event set to the arrived cell, and then displays zero credit on the image, as shown in FIG. 21. Subsequently, the gaming machine 100 scrolls down the image rendered on the top display 120. In this case, the main display 140 displays the image for indicating "LOOK UP". Next, the gaming machine 100 displays images for a next bonus round as shown in FIG. 16.

Next, the gaming machine 100 displays the zero credit on the center area of the main display 140, and then scroll downs zero credit, as shown in FIG. 21.

Figure 22:
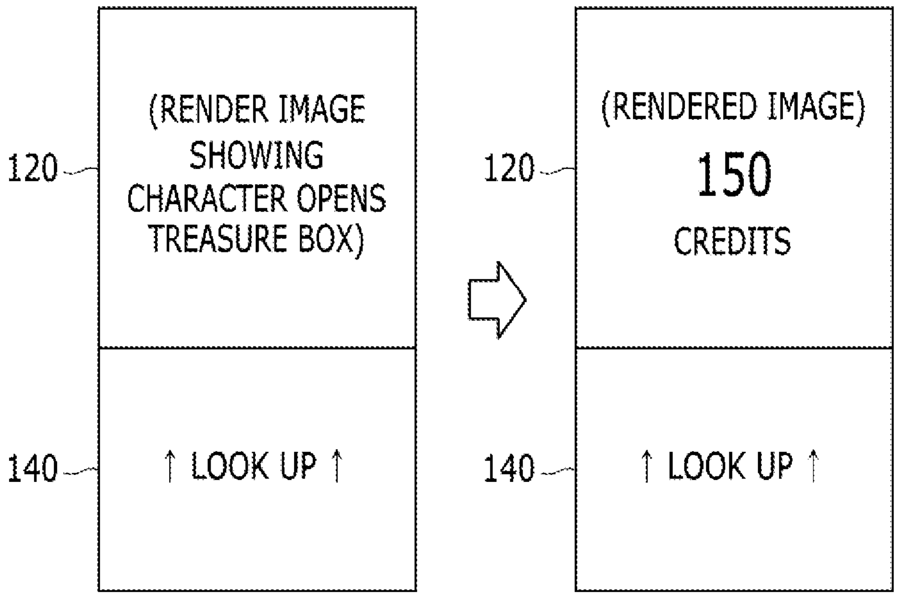
FIG. 22 shows an example of a rendering picture at a treasure box event 1 determined in a bonus round.

FIG. 22 to FIG. 73 show examples of various events in a bonus game according to an embodiment of the present invention. For easy description, the display sections 740, 750, 760, and 790, and various buttons 781, 782, 783, and 770 of the main display 140 are not shown in FIG. 22 to FIG. 73.

Payout Type Event

A payout type event is an event that a fixed payout or a randomly determined payout is awarded to the player when the character corresponding to the player arrives at a cell. The payout type events may include various events, for example, treasure box events 1, 2, 3, 4 and 5, battle events 1, 2 and 3, a coconut catching event, a jar roulette event, and a coconut palm kicking event.

Treasure Box Event 1

Figure 24:
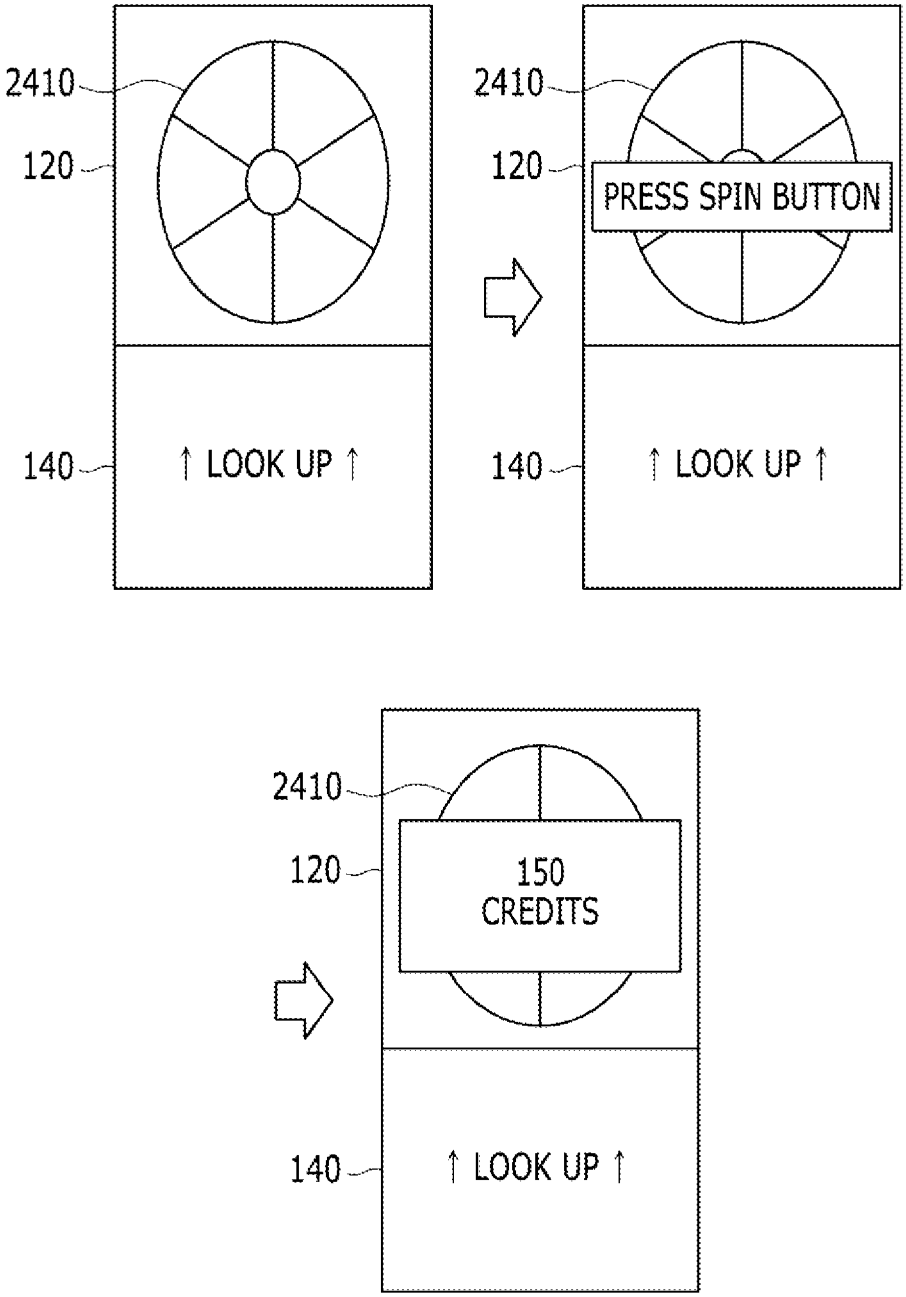
FIG. 24 shows an example of another rendering picture at a treasure box event 1 determined in a bonus round.
Figure 26:
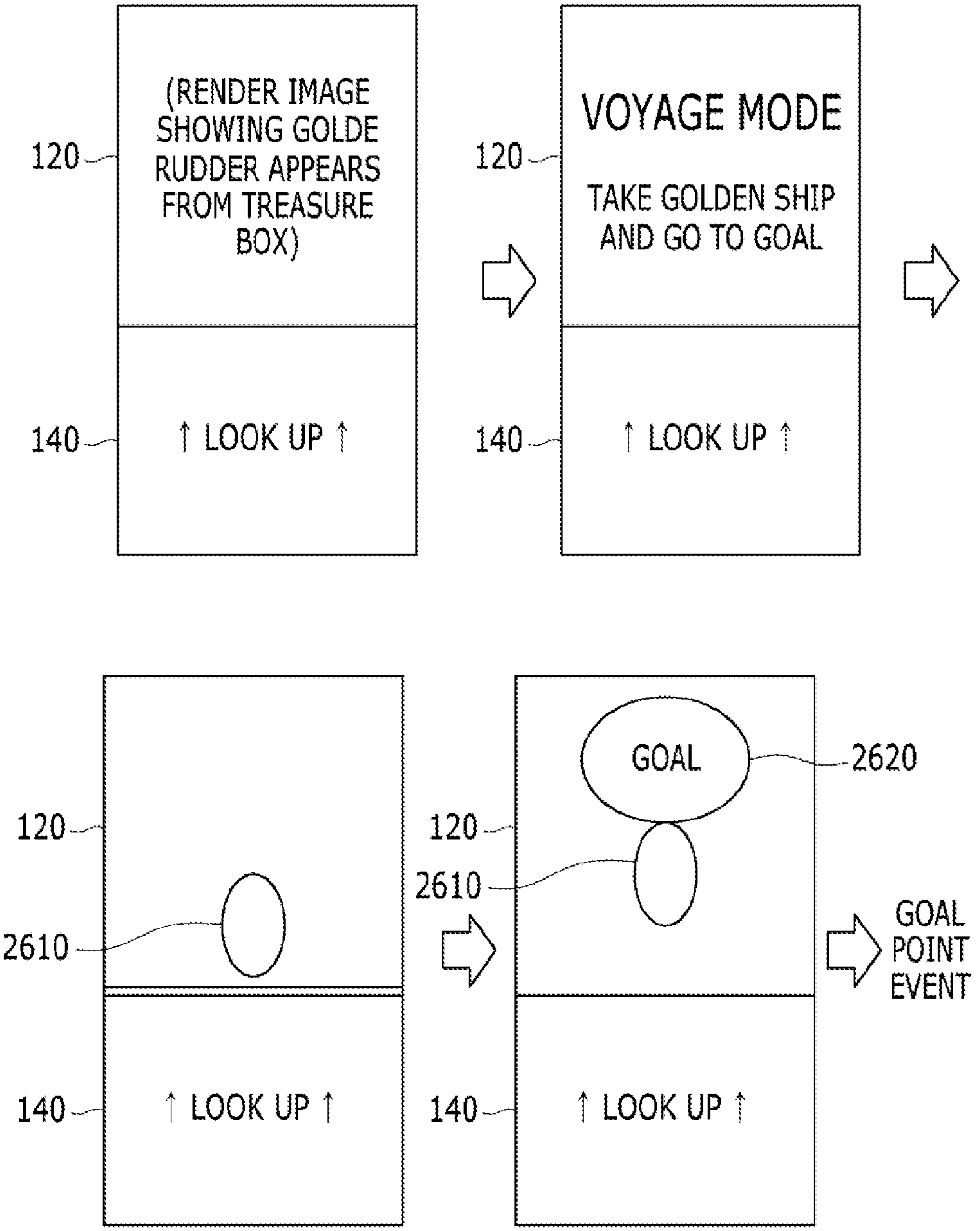
FIG. 26 shows an example of yet another rendering picture at a treasure box event 1 determined in a bonus round.

FIG. 22 shows an example of a rendering picture at a treasure box event 1 determined in a bonus round, FIG. 23 shows an example of a payout determination table for a treasure box event 1 shown in FIG. 22, FIG. 24 shows an example of another rendering picture at a treasure box event 1 determined in a bonus round, FIG. 25 shows an example of a payout determination table for a treasure box event 1 shown in FIG. 24, and FIG. 26 shows an example of yet another rendering picture at a treasure box event 1 determined in a bonus round.

When the character corresponding to the player of the gaming machine 100 arrives at a cell to which a treasure box event 1 is set, the treasure box event 1 is performed. In this case, the cell may include an image for the treasure box. As shown in FIG. 22, the gaming machine 100 renders an image corresponding to the event on the top display 120, and outputs an effect sound corresponding to the event. The rendered image may be an image that the character, for example, “Sinbad” opens a treasure box.

The gaming machine 100 randomly determines a profit of the treasure box event 1. The profit may be any one of various credit values and at least one event. The gaming machine 100 may store a payout determination table for a treasure box event 1 in a memory. An example of the payout determination table is shown in FIG. 23. As shown in FIG. 23, the payout determination table represents mappings between a plurality of results and selection probabilities of the results, i.e., a range of random numbers corresponding to each result. The results include a plurality of payouts including credit values of 50, 100, 150, 200, and 300, a wheel event, and a golden rudder event, and a selection probability of each payout, i.e., a range of random numbers corresponding to each payout. Accordingly, the gaming machine may select any one payout in accordance with the selection probability.

When any one of various credit values is selected as the result, the top display 120 renders an image for awarding credits to the player according to the selected credit value as show in FIG. 22. At this time, the awarded credits may be determined by multiplying the selected credit value by a current BET. For example, if the selected credit value is 50 credits and the player presses BET×3 button (152*c* of FIG. 5), the awarded credits are 150 credits. When the rendered image is displayed in the top display 120, the main display 140 displays the image for indicating “LOOK UP”. Next, as described with reference to FIG. 20 and FIG. 21, the determined credits are awarded to the player.

When the wheel event is selected as the result, the gaming machine 100 displays on the top display 120 an image that a wheel 2410 appears from the treasure box, and then indicate the player to press a spin button (153 of FIG. 3) to spin the wheel 2410, as shown in FIG. 24. The wheel 2410 on the top display 120 is partitioned into a plurality of areas to which various credit values are respectively assigned. When the player press the spin button 153, the gaming machine 100 randomly determines any one of the various credit values, and stops the wheel 2410 such that the area corresponding to the determined credit value is located at a topmost part of the wheel 2410. The gaming machine 100 may store a payout determination table for the wheel event in a memory. An example of the payout determination table is shown in FIG. 25. As shown in FIG. 25, the payout determination table includes a plurality of payouts including credit values of 50, 100, 150, 200, 250, and 300, and a selection probability of each payout, i.e., a range of random numbers corresponding to each payout. Accordingly, the gaming machine may select any one credit value in accordance with the selection probability. Further, the gaming machine 100 displays credits according to the selected credit value on the wheel 2410. Next, as described with reference to FIG. 20 and FIG. 21, the determined credits are awarded to the player.

When the golden rudder event is selected as the result, the gaming machine 100 displays an image that a golden rudder appears from the treasure box, and displays an image for indicating a start of the golden rudder event, as shown in FIG. 26. For example, the top display 120 may display “VOYAGE MODE” and “Take Golden Ship and Go to Goal.” Next, the gaming machine 100 displays on the top display 120 an image that a ship 2610 advances in a river, and then displays on the top display 120 an image that the ship 2610 arrives at a goal point 2620. That is, the gaming machine 100 moves the character to the goal point. Subsequently, the gaming machine 100 executes a goal point event. The goal point event is described in below with reference to FIG. 72A, FIG. 72B and FIG. 73.

Treasure Box Event 2

FIG. 27 shows an example of a payout determination table for a treasure box event 2.

When the character corresponding to the player of the gaming machine 100 arrives at a cell to which a treasure box event 2 is set, the treasure box event 2 is performed. In this case, the cell may include an image for the treasure box. The treasure box event 2 is similar to the treasure box event 1. Instead, a golden rudder event is not selected in the treasure box event 2. As shown in FIG. 27, in a payout determination table for the treasure box event 2, a selection probability of the golden rudder event is 0%.

Treasure Box Events 3, 4, 5

Figure 29:
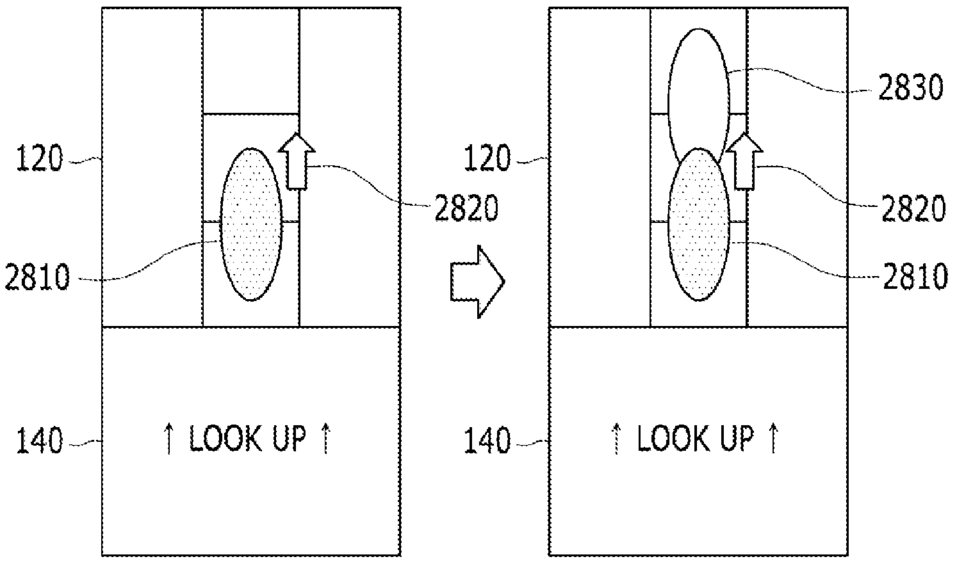
FIG. 29 shows an example of a rendering picture at introduction of a treasure box event 3, 4 or 5 determined in a bonus round.

FIG. 28A shows an example of a payout determination table for a treasure box event 3, FIG. 28B shows an example of a payout determination table for a treasure box event 4, FIG. 28C shows an example of a payout determination table for a treasure box event 5, FIG. 28D shows an example of effects determination table in a treasure box event 3, 4, or 5, and FIG. 29 shows an example of a rendering picture at introduction of a treasure box event 3, 4 or 5 determined in a bonus round.

When the character 2810 corresponding to the player of the gaming machine 100 arrives at a cell to which a treasure box event 3, 4, or 5 is set, the treasure box event 3, 4, or 5 is performed. In this case, the cell may include an image for the treasure box.

In a certain embodiment, the gaming machine 100 may randomly determine win or loss of the player when the treasure box event 3, 4, or 5 starts. The gaming machine 100 may store a payout determination table for the treasure box event 3, 4, or 5 in a memory. An example of the payout determination table is shown in FIG. 28A, FIG. 28B, or FIG. 28C. As shown in FIG. 28A, the payout determination table for the treasure box event 3 represent mapping between two results including win and loss that correspond to credit values of 0 and 400, and selection probabilities of the results. The selection probabilities are 70% and 30%. When the result is the win, an icon corresponding to the opponent character is provided the player as well as the credits. As shown in FIG. 28B, the payout determination table for the treasure box event 4 includes two results including win and loss that correspond to credit values of 0 and 300, and a selection probability 50% of each result. The selection probabilities are 50% and 50%. As shown in FIG. 28C, the payout determination table for the treasure box event 5 includes two results including win and loss that correspond to credit values of 0 and 200, and a selection probability of each result. The selection probabilities are 30% and 70%. Accordingly, the gaming machine may determine win or loss in accordance with the selection probability.

When the gaming machine 100 determines the win of the player and the player does not have an icon of an opponent character, the gaming machine 100 renders effects that a golden sword 2820 appears from the treasure box on the top display 120, as shown in FIG. 29. Subsequently, the top display 120 renders effects that the treasure box is eliminated and the opponent character 2830 appears. The opponent character 2830 may be Cyclops in the treasure box event 3, a giant snake in the treasure box event 4, or a skeleton gladiator in the treasure box event 5. When the gaming machine 100 determines the win of the player and the player has already obtained the icon of the opponent character, the gaming machine 100 renders effects that credits of the determined credit value appears from the treasure box on the top display 120. When the gaming machine 100 determines the loss of the player, the gaming machine 100 renders effects that a credit of zero appears from the treasure box on the top display 120. That is, the gaming machine may render effects corresponding to the determined result, as shown in FIG. 28D.

After the treasure box is eliminated and the opponent character 2830 appears as shown in FIG. 29, a battle event starts. The battle event is described in below.

Battle Events 1, 2, 3

Figure 30A:
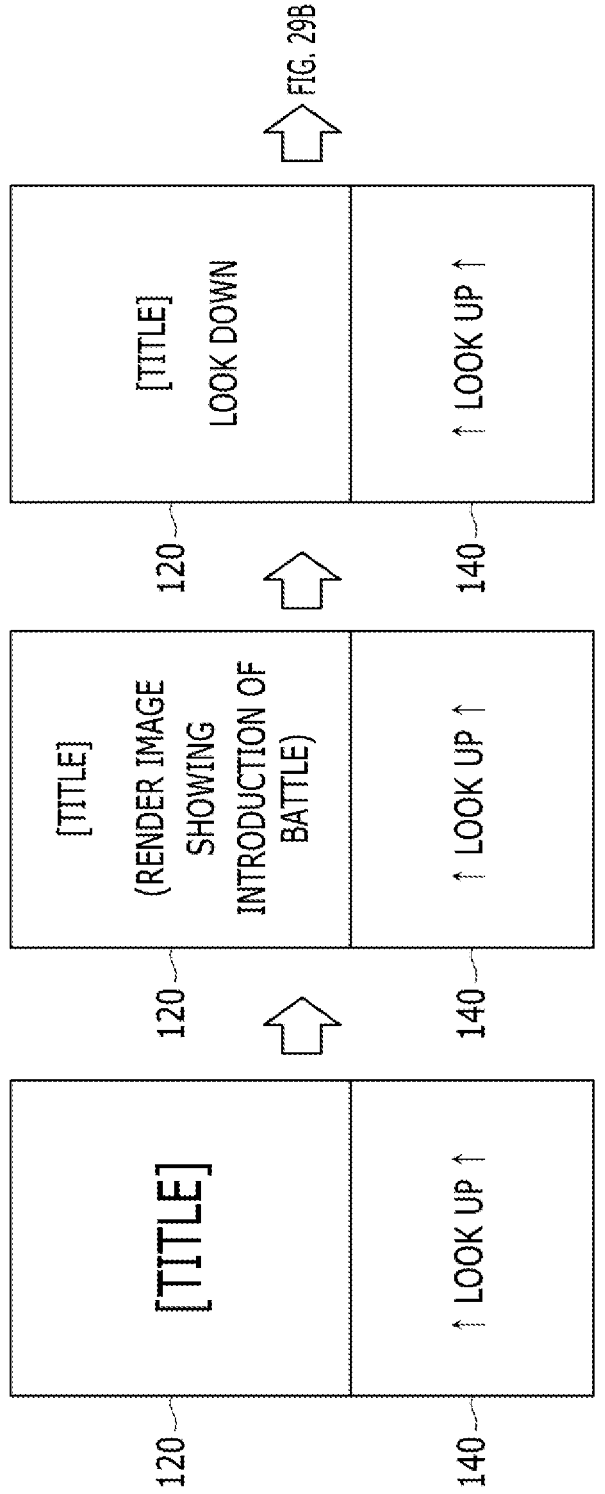
FIG. 30A and FIG. 30B show an example of a rendering picture at a battle event 1, 2, or 3.
Figure 30B:
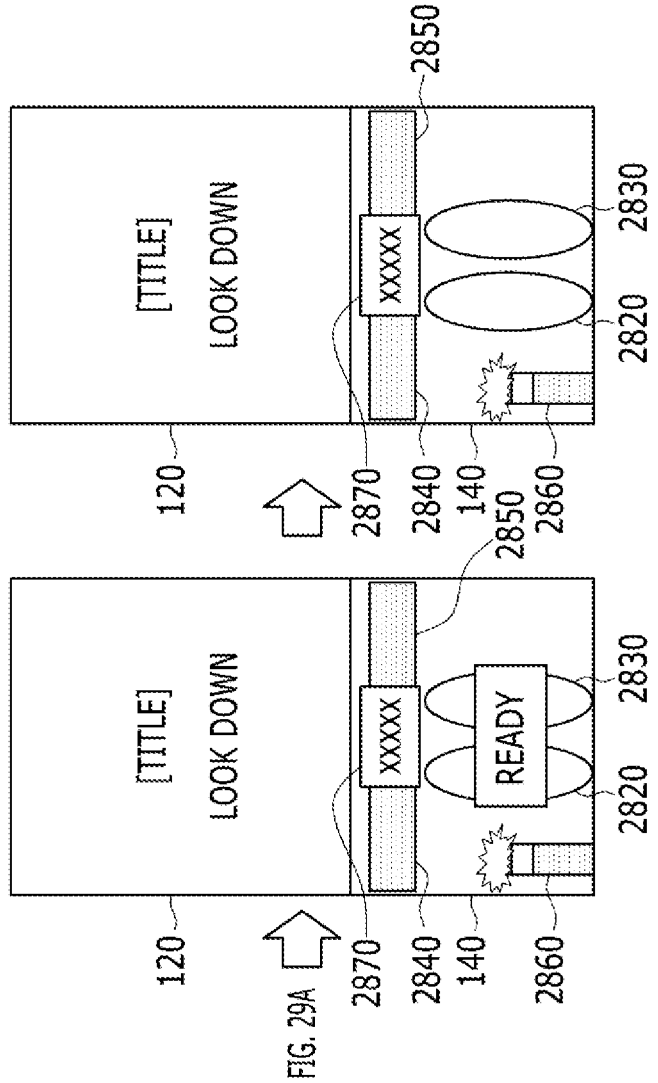
Figure 31:
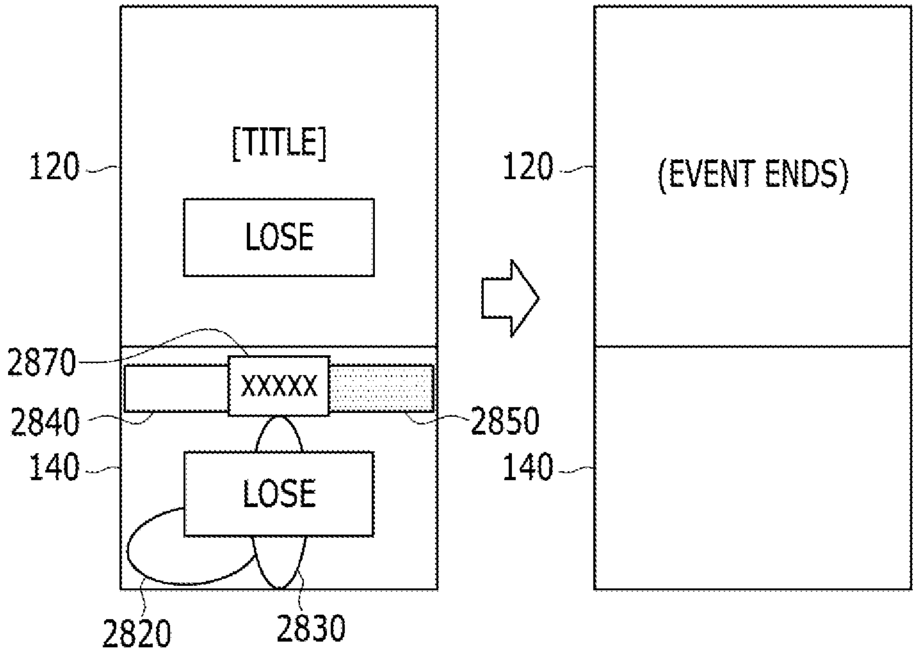
FIG. 31 show an example of a rendering picture for loss at a battle event 1, 2, or 3.
Figure 32:
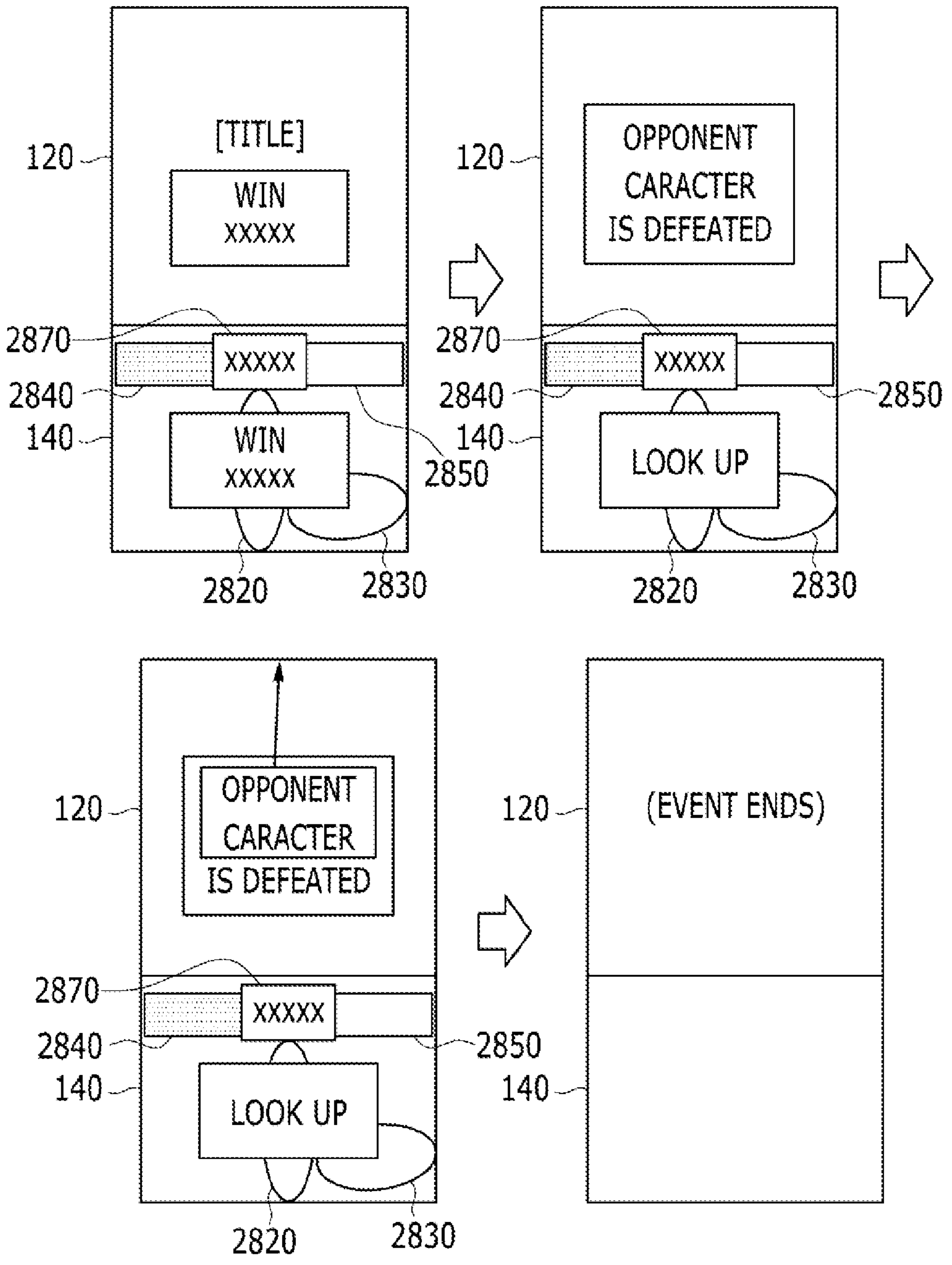
FIG. 32 show an example of a rendering picture for win at a battle event 1, 2, or 3.
Figure 33:
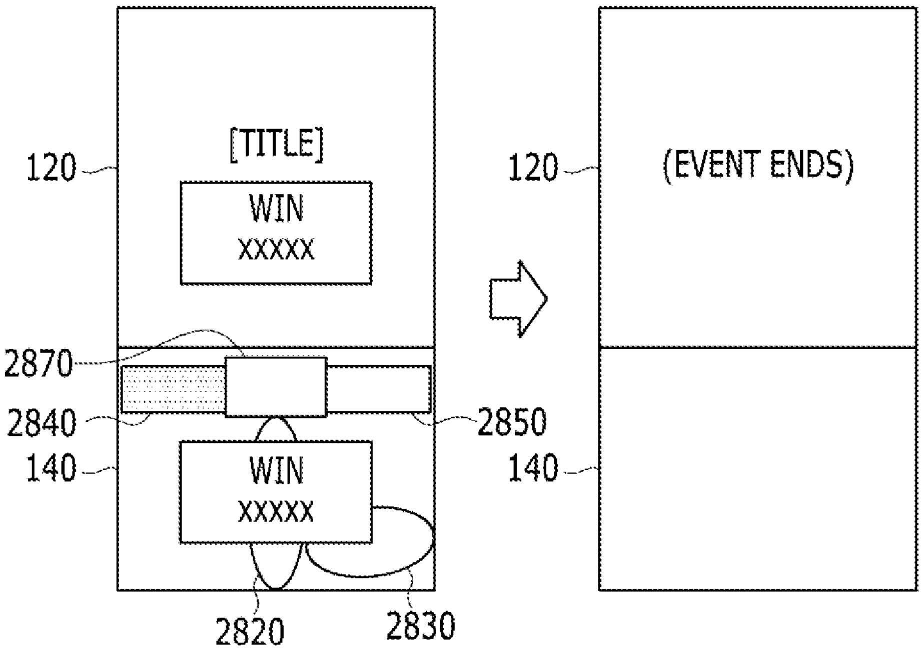
FIG. 33 show an example of another rendering picture for win at a battle event 1, 2, or 3.

FIG. 30A and FIG. 30B show an example of a rendering picture at a battle event 1, 2, or 3, FIG. 31 show an example of a rendering picture for loss at a battle event 1, 2, or 3, FIG. 32 show an example of a rendering picture for win at a battle event 1, 2, or 3, and FIG. 33 show an example of another rendering picture for win at a battle event 1, 2, or 3.

When the character corresponding to the player of the gaming machine 100 arrives at a cell to which a battle event 1, 2, or 3 is set. In this case, the cell may include an image for an opponent character. Further, when the battle event starts in the treasure box event 3, 4, or 5, the battle event 1, 2, or 3 may be performed. The opponent character may be Cyclops in the battle event 1, a giant snake in the battle event 2, or a skeleton gladiator in the battle event 3.

The gaming machine 100 displays a title of the performed event on the top display 120 as shown in FIG. 30A. Subsequently, the gaming machine 100 renders on the top display 120 effects for showing the introduction of a battle according to the performed event, and then indicates the player to look down the main display 140, by displaying, for example, "LOOK DOWN". Next, the gaming machine 100 renders on the main display 140 an image that the character 2820 and the opponent character 2830 face each other as shown in FIG. 30B. Further, the gaming machine 100 displays on the main display 140 stamina 2840 of the character 2820, stamina 2850 of the opponent character 2830, a combo meter 2860, and a credit value 2870 that is provided to the player when the character wins the battle. The combo is a term that designates a set of actions performed in sequence, with timing limitations, that yield a decrease of stamina of the opponent character. The battle starts when an indication on the main display 140 switches from "READY" to "FIGHT", and the player presses a spin button (153 of FIG. 3) to allow the character 2820 to attack the opponent character 2830. The battle ends when any one of the stamina 2840 and the stamina 2850 reaches zero.

When the character 2820 loses the battle, the gaming machine 100 renders an image that the character 2820 falls down, and displays "LOSE" on the top display 120 and the main display 140, as shown in FIG. 31. Further, the gaming machine 100 renders on the top display 120 an image that the battle event 1, 2, or 3 ends. Next, the gaming machine 100 displays images for a next bonus round as shown in FIG. 16. The effects shown in FIG. 31 may not be rendered in the treasure box event 3, 4, or 5.

When the character 2820 wins the battle, the gaming machine 100 renders an image that the opponent character 2830 falls down and displays "WIN" on the top display 120 and the main display 140, as shown in FIG. 32. Further, credits determined by the credit value of "WIN" are displayed together with "WIN". Subsequently, the gaming machine displays on the top display 120 an image for describing that the opponent character is defeated, and then renders an image that an icon of the opponent character flies up. Accordingly, the player can obtain the icon of the opponent character. In this case, the main display 140 displays "LOOK UP". Subsequently, the gaming machine 100 renders on the top display 120 an image that the battle event 1, 2, or 3 ends. Next, the gaming machine 100 displays images for a next bonus round as shown in FIG. 16.

On the other hand, if the player has obtained the icon of the opponent character, the gaming machine 100 does not render an image that the player obtains the icon of the opponent character, as shown in FIG. 33. The effects shown in FIG. 33 may not be rendered in the treasure box event 3, 4, or 5.

Coconut Catching Event

Figure 34A:
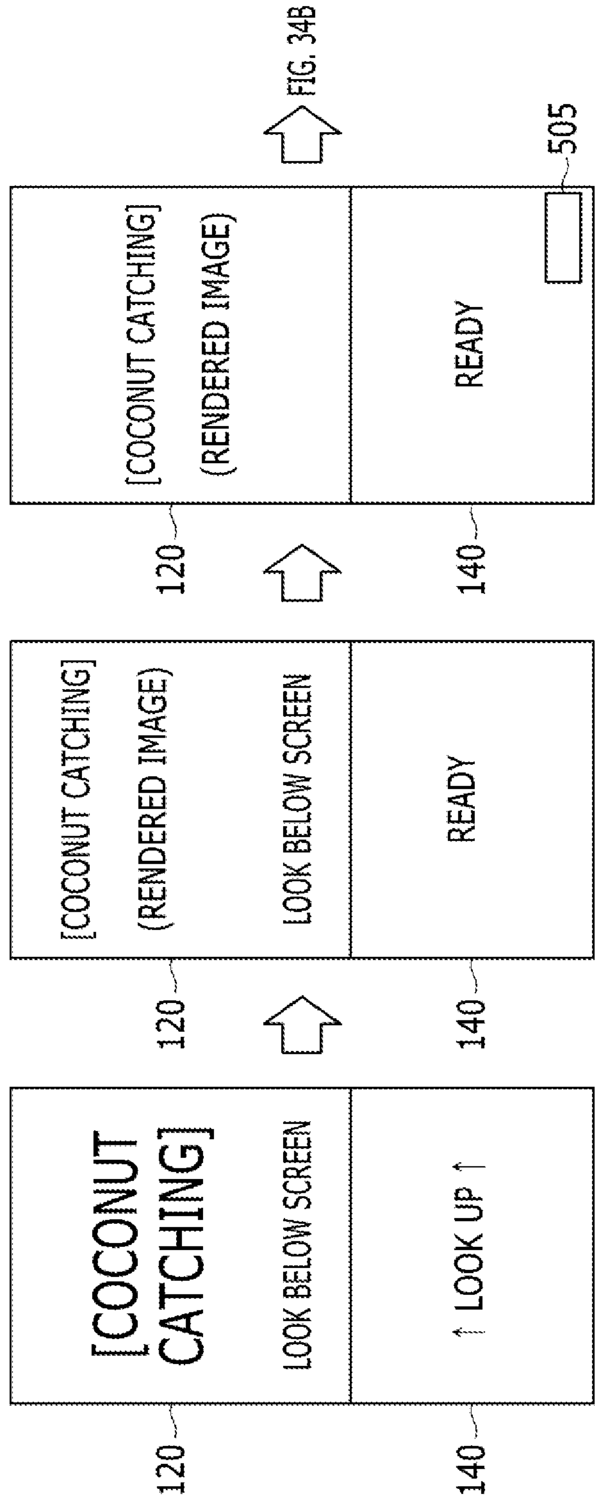
FIG. 34A, FIG. 34B and FIG. 34C show an example of a rendering picture at a coconut catching event determined in a bonus round.
Figure 34B:
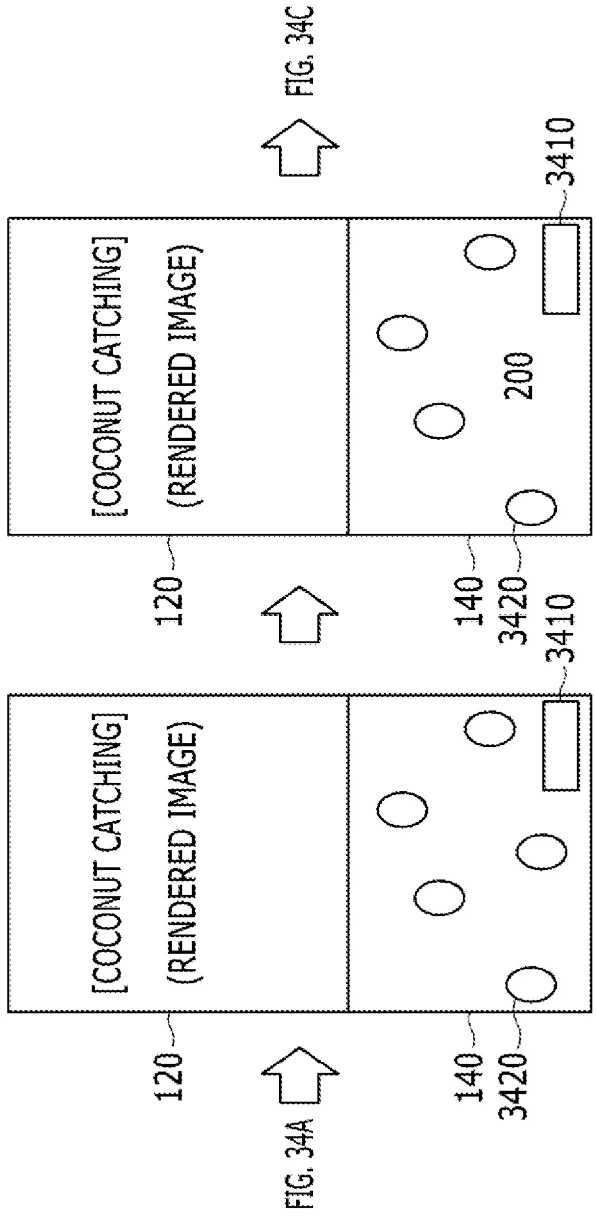
Figure 34C:
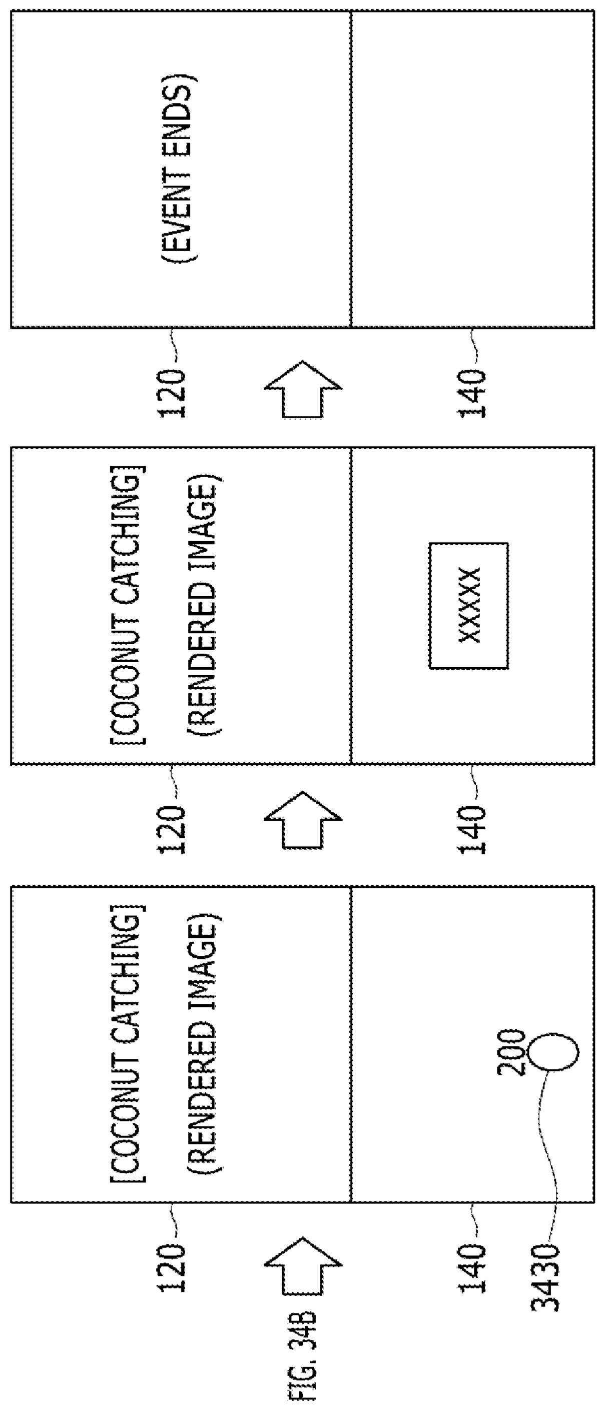

FIG. 34A, FIG. 34B and FIG. 34C show an example of a rendering picture at a coconut catching event determined in a bonus round, FIG. 35 shows an example of a payout determination table for a coconut catching event shown in FIG. 34A to FIG. 34C, and FIG. 36 shows an example of a payout distribution table for a coconut catching event shown in FIG. 34A to FIG. 34C.

When the character corresponding to the player of the gaming machine 100 arrives at a cell to which a coconut catching event, the coconut catching event is performed. In this case, the cell may include an image for a coconut. The gaming machine 100 displays a title of the coconut catching event on the top display 120 as shown in FIG. 34A. Subsequently, the gaming machine 100 indicates the player to look the main display 140, and explains a rule of the coconut catching event in the main display 140. In this case, the gaming machine may display a movie corresponding to a real play of the coconut catching event to explain the game rule. Further, the gaming machine 100 may render on the top display 120 an image representing the coconut catching event, for example, an image representing the coconut palm and a monkey. Next, the main display 140 displays "READY", and then displays "START" to start the coconut catching event. Further, the main display 140 displays a bonus win display section 3410.

When the coconut catching event start, the gaming machine 100 renders on the main display 140 effects that coconuts 3420 fall as shown in FIG. 34B. At this time, the top display 120 renders effects that the monkey drops the coconuts from the coconut palm. When any one of the coconuts is touched by the player, the gaming machine 100 displays a payout corresponding to the touched coconut, and adds the payout to credits of the bonus win display section 2910. After repeating a procedure that the coconuts fall and are touched by the player, the gaming machine renders effects that the last coconut 3430 falls to the middle of the screen of the main display 140 and a payout corresponding to the last coconut 3430 is displayed, as shown in FIG. 34C. Further, the payout of the last coconut 3430 added to the credits of the bonus win display section 3410. Next, the gaming machine 100 displays total credits accumulated in the bonus win display section 3410 on the main display 140, and awards the total credits to the player. Subsequently, the gaming machine 100 renders on the top display 120 an image that the coconut catching event ends, and displays images for a next bonus round as shown in FIG. 16.

In a certain embodiment, the gaming machine 100 may randomly determines a total payout that is awarded in the coconut catching event when the coconut catching event starts. The gaming machine 100 may store a payout determination table for the coconut catching event in a memory. An example of the payout determination table is shown in FIG. 35. As shown in FIG. 35, the payout determination table for the coconut catching event includes a plurality of payouts including various credit values, and a selection probability of each payout. Accordingly, the gaming machine may determine the total payout of the coconut catching event in accordance with the selection probability.

When the coconut catching event starts after the total payout is determined, the gaming machine may determine a payout of the touched coconut based on the number of remaining coconuts among total coconuts and a remaining payout that is not determined among the total payout. The gaming machine 100 may store a payout distribution table for the coconut catching event in a memory. An example of the payout distribution table is shown in FIG. 36. As shown in FIG. 36, the payout distribution table represents a payout of the touched coconut according to the remaining payout and the number of remaining coconuts. It is assumed that the number of total coconuts is 60 in the payout distribution table shown in FIG. 36. For example, assuming that the total payout is 550, each time the coconut is touched when the number of remaining coconuts is within 51 to 60, the credit values of 5 are awarded as the payout. Next, assuming that ten coconuts are touched and the credit values of 50 are awarded as the payout, the remaining payout is 500. Accordingly, each time the coconut is touched when the number of remaining coconuts is within 41 to 50, the credit values of 5 are awarded as the payout. As such, the credit value of the touched coconut is determined according to the number of remaining coconuts and the remaining payout. Further, all of the remaining payout is awarded in the last coconut regardless of touch of the last coconut. Accordingly, the total payout can be awarded in the coconut catching event.

In a certain embodiment, a plurality of payout distribution tables may be stored in the memory. In this case, the gaming machine 100 may randomly determine any one of the plurality of payout distribution tables.

Jar Roulette Event

Figure 37A:
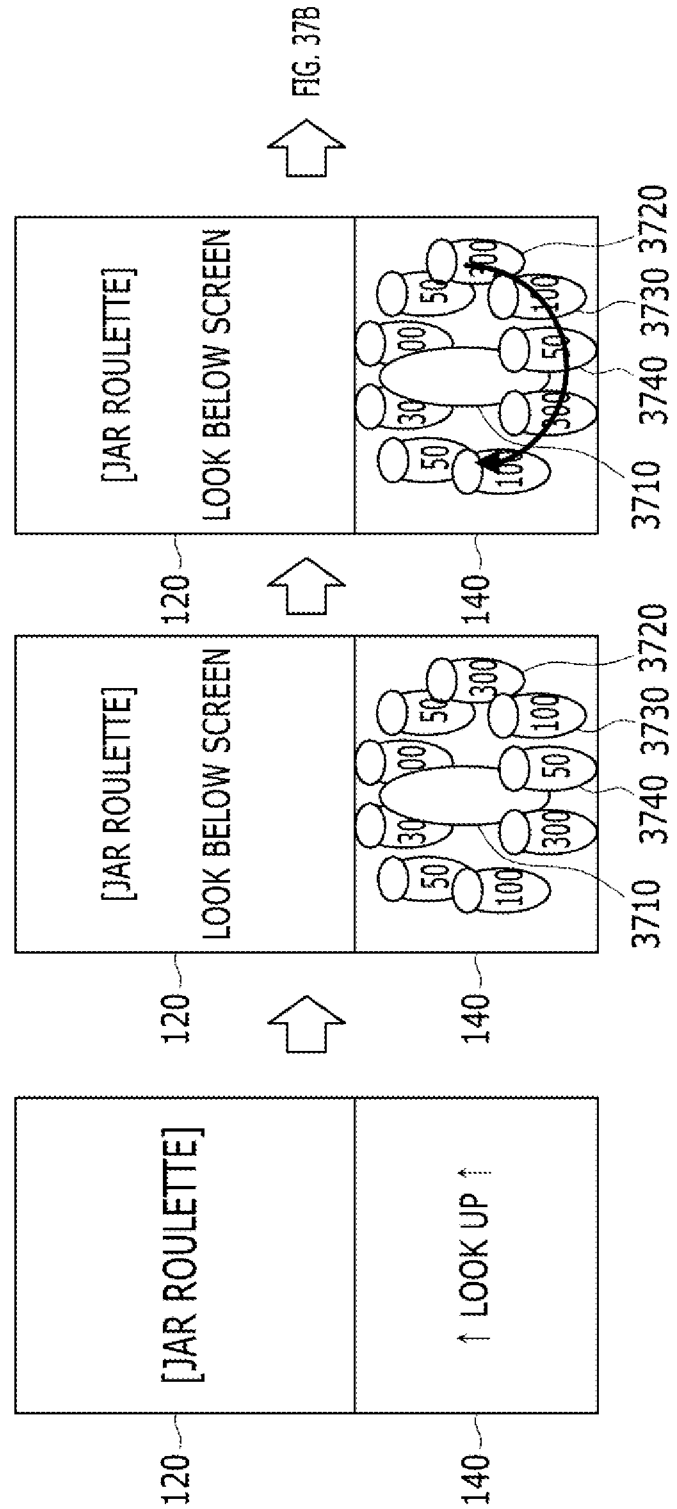
FIG. 37A and FIG. 37B show an example of a rendering picture at a jar roulette event determined in a bonus round.
Figure 37B:
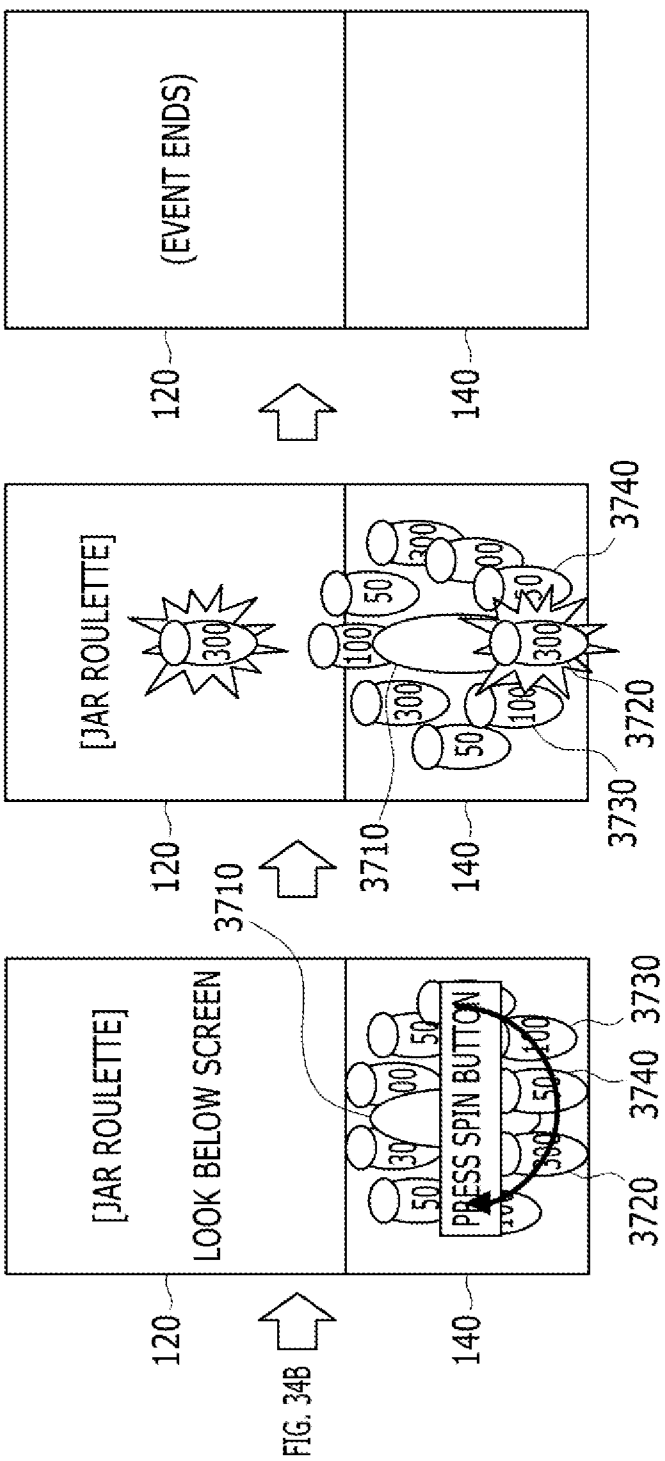

FIG. 37A and FIG. 37B show an example of a rendering picture at a jar roulette event determined in a bonus round.

When the character corresponding to the player of the gaming machine 100 arrives at a cell to which a jar roulette event, the jar roulette event is performed. In this case, the cell may include an image for a jar (or a pot). The gaming machine 100 displays a title of the jar roulette event on the top display 120 as shown in FIG. 37A. Subsequently, the gaming machine 100 renders on the top display 120 effects for showing the introduction of the jar roulette event, and then indicates the player to look down the main display 140. Further, the gaming machine 100 displays on the main displays 140 an image that the character 3710 and a plurality of jars 3720, 3730, and 3740 surrounding the character 3710. A payout is depicted on each of the plurality of jars 3720, 3730, and 3740. The plurality of jars have three types of jars including golden jars 3720, silver jars 3730, and bronze jars 3740. The highest payout is depicted on the golden jar 3720, and the lowest payout is depicted on the bronze jar 3740.

Next, the gaming machine 100 renders on the main displays 140 effects that the plurality of jars 3720, 3730, and 3740 revolve around the character 3710, as shown in FIG. 37B. The gaming machine increases the revolving speed to allow the player to identify the payouts of the jars 3720, 3730, and 3740 at the first turn. Subsequently, the gaming machine 100 notifies the player to press a spin button (153 of FIG. 3). When the player presses the spin button 153, the gaming machine 100 displays on the main displays 140 an image that the jars 3720, 3730, and 3740 stop. Even if the player does not press the spin button, the gaming machine 100 displays on the main displays 140 the image that the jars 3720, 3730, and 3740 stop after a predetermined time, for example ten seconds, lapses. At this time, the character obtains the jar 3720 that is located at the bottom of the screen from among the plurality of jars 3720, 3730, and 3740. Accordingly, the gaming machine 100 highlights the obtained jar 3720, and awards the payout of the obtained jar 3720 to the player. Further, the gaming machine 100 displays the obtained jar on the top display 120. Subsequently, the gaming machine 100 renders on the top display 120 an image that the coconut catching event ends, and displays images for a next bonus round as shown in FIG. 16.

In a certain embodiment, the gaming machine 100 may randomly determines a payout of the jar roulette event when the jar roulette event starts. After determining the payout of the jar roulette event, the gaming machine stops the revolving jars 3720, 3730, and 3740 such that the jar corresponding to the determined payout is located at the bottom of the screen.

Coconut Palm Kicking Event

Figure 38A:
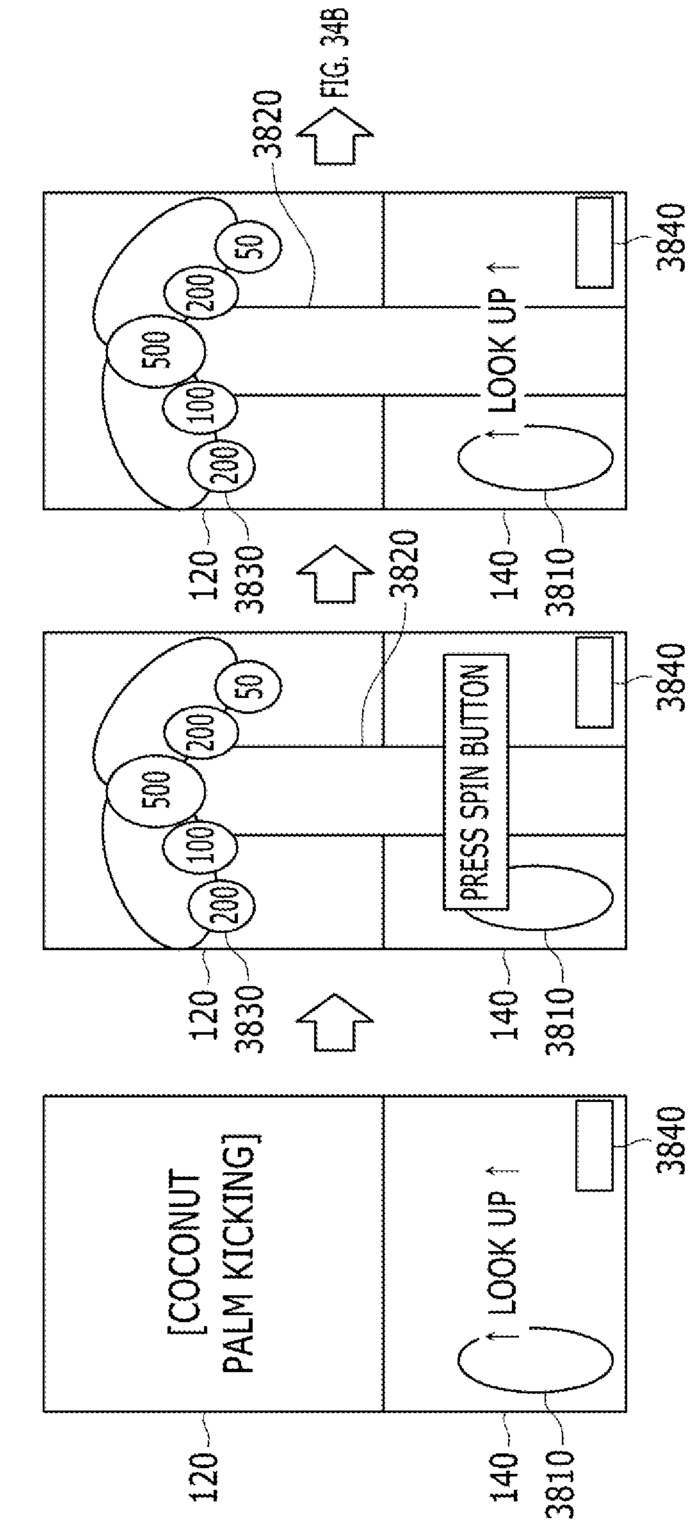
FIG. 38A and FIG. 38B show an example of a rendering picture at a coconut palm kicking event determined in a bonus round.
Figure 38B:
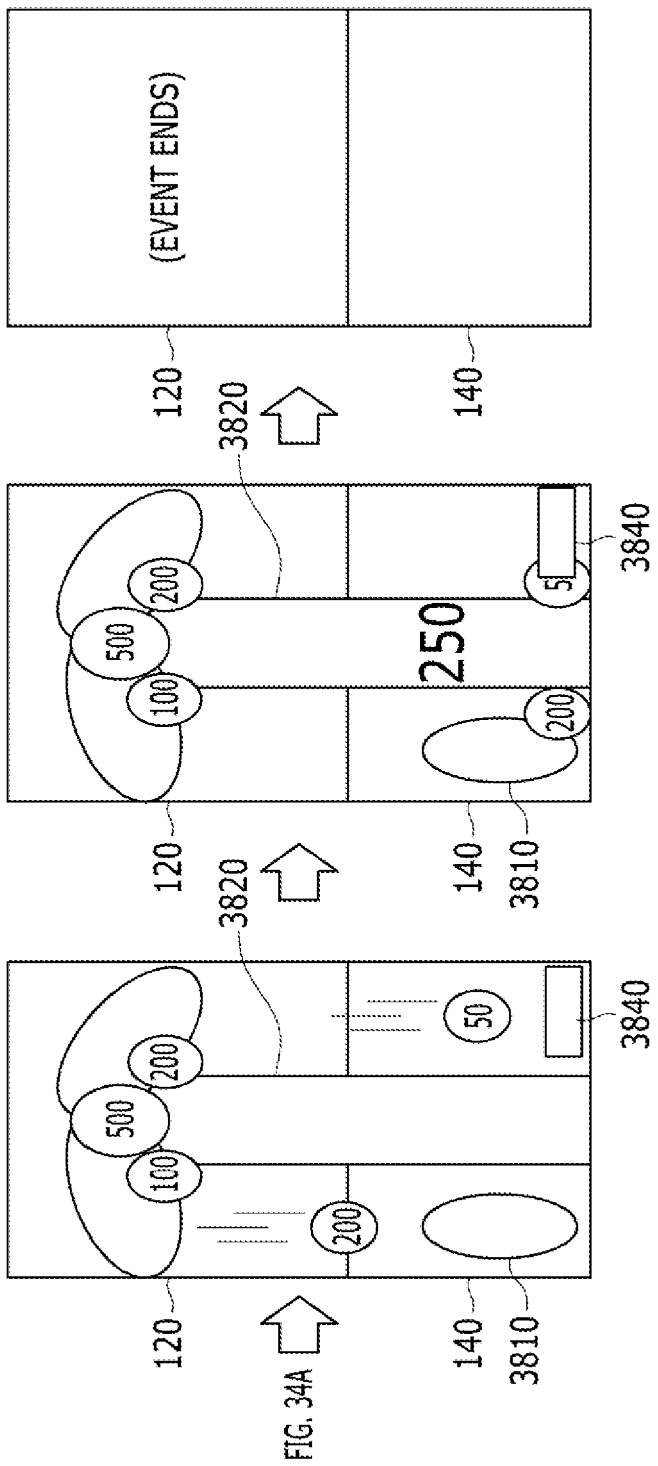

FIG. 38A and FIG. 38B show an example of a rendering picture at a coconut palm kicking event determined in a bonus round, FIG. 39 shows an example of a payout determination table for a coconut palm kicking event shown in FIG. 38A and FIG. 38B, and FIG. 40 shows an example of a pattern determination table for a coconut palm kicking event shown in FIG. 38A and FIG. 38B.

When the character corresponding to the player of the gaming machine 100 arrives at a cell to which a coconut palm kicking event, the coconut palm kicking event is performed. In this case, the cell may include an image for a coconut palm. The gaming machine 100 displays a title of the coconut catching event on the top display 120 as shown in FIG. 38A, and then renders on the top display 120 effects for showing the introduction of the coconut palm kicking event. Subsequently, the gaming machine 100 on the top display 120 and the main display 140 an image that the character 3810 stands beside a coconut palm 3820 having a plurality of coconuts 3830, and notifies the player to press a spin button (153 of FIG. 3). Further, the main displays 140 displays a bonus win display section 3840. A payout is depicted on each of the plurality of coconuts 3830. When the player presses the spin button 153, the gaming machine 100 renders on the top displays 140 effects that the character 3810 kicks the coconut palm 3820 and the coconuts 3830 are shaken. Even if the player does not press the spin button, the gaming machine 100 renders on the top displays 140 effects that the coconuts 3830 are shaken after a predetermined time, for example ten seconds, lapses.

Next, at least one coconut falls from the coconut palm 3820. Each time a coconut falls from the coconut palm 3820, the payout of the dropped coconut is added to credits of the bonus win display section 3840, as shown in FIG. 38B. Next, the gaming machine 100 displays total credits accumulated in the bonus win display section 3840 on the main display 140, and awards the total credits to the player. Subsequently, the gaming machine 100 renders on the top display 120 an image that the coconut palm kicking event ends, and displays images for a next bonus round as shown in FIG. 16.

In a certain embodiment, the gaming machine 100 may randomly determines falling coconuts when the coconut palm kicking event starts. The gaming machine 100 may store a payout determination table for the coconut palm kicking event in a memory. An example of the payout determination table is shown in FIG. 39. As shown in FIG. 39, the payout determination table for the coconut palm kicking event includes a plurality of combinations of selected payouts and a selection probability of each combination. For example, when the combination of the number 8 is selected, a coconut with payout 1 and a coconut with payout 5 fall from the coconut palm. Accordingly, the gaming machine may randomly determine falling coconuts in accordance with the selection probability.

In a certain embodiment, the gaming machine 100 may randomly determine magnitude of payouts awarded in the coconut palm kicking event. The gaming machine 100 may store a pattern determination table for the coconut palm kicking event in a memory. An example of the pattern determination table is shown in FIG. 40. As shown in FIG. 40, any one of a plurality of patterns may be determined according to a selection probability. Further, since each pattern has the magnitudes of payouts, the magnitudes of payouts are determined when the pattern is determined. For example, when pattern 3 is selected, credit values of payout 1, payout 2, payout 3, payout 4, and payout 5 are 30, 30, 80, 80, and 200, respectively. Accordingly, when the combination of the number 8 is selected in FIG. 39, a coconut with the credit value of 30 and a coconut with the credit value of 200 fall from the coconut palm.

Selection Type Event

A selection type event is an event that a payout corresponding to at least one option selected from a plurality of option is awarded to the player when the character corresponding to the player arrives at a cell. The selection type events may include various events, for example, a propose event, a treasure map event, a king's award event, a goods trade event, a mining event, a treasure box discovery event, a fishing event, a caving event, and a big ball rolling event.

Propose Event

Figure 41A:
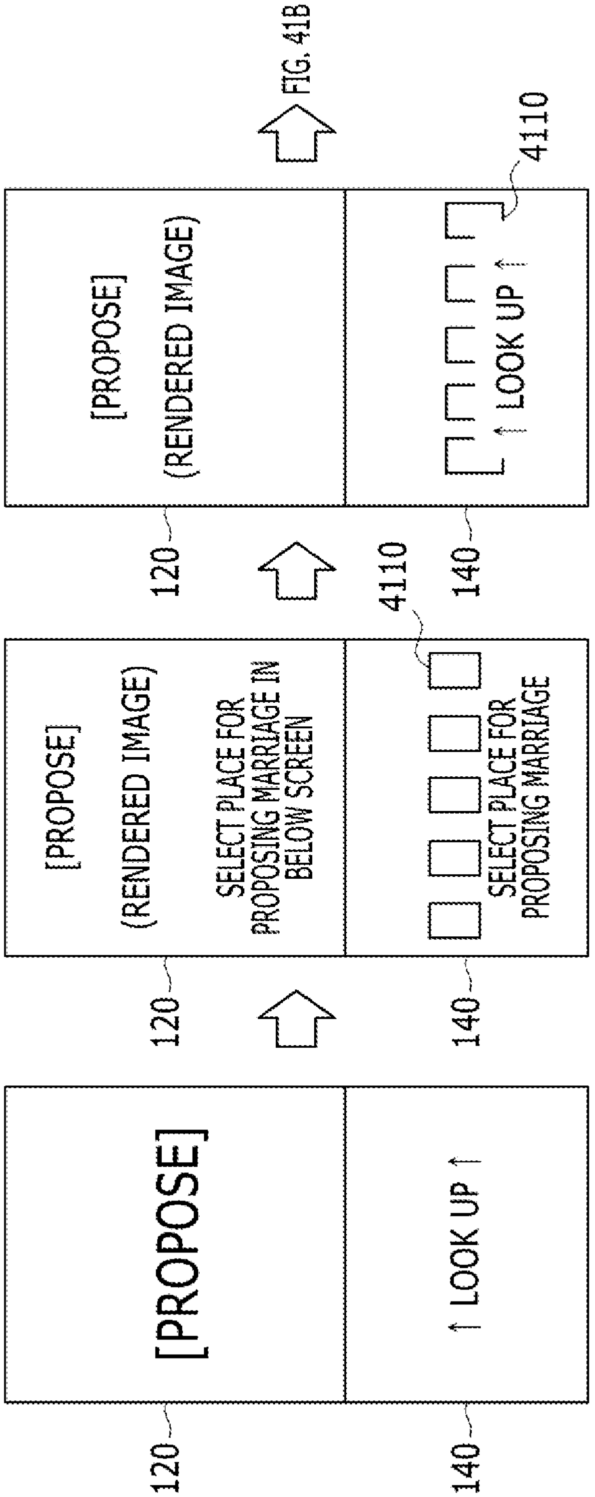
FIG. 41A and FIG. 41B show an example of a rendering picture at a propose event determined in a bonus round.
Figure 41B:
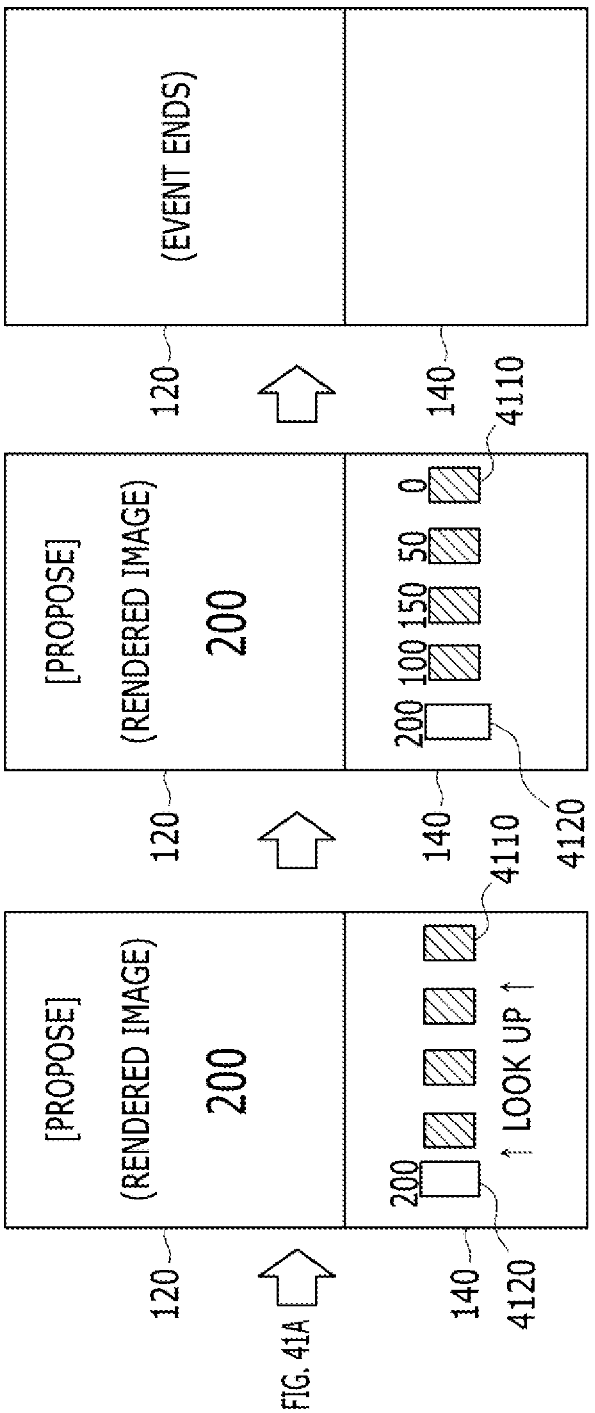

FIG. 41A and FIG. 41B show an example of a rendering picture at a propose event determined in a bonus round.

When the character corresponding to the player of the gaming machine 100 arrives at a cell to which a propose event is set, the propose event is performed. The gaming machine 100 displays a title of the propose event on the top display 120 as shown in FIG. 41A, and then renders on the top display 120 effects for showing the introduction of the propose event. Subsequently, the gaming machine 100 renders on the top display 120 effects that the character attempts to propose marriage, and informs the player to select any one of a plurality of options. For example, the gaming machine 100 displays "SELECT PLACE FOR PROPOSING MARRIAGE" on the top display 120 and the main display 140. Further, the gaming machine displays a plurality of options 4110 on the main display 140, and the plurality of options 4110 represent various places. When the player touches any one of the plurality of options 4110 to select one option 4120, the gaming machine 100 renders on the top display 120 effects that the character proposes marriage at the place corresponding to the selected option. The player may select any one option by pressing any one of a plurality of BET buttons (152*a* to 152*e* of FIG. 6) that correspond to the plurality of options 4110, respectively.

Next, the gaming machine 100 displays a payout awarded in the selected option 4120 on the top display 120 and the main display 140, as shown in FIG. 41B. Subsequently, the gaming machine 100 displays payouts assigned to the unselected options on the main display 140. Next, the gaming machine 100 renders on the top display 120 an image that the coconut palm kicking event ends, and displays images for a next bonus round as shown in FIG. 16.

In a certain embodiment, the gaming machine 100 may store in a memory a payout determination table in which a plurality of payouts are assigned to the plurality of options.

Treasure Map Event

Figure 42A:
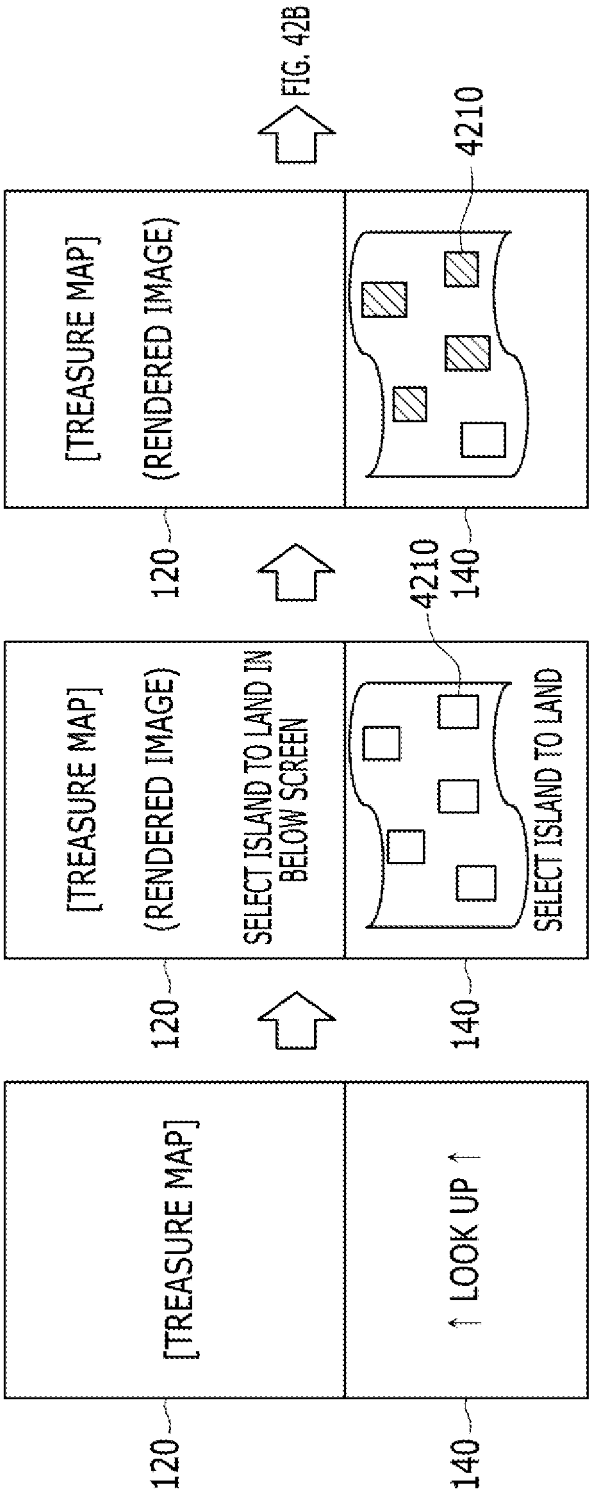
FIG. 42A and FIG. 42B show an example of a rendering picture at a treasure map event determined in a bonus round.
Figure 42B:
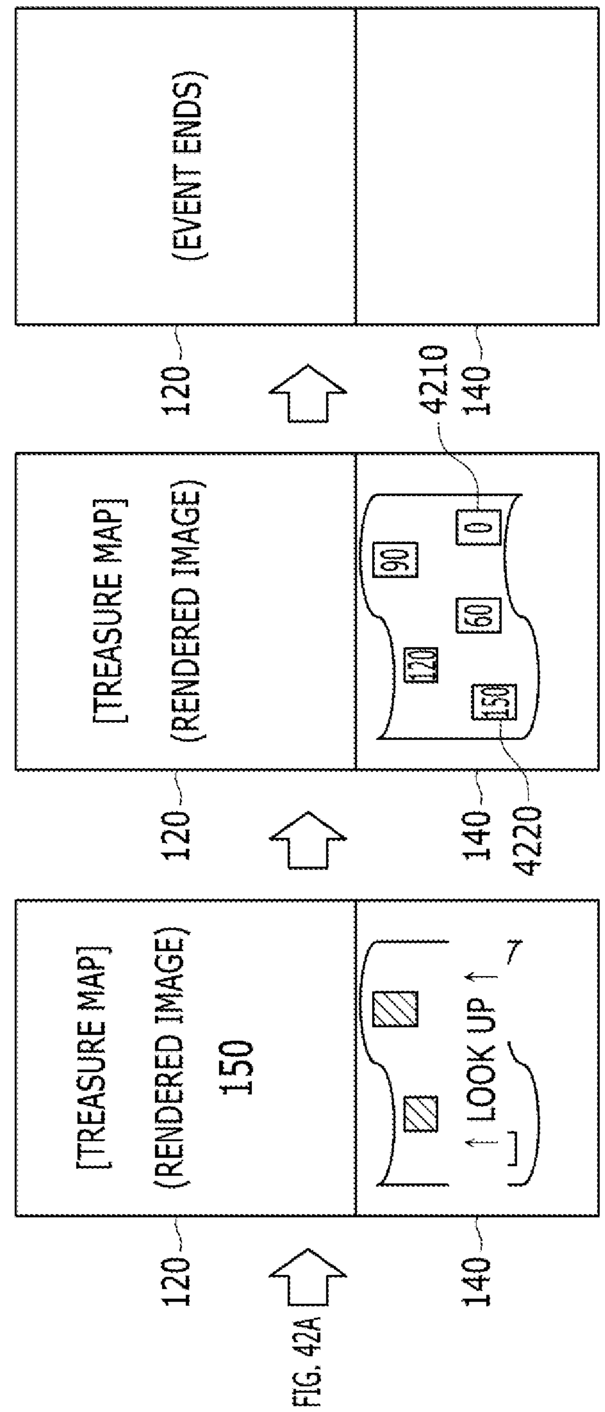

FIG. 42A and FIG. 42B show an example of a rendering picture at a treasure map event determined in a bonus round, FIG. 43A shows an example of an option determination table for a treasure map event shown in FIG. 42A and FIG. 42B, and FIG. 43B shows an example of a payout determination table for a treasure map event shown in FIG. 42A and FIG. 42B.

When the character corresponding to the player of the gaming machine 100 arrives at a cell to which a treasure map event is set, the treasure map event is performed. The gaming machine 100 displays a title of the treasure map event on the top display 120 as shown in FIG. 42A, and then renders on the top display 120 effects for showing the introduction of the treasure map event. Subsequently, the gaming machine 100 renders on the top display 120 effects that a ship is anchored in front of an island, and informs the player to select any one of a plurality of options. For example, the gaming machine 100 displays "SELECT ISLAND TO LAND" on the top display 120 and the main display 140. Further, the gaming machine displays a plurality of options 4210 on the main display 140, and the plurality of options 4210 represent various islands. When the player touches any one of the plurality of options 4210 to select one option 4220, the gaming machine 100 renders on the top display 120 effects that the ship advances toward an island corresponding to the selected option, and highlights the selected option.

Next, the gaming machine 100 displays a payout awarded in the selected option 4220 on the top display 120, and displays "LOOK UP" on the main display 140, as shown in FIG. 41B. Subsequently, the gaming machine 100 displays payouts assigned to the selected option and the unselected options on the main display 140. Next, the gaming machine 100 renders on the top display 120 an image that the coconut palm kicking event ends, and displays images for a next bonus round as shown in FIG. 16.

In a certain embodiment, the gaming machine 100 may store an option selection table in a memory. The option selection table stores mapping between the number of options and a selection probability. An example of the option selection table is shown in FIG. 43A. As shown in FIG. 43A, the number of options is three, four, or five, and the selection probability of each number is 33.33%. Further, the gaming machine 100 may store a payout determination table for each number of options in a memory. An example of the payout determination table is shown in FIG. 43B. As shown in FIG. 43B, the payout determination table include a plurality of options and a payout of each option, for each number. Accordingly, when the treasure map event starts, the gaming machine 100 may randomly determine the number of options based on the selection probability, and then may randomly assign a plurality of options to the plurality of islands. Further, the gaming machine displays the plurality of options 4310 on the main display 140 in accordance with the determined number of options.

King's Award Event

Figure 44A:
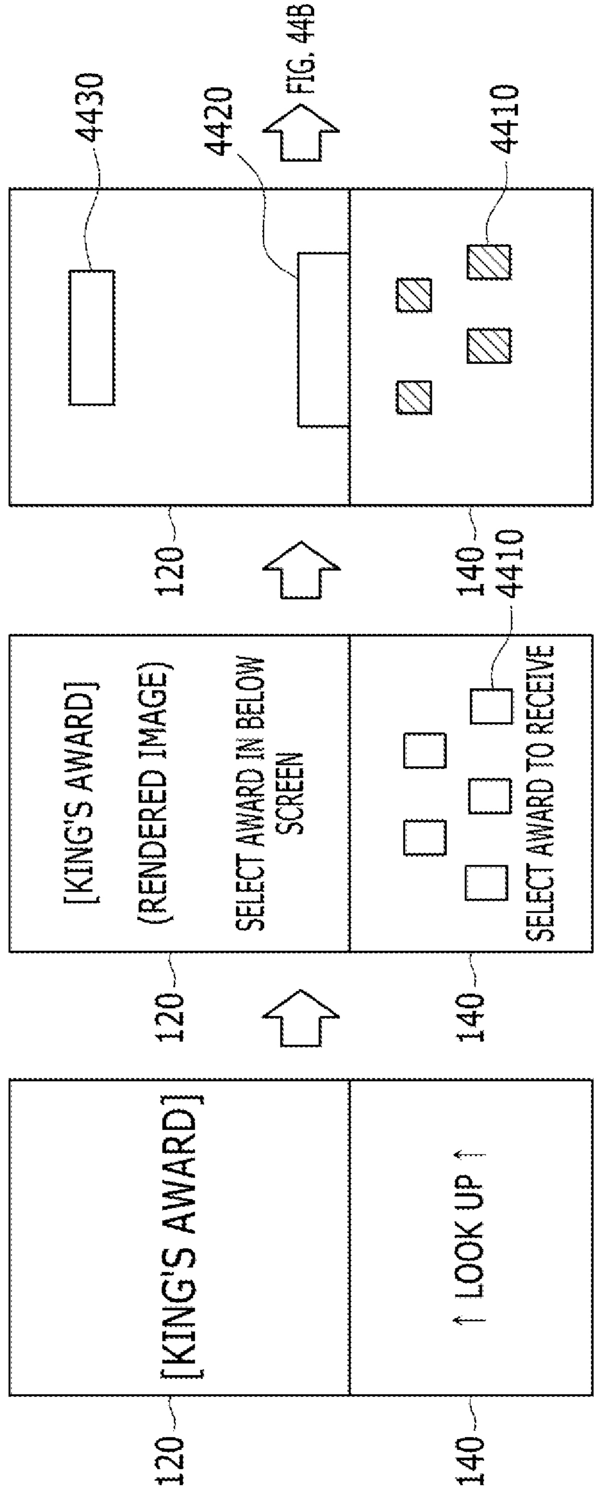
FIG. 44A and FIG. 44B show an example of a rendering picture at a king's award event determined in a bonus round.
Figure 44B:
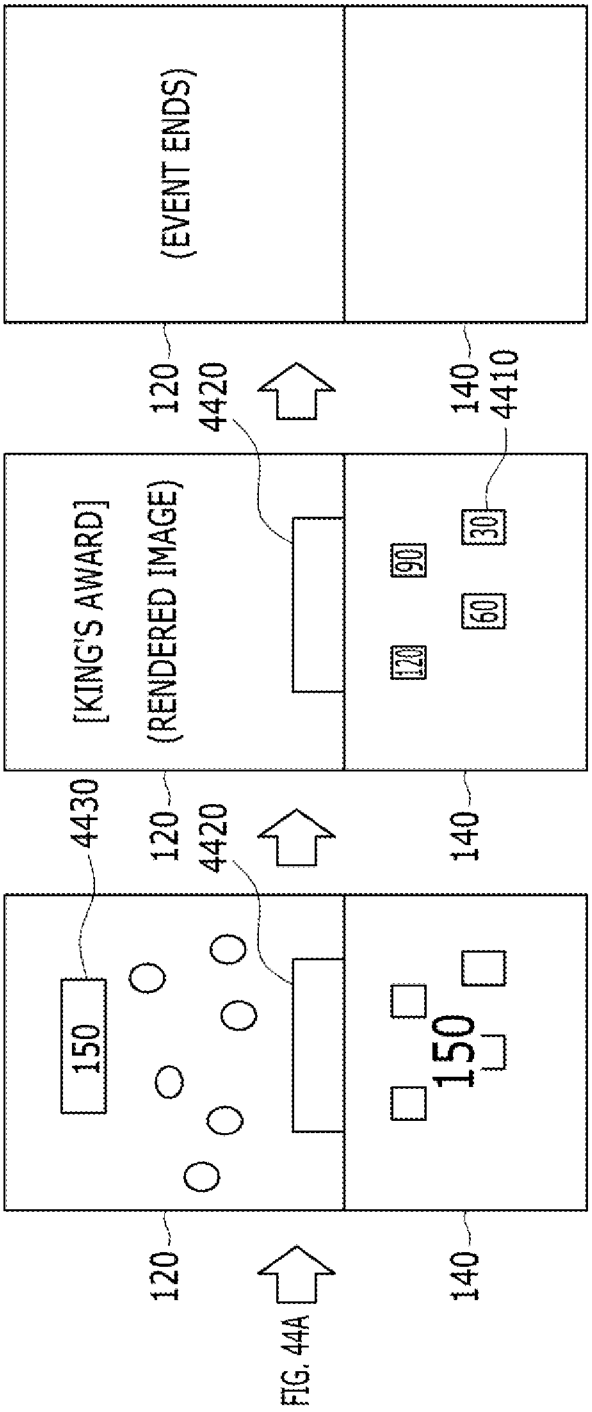

FIG. 44A and FIG. 44B show an example of a rendering picture at a king's award event determined in a bonus round.

When the character corresponding to the player of the gaming machine 100 arrives at a cell to which a king's award event is set, the king's award event is performed. The gaming machine 100 displays a title of the king's award event on the top display 120 as shown in FIG. 44A, and then renders on the top display 120 effects for showing the introduction of the king's award event. Subsequently, the gaming machine 100 renders on the top display 120 effects that a king asks which award the character receives, and informs the player to select any one of a plurality of options. For example, the gaming machine 100 displays "SELECT AWARD TO RECEIVE" on the top display 120 and the main display 140. Further, the gaming machine displays a plurality of options 4410 on the main display 140, and the plurality of options 4410 represent various treasure boxes for various awards. When the player touches any one of the plurality of options 4410 to select one option 4420, the gaming machine 100 renders on the main display 140 and the top display 120 effects that the selected treasure box 4420 goes up to the top display 120. Further, the top display 120 displays a bonus win display section 4430.

Next, the gaming machine 100 renders on the top display 120 effects that coins 4440 are ejected from the selected treasure box 4420, and increases credits of the bonus win display section 4430 while the coins are ejected, as shown in FIG. 44B. Further, the main display 140 displays the awarded credits. Subsequently, the gaming machine 100 displays payouts assigned to the unselected options on the main display 140. Next, the gaming machine 100 renders on the top display 120 an image that the king's award event ends, and displays images for a next bonus round as shown in FIG. 16.

In a certain embodiment, as described with reference to FIG. 43A and FIG. 43B, the gaming machine 100 may store an option selection table and a payout determination table for each number of options in a memory.

Goods Trade Event

Figure 45A:
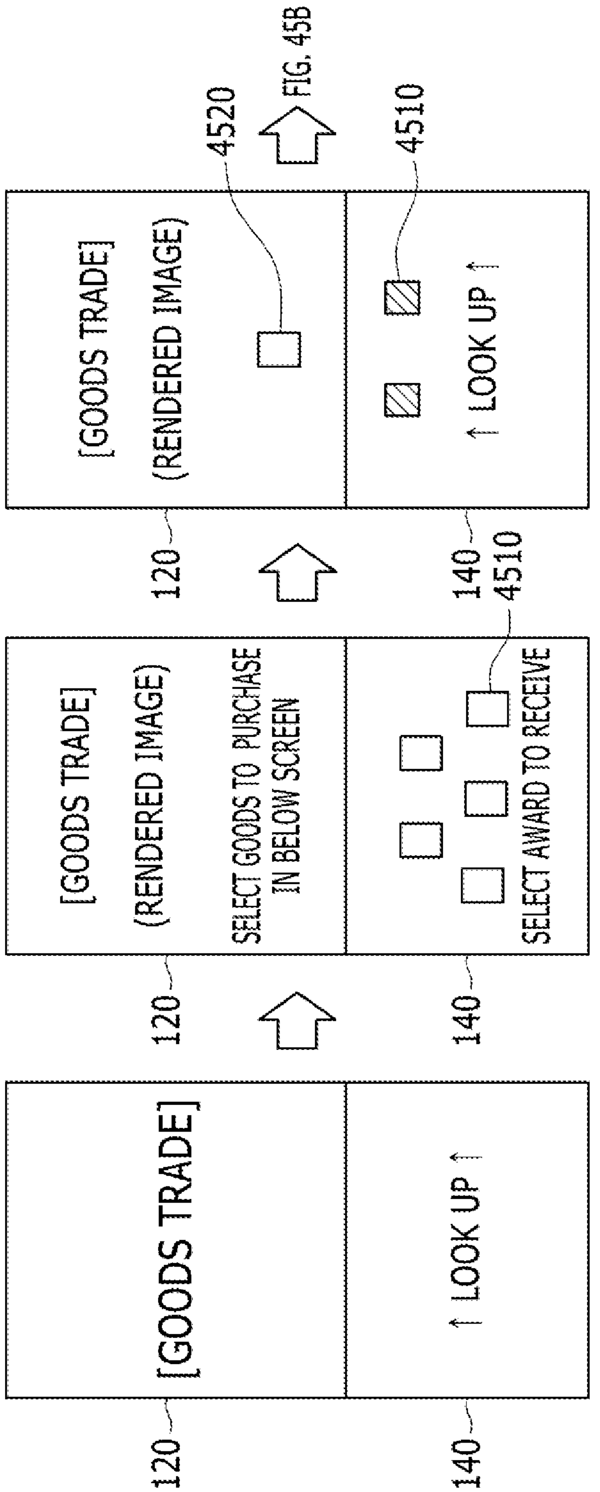
FIG. 45A and FIG. 45B show an example of a rendering picture at a goods trade event determined in a bonus round.
Figure 45B:
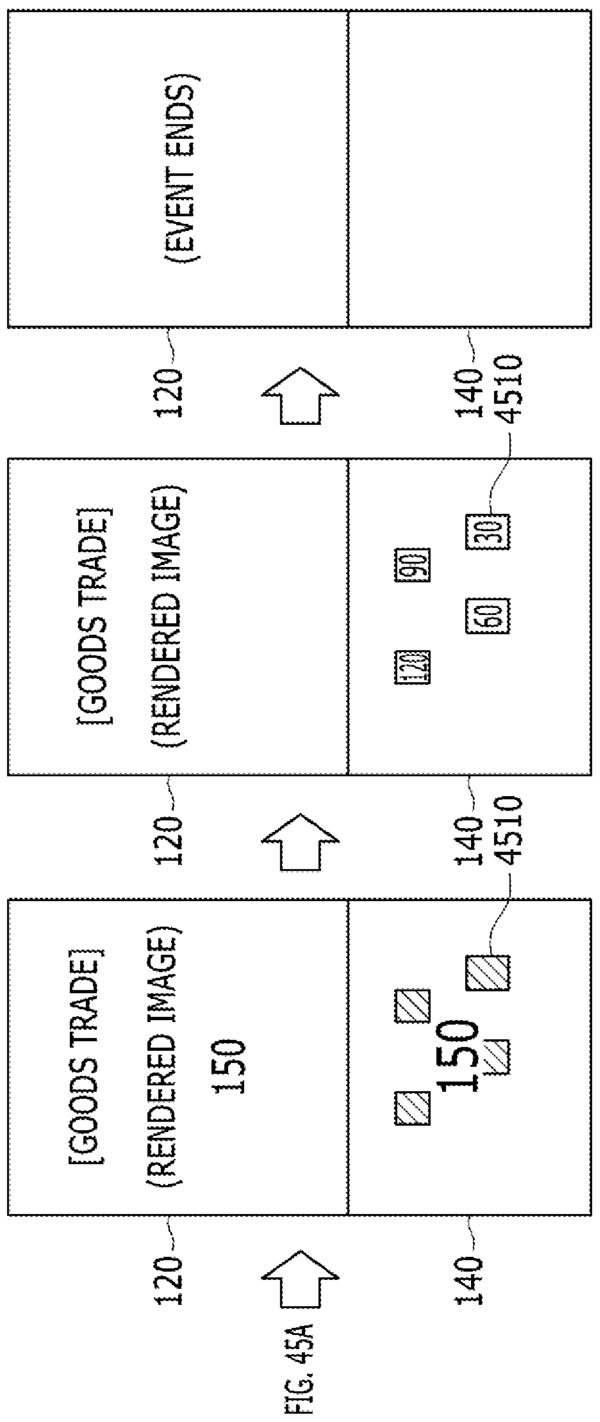

FIG. 45A and FIG. 45B show an example of a rendering picture at a goods trade event determined in a bonus round, FIG. 46A shows an example of an option determination table for a goods trade event shown in FIG. 45A and FIG. 45B, and FIG. 46B shows an example of a payout determination table for a goods trade event shown in FIG. 45A and FIG. 45B.

When the character corresponding to the player of the gaming machine 100 arrives at a cell to which a goods trade event is set, the goods trade event is performed. The goods may be jewels, carpets, or jars. The gaming machine 100 displays a title of the goods trade event on the top display 120 as shown in FIG. 45A, and then renders on the top display 120 effects for showing the introduction of the goods trade event. Subsequently, the gaming machine 100 renders on the top display 120 effects that a merchant asks which goods the character purchase, and informs the player to select any one of a plurality of options. For example, the gaming machine 100 displays "SELECT GOODS TO PURCHASE" on the top display 120 and the main display 140. Further, the gaming machine displays a plurality of options 4510 on the main display 140, and the plurality of options 4510 represent various goods. When the player touches any one of the plurality of options 4510 to select one option 4520, the gaming machine 100 renders on the main display 140 and the top display 120 effects that the selected goods 4520 go up to the top display 120. Further, the gaming machine 100 displays "LOOK UP" on the main display 140.

Next, the gaming machine 100 displays a payout awarded in the selected option 4520 on the top display 120 and the main display 140, as shown in FIG. 45B. Subsequently, the gaming machine 100 displays payouts assigned to the unselected options on the main display 140. Next, the gaming machine 100 renders on the top display 120 an image that the coconut palm kicking event ends, and displays images for a next bonus round as shown in FIG. 16.

In a certain embodiment, the gaming machine 100 may store an option selection table in a memory. The option selection table stores mapping between the number of options and a selection probability. An example of the option selection table for the jewel trade event is shown in FIG. 46A. As shown in FIG. 46A, the number of options is four, five, or six, and the selection probability of each number is 33.33%, 50.00%, or 16.67%. Further, the gaming machine 100 may store a payout determination table for each number of options in a memory. An example of the payout determination table is shown in FIG. 46B. As shown in FIG. 46B, the payout determination table include a plurality of options and a payout of each option, for each number. Accordingly, when the jewel trade event starts, the gaming machine 100 may randomly determine the number of options based on the selection probability, and then may randomly assign a plurality of options to the plurality of jewels. Further, the gaming machine displays the plurality of options 4510 on the main display 140 in accordance with the determined number of options.

Mining Event

Figure 47A:
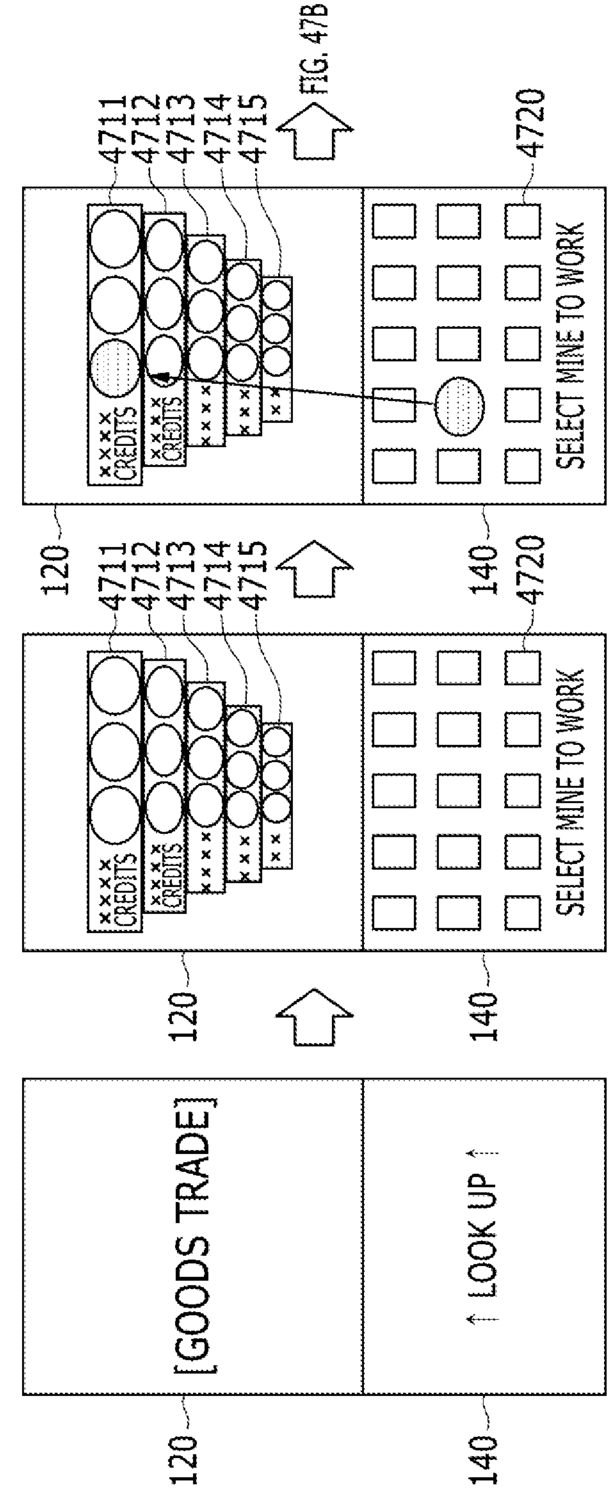
FIG. 47A and FIG. 47B show an example of a rendering picture at a mining event determined in a bonus round.
Figure 47B:
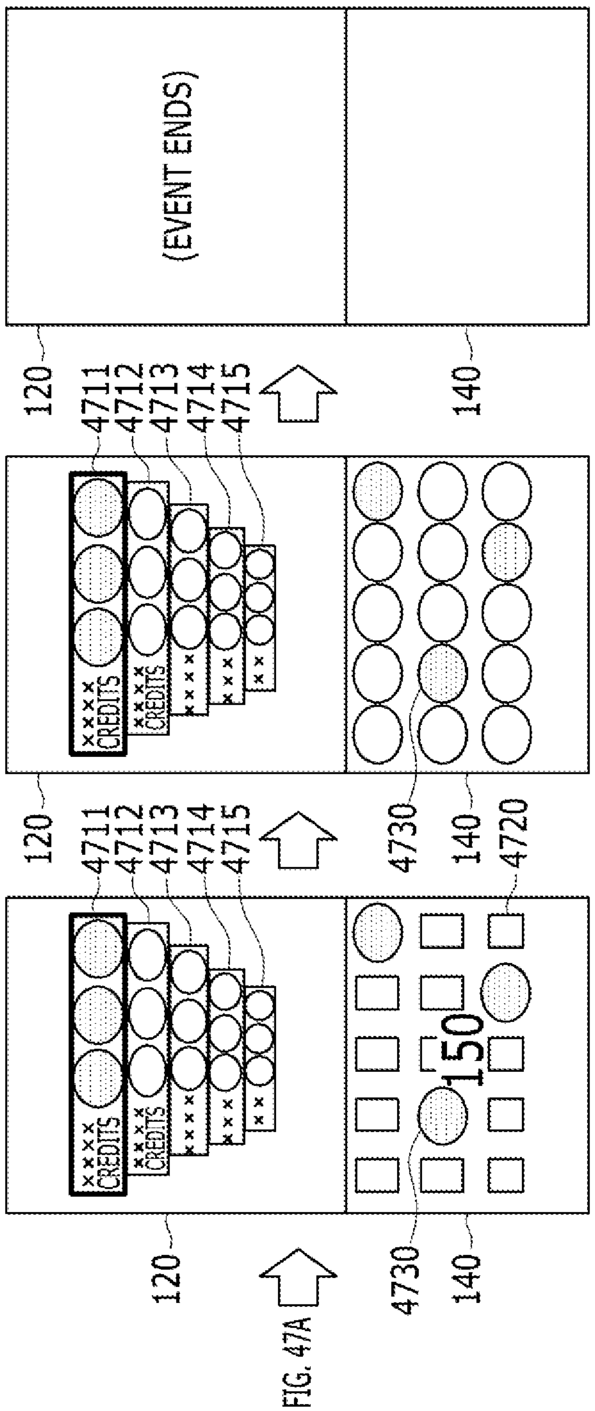

FIG. 47A and FIG. 47B show an example of a rendering picture at a mining event determined in a bonus round.

When the character corresponding to the player of the gaming machine 100 arrives at a cell to which a mining event is set, the mining event is performed. The gaming machine 100 displays a title of the mining event on the top display 120 as shown in FIG. 47A, and then renders on the top display 120 effects for showing the introduction of the mining event. Subsequently, the gaming machine 100 displays a plurality of tables 4711, 4712, 4713, 4714 and 4715, for example five tables, on the top display 120. Each table represents a relationship between a payout and acquisitions, and includes a plurality of blanks, for example three blanks, corresponding to the acquisition. Further, the gaming machine displays a plurality of options 4720 on the main display 140, and the plurality of options 4720 represent various mines. Furthermore, the gaming machine 100 displays a game rule on the main display 140, and informs the player to select any one of a plurality of options. For example, the gaming machine 100 displays "SELECT MINE TO WORK" on the main display 140. When the player touches any one of the plurality of options 4720 to select one option, the gaming machine 100 renders on the main display 140 and the top display 120 effects that an acquisition 4730 from the selected mine go up to a blank of a corresponding one of the plurality of tables 4711 to 4715 in the top display 120. When the number of tables 4711 to 4715 is five, five types of acquisitions may be extracted from the plurality of options 4720. The five types correspond to the five tables 4711 to 4715, respectively. Accordingly, the acquisition from the selected option moves to the table corresponding to its type. Further, the gaming machine 100 repeats a process for selecting any one option from among the plurality of options 4720 until all blanks of any one of the plurality of table 4711 to 4715 are filled with the acquisitions.

When all blanks of any one of the plurality of table 4711 to 4715 are filled with the acquisitions, the gaming machine 100 displays on the main display 140 a payout corresponding to the table that are filled with the acquisitions, as shown in FIG. 47B. Subsequently, the gaming machine 100 displays corresponding acquisitions on unselected options. Next, the gaming machine 100 renders on the top display 120 an image that the mining event ends, and displays images for a next bonus round as shown in FIG. 16.

Treasure Box Discovery Event

Figure 48A:
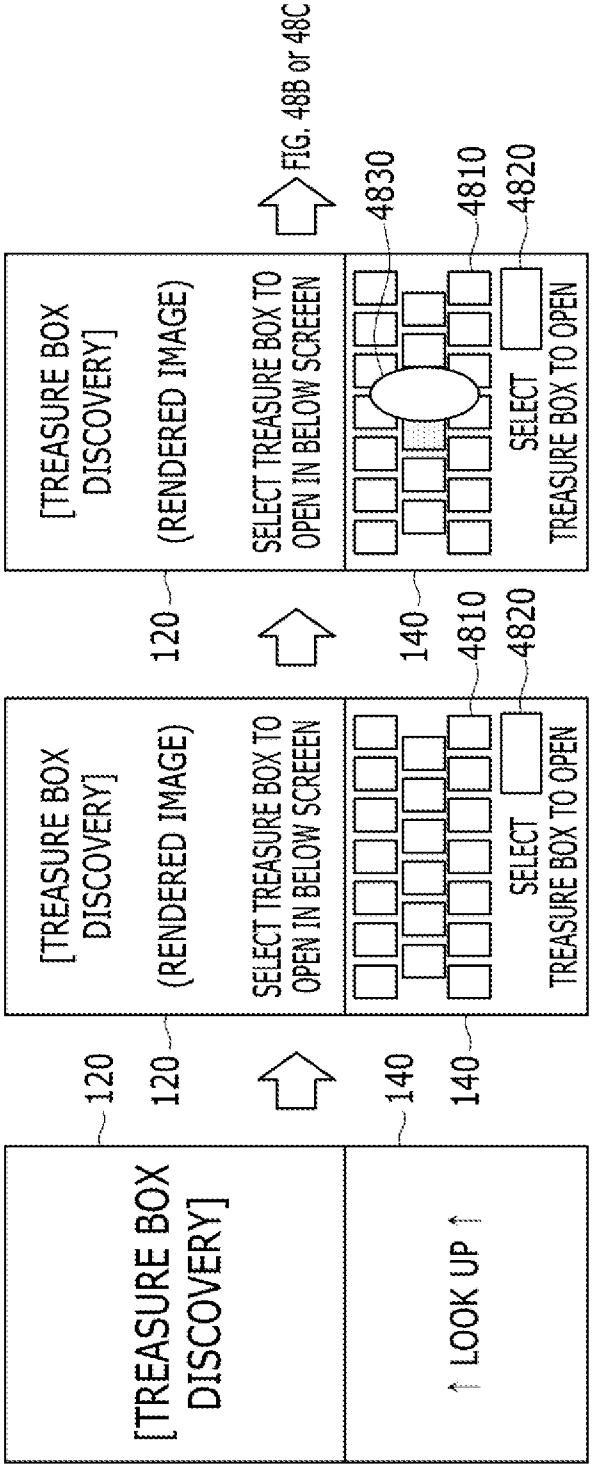
FIG. 48A, FIG. 48B and FIG. 48C show an example of a rendering picture at a treasure box discovery event determined in a bonus round.
Figure 48B:
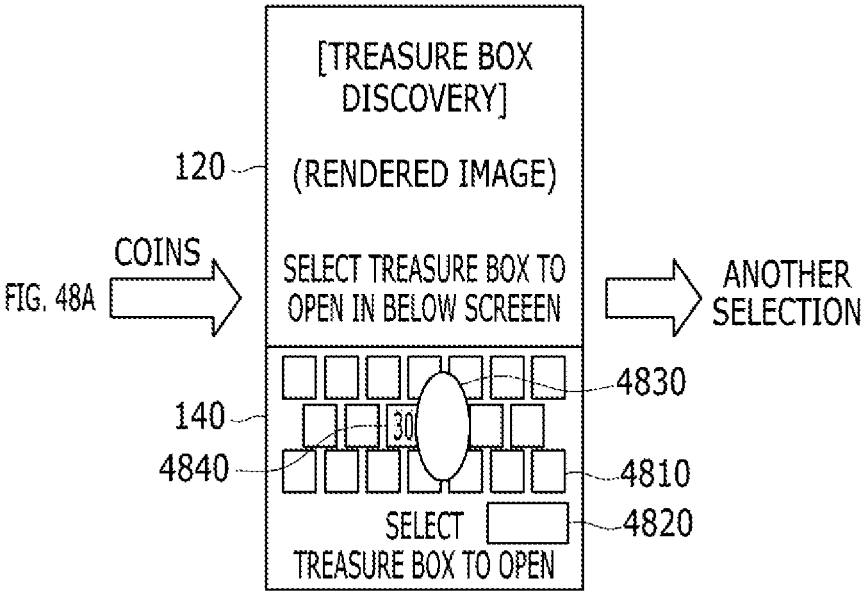
Figure 48C:
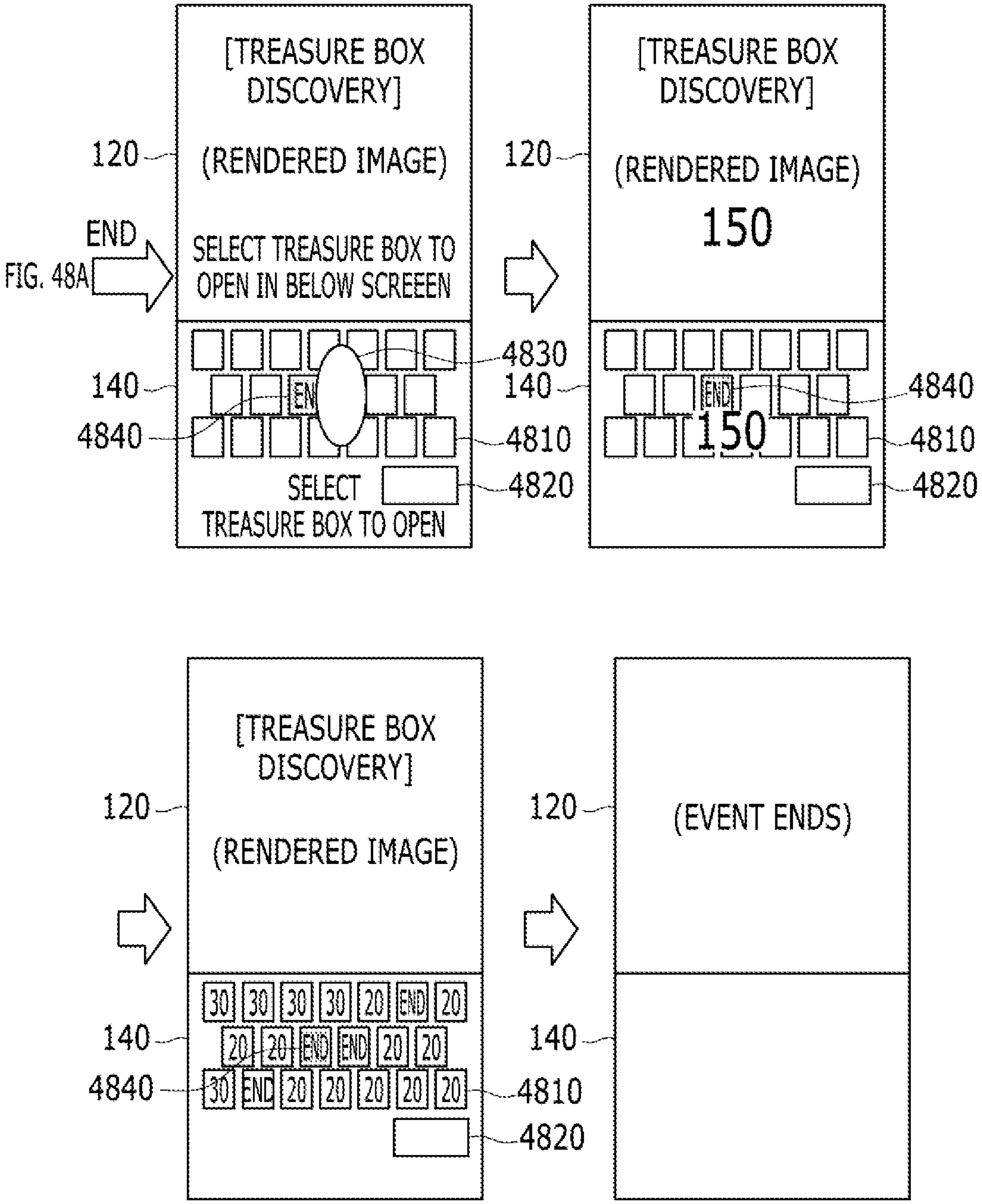

FIG. 48A, FIG. 48B and FIG. 48C show an example of a rendering picture at a treasure box discovery event determined in a bonus round, and FIG. 49 shows an example of a payout determination table for a treasure box discovery event shown in FIG. 48A to FIG. 48C.

When the character corresponding to the player of the gaming machine 100 arrives at a cell to which a treasure box discovery event is set, the treasure box discovery event is performed. The gaming machine 100 displays a title of the treasure box discovery event on the top display 120 as shown in FIG. 48A, and then renders on the top display 120 effects for showing the introduction of the treasure box event. Subsequently, the gaming machine 100 informs the player to select any one of a plurality of options. For example, the gaming machine 100 displays "SELECT TREASURE BOX TO OPEN" on the top display 120 and the main display 140. Further, the gaming machine 100 displays a plurality of options 4810 on the main display 140, and the plurality of options 4810 represent various treasure boxes. Furthermore, the gaming machine 100 displays a bonus win display section 4820 on the main display 140. When the player touches any one of the plurality of options 4810 to select one option, the gaming machine 100 renders on the main display 140 effects that the character 4830 opens a treasure box 4840 of the selected option.

When the selected option includes a payout, the main display 140 renders effects that coins are ejected from the treasure box 4840 of the selected option, and then adds the payout of the selection option to the bonus win display section 4820, as shown in FIG. 48B. Subsequently, the gaming machine 100 informs the player to select another one of a plurality of options again.

When the selected option does not include a payout, the main display 140 renders effects that a snake appears from the treasure box 4840 of the selected option, and then displays "END" on the selected option, as shown in FIG. 48C. Subsequently, the gaming machine 100 displays credits accumulated in the bonus win display section 4820 on the top display 120 as a total payout, and then displays a payout or "END" on unselected options. Next, the gaming machine 100 renders on the top display 120 an image that the treasure box discovery event ends, and displays images for a next bonus round as shown in FIG. 16. That is, the gaming machine repeats a process for selecting any one of the plurality of options 4810 until the selected option includes "END".

In a certain embodiment, the gaming machine 100 may store a payout determination table in a memory. The payout determination table includes a plurality of options and a payout or "END" of each option. An example of the payout determination table for the treasure box discovery event is shown in FIG. 49. Accordingly, when the treasure box discovery event starts, the gaming machine 100 may randomly assign the plurality of options to the plurality of treasure boxes.

Fishing Event

Figure 50A:
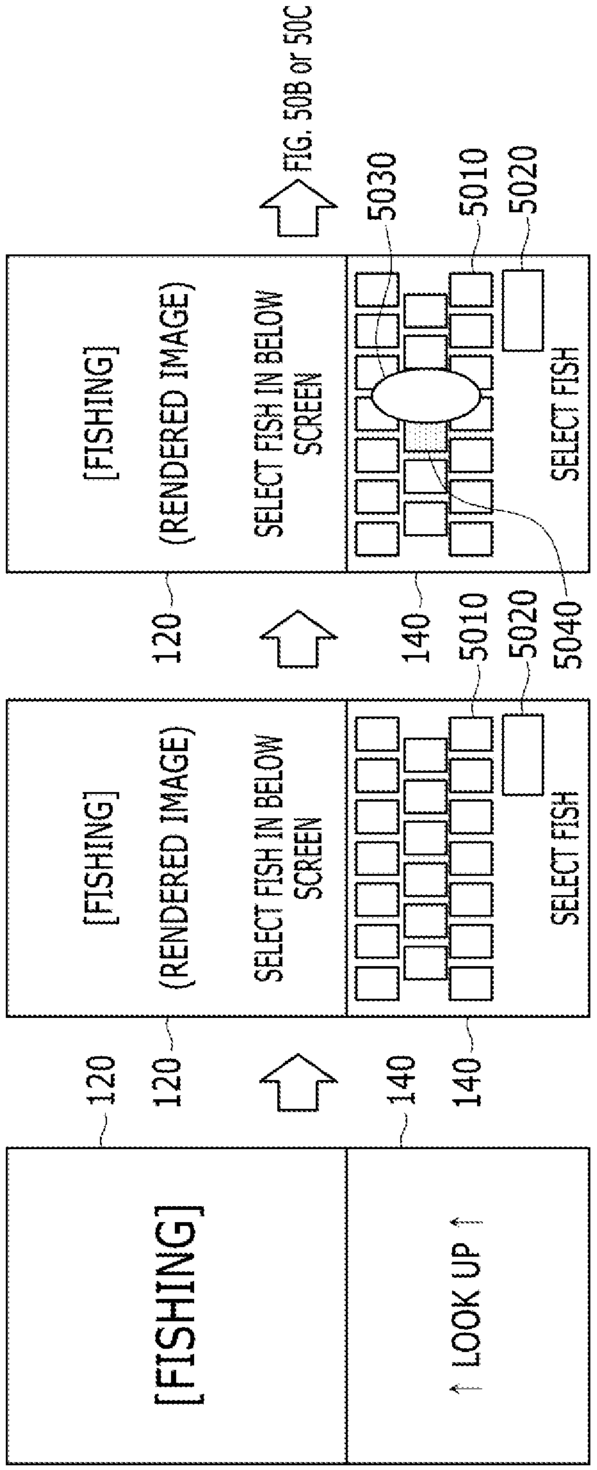
Figure 50C:
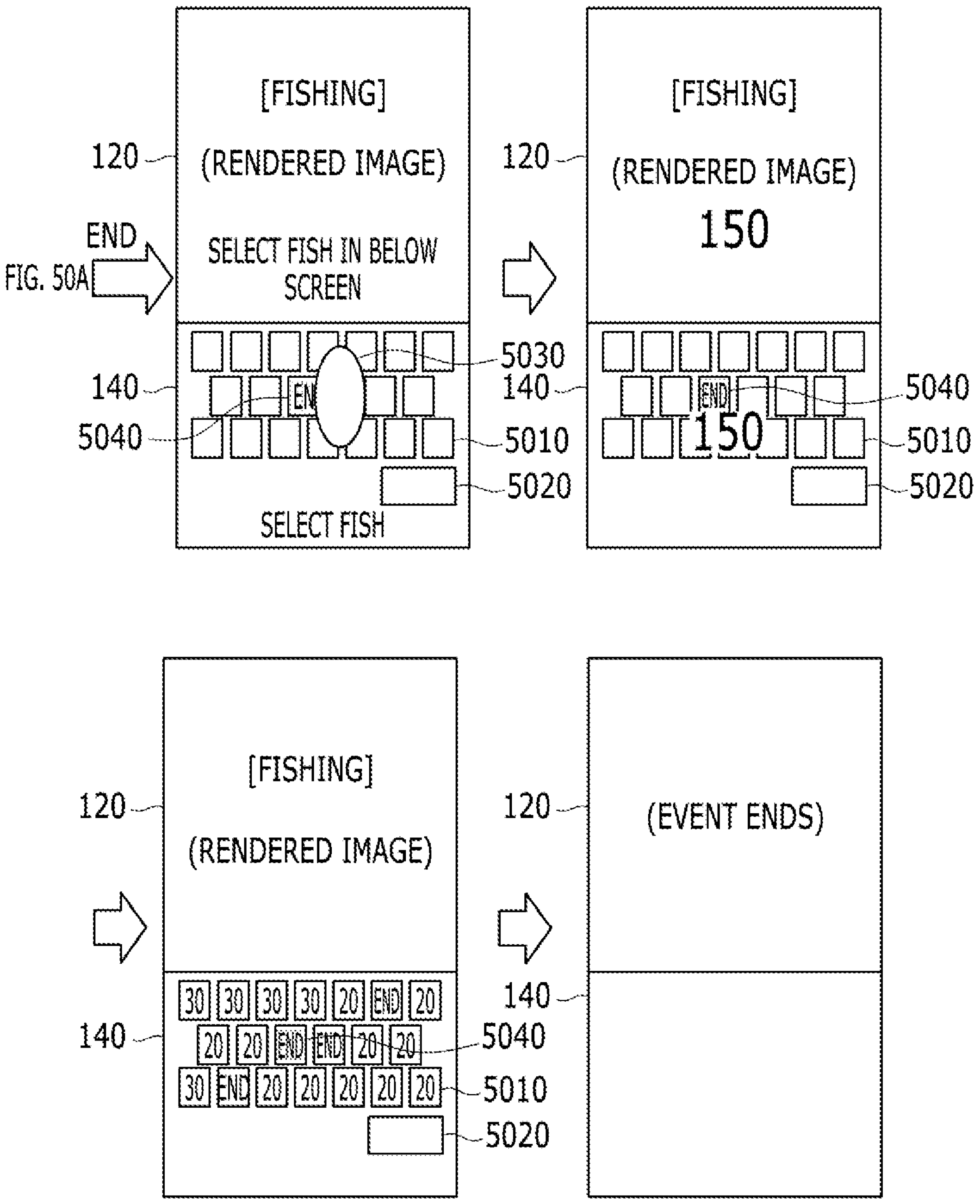

FIG. 50A, FIG. 50B and FIG. 50C show an example of a rendering picture at a fishing event determined in a bonus round.

When the character corresponding to the player of the gaming machine 100 arrives at a cell to which a fishing event is set, the fishing event is performed. The gaming machine 100 displays a title of the fishing event on the top display 120 as shown in FIG. 50A, and then renders on the top display 120 effects for showing the introduction of the treasure box event. Subsequently, the gaming machine 100 informs the player to select any one of a plurality of options. For example, the gaming machine 100 displays "SELECT FISH" on the top display 120 and the main display 140. Further, the gaming machine 100 displays a plurality of options 5010 on the main display 140, and the plurality of options 5010 represent various fishes. Furthermore, the gaming machine 100 displays a bonus win display section 5020 on the main display 140. When the player touches any one of the plurality of options 5010 to select one option, the gaming machine 100 renders on the main display 140 effects that the character 5030 attempts to catch a fish of the selected option.

When the selected option includes a payout, the main display 140 renders effects that the character 5030 catches a fish and is pleased, and then adds the payout of the selection option to the bonus win display section 5020, as shown in FIG. 50B. Subsequently, the gaming machine 100 informs the player to select another one of a plurality of options again.

When the selected option includes a higher payout, the main display 140 renders effects that the character 5030 catches a big fish after a rod and fishing line of the character 5030 are pulled by a fish during a predetermined time and the character 5030 is pleased. The gaming machine 100 adds the higher payout of the selection option to the bonus win display section 5020, as shown in FIG. 50B. Subsequently, the gaming machine 100 informs the player to select another one of a plurality of options again.

When the selected option does not include a payout, the main display 140 renders effects that a fishing line is broken after the rod and fishing line of the character 5030 are pulled by a fish during a predetermined time and the character 5030 is disappointed, and then displays "END" on the selected option, as shown in FIG. 50C. Subsequently, the gaming machine 100 displays credits accumulated in the bonus win display section 5020 on the top display 120 as a total payout, and then displays a payout or "END" on unselected options. Next, the gaming machine 100 renders on the top display 120 an image that the treasure box discovery event ends, and displays images for a next bonus round as shown in FIG. 16. That is, the gaming machine repeats a process for selecting any one of the plurality of options 5010 until the selected option includes "END".

As describe above, the gaming machine 100 renders the effects that the rod and fishing line of the character 5030 are pulled by the fish during the predetermined time even if a result is "END", thereby allowing the player to expect to obtain the higher payout.

In a certain embodiment, as described with reference to FIG. 49, the gaming machine 100 may store a payout determination table for the plurality of options in a memory.

Caving Event

Figure 51A:
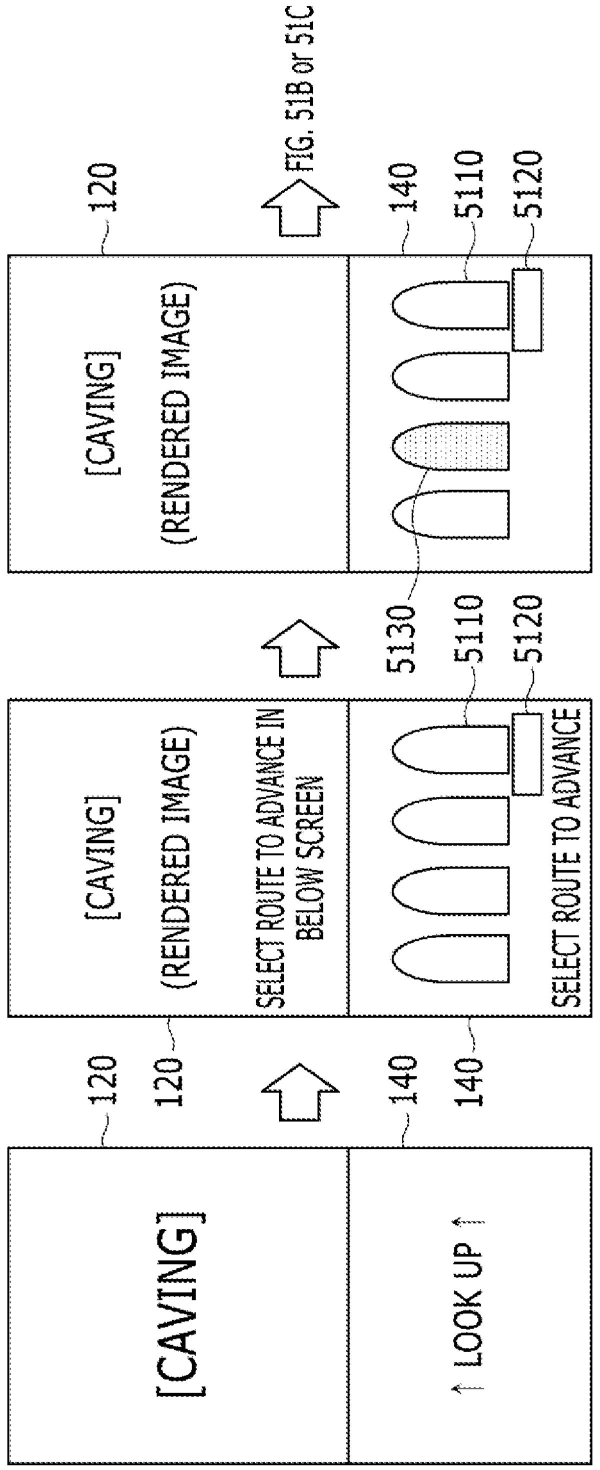
FIG. 51A, FIG. 51B, and FIG. 51C show an example of a rendering picture at a fishing event determined in a bonus round.
Figure 51B:
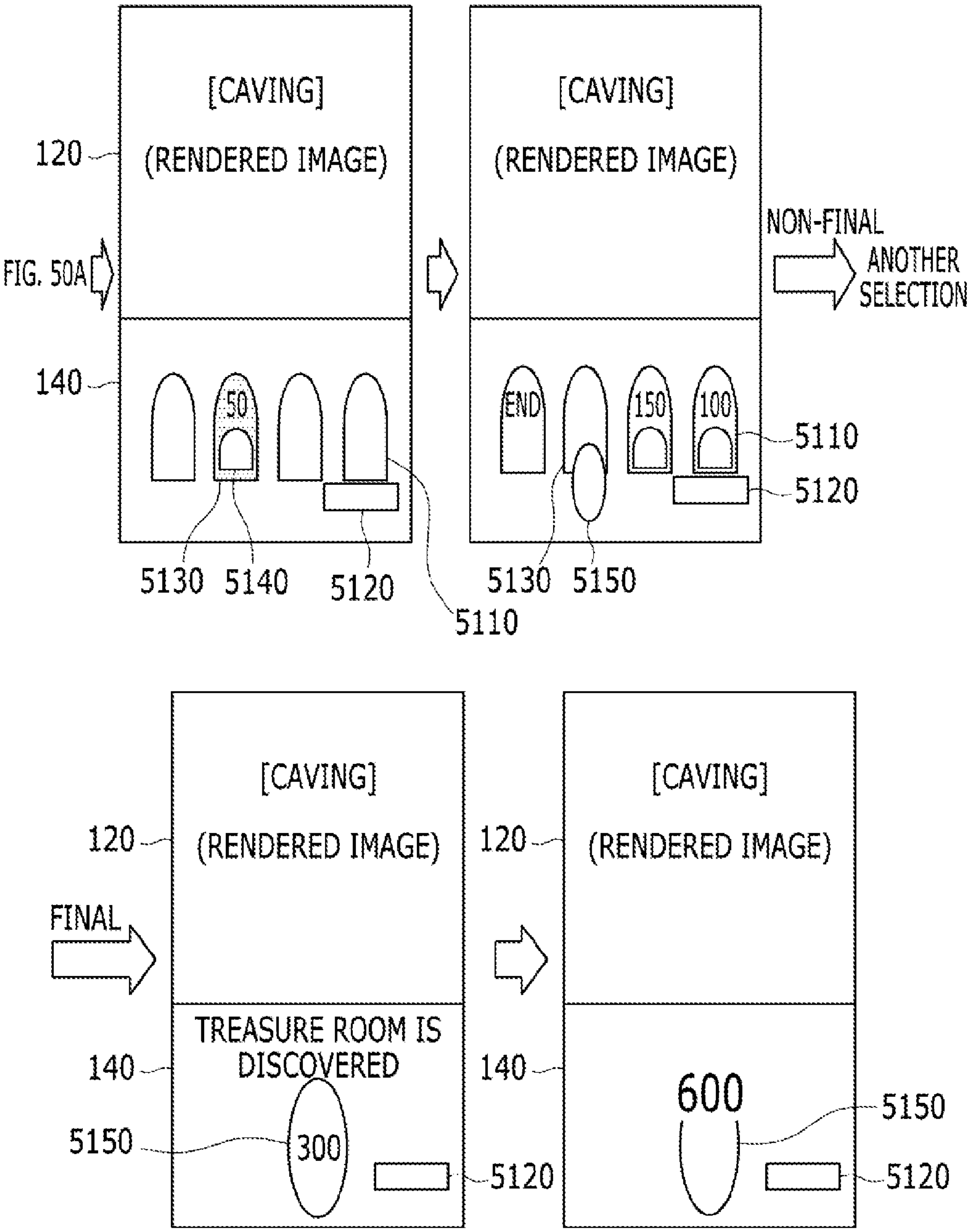
Figure 51C:
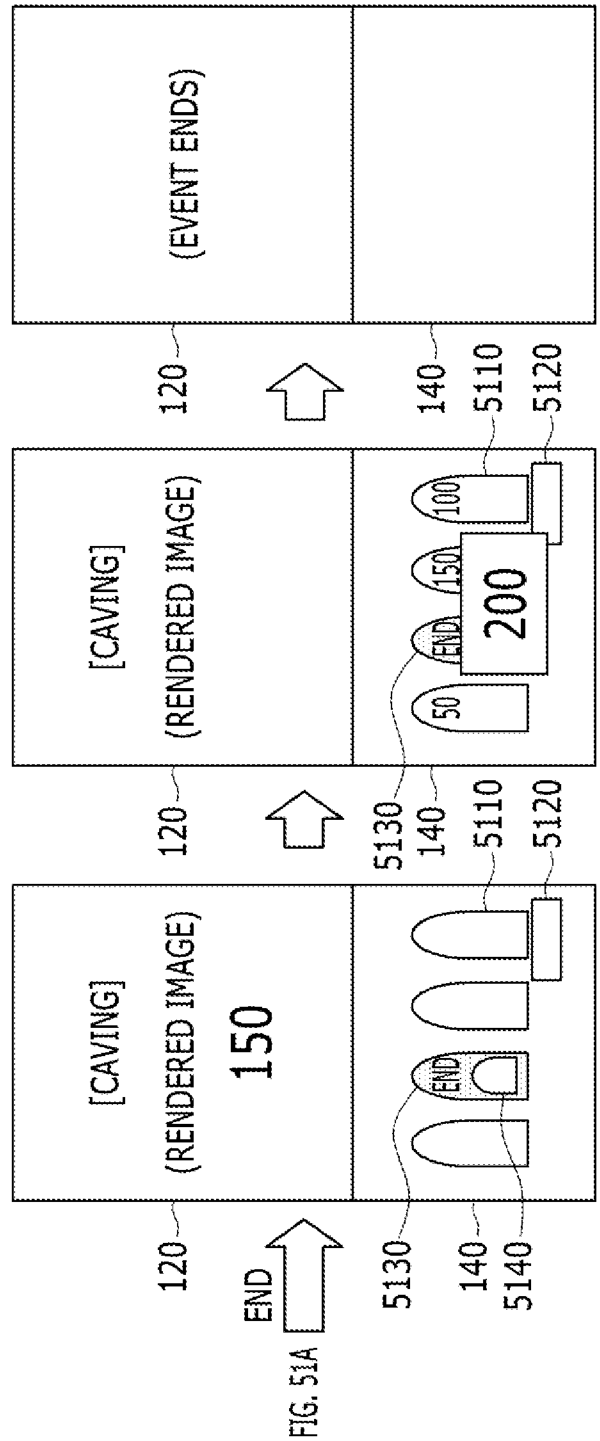

FIG. 51A, FIG. 51B, and FIG. 51C show an example of a rendering picture at a fishing event determined in a bonus round, and FIG. 52 shows an example of a payout determination table for a caving event shown in FIG. 51A to FIG. 51C.

When the character corresponding to the player of the gaming machine 100 arrives at a cell to which a caving event is set, the caving event is performed. The gaming machine 100 displays a title of the caving event on the top display 120 as shown in FIG. 51A, and then renders on the top display 120 effects for showing the introduction of the caving event. Subsequently, the gaming machine 100 informs the player to select any one of a plurality of options, and informs the player that the character can arrive at a treasure room after discovering a treasure box N times. For example, the gaming machine 100 displays "SELECT ROUTE TO ADVANCE" on the top display 120 and the main display 140. Further, the gaming machine 100 displays a plurality of options 5110 on the main display 140, and the plurality of options 5110 represent various caves. Furthermore, the gaming machine 100 displays a bonus win display section 5120 on the main display 140. Next, the gaming machine 100 receives a touch of the player to select any one of the plurality of options 5110.

When the selected option 5130 includes a payout, the main display 140 displays a treasure box 5140 and the payout on the selected option as shown in FIG. 51B. Further, the gaming machine 100 adds credits of the payout to the bonus win display section 5120. Subsequently, the gaming machine 100 displays "END" or a payout on unselected options, and renders effects that the character 5150 advances a cave of the selected option 5140. Next, when the selection of the option is a non-final selection, the gaming machine 100 repeats a process for displaying a plurality of options and selecting any one of the plurality of options. In this case, the gaming machine informs the player that the character can arrive at a treasure room after discovering a treasure box (N−1) times. When the selection of the option is a final selection, the gaming machines repeats a process for displaying a plurality of options and selecting any one of the plurality of options. In this case, the gaming machine informs the player that the character can arrive at a treasure room after discovering a treasure box (N−1) times.

When the selection of the option is a final selection, that is, N is 1, the gaming machine 100 renders effects that the character 5150 discovers a treasure room, and then displays a final payout of the treasure room on the main display 140, as shown in FIG. 51B. That is, when a mission (i.e., the discovery of the treasure room) of the event is accomplished, the gaming machine 100 can award an additional payout (the final payout) to the player. Further, the gaming machine 100 adds credits of the final payout to the bonus win display section 5120. Subsequently, the gaming machine 100 displays credits accumulated in the bonus win display section 5120 on the main display 140 as a total payout. Next, the gaming machine 100 renders on the top display 120 an image that the treasure box discovery event ends, and displays images for a next bonus round as shown in FIG. 16.

When the selected option 5130 does not include a payout, the main display 140 renders effects that a skull appears from the cave of the selected option, and then displays "END" on the selected option, as shown in FIG. 51C. Subsequently, the gaming machine 100 displays credits accumulated in the bonus win display section 5120 on the top display 120 as a total payout, and then displays a payout or "END" on unselected options. Next, the gaming machine 100 renders on the top display 120 an image that the treasure box discovery event ends, and displays images for a next bonus round as shown in FIG. 16.

In a certain embodiment, the gaming machine 100 may store a payout determination table in a memory. The payout determination table includes a plurality of options and a payout or "END" of each option. An example of the payout determination table for the caving event is shown in FIG. 52. Accordingly, each time the plurality of options are displayed for the selection, the gaming machine 100 may randomly assign the plurality of options to the plurality of caves.

Big Ball Rolling Event

Figure 53A:
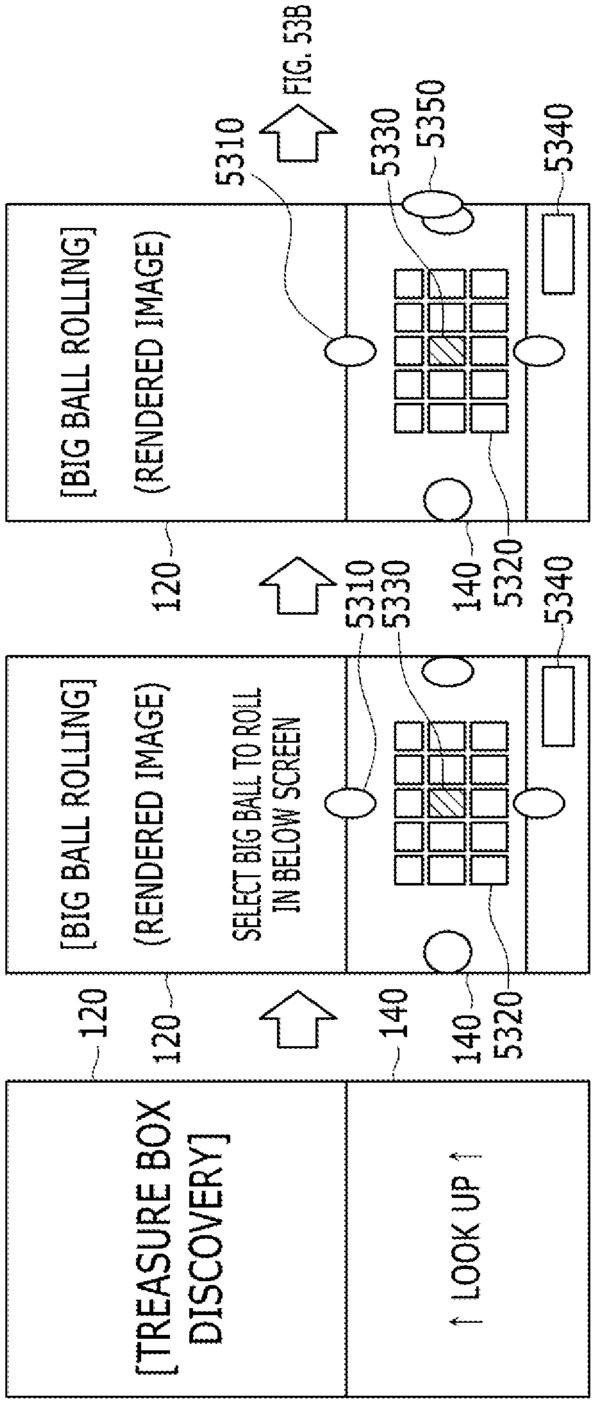
FIG. 53A, FIG. 53B and FIG. 53C show an example of a rendering picture at a big ball rolling event determined in a bonus round.
Figure 53B:
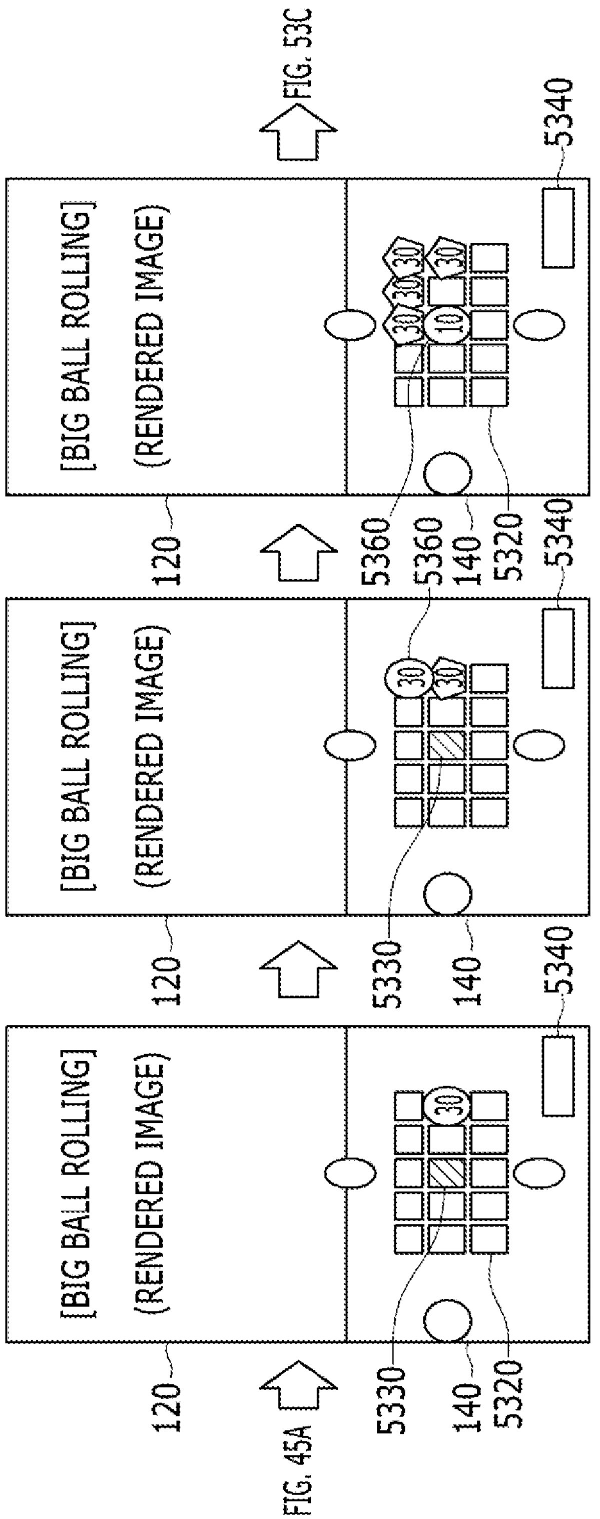
Figure 53C:
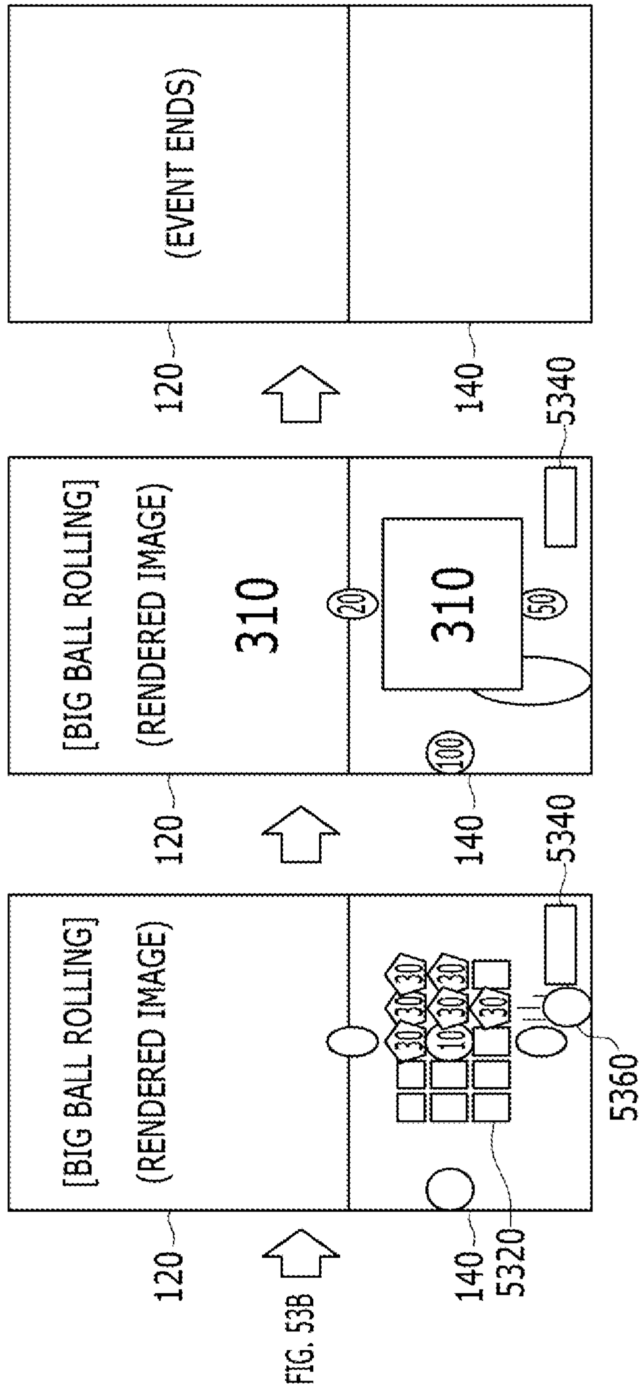

FIG. 53A, FIG. 53B and FIG. 53C show an example of a rendering picture at a big ball rolling event determined in a bonus round, FIG. 54A and FIG. 54B show examples of rolling pattern tables for a big ball rolling event shown in FIG. 53A to FIG. 53C, and FIG. 55A, FIG. 55B, FIG. 55C and FIG. 55D show a route specification table for a big ball rolling event shown in FIG. 53A to FIG. 53C.

When the character corresponding to the player of the gaming machine 100 arrives at a cell to which a big ball rolling event is set, the big ball rolling event is performed. The gaming machine 100 displays a title of the big ball rolling event on the top display 120 as shown in FIG. 53A, and then renders on the top display 120 effects for showing the introduction of the big ball rolling event. Subsequently, the gaming machine 100 informs the player to select any one of a plurality of options. For example, the gaming machine 100 displays "SELECT BIG BALL TO ROLL" on the top display 120 and the main display 140. Further, the gaming machine 100 displays a plurality of options 5310, for example four options, and a plurality of items 5320, for example fifteen items, on the main display 140. The plurality of options 5310 represent various big balls, and the plurality of items 5320 represent various rocks. The gaming machine 100 may emphasize the options 5310 and darken the items to allow the player to select only the options 5310. Further, the gaming machine 100 may emphasize an item 5330 at the center of the items 5320 to represent that the center item 5330 provides a higher payout. Furthermore, the gaming machine 100 displays a bonus win display section 5340 on the main display 140. When the player touches any one of the plurality of options 5310 to select one option, the gaming machine 100 renders on the main display 140 effects that the character 5350 push or kick the ball of the selected option 5360 and the ball 5360 rolls towards the rocks 5320 below a cliff.

Subsequently, the main display 140 renders effects that the ball 5360 hits any one of the rocks 5310 to crack the rock and a jewel appears from the cracked rock to provide a payout, as shown in FIG. 53B. The payout from the cracked rock is added to the bonus win display section 5340. Subsequently, the main display 140 renders effects that the ball 5360 rolls in any one direction of an upward direction, a downward direction, a leftward direction and a rightward direction, and repeats a process that a payout appears from the rock hit by the ball 5360. When the ball 5360 hits the center rock 5330, a big jewel appears from the center rock 5330 to provide the high payout.

When the ball 5360 rolls in a direction in which no rock exists, a game ends. Subsequently, the gaming machine 100 displays credits accumulated in the bonus win display section 5340 on the top display 120 and the main display 140 as a total payout, and a payout on unselected options. Further, the main display 140 renders effects that the character 5350 is pleased. Next, the gaming machine 100 renders on the top display 120 an image that the big rock rolling event ends, and displays images for a next bonus round as shown in FIG. 16.

In a certain embodiment, the gaming machine 100 may randomly assign a plurality of payouts to the plurality of item 5320 excluding the center item 5330. The payout assigned to the center item 5330 may be fixed.

In a certain embodiment, the gaming machine 100 may store at least one rolling pattern table in a memory. Examples of two rolling pattern tables are shown in FIG. 54A and FIG. 54B. As shown in FIG. 54A and FIG. 54B, each rolling pattern table includes a plurality of patterns for each option and a selection probability of each pattern. In the case that the plurality of options 5310 includes four options for an upper position, a lower position, a left position and a right position, four route tables exist for the four options in each rolling pattern table. Further, in the case that a plurality of rolling pattern tables exist, the gaming machine 100 randomly determines any one of the rolling pattern tables. In the case that the table shown in FIG. 54A is randomly determined, the player can obtain a higher payout when selecting the lower position or the right position. In the case that the table shown in FIG. 54B is randomly determined, the player can obtain a higher payout when selecting the upper position or the left position. Subsequently, the gaming machine 100 randomly selects any one route from among a plurality of routes included in a route table corresponding to the selected position, and renders effects that the ball 5360 rolls along the selected route from the selected position.

In a certain embodiment, the gaming machine 100 may store a route specification table representing a detailed path for each of a plurality of routes as shown in FIG. 55A, FIG. 55B, FIG. 55C and FIG. 55D. Accordingly, the gaming machine 100 renders effects that the ball 5360 rolls along the selected route with reference to the detailed path for the selected route. For example, when the player selects an option for the right position and route 11 is selected, the ball 5360 rolls as shown in FIG. 53B and FIG. 53C.

In a certain embodiment, the gaming machine may render effects that the ball 5560 determines a rolling direction, at predetermined positions of the detailed paths shown in FIG. 55A to FIG. 55D.

Start Over Type Event

A start over type event is an event similar to the selection type event. Differently from the selection type event, at least one option of a plurality of options included in the start over type event is a start over option. When the selected option is the start over option, the character of the player returns to a start point. The start over type events may include various events, for example, a bridge event, a storm event, a big ball event, and a monkey repel event.

Bridge Event

Figure 56A:
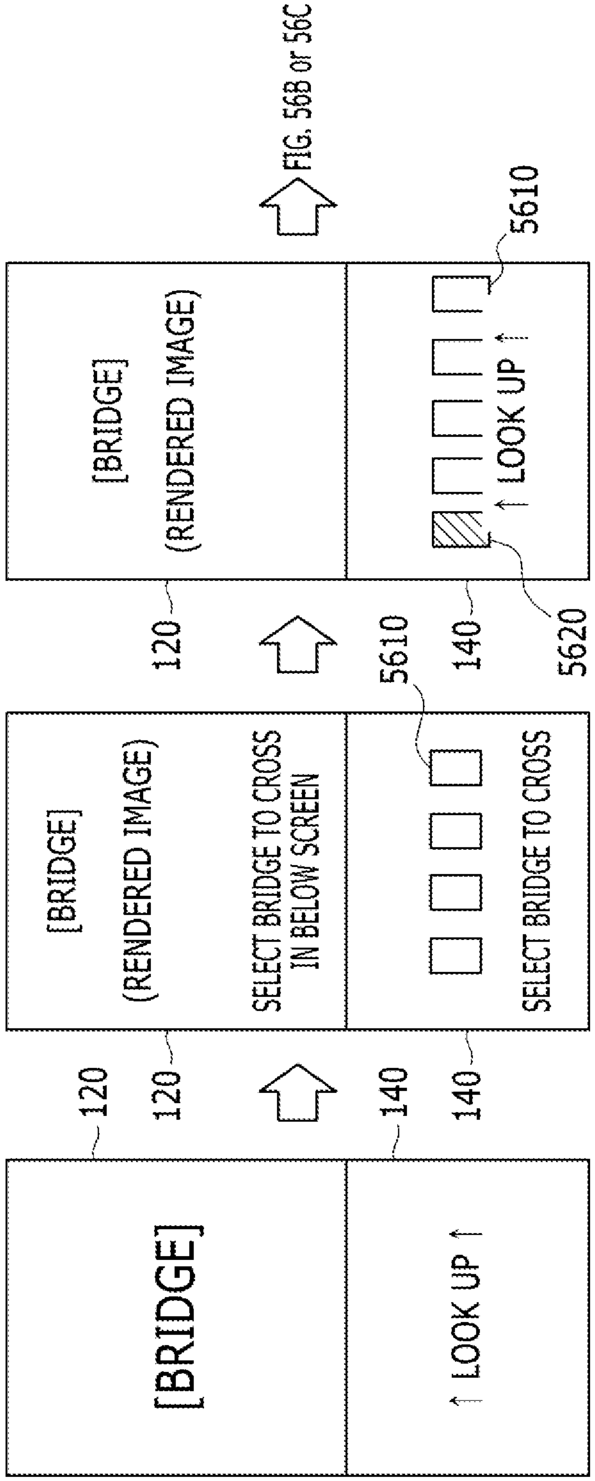
FIG. 56A, FIG. 56B and FIG. 56C show an example of a rendering picture at a bridge event determined in a bonus round.
Figure 56B:
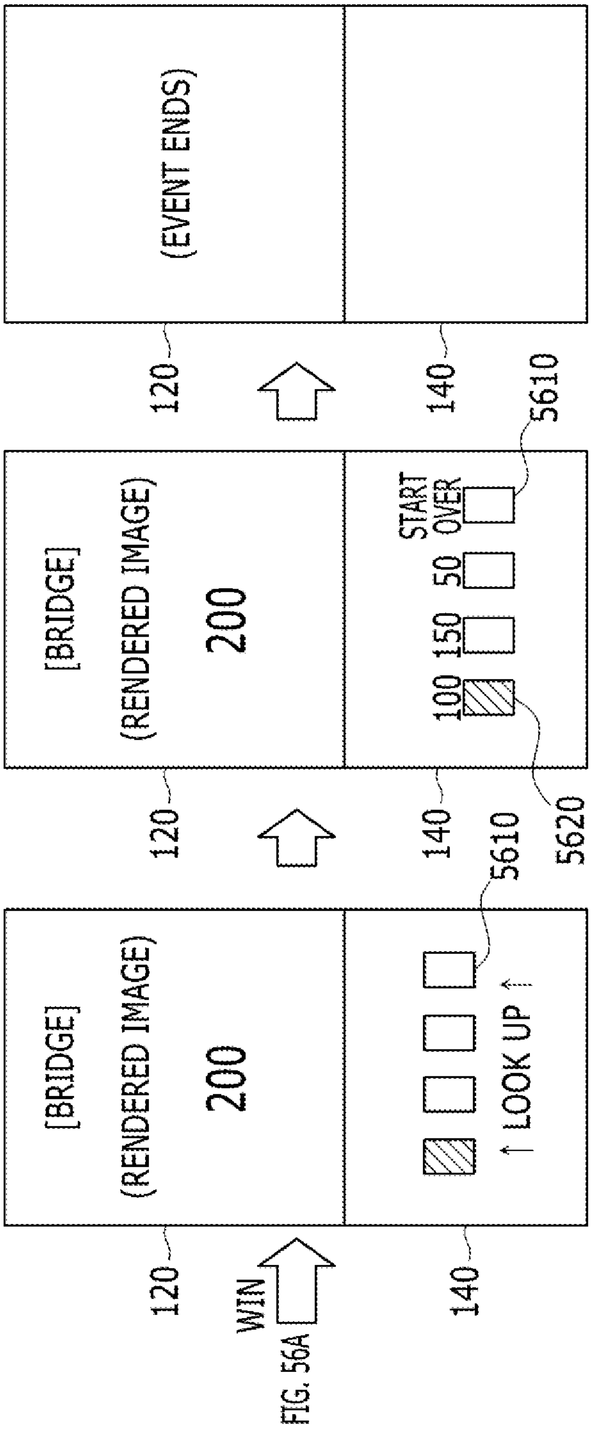
Figure 56C:
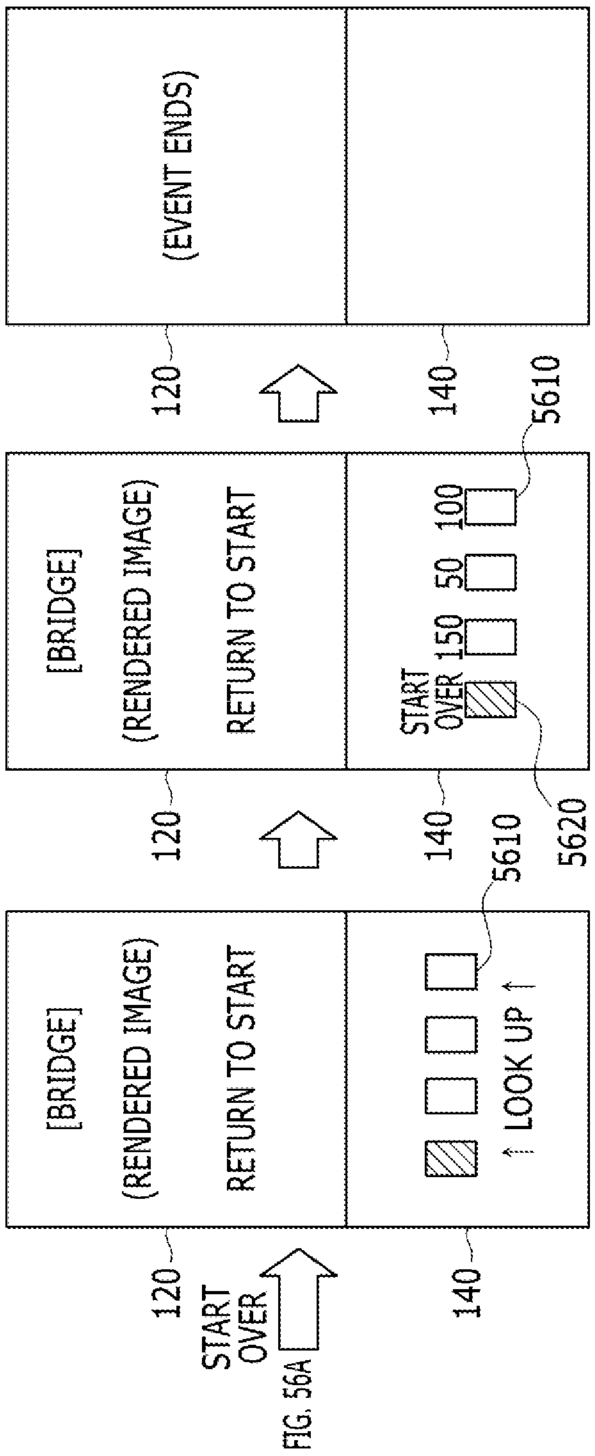

FIG. 56A, FIG. 56B and FIG. 56C show an example of a rendering picture at a bridge event determined in a bonus round, and FIG. 57 shows an example of a payout determination table for a bridge event shown in FIG. 56A to FIG. 56C.

When the character corresponding to the player of the gaming machine 100 arrives at a cell to which a bridge event is set, the bridge event is performed. The gaming machine 100 displays a title of the bridge event on the top display 120 as shown in FIG. 56A, and then renders on the top display 120 effects for showing the introduction of the bridge event. Subsequently, the gaming machine 100 renders on the top display 120 effects that the character is chased by a big ball and arrives at a bridge, and informs the player to select any one of a plurality of options. For example, the gaming machine 100 displays "SELECT BRIDGE TO CROSS" on the top display 120 and the main display 140. Further, the gaming machine displays a plurality of options 5610 on the main display 140, and the plurality of options 5610 represent various bridges. When the player touches any one of the plurality of options 5610 to select one option, the gaming machine 100 renders on the top display 120 effects that the character crosses a bridge of the selected option and then the bridge quakes. The main display 140 displays "LOOK UP".

When the selected option includes a payout, the gaming machine 100 renders effects that the character succeeds to cross the bridge and is pleased, and displays the payout of the selected option on the top display 120, as shown in FIG. 56B. Subsequently, the gaming machine 100 displays payouts or "START OVER" assigned to the selected option and the unselected options on the main display 140. Next, the gaming machine 100 renders on the top display 120 an image that the bridge ends, and displays images for a next bonus round as shown in FIG. 16.

When the selected option includes "START OVER", the gaming machine 100 renders effects that the character falls off the bridge and notifies the player that the character returns to a start point. For example, the gaming machine 100 displays "RETURN TO START" on the top display 120, and displays "LOOK UP" on the main display 140, as shown in FIG. 56C. Subsequently, the gaming machine 100 displays "START OVER" or payouts assigned to the selected option and the unselected options on the main display 140. Next, the gaming machine 100 renders on the top display 120 an image that the bridge ends, and displays images for a next bonus round as shown in FIG. 16.

In a certain embodiment, the gaming machine 100 may store a payout determination table in a memory. The payout determination table includes a plurality of options and a payout or "START OVER" of each option. An example of the payout determination table for the bridge event is shown in FIG. 57. Accordingly, when the bridge event starts, the gaming machine 100 may randomly assign the plurality of options to the plurality of bridges.

Storm Event

Figure 58A:
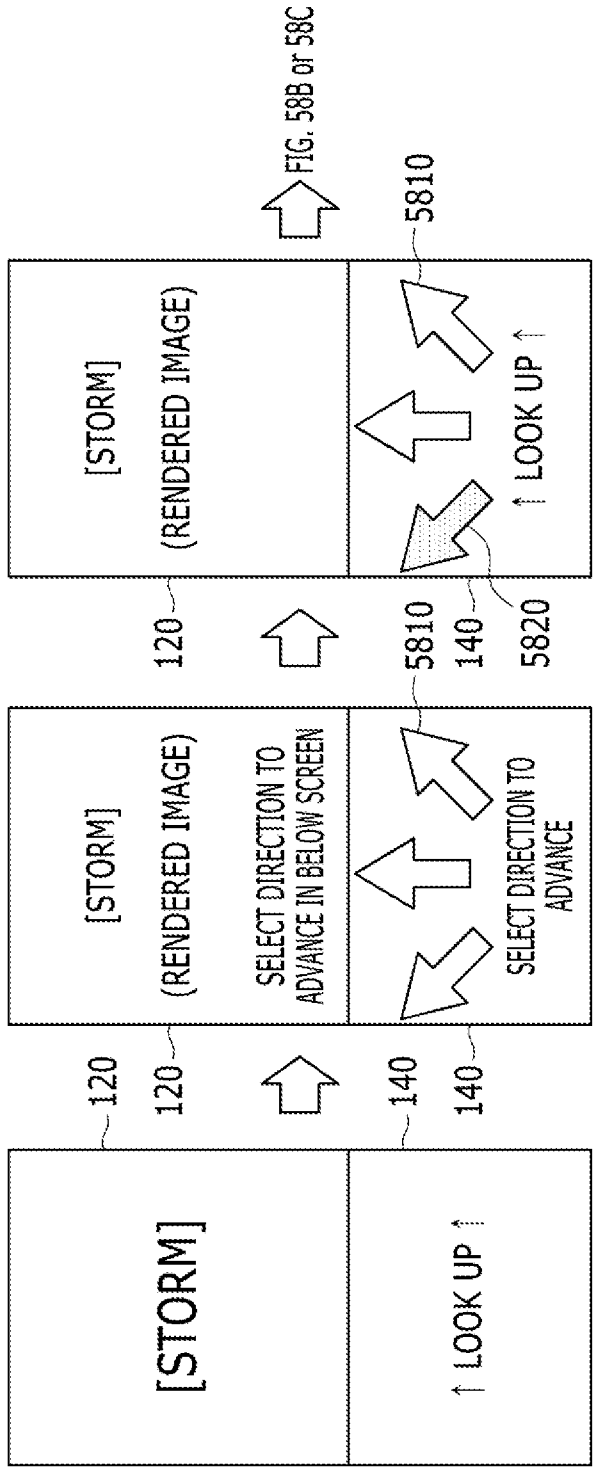
FIG. 58A, FIG. 58B and FIG. 58C show an example of a rendering picture at a storm event determined in a bonus round.
Figure 58B:
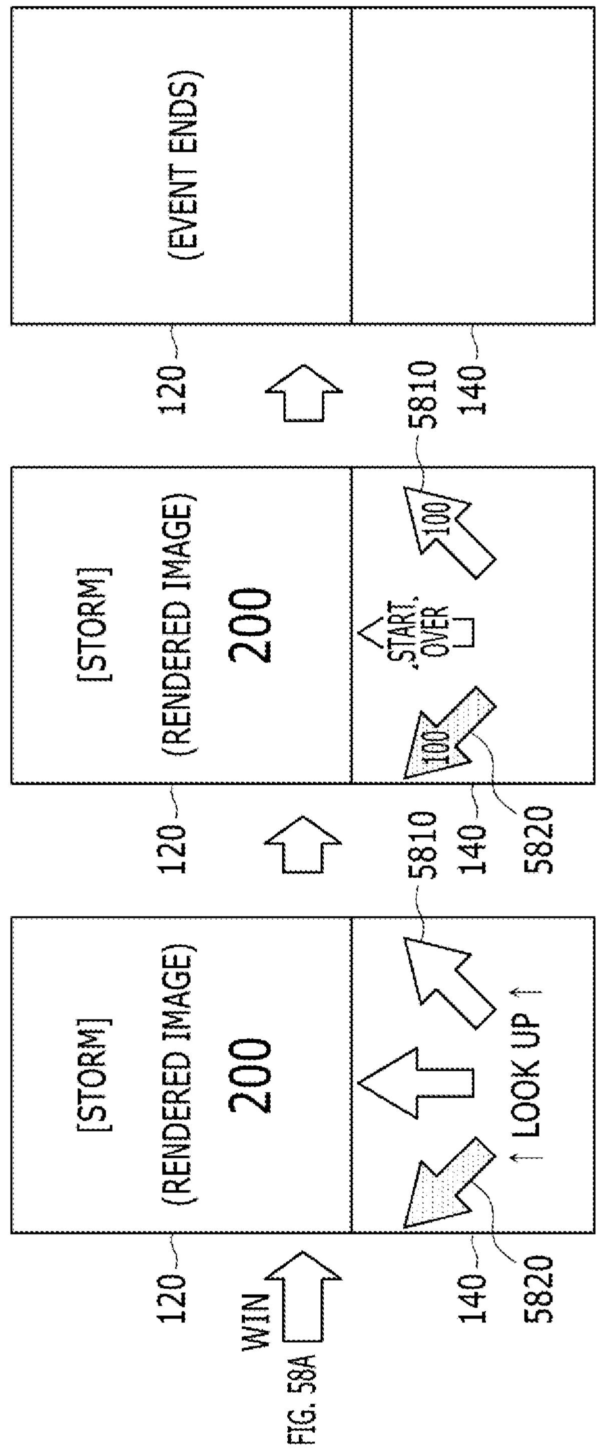
Figure 58C:
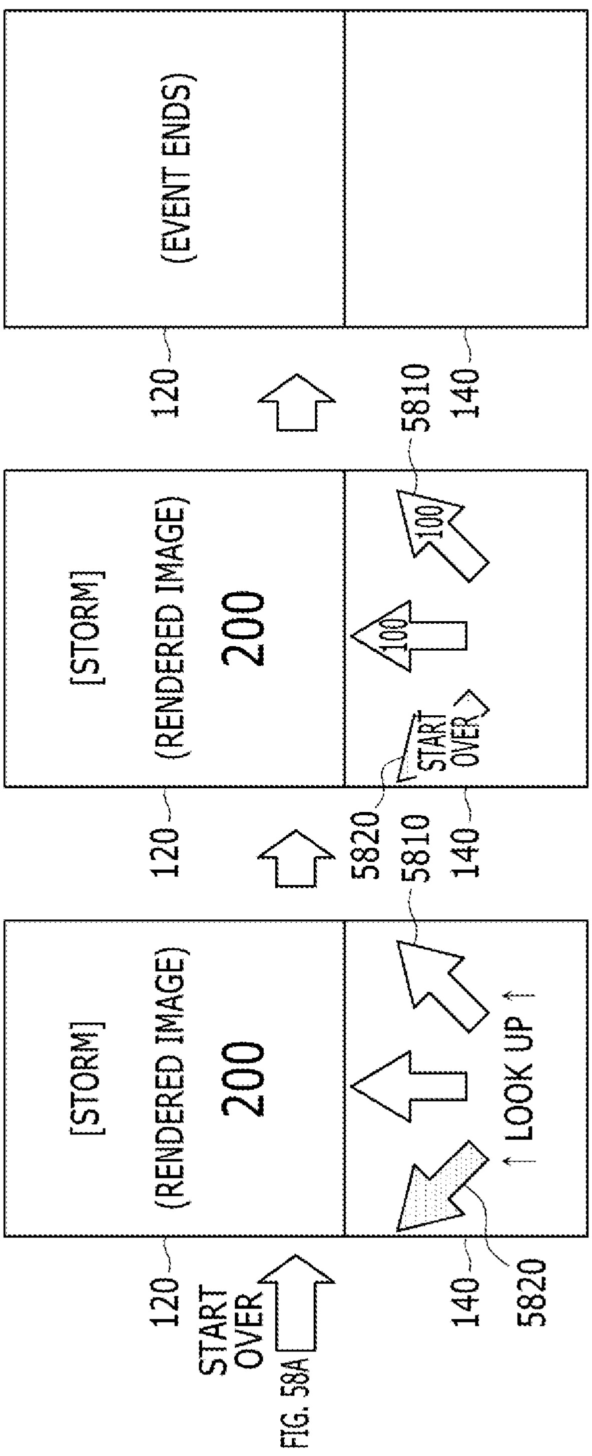

FIG. 58A, FIG. 58B and FIG. 58C show an example of a rendering picture at a storm event determined in a bonus round.

When the character corresponding to the player of the gaming machine 100 arrives at a cell to which a storm event is set, the storm event is performed. The gaming machine 100 displays a title of the storm event on the top display 120 as shown in FIG. 58A, and then renders on the top display 120 effects for showing the introduction of the storm event. Subsequently, the gaming machine 100 renders on the top display 120 effects that a ship of the character battles with a storm, and informs the player to select any one of a plurality of options. For example, the gaming machine 100 displays "SELECT DIRECTION TO ADVANCE" on the top display 120 and the main display 140. Further, the gaming machine displays a plurality of options 5810 on the main display 140, and the plurality of options 5810 represent various directions. When the player touches any one of the plurality of options 5810 to select one option, the gaming machine 100 renders on the top display 120 effects that the character takes a helm of the ship in a direction of the selected option 5820 and a whirlpool approaches to the ship. The main display 140 displays "LOOK UP".

When the selected option includes a payout, the gaming machine 100 renders effects that the storm abates and the character is pleased, and displays the payout of the selected option on the top display 120, as shown in FIG. 58B. Subsequently, the gaming machine 100 displays payouts or "START OVER" assigned to the selected option and the unselected options on the main display 140. Next, the gaming machine 100 renders on the top display 120 an image that the bridge ends, and displays images for a next bonus round as shown in FIG. 16.

When the selected option includes "START OVER", the gaming machine 100 renders effects that the ship is heavily damaged and notifies the player that the character returns to a start point. For example, the gaming machine 100 displays "RETURN TO START" on the top display 120, and displays "LOOK UP" on the main display 140, as shown in FIG. 58C. Subsequently, the gaming machine 100 displays "START OVER" or payouts assigned to the selected option and the unselected options on the main display 140. Next, the gaming machine 100 renders on the top display 120 an image that the bridge ends, and displays images for a next bonus round as shown in FIG. 16.

In a certain embodiment, as described with reference to FIG. 57, the gaming machine 100 may store a payout determination table in a memory. When the storm event starts, the gaming machine 100 may randomly assign the plurality of options to the plurality of directions.

Big Ball Event

Figure 59A:
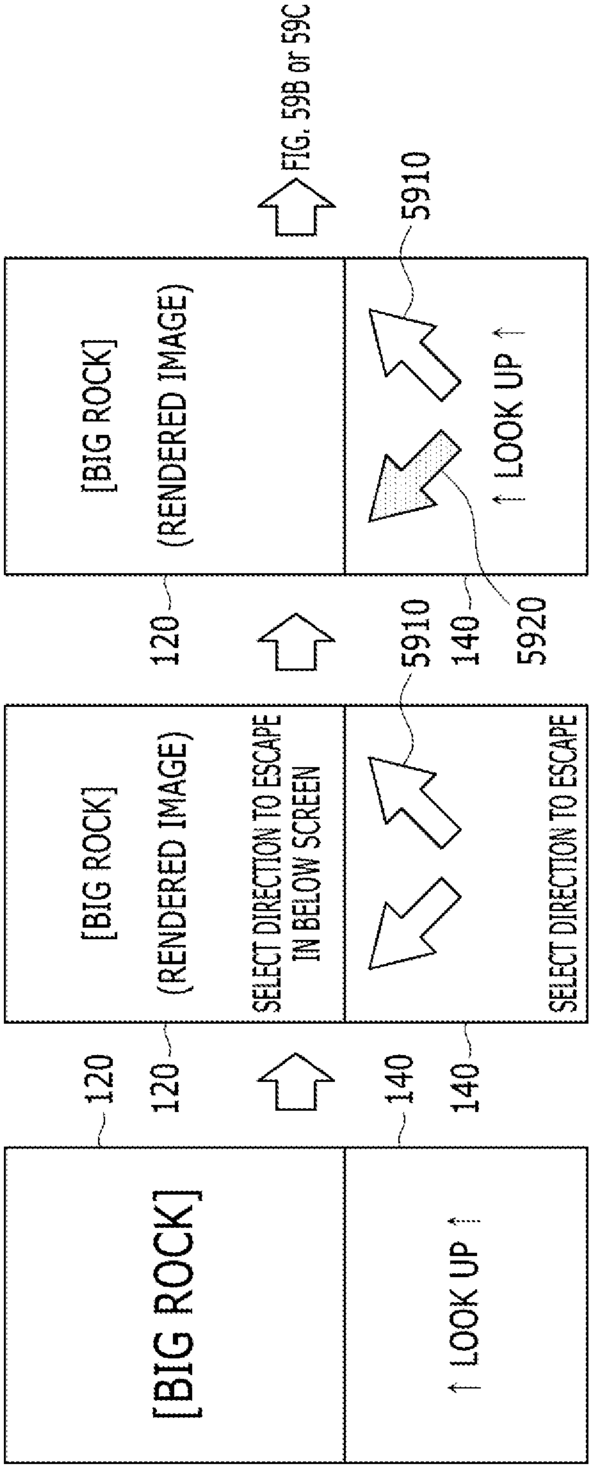
FIG. 59A, FIG. 59B and FIG. 59C show an example of a rendering picture at a big ball event determined in a bonus round.
Figure 59B:
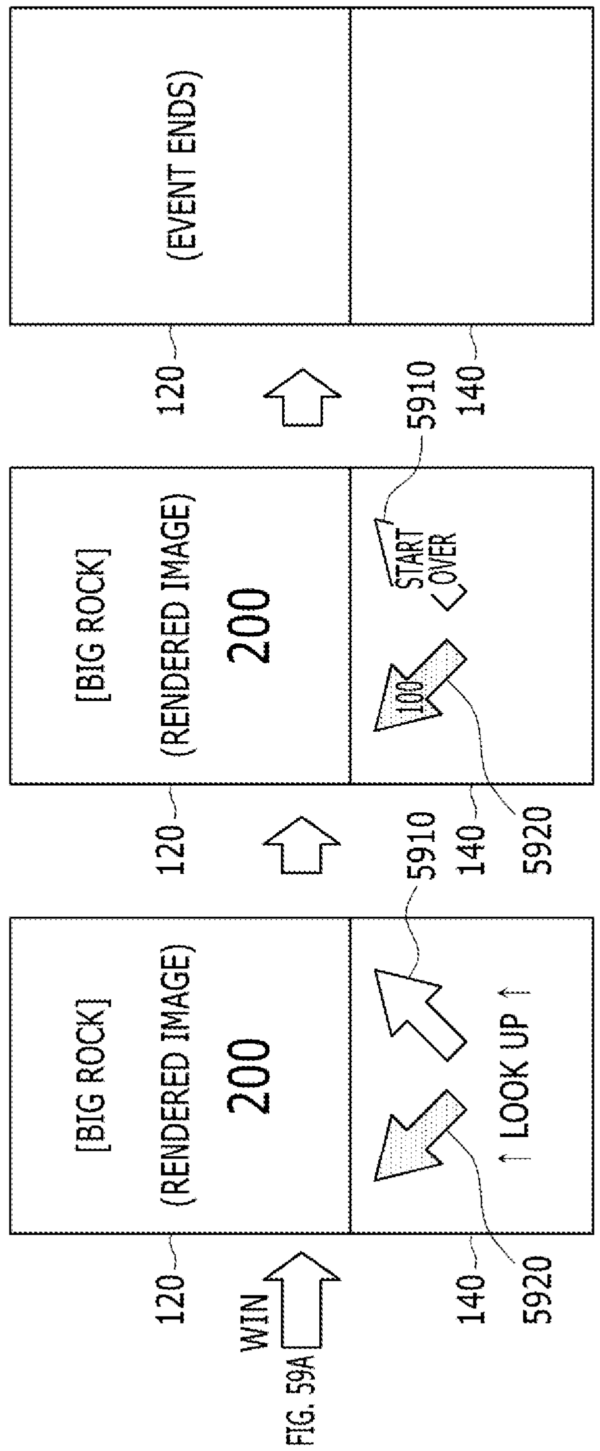
Figure 59C:
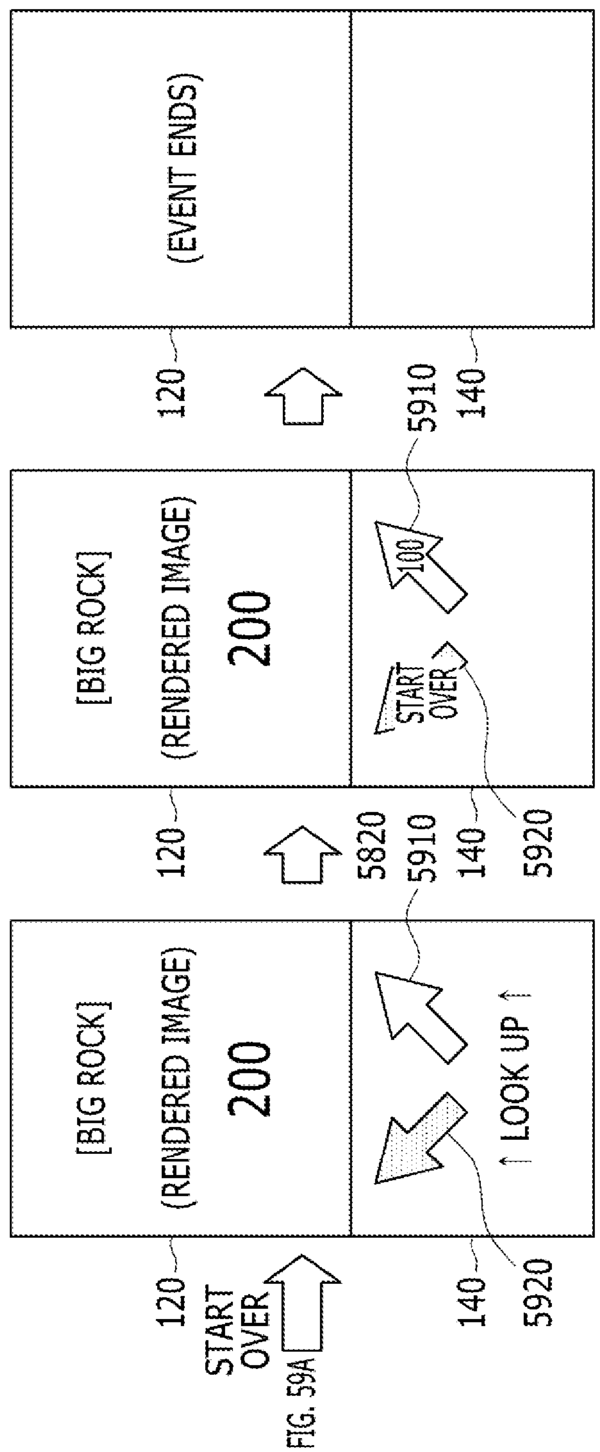

FIG. 59A, FIG. 59B and FIG. 59C show an example of a rendering picture at a big ball event determined in a bonus round.

When the character corresponding to the player of the gaming machine 100 arrives at a cell to which a big ball event is set, the big ball event is performed. The gaming machine 100 displays a title of the big ball event on the top display 120 as shown in FIG. 59A, and then renders on the top display 120 effects for showing the introduction of the big ball event. Subsequently, the gaming machine 100 renders on the top display 120 effects that the character is chased by a big ball, and informs the player to select any one of a plurality of options. For example, the gaming machine 100 displays "SELECT DIRECTION TO ESCAPE" on the top display 120 and the main display 140. Further, the gaming machine displays a plurality of options 5910 on the main display 140, and the plurality of options 5910 represent various directions. When the player touches any one of the plurality of options 5910 to select one option, the gaming machine 100 renders on the top display 120 effects that the character runs away in a direction of the selected option 5920 and the big ball selects an advancing direction. The main display 140 displays "LOOK UP".

When the selected option includes a payout, the gaming machine 100 renders effects that the big ball rolls down in a direction where the character does not exist and the character is please, and displays the payout of the selected option on the top display 120, as shown in FIG. 59B. Subsequently, the gaming machine 100 displays payouts or "START OVER" assigned to the selected option and the unselected options on the main display 140. Next, the gaming machine 100 renders on the top display 120 an image that the bridge ends, and displays images for a next bonus round as shown in FIG. 16.

When the selected option includes "START OVER", the gaming machine 100 renders effects that the character is squashed by the big ball and notifies the player that the character returns to a start point. For example, the gaming machine 100 displays "RETURN TO START" on the top display 120, and displays "LOOK UP" on the main display 140, as shown in FIG. 59C. Subsequently, the gaming machine 100 displays "START OVER" or payouts assigned to the selected option and the unselected options on the main display 140. Next, the gaming machine 100 renders on the top display 120 an image that the bridge ends, and displays images for a next bonus round as shown in FIG. 16.

In a certain embodiment, as described with reference to FIG. 57, the gaming machine 100 may store a payout determination table in a memory. When the big ball event starts, the gaming machine 100 may randomly assign the plurality of options to the plurality of directions.

Monkey Repel Event

Figure 60A:
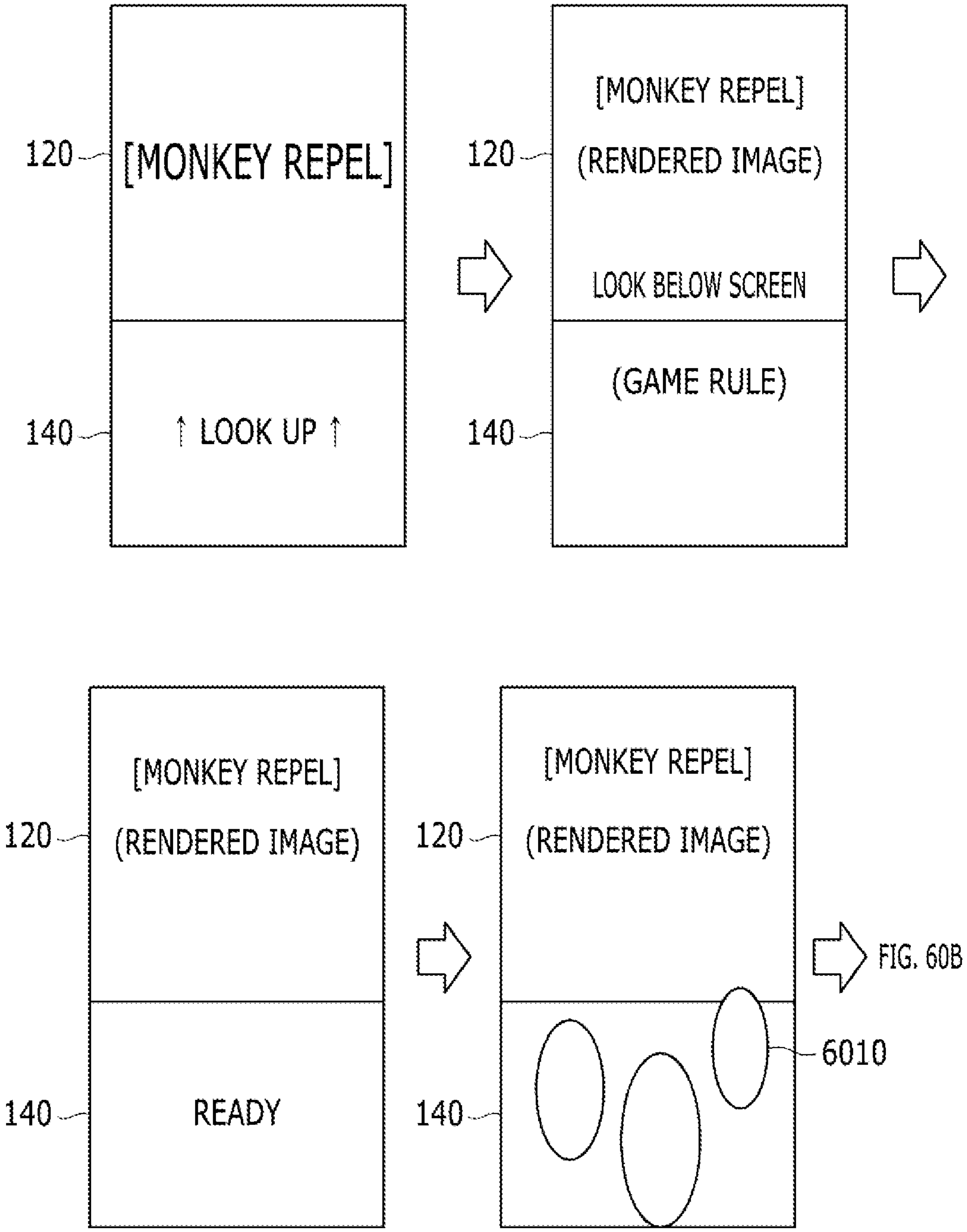
FIG. 60A and FIG. 60B show an example of a rendering picture at a monkey repel event determined in a bonus round.
Figure 60B:
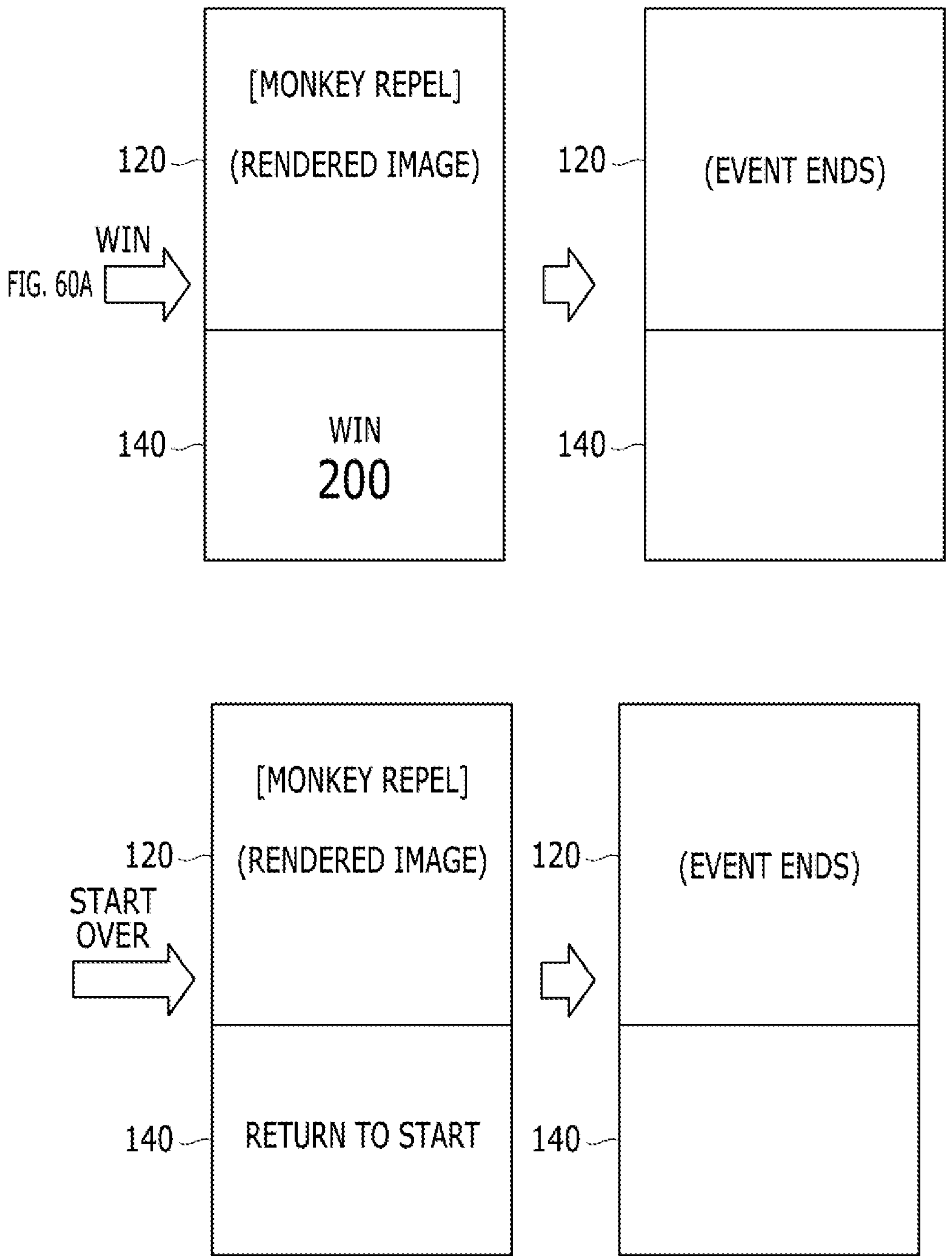

FIG. 60A and FIG. 60B show an example of a rendering picture at a monkey repel event determined in a bonus round.

When the character corresponding to the player of the gaming machine 100 arrives at a cell to which a monkey repel event is set, the monkey repel event is performed. The gaming machine 100 displays a title of the monkey repel event on the top display 120 as shown in FIG. 60A, and then renders on the top display 120 effects for showing the introduction of the monkey repel event. Subsequently, the gaming machine informs the player to look the main display 140, and displays a game rule on the main display 140. In this case, the main display 140 may display a movie corresponding to a real play of the monkey repel event to explain the game rule. The main display 140 displays "READY", and then displays "START" to start the monkey repel event. Next, the main display 140 displays a plurality of options 6010. For example, the main display 140 may display effects that various monkeys corresponding to the plurality of options 6010 attacks to the character. When the player touches any one of the plurality of options 6010 to select one option, the gaming machine 100 renders on the main display 140 effects that the touched monkey is defeated and vanished.

When the selected option includes a payout, the gaming machine 100 renders on the top display 120 effects that the character stands in defeated monkeys, and displays the payout of the selected option on the main display 140, as shown in FIG. 60B. Next, the gaming machine 100 renders on the top display 120 an image that the bridge ends, and displays images for a next bonus round as shown in FIG. 16.

When the selected option includes "START OVER", the gaming machine 100 renders on the top display 120 effects that the character is defeated by the monkeys, and notifies the player that the character returns to a start point, as shown in FIG. 60B. For example, the gaming machine 100 displays "RETURN TO START" on the main display 140. Next, the gaming machine 100 renders on the top display 120 an image that the bridge ends, and displays images for a next bonus round as shown in FIG. 16.

In a certain embodiment, as described with reference to FIG. 57, the gaming machine 100 may store a payout determination table in a memory. When the monkey repel event starts, the gaming machine 100 may randomly assign the plurality of options to the plurality of monkeys.

Free Game Type Event

The free game type event is one for providing the player with a free game similar to the base game when the player arrives at a cell. The free game type events may include various events, for example, an expanded WILD free game event, a scattered WILD free game event, and a WILD re-spin free game event.

Expanded Wild Free Game Event

Figure 61A:
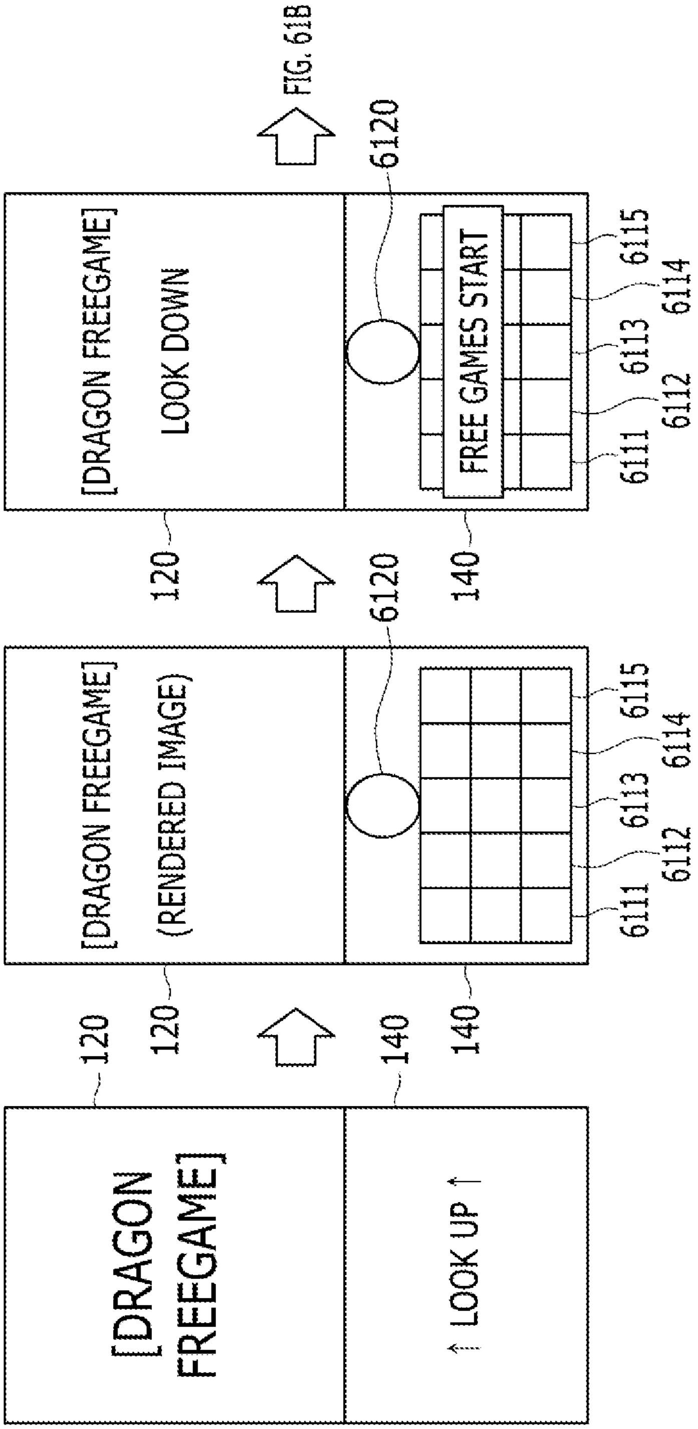
FIG. 61A and FIG. 61B show an example of a rendering picture at an expanded WILD free game event in a bonus round.
Figure 61B:
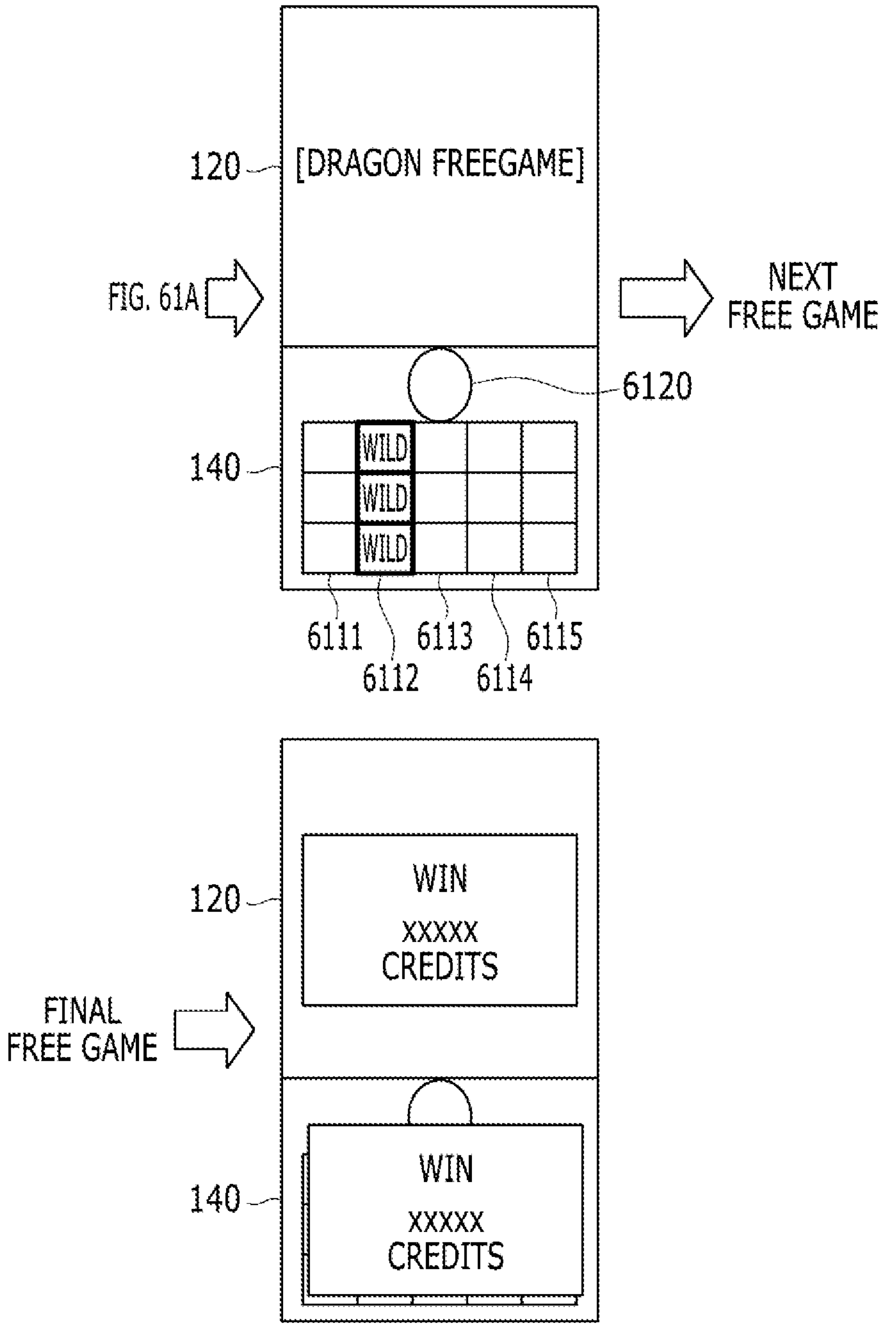

FIG. 61A and FIG. 61B show an example of a rendering picture at an expanded WILD free game event in a bonus round, FIG. 62A shows an example of an expansion determination table for an expanded WILD free game event shown in FIG. 61A and FIG. 61B, FIG. 62B shows an example of an expanded reel determination table for an expanded WILD free game event shown in FIG. 61A and FIG. 61B, FIG. 63 shows an example of another expanded reel determination table for an expanded WILD free game event shown in FIG. 61A and FIG. 61B, and FIG. 64 shows an example of symbol sequences of reels for an expanded WILD free game event shown in FIG. 61A and FIG. 61B.

Symbol Sequence

When the character corresponding to the player of the gaming machine 100 arrives at a cell to which an expanded WILD free game event is set, the expanded WILD free game event is performed. The expanded WILD free game event may include a dragon free game event, and provides a plurality of free games, for example five free games. The gaming machine 100 displays a title of the dragon free game event on the top display 120 as shown in FIG. 61A. Subsequently, the gaming machine 100 renders on the top display 120 effects for showing the introduction of the dragon free game event, and displays a plurality of video reels 6111, 6112, 6113, 6114, and 6115, and an image of a dragon 6120 on the main display 140. Next, the top display 120 displays "LOOK DOWN", and the free game starts.

When a free game starts, the plurality of reels 6111, 6112, 6113, 6114, and 6115 spin. While the plurality of reels 6111 to 6115 spin, the top displays 120 renders effects that the dragon 6120 breathes a fire on at least one of the plurality of reels 6111 to 6115, as shown in FIG. 61B. Subsequently, the plurality of reels 6111 to 6115 stops, and WILD symbols are appeared on all symbol blocks of the at least one reel on which the fire is breathed. That is, WILD symbols are expanded in the at least one reel on which the fire is breathed. The gaming machine 100 awards a payout determined by a combination of WILD symbols and/or other symbols to the player. Next, if the free game is not a final free game, the gaming machine 100 executes a next free game. If the free game is the final free game, the gaming machine 100 displays on the top display 120 and the main display 140 a total payout corresponding to a sum of payouts which are awarded in the plurality of free games, as shown in FIG. 61B.

In a certain embodiment, the gaming machine may randomly determine whether to expand WILD symbols in each of the free games. The gaming machine may store an expansion determination table in a memory as shown in FIG. 62A. An example of the expansion determination table includes "ON" and "OFF", and selection probabilities of "ON" and "OFF". When the "ON" is selected based on the selection probability in a certain free game, the WILD symbols are expanded in the certain free game. Further, the gaming machine may store an expanded reel determination table in a memory in order to select a reel in which the WILD symbols are expanded. As shown in FIG. 62B, an example of the expanded reel determination table includes a plurality of combinations and a selection probability of each combination. Each combination represents at least one reel in the WILD symbols are expanded from among the plurality of reels 6111 to 6115. In FIG. 62B, "\WI" denotes a reel in which the WILD symbols are not expanded, and "WI" denotes a reel in which the WILD symbols are expanded. For example, when the combination of number 2 is selected, the WILD symbols are expanded in the third reel 6113. Accordingly, the gaming machine randomly determines whether to expand the WILD symbols based on expansion determination table in each free game, and randomly determines at least one reel in which the WILD symbols are expanded based on the expanded reel determination table in a free game in which expansion of the WILD symbols are selected.

In a certain embodiment, the gaming machine 100 may provide two expanded reel determination tables that correspond to a base mode and a special mode, respectively. In this case, the gaming machine 100 randomly determines at least one of the free games to which the special mode is applied, and applies the base mode to other free games. In the base mode, the gaming machine randomly determines a reel in which the WILD symbols are expanded based on the tables shown in FIG. 62A and FIG. 62B. In the special mode, the gaming machine 100 determines that expansion of the WILD symbols is always used differently from the base mode. Further, the gaming machine randomly determines at least one reel in which the WILD symbols are expanded based on an expanded reel determination table of the special mode. As shown in FIG. 63, an example of the expanded reel determination table includes a plurality of combinations and a selection probability of each combination. Each combination represents at least one reel in which the WILD symbols are expanded from among the plurality of reels 6111 to 6115. As shown in FIG. 62B and FIG. 63, the number of reels (for example, two) in which the WILD symbols are expanded in the special mode is more than the number of reels (for example, one) in which the WILD symbols are expanded in the base mode.

In a certain embodiment, the gaming machine 100 may use a symbol sequence that is different from the base game in the free game. An example of the symbol sequence used in the expanded WILD free game event is shown in FIG. 64. The symbols of the symbol sequence may include symbols depicted as, for example, WHALE, SNAKE, MONKEY, SWORD, POT, RAFT, and WILD. The symbol sequence may not include a BONUS symbol. Further, the symbol sequence may not include symbols that can award a relatively high payout, for example BIRD, DRAGON and CYCLOPS symbols.

Scattered Wild Free Game Event

Figure 65A:
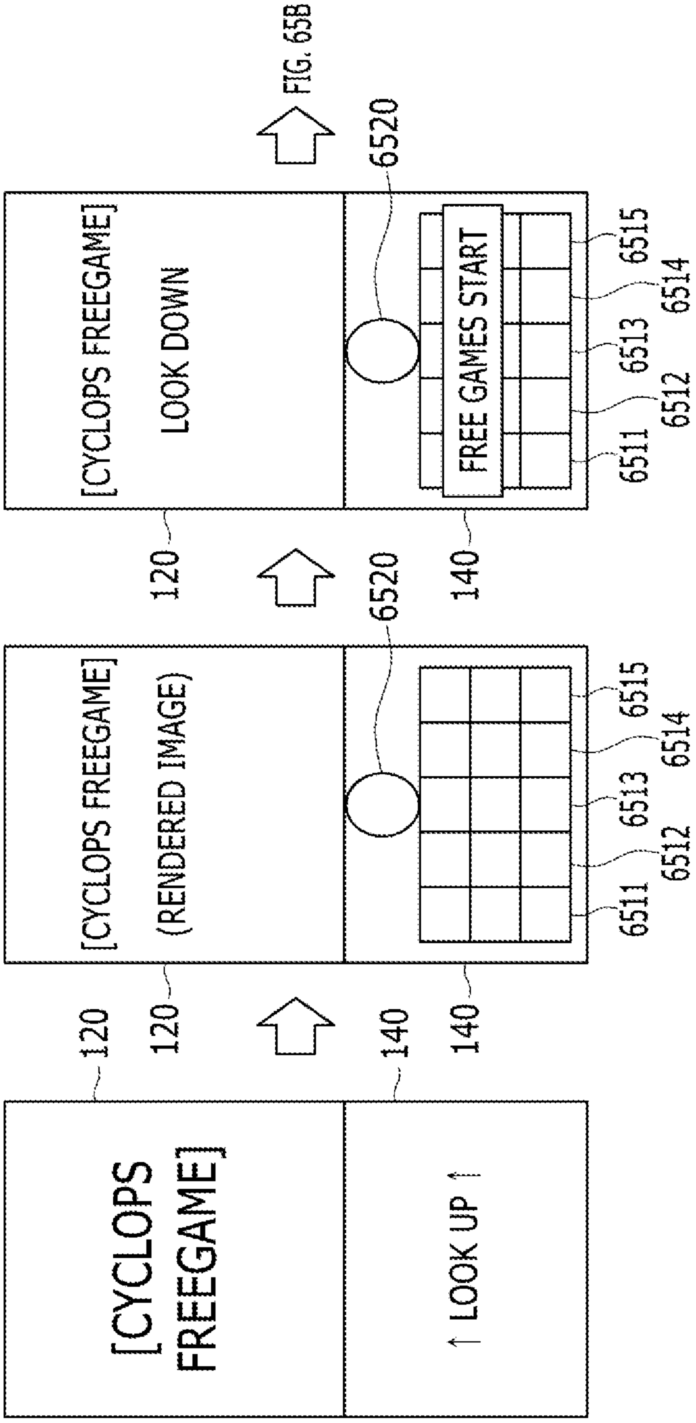
FIG. 65A and FIG. 65B show an example of a rendering picture at a scattered WILD free game event in a bonus round.
Figure 65B:
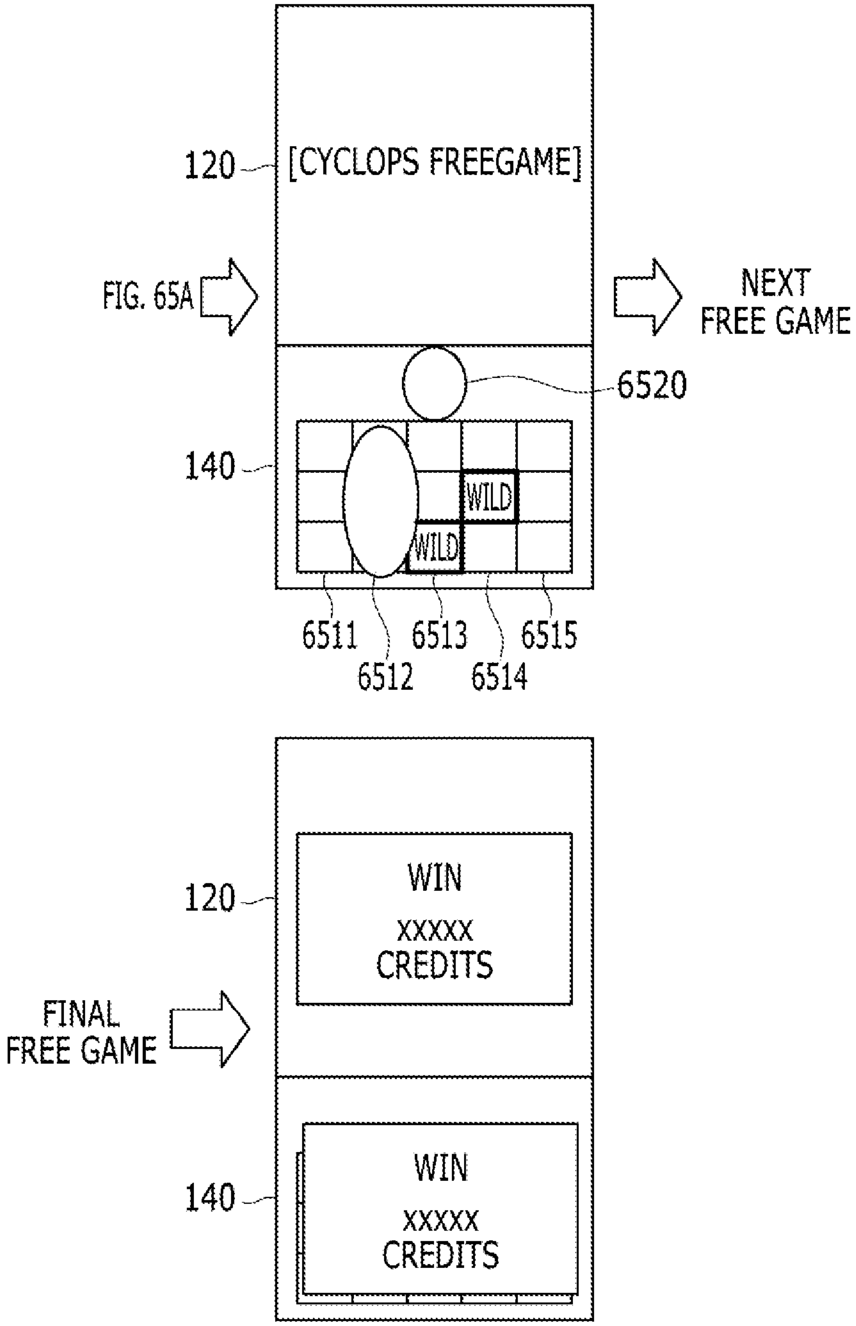

FIG. 65A and FIG. 65B show an example of a rendering picture at a scattered WILD free game event in a bonus round, FIG. 66A shows an example of an expansion determination table for a scattered WILD free game event shown in FIG. 65A and FIG. 65B, FIG. 66B shows an example of a number determination table for a scattered WILD free game event shown in FIG. 65A and FIG. 65B, FIG. 67 shows an example of another number determination table for a scattered WILD free game event shown in FIG. 65A and FIG. 65B, and FIG. 68 shows an example of symbol sequences of reels for a scattered WILD free game event shown in FIG. 65A and FIG. 65B.

When the character corresponding to the player of the gaming machine 100 arrives at a cell to which a scattered WILD free game event is set, the scattered WILD free game event is performed. The scattered WILD free game event may include a Cyclops free game event, and provides a plurality of free games, for example five free games. The gaming machine 100 displays a title of the Cyclops free game event on the top display 120 as shown in FIG. 65A. Subsequently, the gaming machine 100 renders on the top display 120 effects for showing the introduction of the Cyclops free game event, and displays a plurality of video reels 6511, 6512, 6513, 6514, and 6515, and an image of the Cyclops 6520 on the main display 140. Next, the top display 120 displays "LOOK DOWN", and the free game starts.

When a free game starts, the plurality of reels 6511 to 6515 spin. After the plurality of reels 6511 to 6515 stop, the top displays 120 renders effects that the Cyclops 6520 beats the reels 6511 to 6515 to split some symbol blocks and symbols of the split symbol blocks are changed to WILD symbols, as shown in FIG. 65B. The gaming machine 100 awards a payout determined by a combination of WILD symbols and/or other symbols to the player. Next, if the free game is not a final free game, the gaming machine 100 executes a next free game. If the free game is the final free game, the gaming machine 100 displays on the top display 120 and the main display 140 a total payout corresponding to a sum of payouts which are awarded in the plurality of free games, as shown in FIG. 65B.

In a certain embodiment, the gaming machine may randomly determine whether to scatter WILD symbols in each of the free games. The gaming machine may store a scattering determination table in a memory as shown in FIG. 66A. An example of the scattering determination table includes "ON" and "OFF", and selection probabilities of "ON" and "OFF". When the "ON" is selected based on the selection probability in a certain free game, the WILD symbols are scattered on some symbol blocks in the certain free game. Further, the gaming machine may store a number determination table in a memory in order to determine the number of WILD symbols to be scattered. As shown in FIG. 66B, an example of the number determination table includes a plurality of numbers and a selection probability of each number. For example, when the number of WILD symbols is determined to four, four symbol blocks of the reels 6511 to 6515 are changed to the WILD symbols. In this case, the gaming machine 100 may randomly determine symbols blocks to be changed to the WILD symbols from among fifteen symbol blocks of the reels 6511 to 6515. Accordingly, the gaming machine randomly determines whether to scatter the WILD symbols based on scattering determination table in each free game, and randomly determines at least symbol block to be changed to the WILD symbols based on the number determination table in a free game in which scattering of the WILD symbols is selected.

In a certain embodiment, the gaming machine 100 may provide two number determination tables that correspond to a base mode and a special mode, respectively. In this case, the gaming machine 100 randomly determines at least one of the free games to which the special mode is applied, and applies the base mode to other free games. In the base mode, the gaming machine randomly determines the number of symbol blocks to be changed to the WILD symbols based on the tables shown in FIG. 66A and FIG. 66B. In the special mode, the gaming machine 100 determines that scattering of the WILD symbols is always used differently from the base mode. Further, the gaming machine randomly determines the number of WILD symbols to be scattered based on the number determination table of the special mode. As shown in FIG. 67, an example of the number determination table includes a plurality of numbers and a selection probability of each number. In this case, the selection probability of a predetermined number (for example, four) may be 100%, and the selection probabilities of other numbers may be 0%. That is, four WILD symbols may be always scattered in the special mode.

In a certain embodiment, the gaming machine 100 may use a symbol sequence that is different from the base game in the free game. An example of the symbol sequence used in the scattered WILD free game event is shown in FIG. 68. The symbols of the symbol sequence may include symbols depicted as, for example, BIRD, DRAGON, CYCLOPS, WHALE, SNAKE, MONKEY, SWORD, POT, and RAFT. The symbol sequence may not include WILD and BONUS symbols. Further, the symbol sequence may not include symbols that can award a relatively high payout, for example BIRD, DRAGON and CYCLOPS symbols.

Wild Re-Spin Free Game Event

FIG. 69A, FIG. 69B, FIG. 69C and FIG. 69D show an example of a rendering picture at a WILD re-spin free game event in a bonus round, and FIG. 70 shows an example of symbol sequences of reels for a WILD re-spin free game event shown in FIG. 69A to FIG. 69D.

Figure 69A:
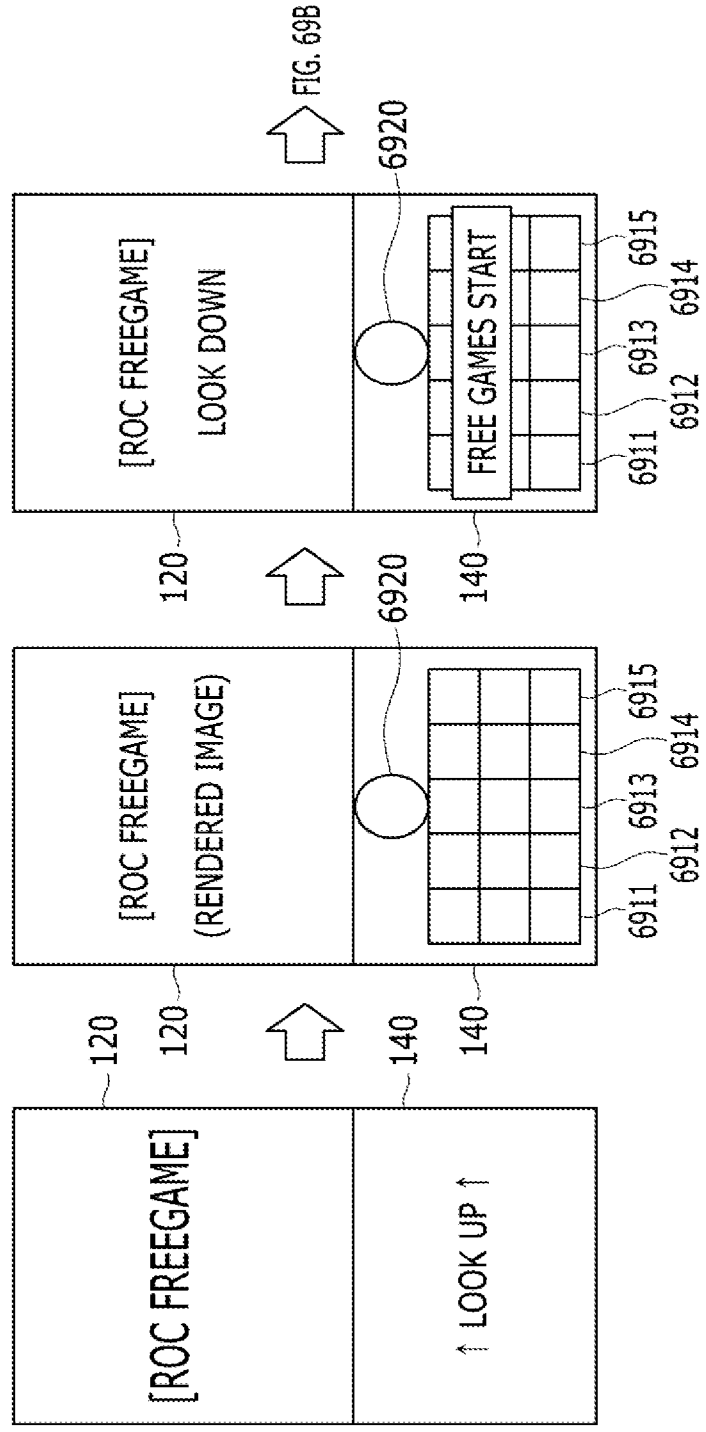
FIG. 69A, FIG. 69B, FIG. 69C and FIG. 69D show an example of a rendering picture at a WILD re-spin free game event in a bonus round.

When the character corresponding to the player of the gaming machine 100 arrives at a cell to which a WILD re-spin free game event is set, the WILD re-spin free game event is performed. The WILD re-spin free game event may include a Roc free game event, and provides a plurality of free games, for example five free games. The gaming machine 100 displays a title of the Roc free game event on the top display 120 as shown in FIG. 69A. Subsequently, the gaming machine 100 renders on the top display 120 effects for showing the introduction of the Roc free game event, and displays a plurality of video reels 6911, 6912, 6913, 6914, and 6915, and an image of the Roc 6920 on the main display 140. Next, the top display 120 displays "LOOK DOWN", and the free game starts.

Figure 69B:
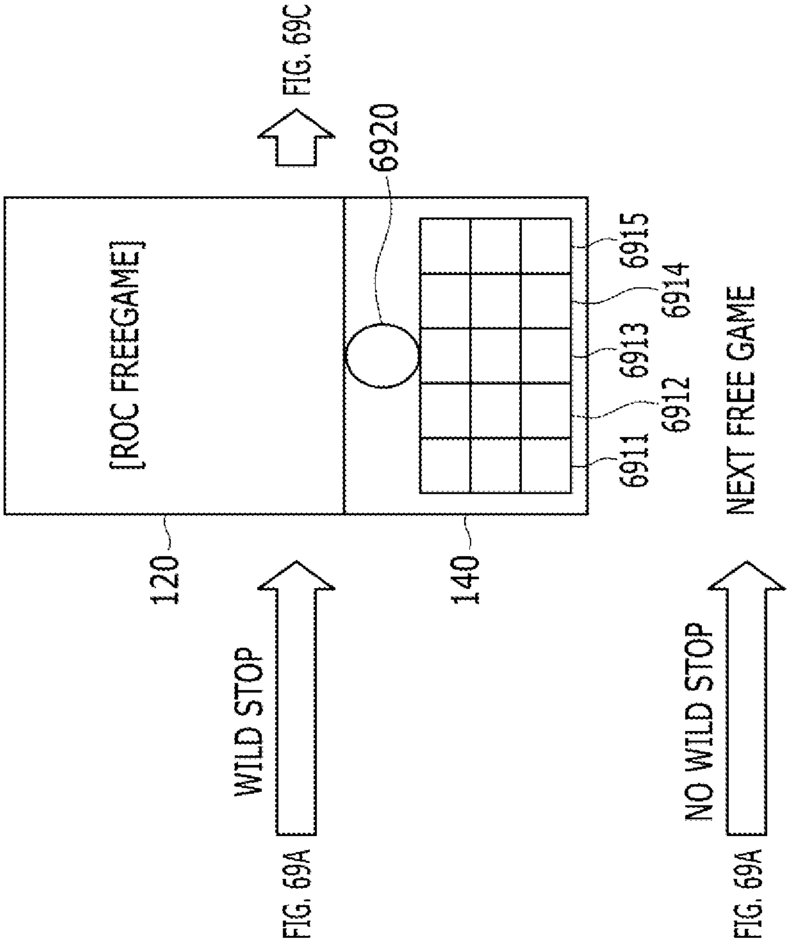
Figure 69C:
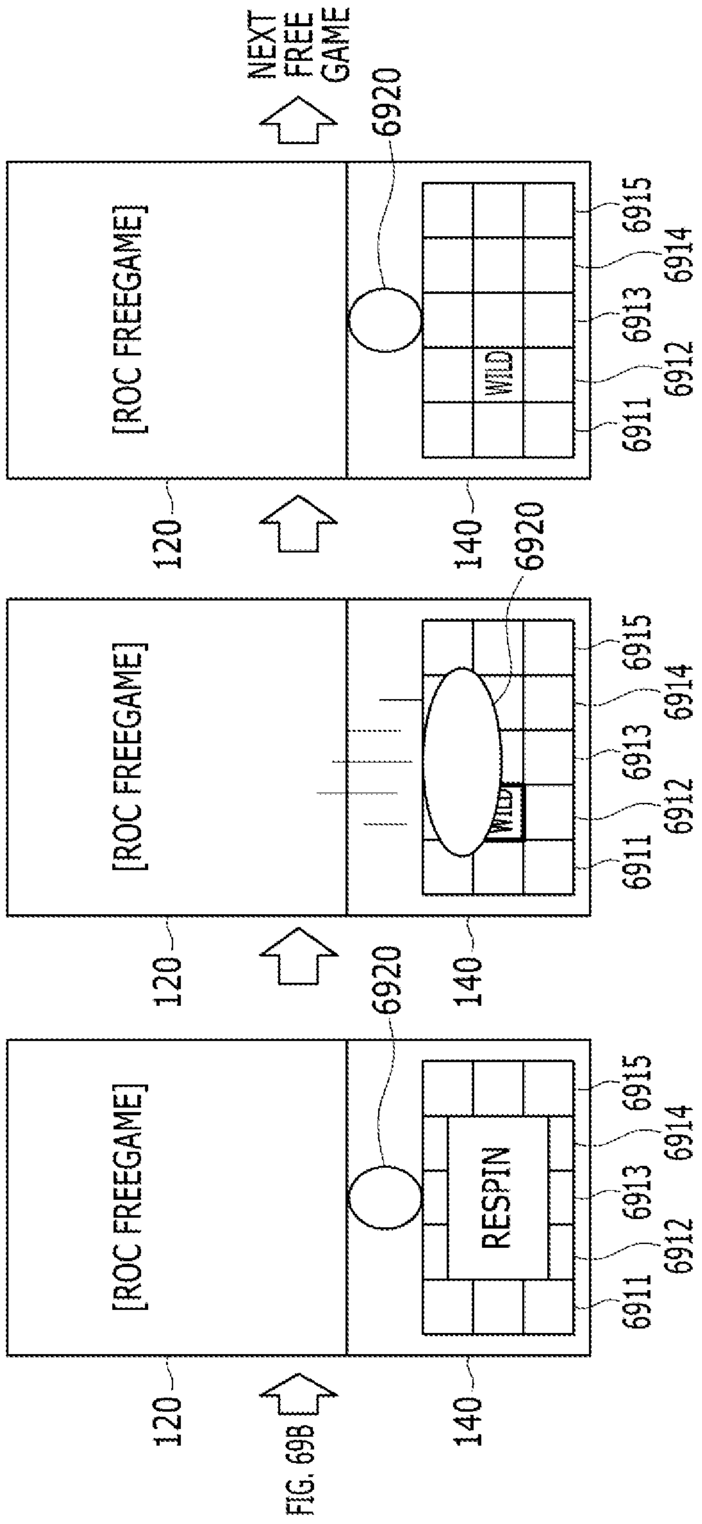
Figure 69D:
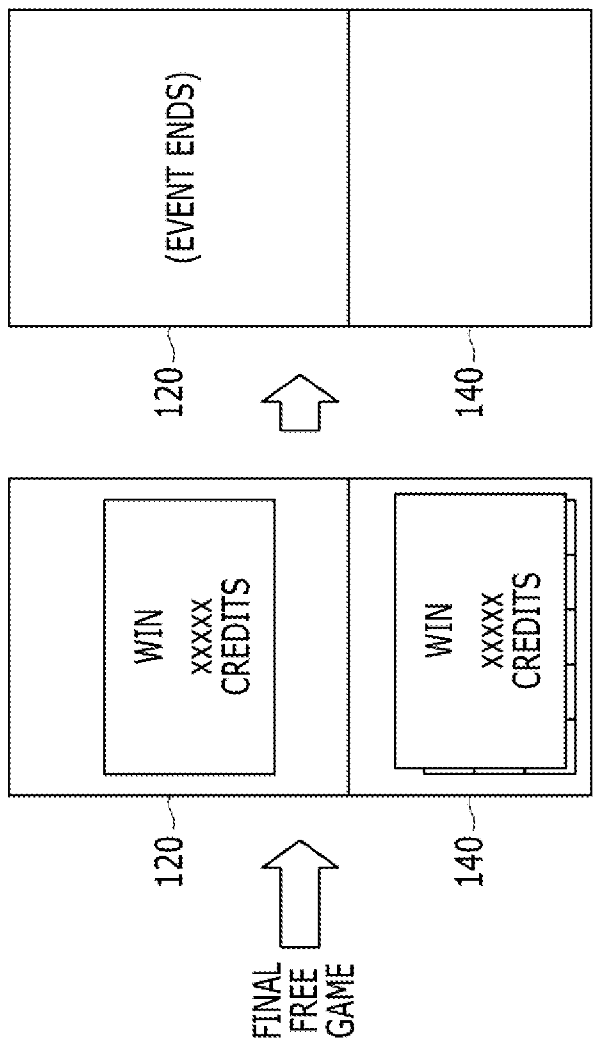

When a free game starts, the plurality of reels 6911 to 6915 spin and then stop. If the symbols appeared on the stopped reels 6911 to 6915 include no WILD symbol, the gaming machine 100 provides a payout according to a combination of symbols, as shown in FIG. 69B. When the free game is not a final free game, the gaming machine 100 executes a next free game. When the free game is the final free game, the gaming machine 100 displays on the top display 120 and the main display 140 a total payout corresponding to a sum of payouts which are awarded in the plurality of free games, as shown in FIG. 69D.

If the symbols appeared on the stopped reels 6911 to 6915 include at least one WILD symbol, the gaming machine 100 provides a payout according to a combination of the WILD symbol and other symbols, as shown in FIG. 69B. Subsequently, the gaming machine 100 displays "RESPIN" on the main display 140, as shown in FIG. 69C. Next, the main display 140 renders effects that the Roc 6920 flies on the reels 6911 to 6915 and goes across the reels 6911 to 6915. The gaming machine 100 re-spins the reels 6911 to 6915 with fixing the WILD symbol at a time when the Roc 6920 turns. Subsequently, the Roc 6920 returns to an original position, and the reels 6911 to 6915 slowly stop. Accordingly, symbols are rearranged on other symbol blocks excluding the symbol block in which the WILD symbol is fixed, and the gaming machine 100 provides a payout according to a combination of the WILD symbol and rearranged symbols again. When the free game is not a final free game, the gaming machine 100 executes a next free game. When the free game is the final free game, the gaming machine 100 displays on the top display 120 and the main display 140 a total payout corresponding to a sum of payouts which are awarded in the plurality of free games, as shown in FIG. 69D.

In a certain embodiment, the gaming machine 100 may use a symbol sequence that is different from the base game in the free game. An example of the symbol sequence used in the WILD re-spin free game event is shown in FIG. 70. The symbols of the symbol sequence may include symbols depicted as, for example, BIRD, DRAGON, CYCLOPS, WHALE, SNAKE, MONKEY, SWORD, POT, RAFT, and WILD. The symbol sequence may not include a BONUS symbol. Further, the symbol sequence may not include symbols that can award a relatively higher payout, for example BIRD, DRAGON and CYCLOPS symbols. Furthermore, the first reel of the symbol sequence may not include the WILD symbol.

Turning Point Type Event

Figure 71:
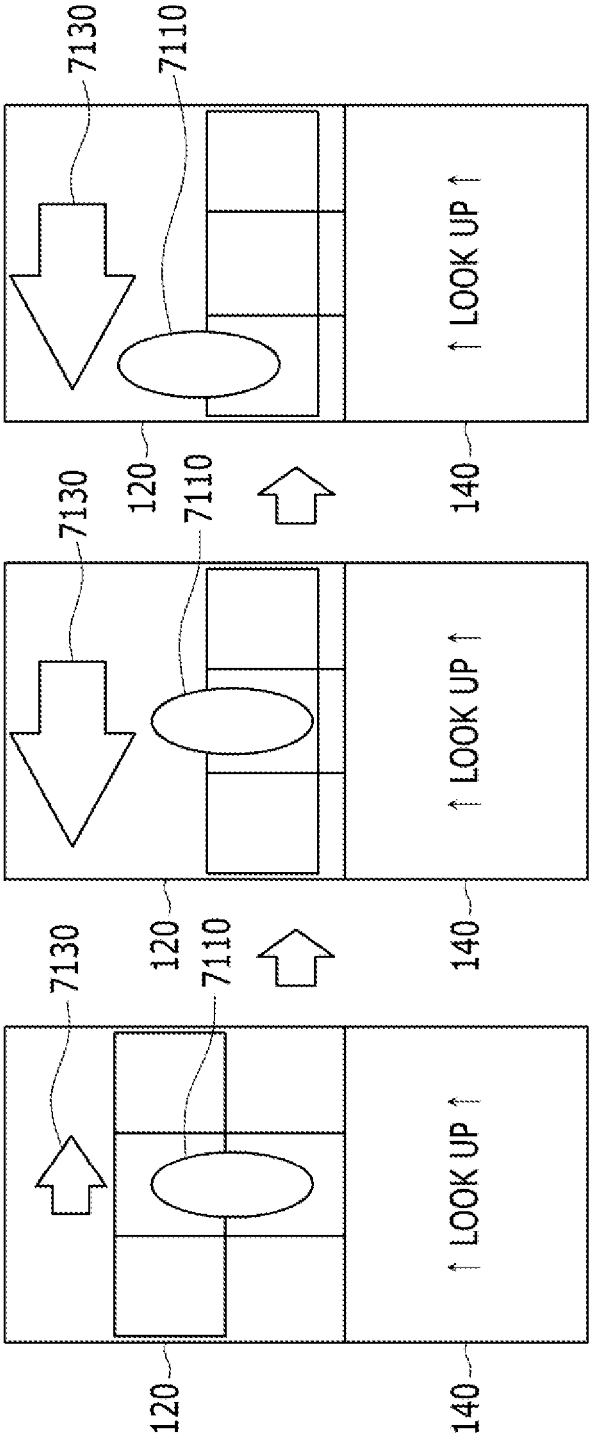
FIG. 71 show an example of a rendering picture at a turning point event determined in a bonus round.

FIG. 71 show an example of a rendering picture at a turning point event determined in a bonus round.

A turning point type event is an event that determines any one among a plurality of paths for a plurality of courses. The character of the player can proceed to the path selected in the turning point. FIG. 71 shows an example of a turning point type event in a bonus game according to an embodiment of the present invention.

While the character 7110 corresponding to the player of the gaming machine 100 advance to a turning point cell to which a turning point event is set, the top display 120 alternately displays a left arrow and right arrow 7120 in turn on the turning point cell, as shown in FIG. 71. The main display 140 displays "LOOK UP". When the character arrives at the turning point cell, the top display 120 alternately displays a big left arrow and big right arrow 7130. Next, the gaming machine 100 stops alternation of the big left arrow and big right arrow 7130, and displays only one of the big left arrow and big right arrow 7130. Accordingly, the character 7110 advances in a course corresponding to a direction of the displayed big arrow 7130. The gaming machine 100 may randomly determine any one of the big left arrow and big right arrow 7130. A selection probability of each of the big left arrow and big right arrow may be 50%. Further, if a cell to be moved by the determined digit remains, the gaming machine 100 moves the character by the number of remaining cells, according to the course determined in the turning point.

Goal Point Type Event

Figure 72A:
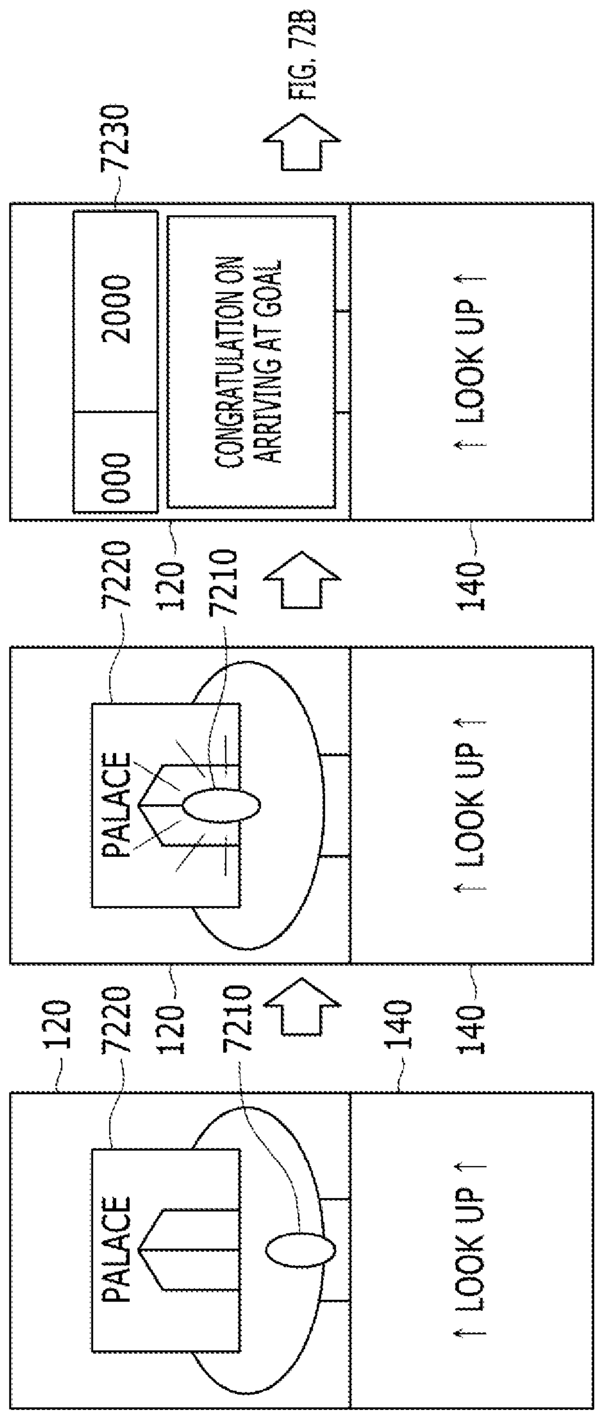
FIG. 72A and FIG. 72B show an example of a rendering picture at a goal point event determined in a bonus round.
Figure 72B:
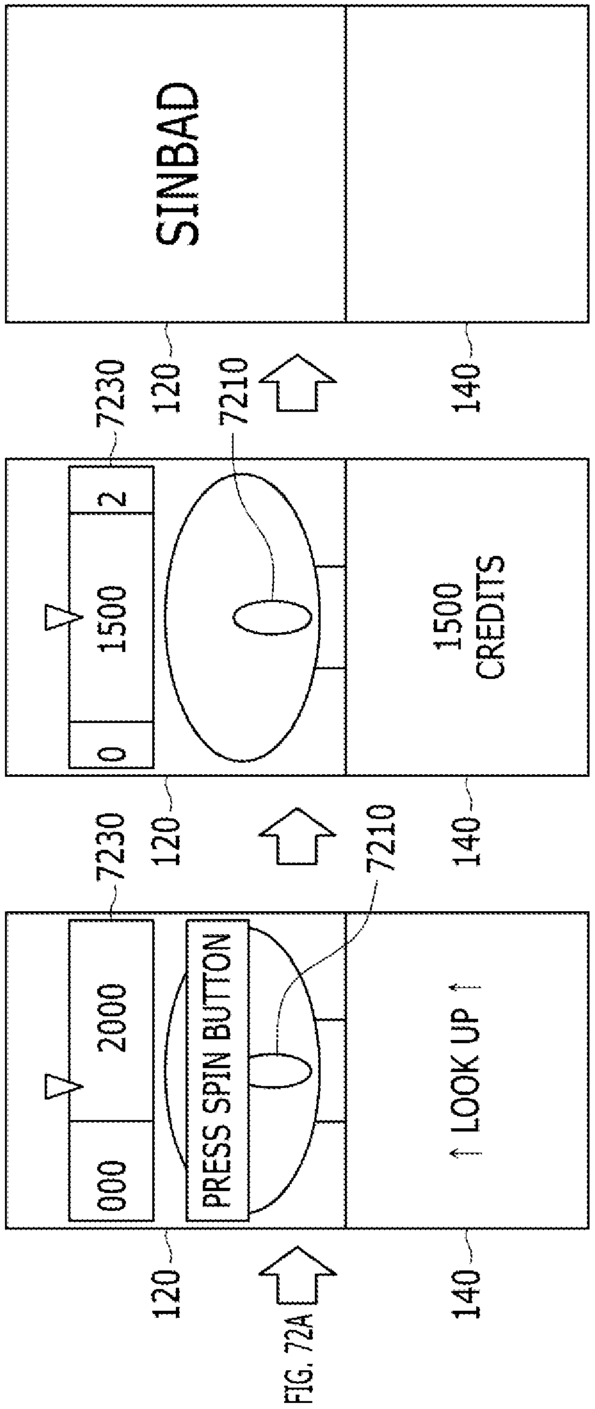

A goal point is a final cell among a plurality of cells forming the map of bonus game. In the goal point, big credits are awarded to the player. FIG. 72A and FIG. 72B show an example of a rendering picture at a goal point event determined in a bonus round, and FIG. 73 shows an example of a payout determination table for a goal point event shown in FIG. 72A and FIG. 72B.

As shown in FIG. 72A, the gaming machine 100 displays an image of a palace 7220 on the goal point. When the character 7210 arrives at a goal point, a goal point type event starts. Further, the top display 120 renders effects that the character 7210 enters the palace 7220 with opening a door of the palace 7220. Subsequently, the top display 120 displays an image for congratulating the player on an arrival of the goal point, and displays a roulette 7230. The roulette 7230 includes a plurality of payouts.

Next, the gaming machine 100 informs the player to press a spin button (153 of FIG. 6) on the top display 120, as shown in FIG. 72B. When the player presses the spin button 153, the gaming machine 100 spins the roulette 7230 and stops the roulette 7230 after a predetermined time. When the roulette 7230 stops, the top display 120 renders effects that the character is pleased, and the main display 140 displays the payout determined by the roulette 7230. Next, the gaming machine 100 renders an ending of the bonus game.

In a certain embodiment, the gaming machine 100 may randomly determine the payout of the goal point based on an average BET per bonus round. In detail, the gaming machine 100 calculates a sum of BET amounts betted by the player while the character moves from the start point to the goal point, and calculates the number of bonus rounds executed while the character moves from the start point to the goal point. Next, the gaming machine 100 divides the sum of BET amounts by the number of bonus rounds to calculate an average BET amount per bonus round, and divides the average BET amount per bonus round by default credits of one BET amount to calculate the average BET per bonus round. Next, the gaming machine 100 selects any one of an integer part of the average BET per bonus round and a next integer of the integer part of the average BET per bonus round as an integer value. At this time, the gaming machine 100 selects the next integer of the integer part of the average BET per bonus round as the integer value with a probability corresponding to a fractional part of the average BET per bonus round, and selects the integer part of the average BET per bonus round as the integer value with a probability corresponding to a difference between one and the fractional part of the average BET per bonus round. For example, if the sum of BET amounts betted by the player is 2200 credits and the number of bonus rounds is 35, the average BET amount per bonus round is 62.85714 (=2200/35). In this case, if the default credits are 500 credits, the average BET per bonus round is 1.25714 (=62.85714/50). Accordingly, the controller changes the average BET per bonus round to 1 BET with the probability of 74.29% (1−0.25714=0.74286), and changes the average BET per bonus round to 2 BETs with the probability of 25.71%.

Further, the gaming machine 100 may store a payout determination table for the goal point in a memory. An example of the payout determination table for the goal point is shown in FIG. 73. As shown in FIG. 73, the payout determination table for the goal point includes a plurality of payouts and a selection probability of each payout for each average BET per bonus round. Accordingly, the gaming machine 100 may randomly determine the payout of the goal point based on the average BET per bonus round changed to an integer value. For example, when the average BET per bonus round changed to the integer value is 4 BETs, the gaming machine determines the payout of the goal point to 1000 credits with a probability of 32%, 3000 credits with a probability of 56%, and 10000 credits with a probability of 12%. Accordingly, in the payout determination table, the higher the average BET per bonus round is, the greater the expected value of the payout is. As such, since the expected value of payout is set to be proportional to the average BET per unit game in the payout determination table, the probability that the player can obtain a great payout is increased if the player bets the high BETs in the many bonus rounds.

As described above, according to embodiments of the present invention, since various events are provided in the bonus game, the player can continuously play a plurality of bonus rounds to enjoy the various events. Further, the player can continuously play a plurality of base games to trigger the bonus game for providing the various events.

Versus Event

FIG. 74 shows an example of a versus event determination table according to an embodiment of the present invention.

According to an embodiment of the present invention, a versus event is randomly triggered while a player plays a base game. The versus event is an event in which players of adjacent gaming machines perform a same game to obtain an award of the same game. The versus event may be triggered when all the players of adjacent gaming machines have entry rights for the versus event. The entry right of each player may be randomly determined when the base game is executed in the gaming machine of each player. In this case, a versus event determination table may be stored in a memory. The memory may be a RAM (612 or 642 of FIG. 7 or 8), a ROM (613 or 643 of FIG. 7 or 8). An example of the versus event determination table is shown in FIG. 74. As shown in FIG. 74, the versus event determination table includes probabilities according to BET amounts. Accordingly, the common control unit performs drawing of the entry right for the player based on the BET amount of the base game and the versus event determination table when the player executes the base game. For example, if the BET amount is 5 BETs in the base game, the entry right can be selected with a probability of 5%.

The versus event may be related to a story, for example, "Sinbad the Sailor." The versus event may include various events, for example, a treasure island event, a king's award event, a battle event, a camel race event, a boating event, a coconut dropping event, a Roc's egg event, and a Roc shooting event. Further, the versus events may be classified into a plurality of types. A first type is a versus event that selects any one player of the first player and the second player and then is performed for only the selected player, and may include the Roc's egg event and the Roc shooting event. A second type is a versus event that in which the first player and the second player alternately select any one option from among a plurality of options to determine a winner, and may include the treasure island event, the king's award event, the camel race event, and a coconut dropping event. A third type is a versus event in which the first player and the second player compete on a same screen to determine a winner, and may include the battle event and the boating event.

When the versus event is triggered, any one event may be randomly selected from among the various events. In a certain embodiment, some events may not be selected according to a state of the neighbor player. For example, the first type such as the Roc's egg event and the Roc shooting event cannot be selected when the neighbor player performs a bonus game.

Versus Event Start

Figure 75:
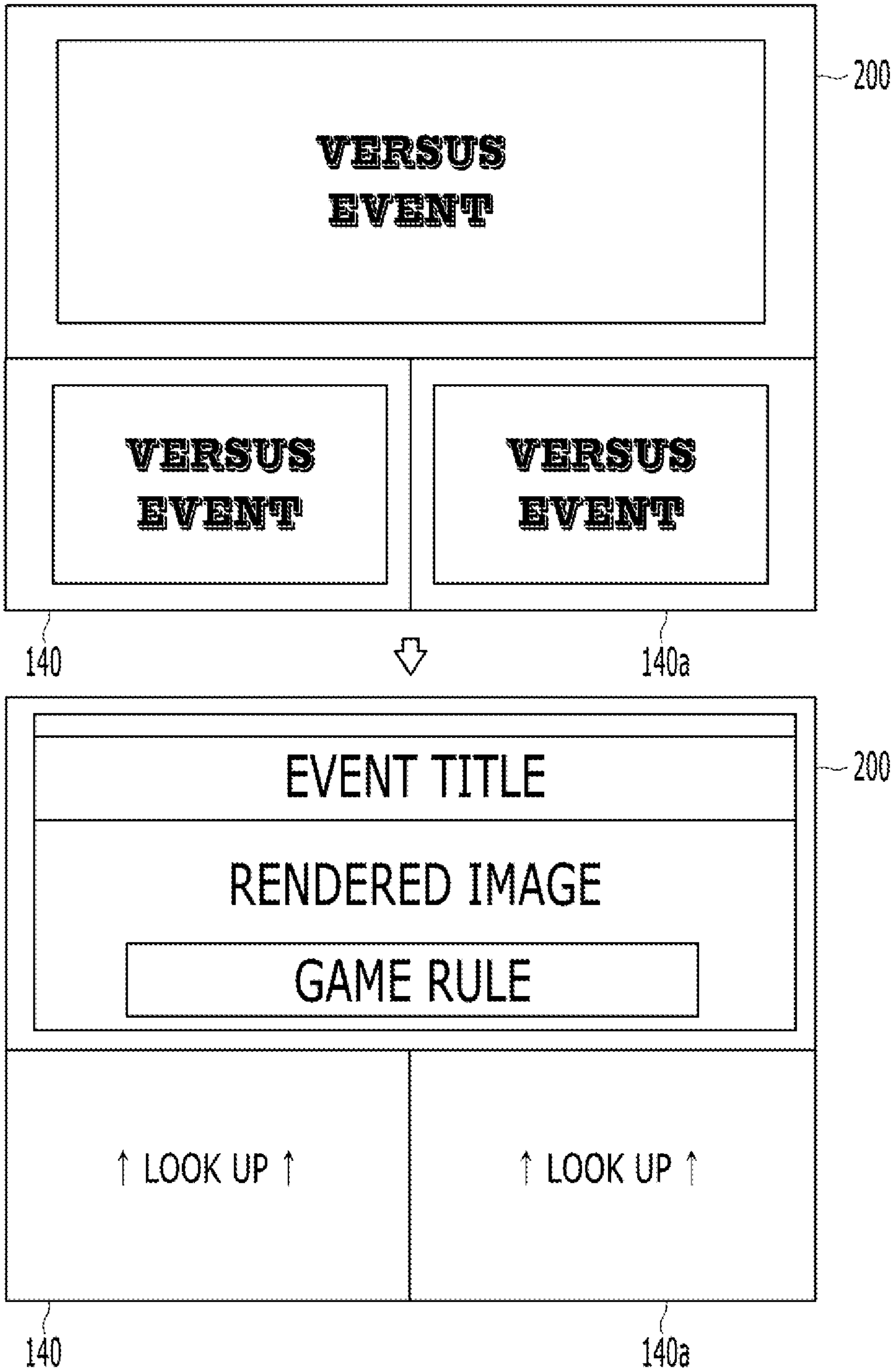
FIG. 75 shows an example of a rendering picture at a trigger of a versus event.

FIG. 75 shows an example of a rendering picture at a trigger of a versus event.

When a versus event is triggered, a common display (200 of FIG. 4) displays an image for notifying the versus event as shown in FIG. 75. Further, main displays (140 and 140*a* of FIG. 4) of a gaming machine 100 and a neighbor gaming machine 100*a* display the image for notifying the versus event. Next, the common display 200 renders an effect image of the versus event, and displays a title of the versus event and a game rule of the versus event. Further, the main displays 140 and 140*a* display "LOOK UP".

In a certain embodiment, images displayed in the common display 200 or data related to the common display 200 may be controlled by a common control unit (640 of FIG. 6B) of a controller, and images displayed in the main displays 140 and 140*a* or data related to the main displays 140 or 140*a* may be controlled by a control unit (610*a* of FIG. 6A) of the controller.

Treasure Island Event

FIG. 76A, FIG. 76B, FIG. 76C and FIG. 76D show an example of a rendering picture at a treasure island event determined in a versus event.

Figure 76A:
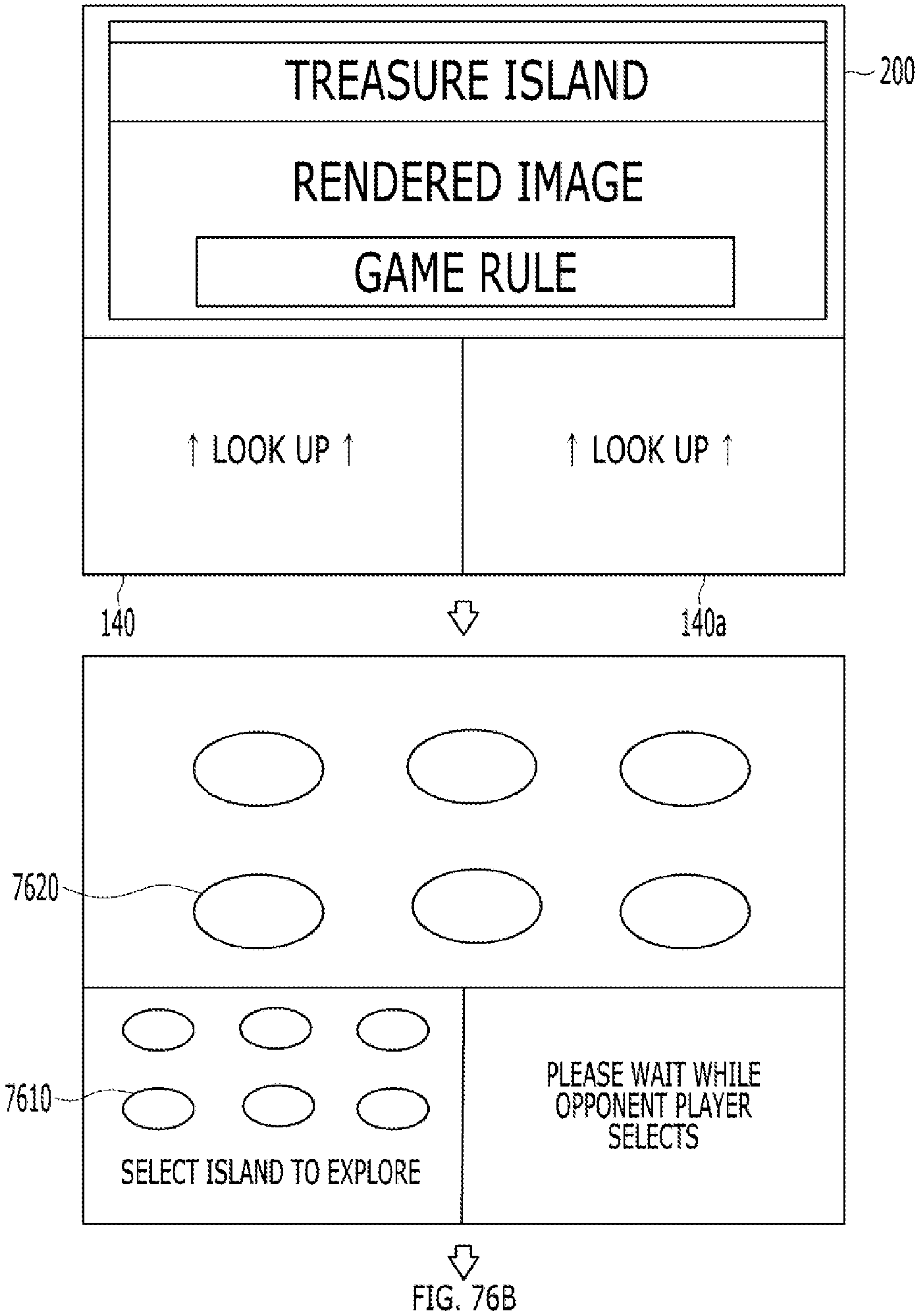
FIG. 76A, FIG. 76B, FIG. 76C and FIG. 76D show an example of a rendering picture at a treasure island event determined in a versus event.

When a treasure island event is selected as the versus event, the common display 200 displays a title of the treasure island event as shown in FIG. 76A. Next, the main display 140 of the gaming machine 100 displays a plurality of options 7610, and the plurality of options 7610 correspond to various islands. Further, the main display 140 informs the player to select any one of the plurality of options 7610. For example, the main display 140 displays "SELECT ISLAND TO EXPLORE." The main display 140*a* of the neighbor gaming machine 100*a* instructs the neighbor player to wait while the player of the gaming machine 100 selects any one option. For example, the main display 140*a* displays "PLEASE WAIT WHILE OPPONENT PLAYER SELECTS." Further, the common display 200 renders effects that the plurality of islands 7620 are afloat in the sea.

Figure 76B:
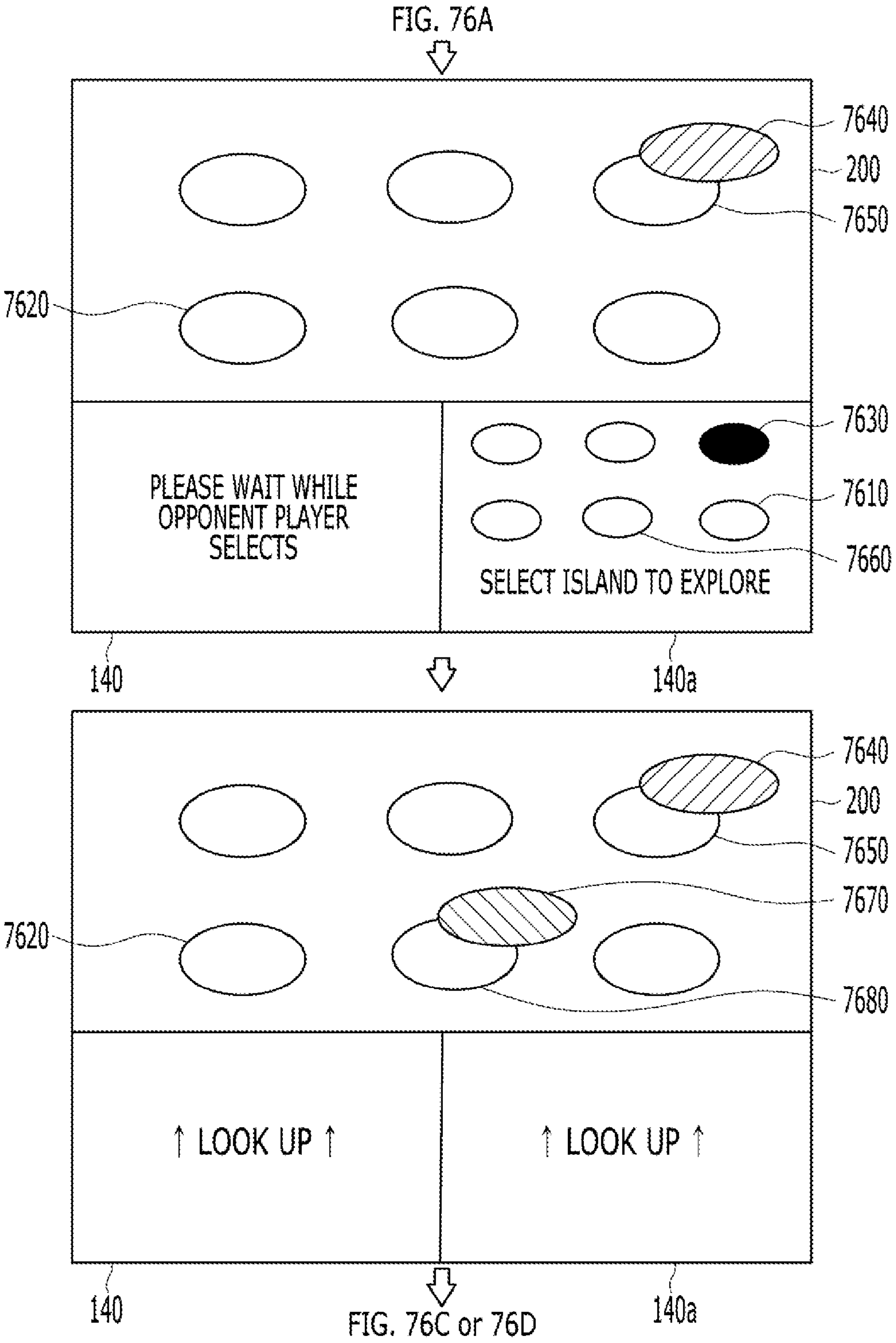

When the player selects any one option 7630, the common display 200 renders effects that the character 7640 of the player is attached to the island 7650 corresponding to the selected option 7630, as shown in FIG. 76B. Further, the main display 140*a* of the neighbor gaming machine 100*a* displays the plurality of options 7610, and informs the neighbor player to select any one of the plurality of options 7610. At this time, the option 7630 selected by the player is displayed as an unselectable state. The main display 140 of the gaming machine 100 instructs the player to wait while the neighbor player selects any one option. When the neighbor player selects any one option 7660, the common display 200 renders effects that the character 7670 of the neighbor player is attached to the island 7680 corresponding to the selected option 7660. Further, the main displays 140 and 140*a* display "LOOK UP."

Figure 76C:
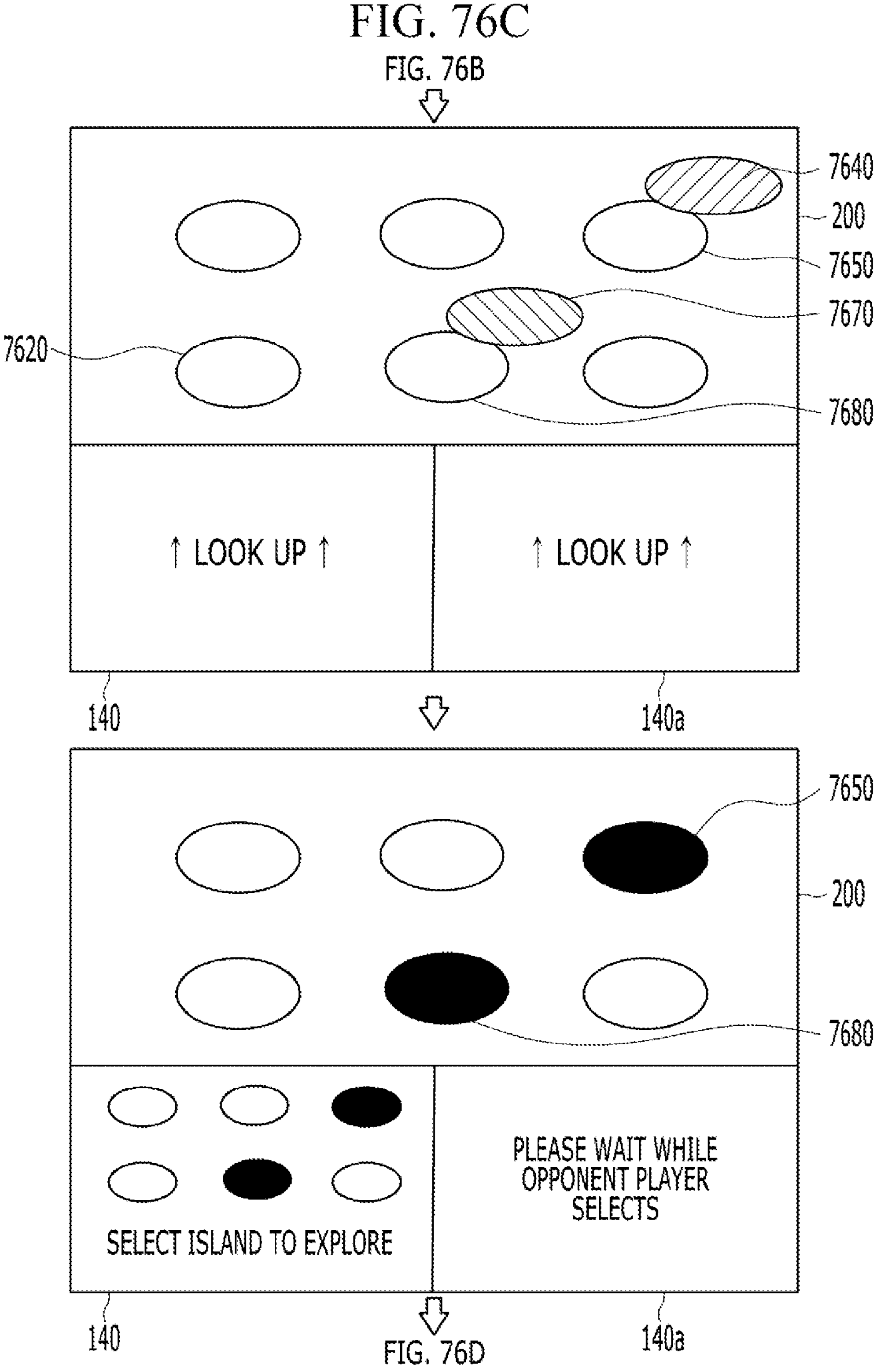

After a predetermined time, the common display 200 displays results of the options 7630 and 7660 selected by the player and the neighbor player. When both the players lose the draw, that is, the results of both the selected options 7630 and 7660 are misses, the common display 200 displays the results of the selected options on the selected islands 7650 and 7680. Subsequently, the common display 200 displays the plurality of islands 7620 in which the characters 7640 and 7670 are attached to the selected islands 7650 and 7680, and the main display 140 informs the player to select any one of the plurality of options 7610 excluding the selected options 7630 and 7660, as shown in FIG. 76C. That is, a process for the player and the neighbor player to select any one option is repeated until any one of the player and the neighbor player selects an option including a payout.

Figure 76D:
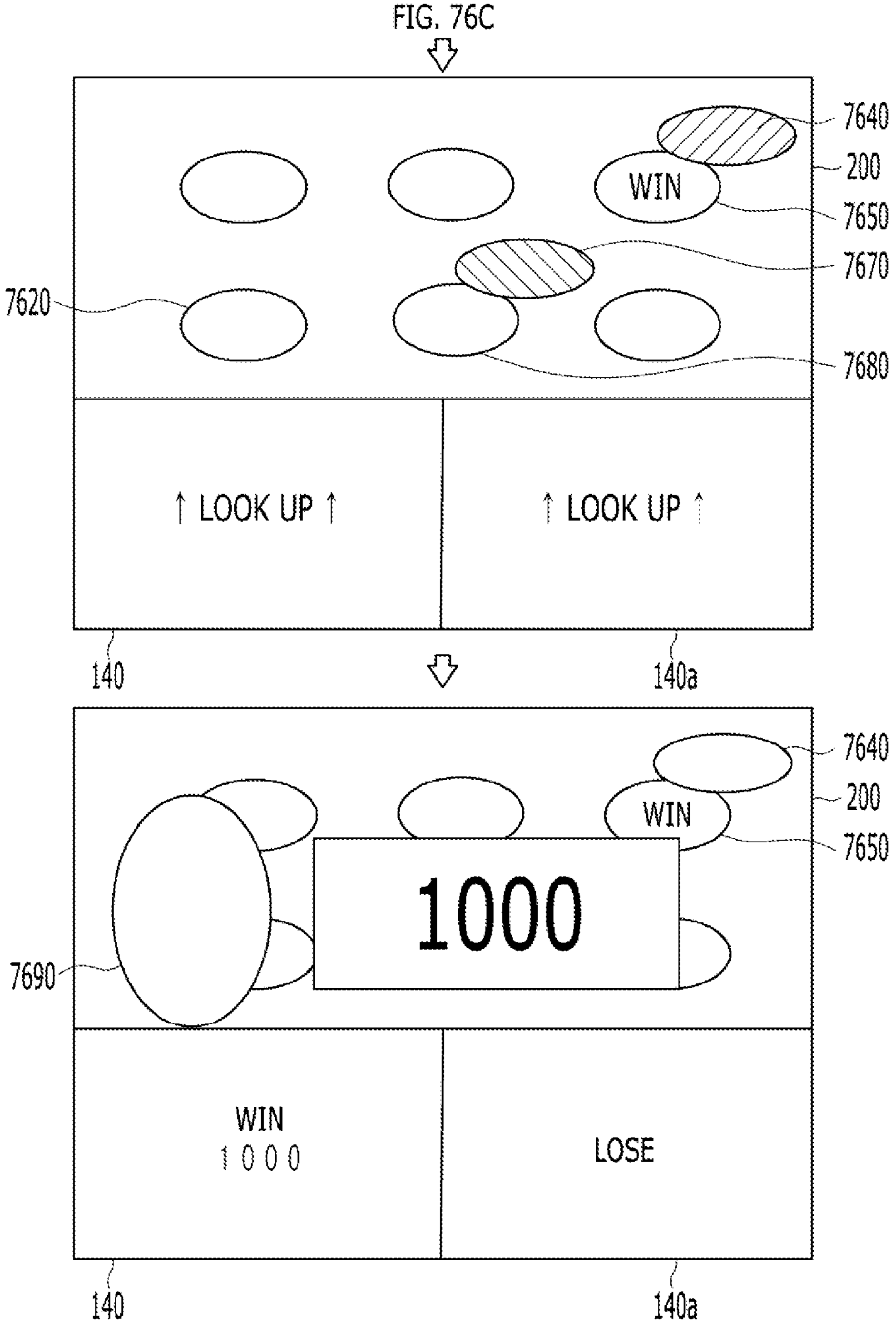

When any one of the players wins the draw, that is, the result of any one of the selected options 7630 and 7660 include a payout, the common display 200 displays "WIN" on the island 7650 of the option 7630 including the payout, as shown in FIG. 76D. Subsequently, the common display 200 displays credits of the payout and renders effects that the character 7690 of the winning player is pleased. Further, the main display 140 of the gaming machine 100 for the winning player displays the credits of the payout, and the main display 140*a* of the gaming machine 100*a* for the losing player displays "LOSE". The versus event ends, and the common display 200 and the main displays 140 and 140*a* display a screen prior to the versus event.

In a certain embodiment, the controller may randomly assign one payout and a plurality of misses to the plurality of options 7610 when the treasure island event starts. That is, one option may be randomly selected as an option including the payout from among the plurality of options 7610. Further, a player that first selects an option among the two players may be randomly determined.

King's Award Event

Figure 77A:
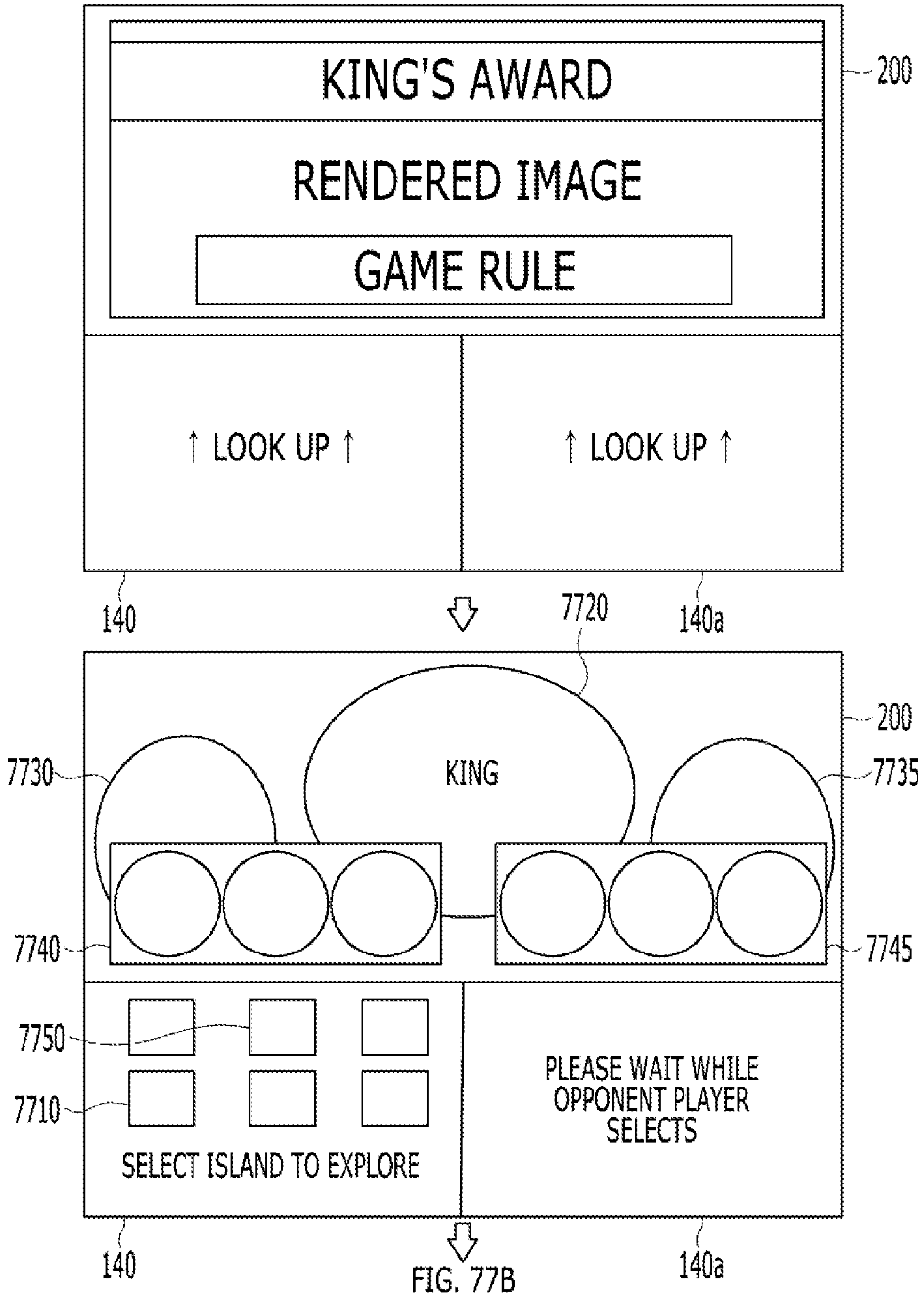
Figure 77C:
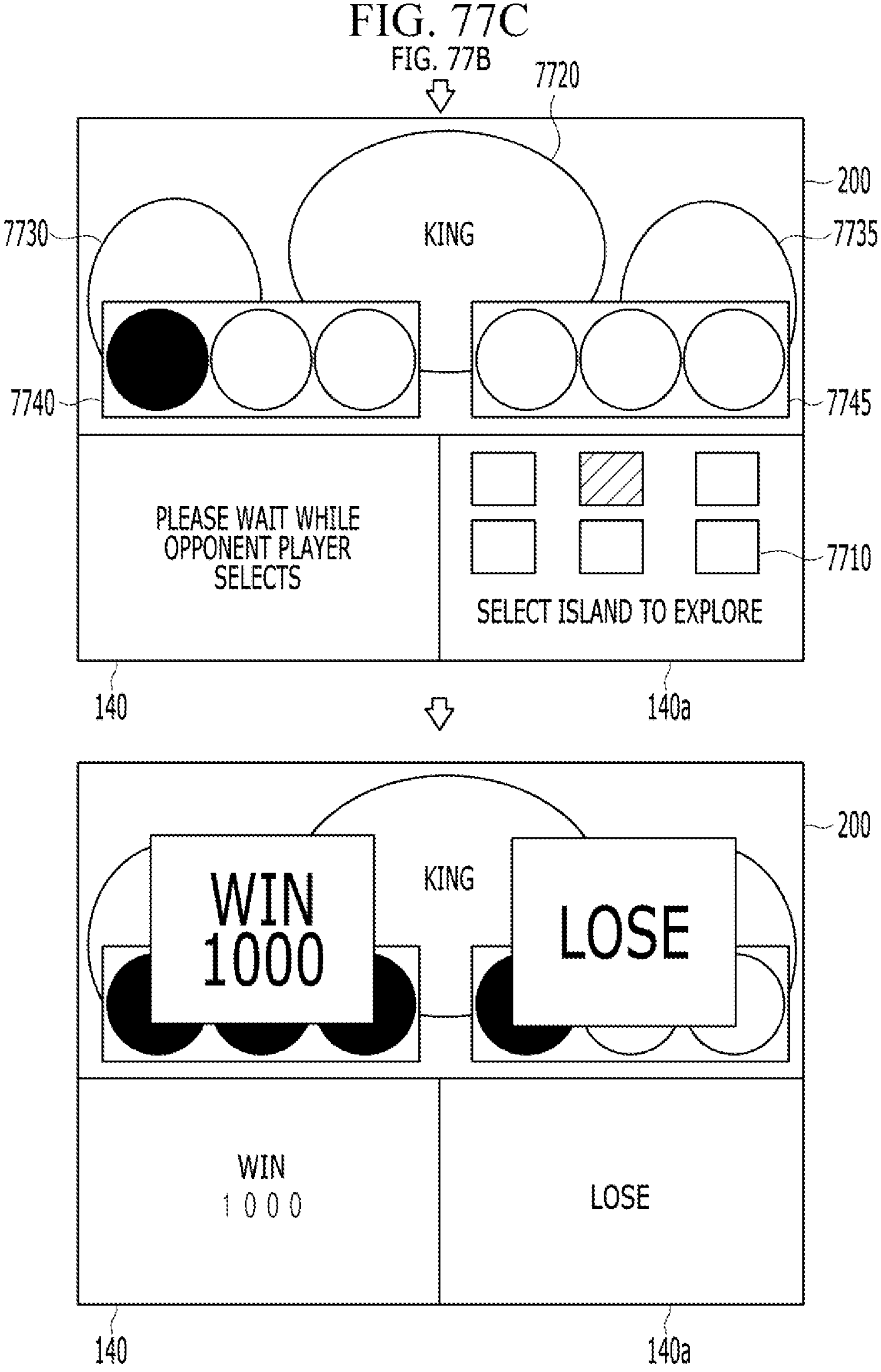

FIG. 77A, FIG. 77B and FIG. 77C show an example of a rendering picture at a king's award event determined in a versus event.

When a king's award event is selected as the versus event, the common display 200 displays a title of the king's award event as shown in FIG. 77A. Next, the main display 140 of the gaming machine 100 displays a plurality of options 7710, for example six options, and the plurality of options 7710 correspond to various treasure boxes. Further, the main display 140 informs the player to select any one of the plurality of options 7710. For example, the main display 140 displays "SELECT TREASURE BOX." The main display 140*a* of the neighbor gaming machine 100*a* instructs the neighbor player to wait while the player of the gaming machine 100 selects any one option. Further, the common display 200 renders effects that the character 7730 of the player and the character 7735 of the neighbor player stand on both sides of the king 7720, and displays two tables 7740 and 7745 for two players, each table including three blanks.

When an option selected by the player corresponds to a hit, the main display 140 render effects that a jewel 7760 appears from a treasure box of the selected option 7750 and flies to the common display 200, and the common display 200 renders effects that a jewel 7765 from the below fills one blank of the table 7740 for the player, as shown in FIG. 77B.

When the option selected by the player corresponds to a miss, the main display 140 render effects that the treasure box of the selected option 7750 is empty, and the common display 200 renders effects that the character 7730 is disappointed, as shown in FIG. 77B.

After the player selects the option 7750, the main display 140*a* of the neighbor gaming machine 100*a* displays the plurality of options 7710, and informs the neighbor player to select any one of the plurality of options 7710. When the neighbor player selects any one option, a process described with reference to FIG. 77B is performed for the neighbor player, as shown in FIG. 77C.

Next, a process described with reference to FIG. 77B is repeated for the player and the neighbor player. When all of the blanks of the table 7740 or 7745 for any one of the player and the neighbor player are filled with the jewels, the player corresponding to the table filled with the jewels wins in the versus event. The common display 200 displays "WIN" and credits of a payout on a top display portion corresponding to the gaming machine 100 of the winning player, and displays "LOSE" on a top display portion corresponding to the gaming machine 100*a* of the losing player. Further, the main display 140 of the gaming machine 100 for the winning player displays the credits of the payout, and the main display 140*a* of the gaming machine 100*a* for the losing player displays "LOSE". The versus event ends, and the common display 200 and the main displays 140 and 140*a* display a screen prior to the versus event.

In a certain embodiment, the controller may randomly assign a plurality of hits and a plurality of misses to the plurality of options 7710 when the king's award event starts. Further, a player that first selects an option among the two players may be randomly determined.

Battle Event

Figures 78A, 78B:
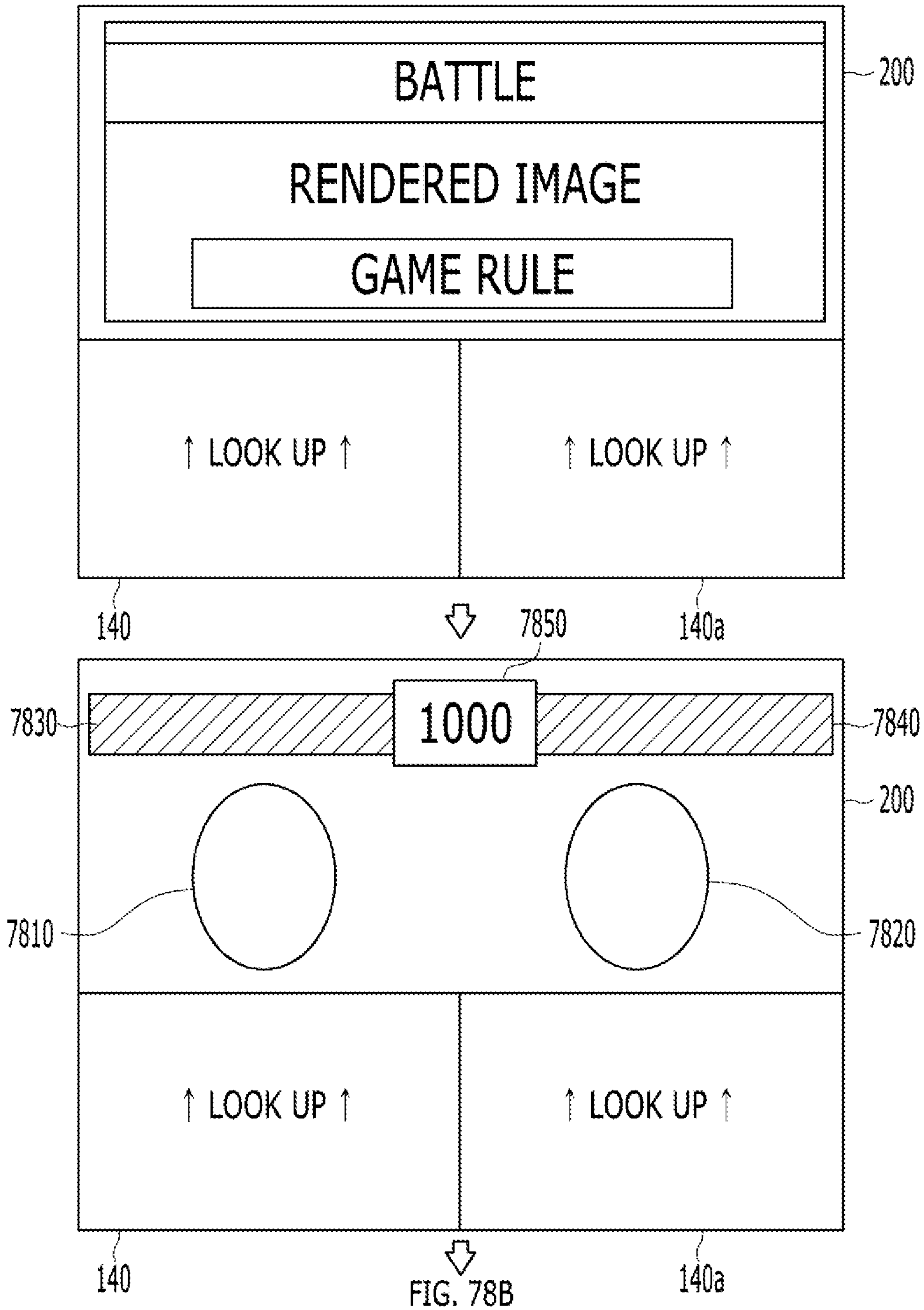
FIG. 78A and FIG. 78B show an example of a rendering picture at a battle event determined in a versus event.
Figure 78B:
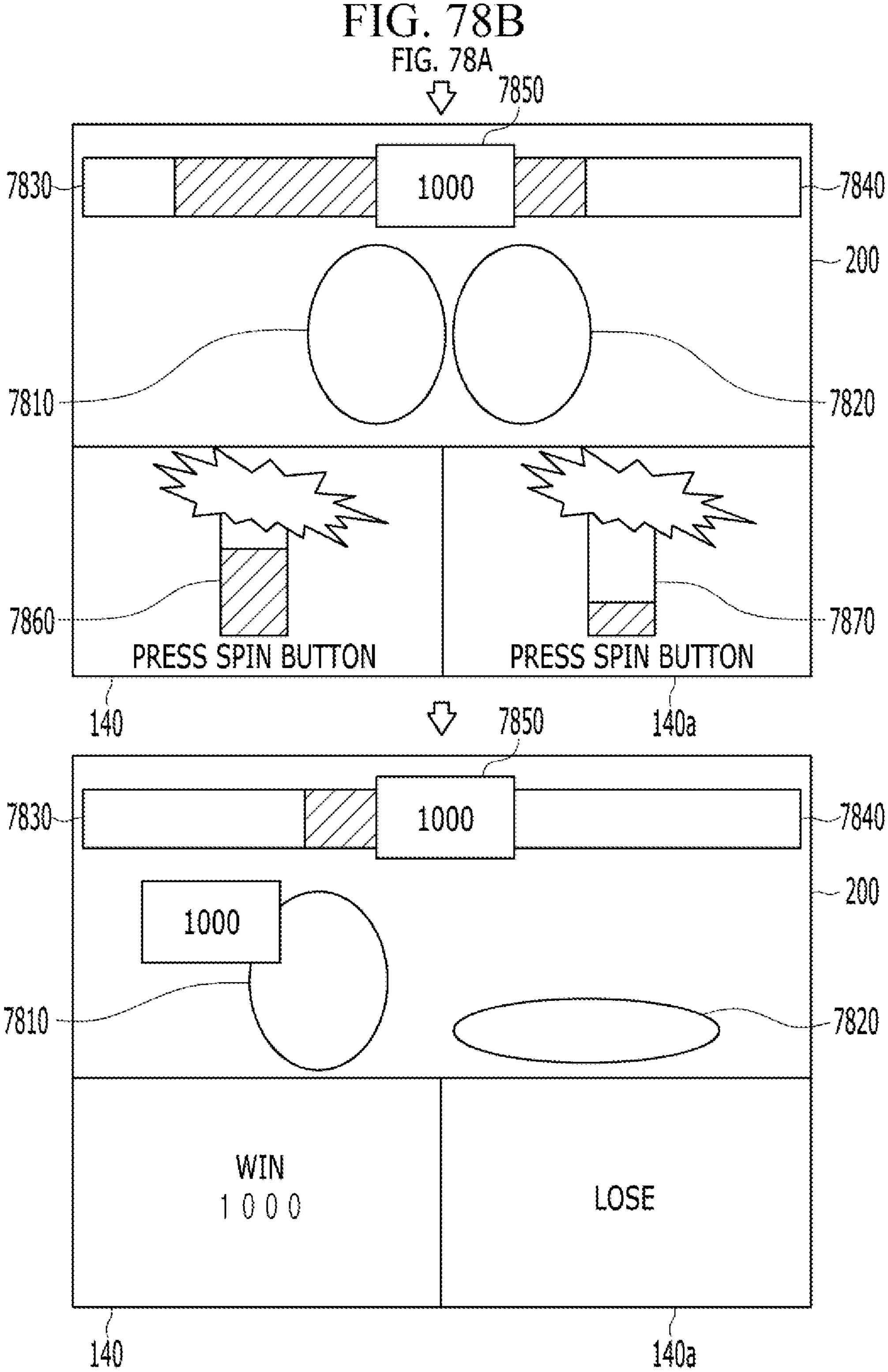

FIG. 78A and FIG. 78B show an example of a rendering picture at a battle event determined in a versus event.

When a battle event is selected as the versus event, the common display 200 displays a title of the battle event as shown in FIG. 78A. Next, the common display 200 displays an image that the character 7810 of the player and the character 7820 of the neighbor player face each other. Further, the common display 200 displays stamina 7830 of the character 7810, stamina 7840 of the neighbor character 7820, and a payout 7850 that is provided to a winning player. Further, the main displays 140 and 140*a* display "LOOK UP."

Next, the main display 140 informs the player to press a spin button (153 of FIG. 3), and displays a combo meter 7860 of the character 7810, as shown in FIG. 78B. The main display 140*a* informs the neighbor player to press the spin button 153, and displays a combo meter 7870 of the neighbor character 7820. When a battle of the battle event starts, the common display 200 renders effects that each of the two characters 7810 and 7820 attack the opponent character and the stamina 7830 and the stamina 7840 are reduced by the attack. The attack of the character 7810 or 7820 quickens by a press of the spin button. Further, an amount of the combo meter 7860 or 7870 is increased by the press of the spin button. When the amount of any one of the combo meters 7860 and 7870 is full, the common display 200 renders effects that the corresponding character uses a lethal technique on the opponent character. After the lethal technique is used, the amounts of the combo meters 7860 and 7870 become zero, and the stamina 7830 or 7840 of the opponent character is decreased greatly. The character 7810 wins when the stamina 7840 of the opponent character 7820 reaches zero. The common display 200 renders effects that the winning character 7810 is pleased and the losing character 7820 is defeated, and displays credits of the payout on the winning character 7810. Further, the main display 140 of the winning character 7810 displays credits of the payout and "WIN", and the main display 140*a* of the losing character 7820 displays credits of the payout and "LOSE". The versus event ends, and the common display 200 and the main displays 140 and 140*a* display a screen prior to the versus event.

In a certain embodiment, "WIN" or "LOSE" may be randomly determined regardless of the press of the spin button.

Camel Race Event

Figure 79A:
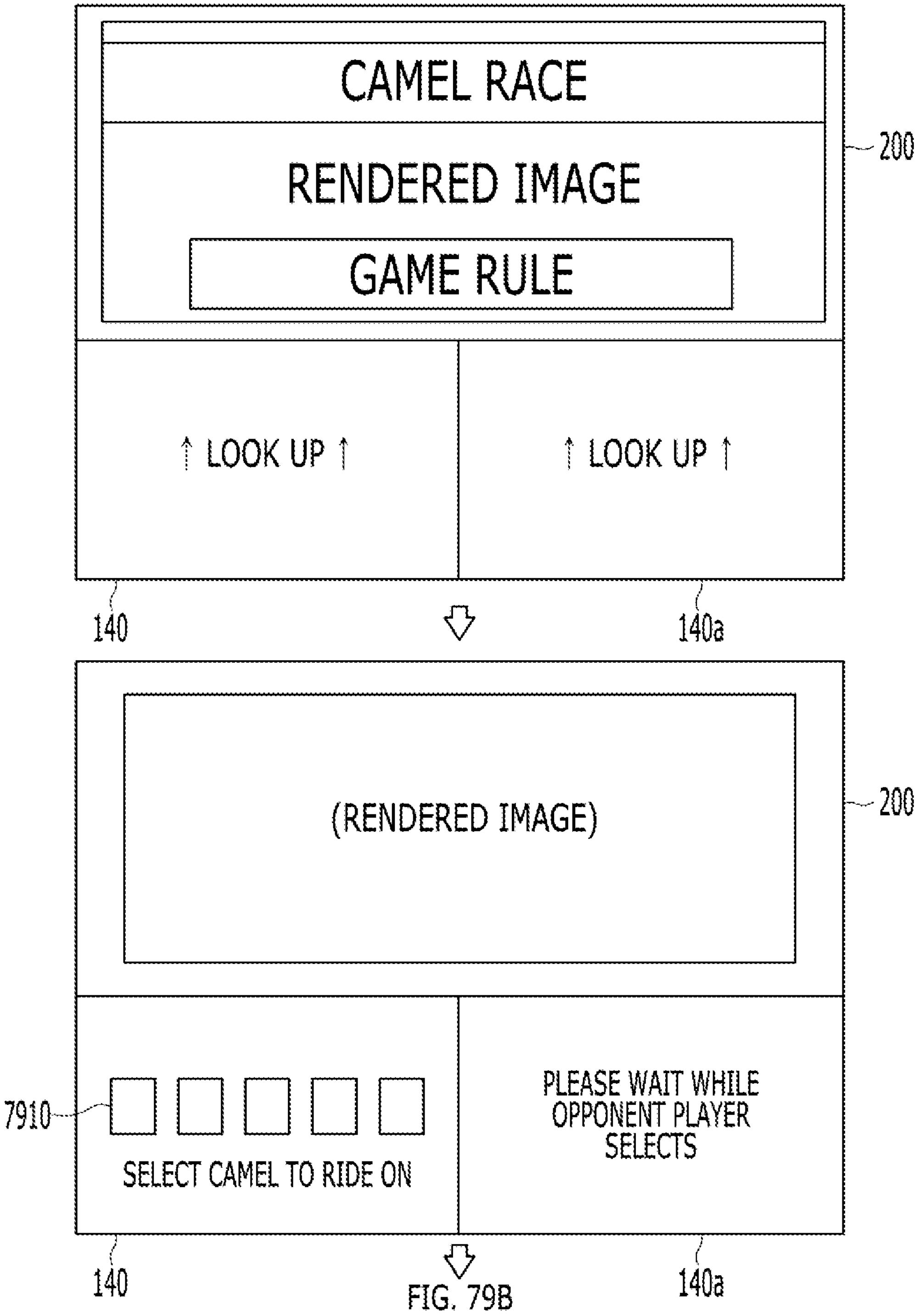
FIG. 79A, FIG. 79B and FIG. 79C show an example of a rendering picture at a camel race event determined in a versus event.
Figure 79B:
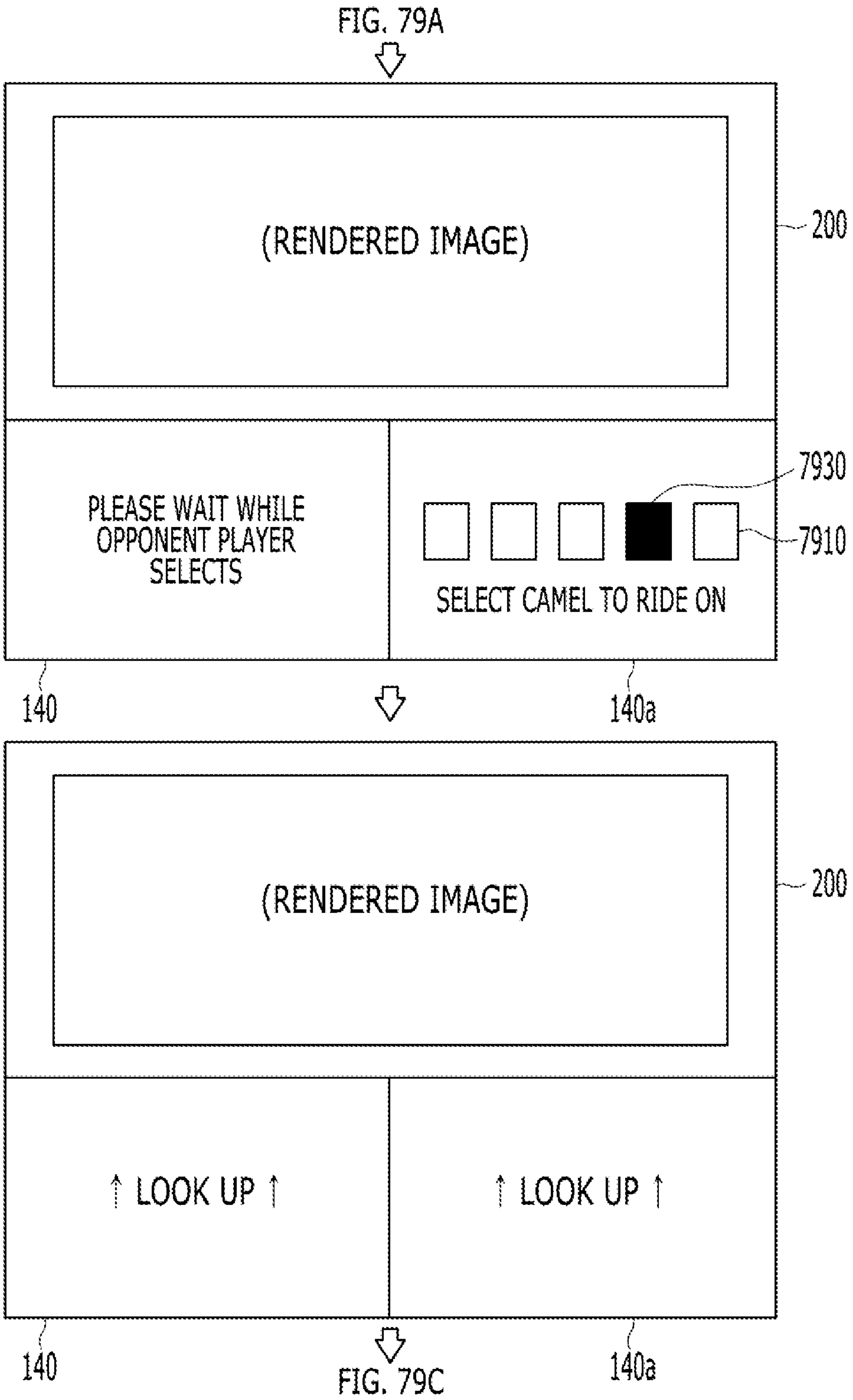
Figure 79C:
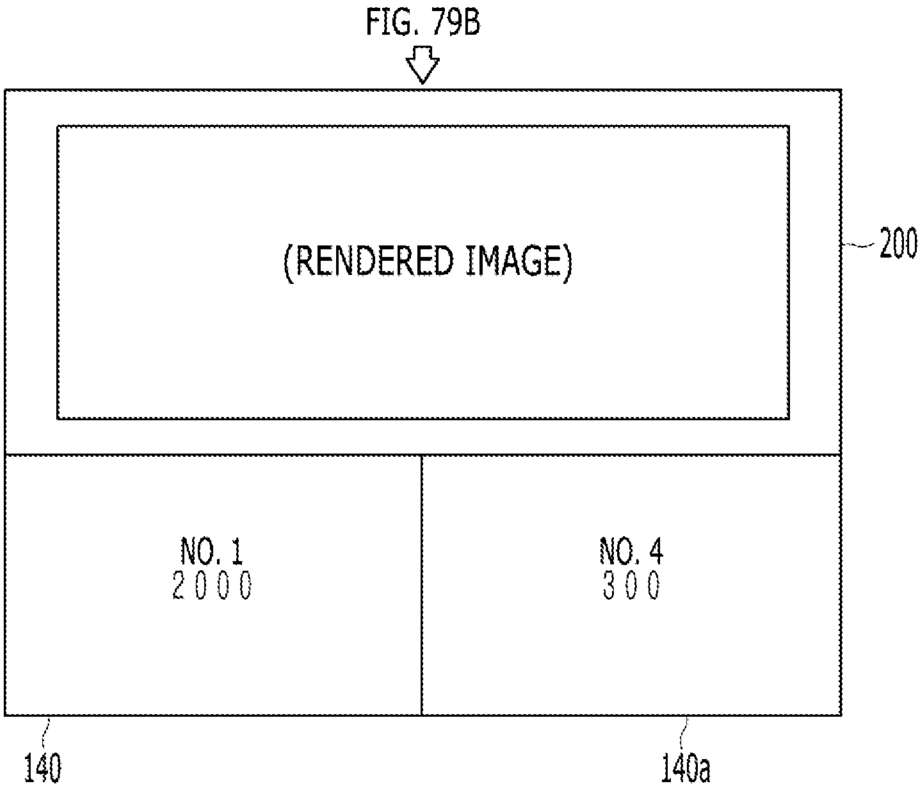

FIG. 79A, FIG. 79B and FIG. 79C show an example of a rendering picture at a camel race event determined in a versus event, and FIG. 80 shows an example of a ranking determination table for a camel race event shown in FIG. 79A to FIG. 79C.

When a camel race event is selected as the versus event, the common display 200 displays a title of the camel race event as shown in FIG. 79A. Next, the main display 140 of the gaming machine 100 displays a plurality of options 7910, and the plurality of options 7910 correspond to various camels. Further, the main display 140 informs the player to select any one of the plurality of options 7910. For example, the main display 140 displays "SELECT CAMEL TO RIDE ON." The main display 140*a* of the neighbor gaming machine 100*a* instructs the neighbor player to wait while the player of the gaming machine 100 selects any one option. Further, the common display 200 renders effects that the camels stand at the starting line, and displays payouts according to the ranking.

When the player selects any one option 7920, the common display 200 renders effects that the character of the player rides on the camel corresponding the selected option 7920. Further, the main display 140*a* of the neighbor gaming machine 100*a* displays the plurality of options 7910, and informs the neighbor player to select any one of the plurality of options 7910, as shown in FIG. 79B. At this time, the option 7920 selected by the player is displayed as an unselectable state. The main display 140 of the gaming machine 100 instructs the player to wait while the neighbor player selects any one option. When the neighbor player selects any one option, a camel race starts and the common display 200 renders the camel race. After the camel race ends, the common display 200 displays a plurality of characters that took part in the camel race and a ranking of each character. Further, the main displays 140 and 140*a* displays the ranking of a corresponding character and a payout according to the ranking, as shown in FIG. 79C. The versus event ends, and the common display 200 and the main displays 140 and 140*a* display a screen prior to the versus event.

In a certain embodiment, a ranking determination table may be stored in a memory. An example of the ranking determination table is shown in FIG. 80. As shown in FIG. 80, the ranking determination table includes a plurality of rankings, a payout of each ranking, and a selection probability of each ranking. Accordingly, the controller randomly determines the ranking of each character based on the ranking determination table, and provides the payout according to the ranking. Further, a player that first selects an option among the two players may be randomly determined.

Boating Event

FIG. 81A, FIG. 81B, FIG. 81C and FIG. 81D show an example of a rendering picture at a boating event determined in a versus event, FIG. 82A shows an example of a payout determination table for a boating event shown in FIG. 81A to FIG. 81D, and FIG. 82B shows an example of a distribution pattern table for a boating event shown in FIG. 81A to FIG. 81D.

Figures 81A, 81B:
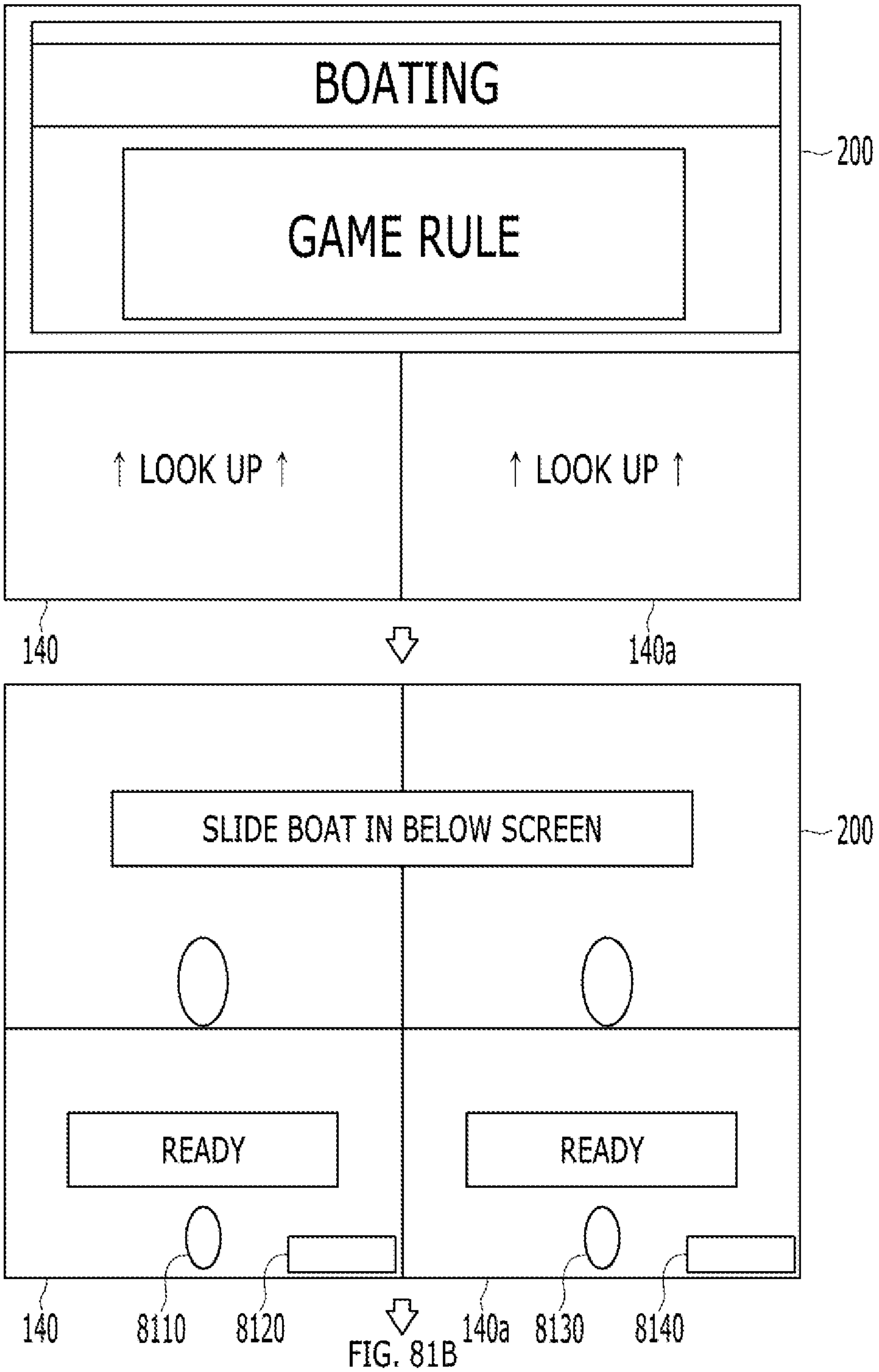
FIG. 81A, FIG. 81B, FIG. 81C and FIG. 81D show an example of a rendering picture at a boating event determined in a versus event.
Figure 81B:
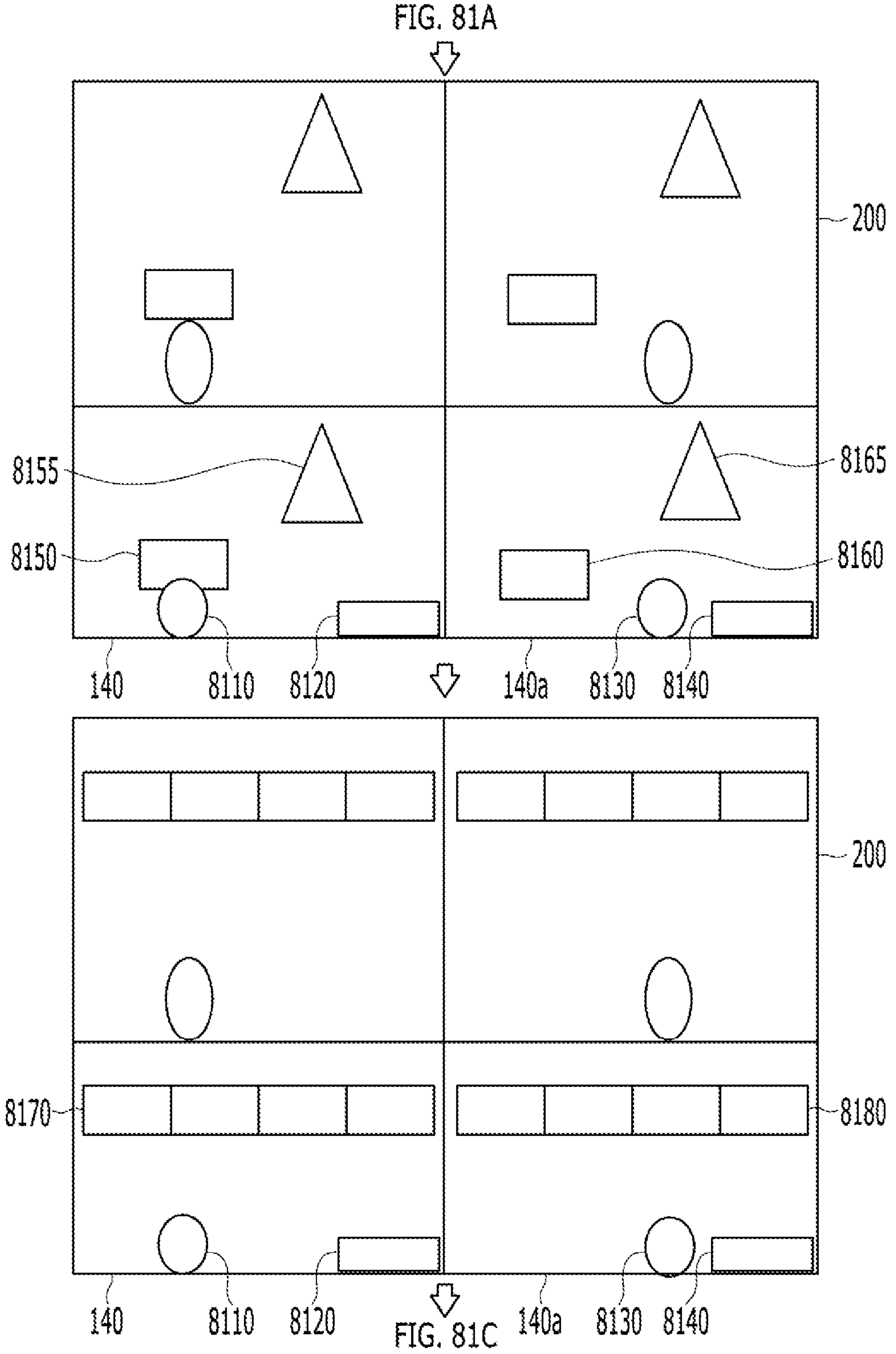

When a boating event is selected as the versus event, the common display 200 displays a title of the boating event as shown in FIG. 81A. Next, the main display 140 displays a boat 8110 on which the character of the player rides and a bonus win display section 8120. The main display 140*a* displays a boat 8130 on which the character of the neighbor player rides and a bonus win display section 8140. Further, the common display 200 displays the boats 8110 and 8130 of the player and the neighbor player as the main displays 140 and 140*a*, and informs the player and the neighbor player to slide the boats. Next, the main displays 140 and 140*a* display "READY" and then "START" to start a game.

When the game start, the main display 140 or 140*a* renders effects that boat 8110 or 8130 across a river, as shown in FIG. 81B. If the player or neighbor player slides a finger with touching an area where the boat 8110 or 8130 is displayed on the main display 140 or 140*a*, the boat 8110 or 8130 moves in a sliding direction. However, the boat 8110 or 8130 can move from side to side, but cannot move forward or backward. While the boat 8110 or 8130 across the river, the main display 140 or 140*a* displays a treasure box 8150 or 8160 and a rock 8155 or 8165. Each time the player or neighbor player slides the finger to obtain the treasure box 8150 or 8160, the main display 140 or 140*a* renders effects that a payout appears from the treasure box 8150 or 8160 and is added to a corresponding bonus win display section 8120 or 8140. When the boat 8110 or 8130 crashes the rock 8155 or 8160, the main display 140 or 140*a* renders effects that the boat 8110 or 8130 flies off in a left or right direction. Next, the main display 140 or 140*a* displays a final treasure box 8170 or 8180 to allow the boat 8110 or 8130 to always obtain the final treasure box 8170 or 8180. The payout obtained from the treasure boxes may be adjusted by a payout assigned to the final treasure box 8170 or 8180. In FIG. 81B, the common display 200 renders effects that are similar to the effects by the main displays 140 and 140*a*.

Figure 81C:
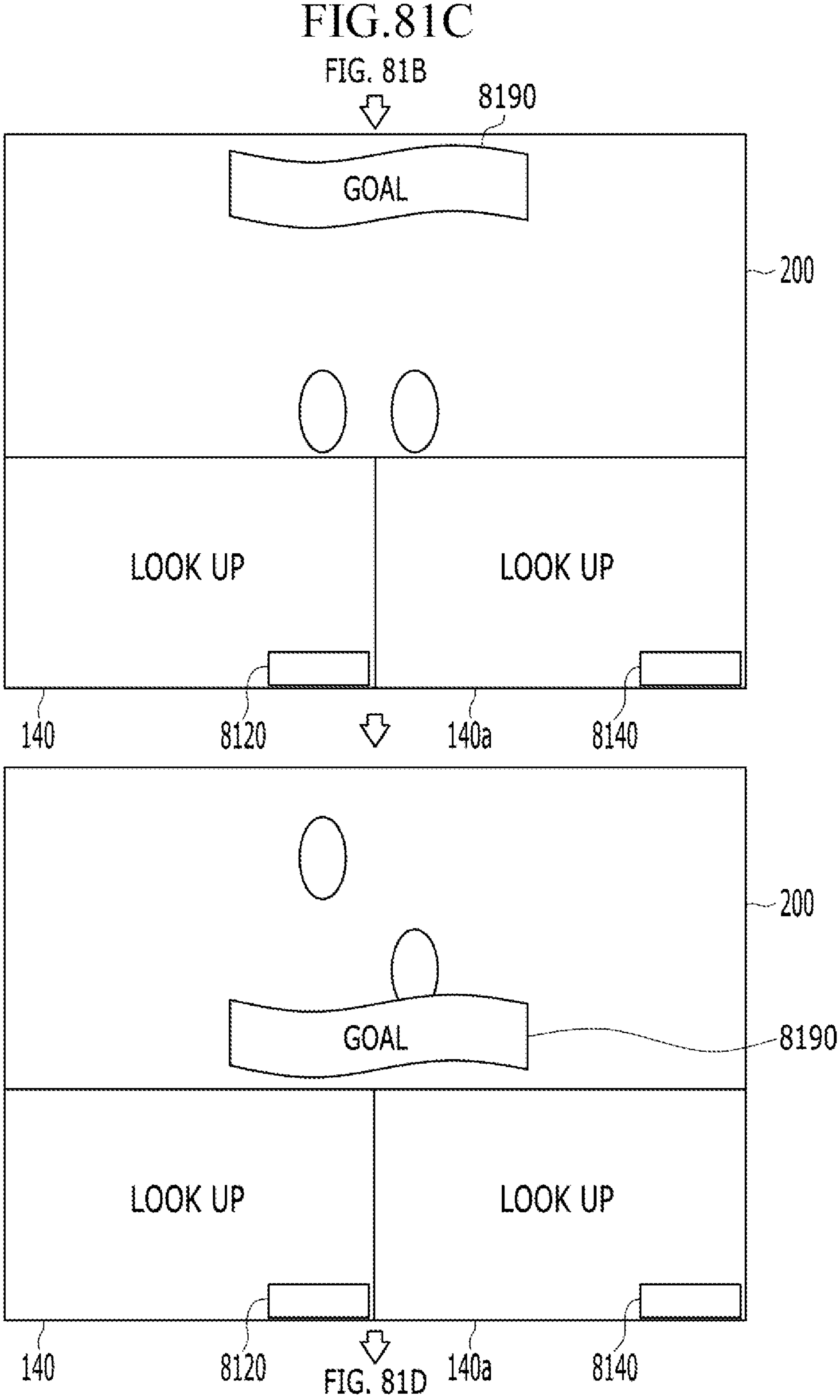

Next, the main displays 140 and 140*a* display "LOOK UP", and the common display 200 renders effects that the rivers of the two players meet and the boats 8110 and 8130 advance toward a goal 8190, as shown in FIG. 81C. Subsequently, the common display 200 renders effects that any one of the boats 8110 and 8130 arrives at the goal 8190.

Figure 81D:
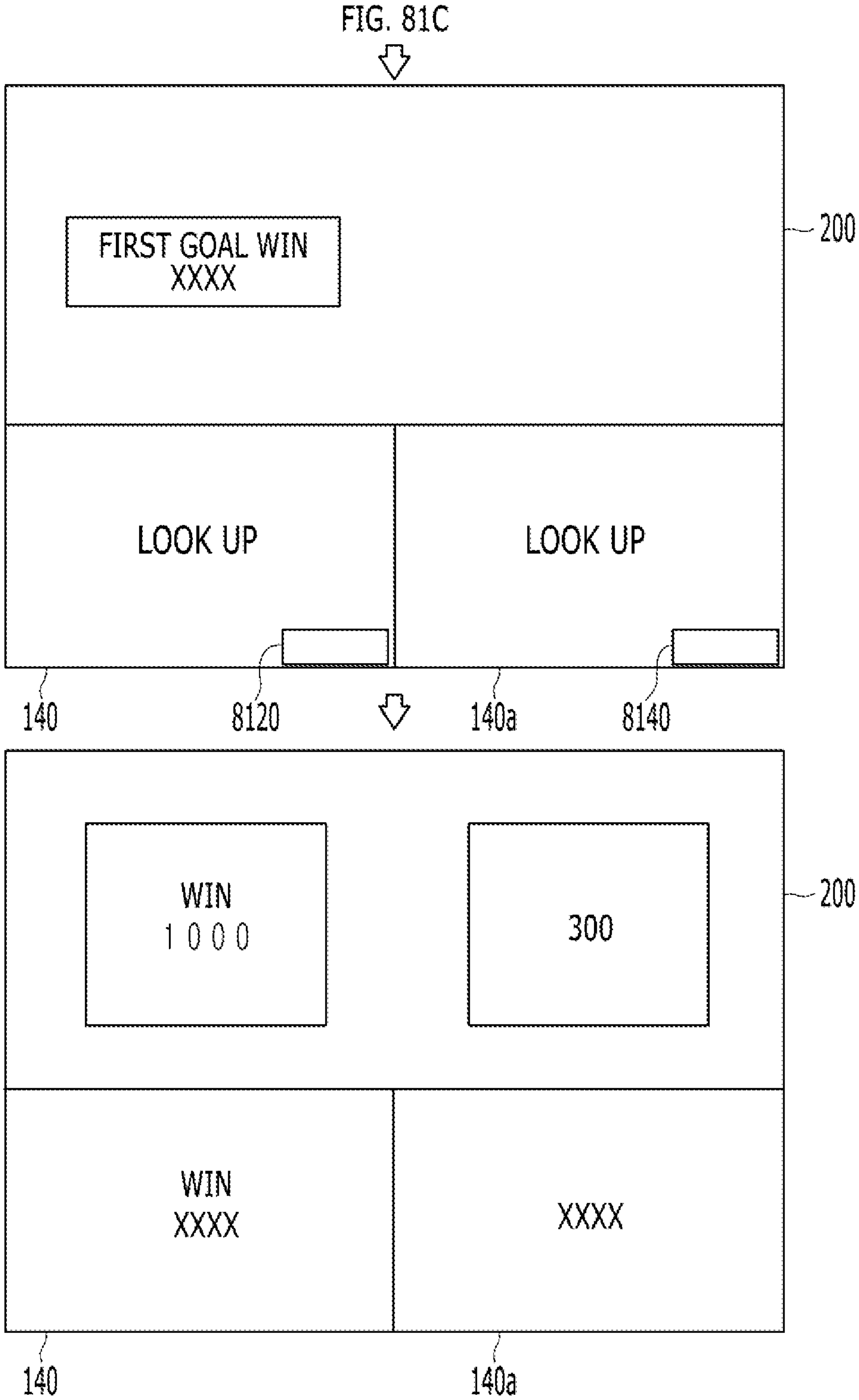

Next, the common display 200 displays a goal payout awarded to a winning player of a boat that first arrives at the goal among the two boats 8110 and 8130, as shown in FIG. 81D. For example, the common display 200 displays "FIRST GOAL WIN" and credits of the goal payout. Subsequently, the main display 140 of the winning player displays "WIN" and a total payout corresponding to a sum of the goal payout and a payout accumulated to the bonus win display section 8120, and the main display 140*a* of the losing player displays a payout accumulated to the bonus win display section 8140. Further, the common display 200 displays "WIN" and the total payout on a top display portion corresponding to the winning player, and displays the total payout on a top display portion corresponding to the losing player. The versus event ends, and the common display 200 and the main displays 140 and 140*a* display a screen prior to the versus event.

In a certain embodiment, the player of the boat that first arrives at the goal may be randomly determined. A payout determination table may be stored in a memory. An example of the payout determination table is shown in FIG. 82A. As shown in FIG. 82A, the payout determination table includes a plurality of payouts and a selection probability of each payout. The controller randomly determines the total payout obtained the treasure boxes based on the payout determination table, and distributes the determined total payout to the treasure boxes obtained by the player. In this case, the controller may distribute the determined total payout based on a distribution pattern. For example, when the total payout is 340 credits and pattern 1 is selected in an example of the distribution pattern shown in FIG. 82B, four percent (13.6 credits) of 340 credits are rounded down to 10 credits and 10 credits are assigned to the first treasure box obtained by the player. Next, since remaining payout is 330 credits, eight percent (26.4 credits) of 330 credits are rounded down to 20 credits and 20 credits are assigned to the second treasure box obtained by the player. Since remaining payout is 310 credits, fourteenth percent (43.4 credits) of 310 credits are rounded down to 40 credits and 40 credits are assigned to the third treasure box obtained by the player. If the player fails to obtain the treasure box after obtaining the third treasure box, the remaining payout (270 credits) is assigned to the last treasure box. On the other hand, when the distributed payout is less than 10 credits, 10 credits may be assigned to the treasure box. As such, the total payout can be distributed to the treasure boxes obtained by the player regardless of the number of the treasure boxes obtained by the player.

Coconut Dropping Event

Figures 83A, 83B:
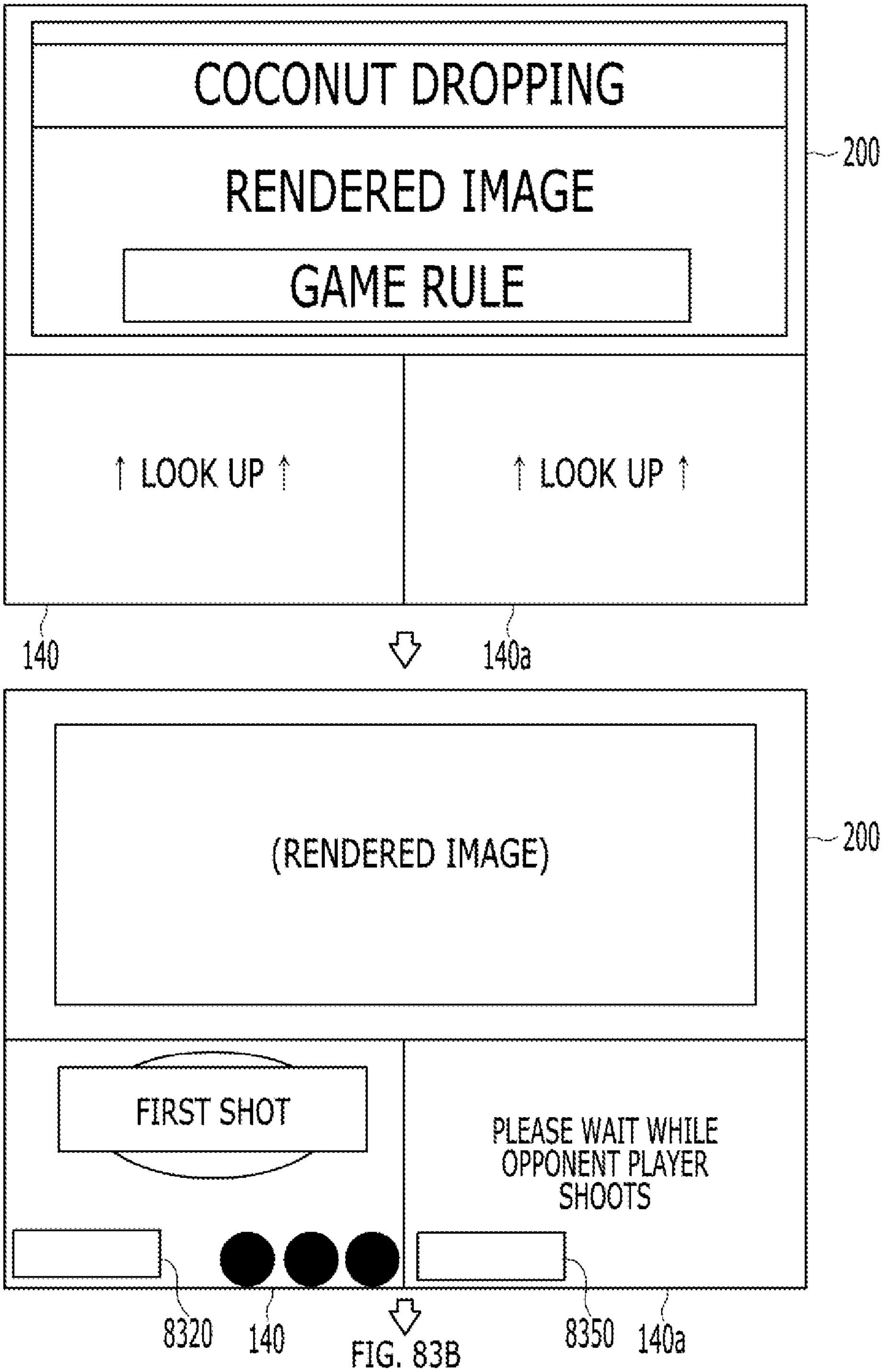
FIG. 83A, FIG. 83B and FIG. 83C show an example of a rendering picture at a coconut dropping event determined in a versus event.
Figure 83B:
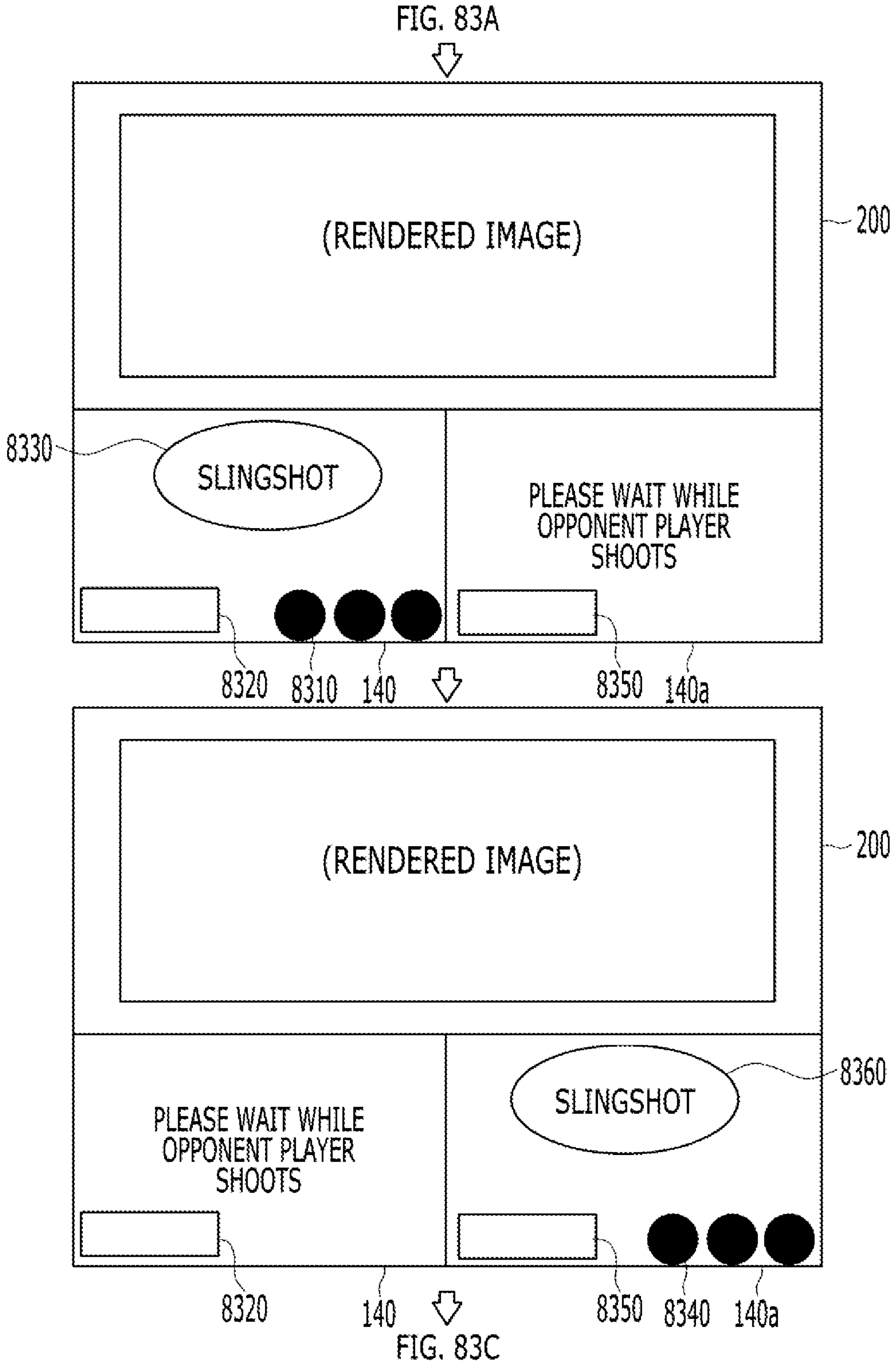
Figure 83C:
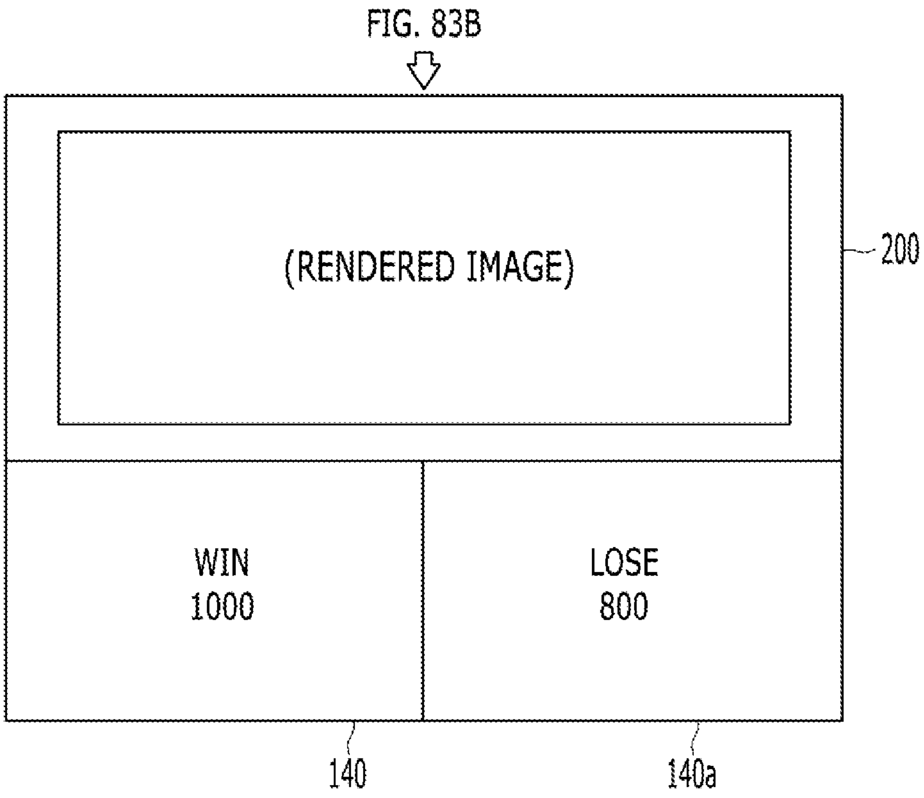

FIG. 83A, FIG. 83B and FIG. 83C show an example of a rendering picture at a coconut dropping event determined in a versus event.

When a coconut dropping event is selected as the versus event, the common display 200 displays a title of the coconut dropping event as shown in FIG. 83A. Next, the common display 200 displays an image for a coconut palm having a lot of coconuts. The main display 140 displays remaining bullets 8310 and a bonus win display section 8320, and may display how many shots a current shot is. The main display 140*a* of the neighbor gaming machine 100*a* instructs the neighbor player to wait while the player of the gaming machine 100 shoots.

Next, the main display 140 displays a slingshot 8330 such that the player can slide a finger with touching an area where a band of the slingshot is displayed, as shown in FIG. 83B. The player can shoot the bullet of the slingshot 8330 by pulling the band of the slingshot 8330 by touching the area. The common display 200 displays effects that the bullet is shot according to a trajectory determined by a pulling direction and a pulling strength. When the bullet hits any one of the coconuts, the common display 200 displays effects that the hit coconut is dropped and a payout appears from the hit coconut. The payout is added to the bonus win display section 8320. Next, the main display 140*a* of the neighbor player displays remaining bullets 8340 and a bonus win display section 8350, and may display how many shots a current shot is. The main display 140 of the player instructs the player to wait while the neighbor player shoots. The neighbor shoots the bullet of the slingshot 8360 by pulling the band of the slingshot 8330. When the bullet hits any one of the coconuts, the common display 200 displays effects that the hit coconut is dropped and a payout appears from the hit coconut. The payout is added to the bonus win display section 8350.

A process for the player and the neighbor player to shoot the bullet is repeated until the remaining bullets of the player and the neighbor player are zero. A player that obtains a higher total payout wins among the two players. The main display 140 of the winning player displays "WIN" and the total payout accumulated to the bonus win display section 8320, and the main display 140*a* of the losing player displays the total payout accumulated to the bonus win display section 8350, as shown in FIG. 83C. Further, the common display 200 renders effects that the winning player is pleased and the losing player is disappointed. The versus event ends, and the common display 200 and the main displays 140 and 140*a* display a screen prior to the versus event.

In a certain embodiment, a player that first shoots the bullet among the two players may be randomly determined. Further, as described with reference to FIG. 82A and FIG. 82B, the controller may randomly determine the total payout, and distribute the total payout to the coconuts hit by the player.

Roc's Egg Event

Figure 84A:
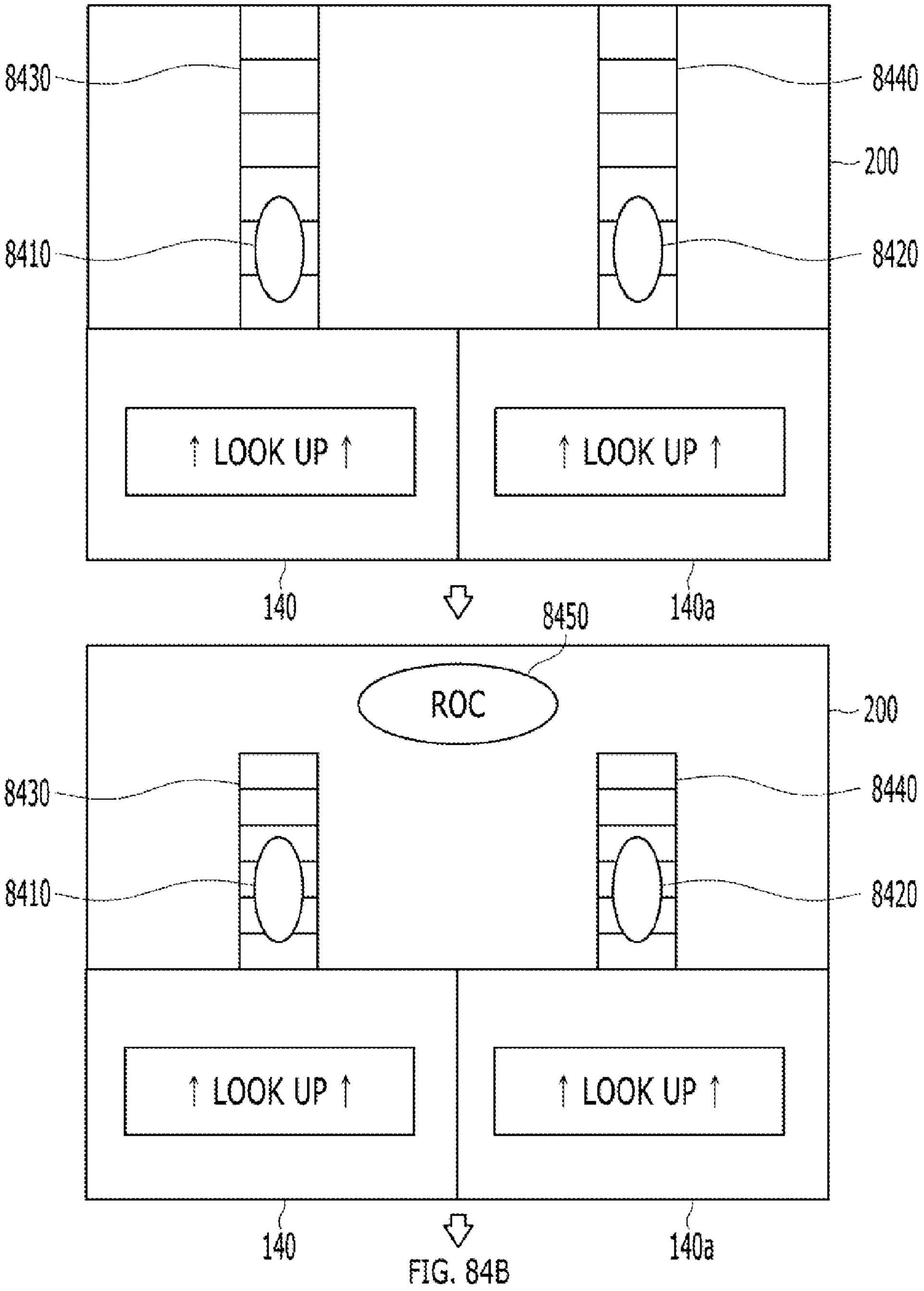
FIG. 84A and FIG. 84B show an example of a rendering picture at a Roc's egg event determined in a versus event.
Figure 84B:
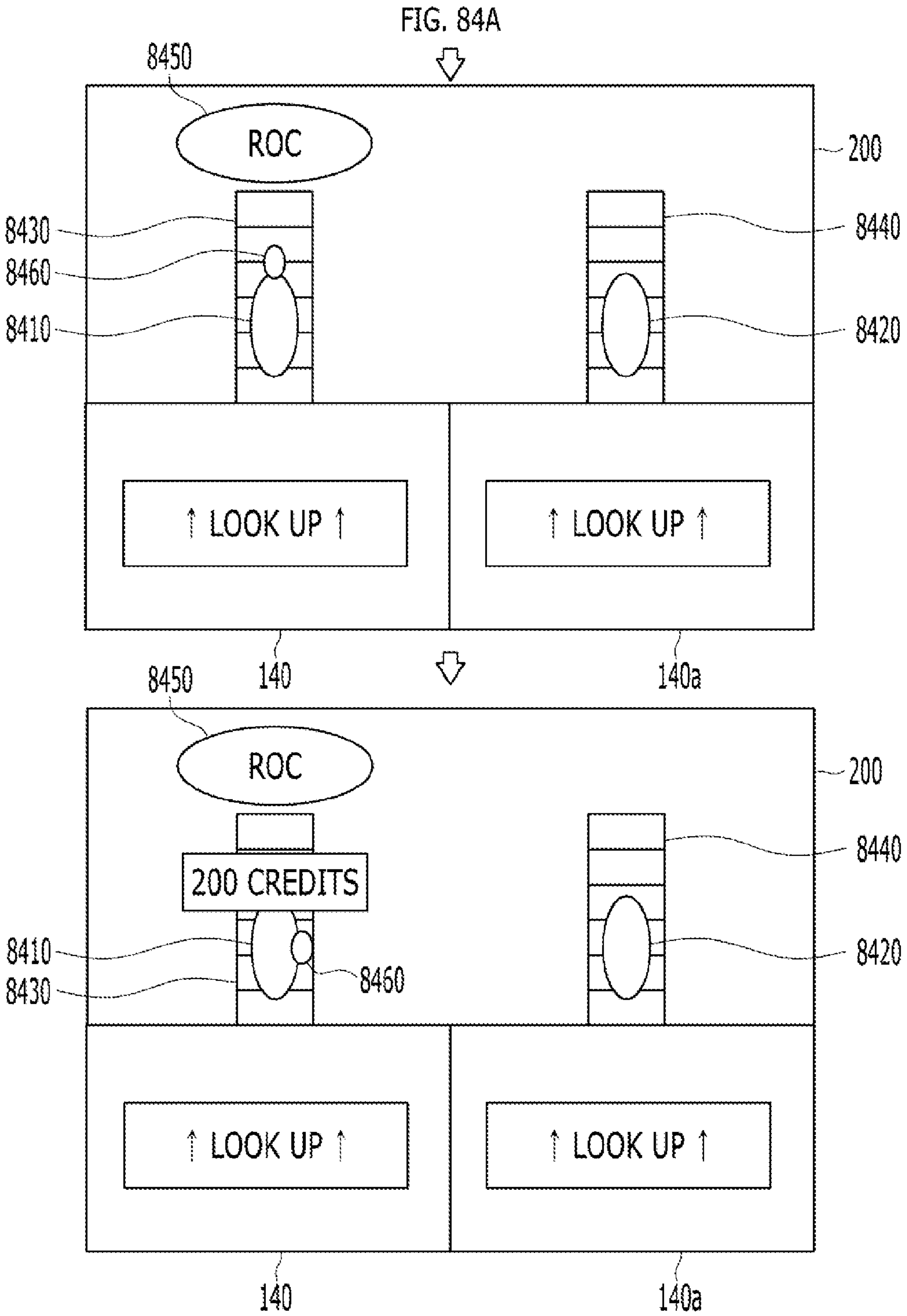

FIG. 84A and FIG. 84B show an example of a rendering picture at a Roc's egg event determined in a versus event.

When a Roc's egg event is selected as the versus event, the main displays 140 and 140*a* render effects that a screen is closed by shutters, and display "LOOK UP." Next, the common display 200 displays the character 8410 of the player and the character 8420 of the neighbor player on maps 8430 and 8440, respectively, as shown in FIG. 84A. Subsequently, the common display 200 renders effects that the Roc 8450 appears, and renders effects that the RoC 8450 thinks whether to take action on the character 8410 or the neighbor character 8420.

Next, the common display 200 renders effects that the Roc 8450 drop an egg 8460 to any one of the characters 8410 and 8420, as shown in FIG. 84B. The player of the character 8410 receiving the egg 8460 of the Roc 8450 becomes a winning player. Subsequently, the common display 200 renders effects that the egg 8460 is cracked, a payout appears from the cracked egg 8460, and the character 8410 of the winning player is pleased. Further, the main display 140 of the winning player displays the payout. The versus event ends, and the common display 200 and the main displays 140 and 140*a* display a screen prior to the versus event.

In a certain embodiment, the winning player may be randomly determined. Further, the controller may randomly determine a payout of the Roc's egg event based on a payout determination table storing a plurality of payouts and a selection probability of each payout.

Roc Shooting Event

Figure 85A:
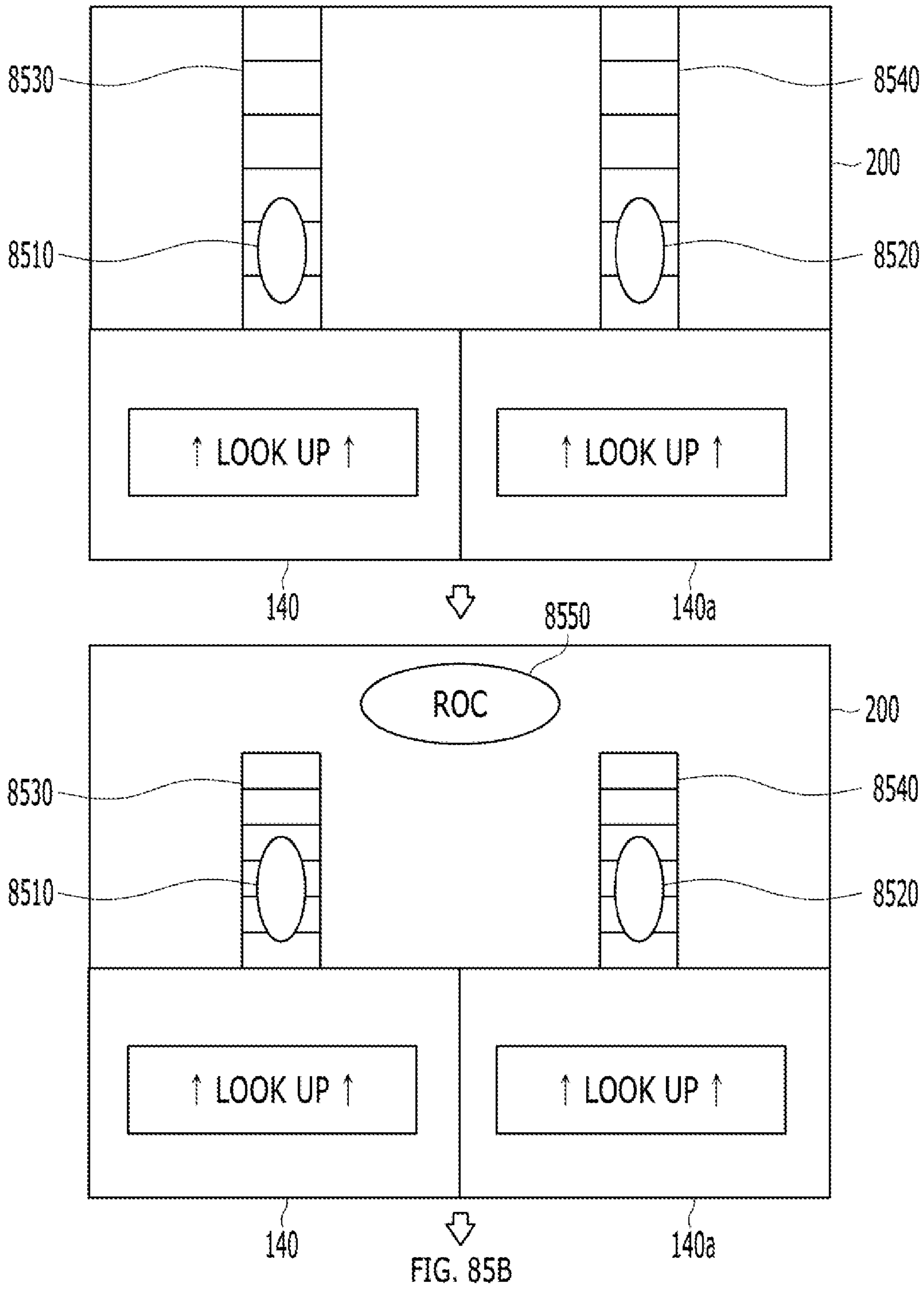
FIG. 85A, FIG. 85B, FIG. 85C, FIG. 85D and FIG. 85E show an example of a rendering picture at a Roc shooting event determined in a versus event.
Figure 85B:
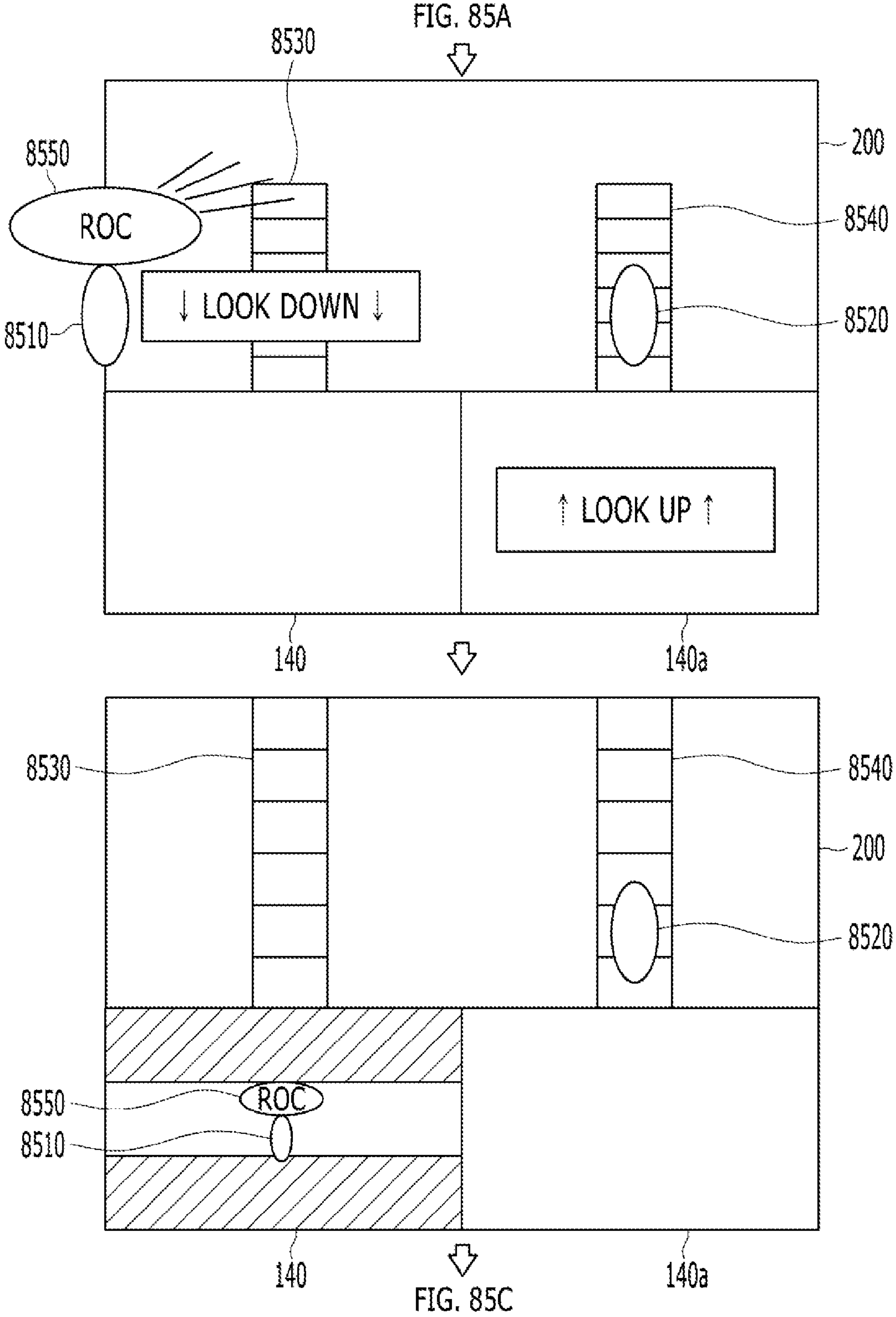
Figures 85B, 85C, 85D:
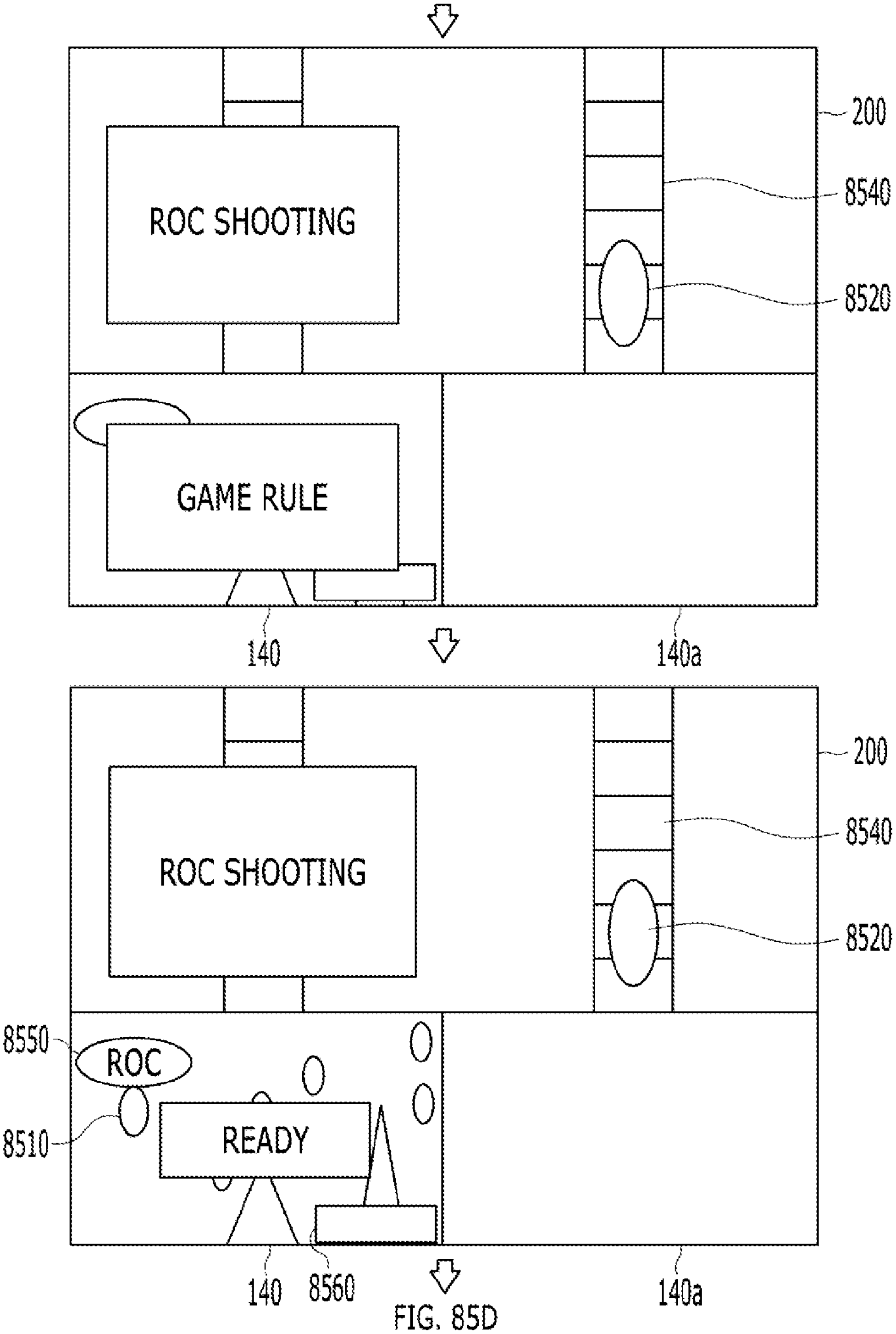
Figures 85C, 85D, 85E:
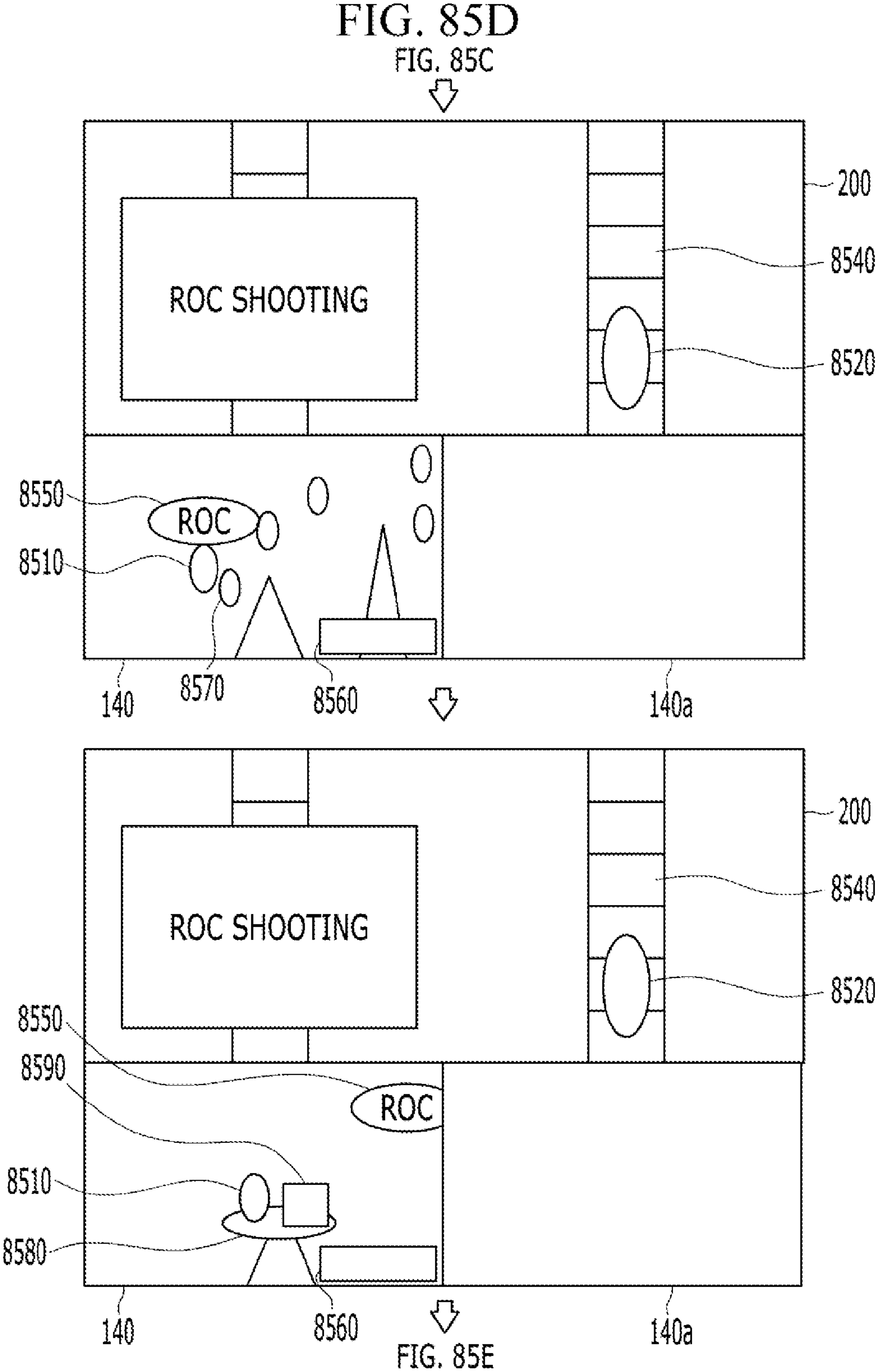
Figure 85E:
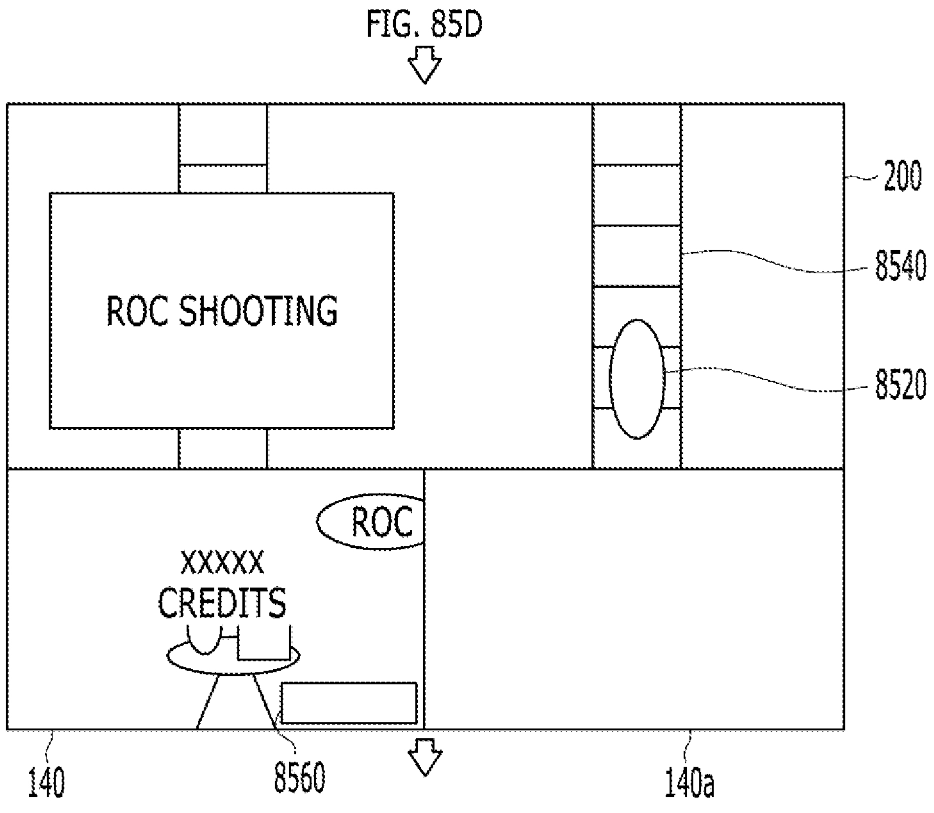
Figure 86:
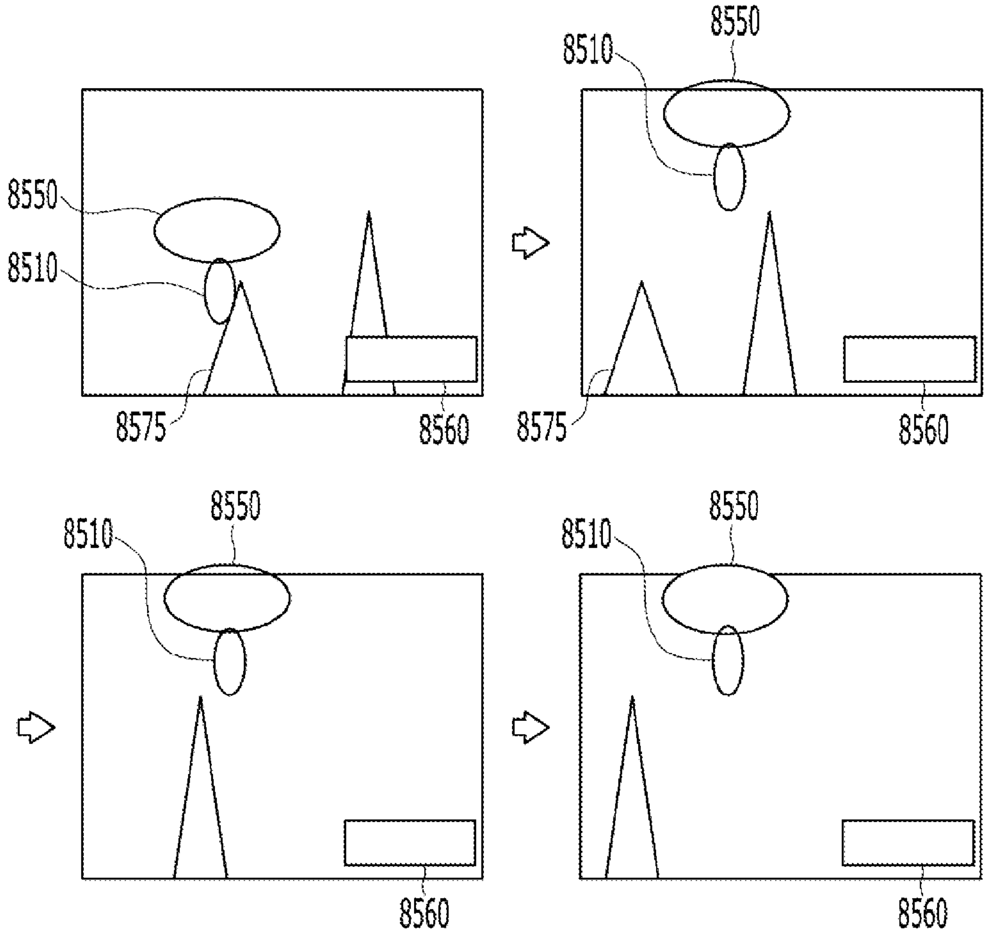
FIG. 86 show an example of another rendering picture at a Roc shooting event determined in a versus event.

FIG. 85A, FIG. 85B, FIG. 85C, FIG. 85D and FIG. 85E show an example of a rendering picture at a Roc shooting event determined in a versus event, and FIG. 86 show an example of another rendering picture at a Roc shooting event determined in a versus event.

When a Roc shooting event is selected as the versus event, the main displays 140 and 140*a* render effects that a screen is closed by shutters, and display "LOOK UP." Next, the common display 200 displays the character 8510 of the player and the character 8520 of the neighbor player on maps 8530 and 8540, respectively, as shown in FIG. 85A. Subsequently, the common display 200 renders effects that the Roc 8550 appears, and renders effects that the RoC 8550 thinks whether to take action on the character 8510 or the neighbor character 8520.

Next, the common display 200 renders effects that the Roc 8550 takes any one of the characters 8510 and 8520 away, as shown in FIG. 85B. In this case, the player of the character 8510 taken by the Roc 8550 becomes a winning player. The common display 200 displays "LOOK DOWN" on the map 8530 of the winning player. Subsequently, the common display 200 renders effects that the character 8520 of the losing player is relieved, and the main display 140 renders effects that a closed screen is open and the Roc 8550 and the character 8510 appear. In this case, the main display 140*a* of the losing player and a corresponding top display portion of the common display 200 display a screen prior to the versus event.

Next, the common display 200 displays a title of the Roc shooting event on a top display portion of the winning player, and the main display 140 displays a game rule, as shown in FIG. 85C. Subsequently, the main display 140 displays "READY" and then "START" to starts a game. Further, the main display 140 displays a bonus win display section 8560.

When the game starts, the Roc 8550 gradually descends. Each time the player of the character 8510 presses a spin button (153 of FIG. 3), the Roc 8550 rises little by little. As shown in FIG. 85D, the main display 140 displays a plurality of coins 8570. Each time the character 8510 touches any one of the plurality of coins 8570, the touched coin is vanished and a payout appears from the vanished coin. Further, credits of the payout are added to the bonus win display section 8560. Finally, the main display 140 renders effects that the Roc 8550 drops the character 8510 on an island 8580 having a treasure box 8590 and flies away. Subsequently, the main display 140 renders effects that the character 8510 opens the treasure box and is pleased, and a payout appears from the treasure box. Next, the main display 140 and a corresponding top display portion of the common display 200 display a total payout corresponding to a sum of the payout from the treasure box and payouts accumulated to the bonus win display section 8560, as shown in FIG. 85E. Subsequently, the main display 140 of the winning player and a corresponding top display portion of the common display 200 display a screen prior to the versus event. In this case, a background on which the plurality of coins 8750 appear may be varied. That is, a plurality of backgrounds may be stored in a memory, and any one background may be randomly selected from among the plurality of backgrounds. Accordingly, a random selection can prevent the player from remembering positions at which the coins 8570 appears to obtain all of the coins.

When the character 8510 hits a crag 8575, the main display 140 renders effects that the Roc 8550 and the character 8510 are in pain and are flied to a top part of the screen, as shown in FIG. 86. Further, the main display 140 displays the Roc 8550 and the character 8510 translucently such that the player cannot control the Roc 8550. Accordingly, the player cannot obtain the coin by controlling the Roc 8550. After a predetermined time is lapsed, the main display 140 displays the Roc 8550 and the character 8510 normally such that the player can control the Roc 8550, as shown in FIG. 86.

In a certain embodiment, the winning player of may be randomly determined. Further, as described with reference to FIG. 82A and FIG. 82B, the controller may randomly determine the total payout, and distribute the total payout to the coins obtained by the player and the treasure box.

Error in Versus Event

Figures 87A, 87B:
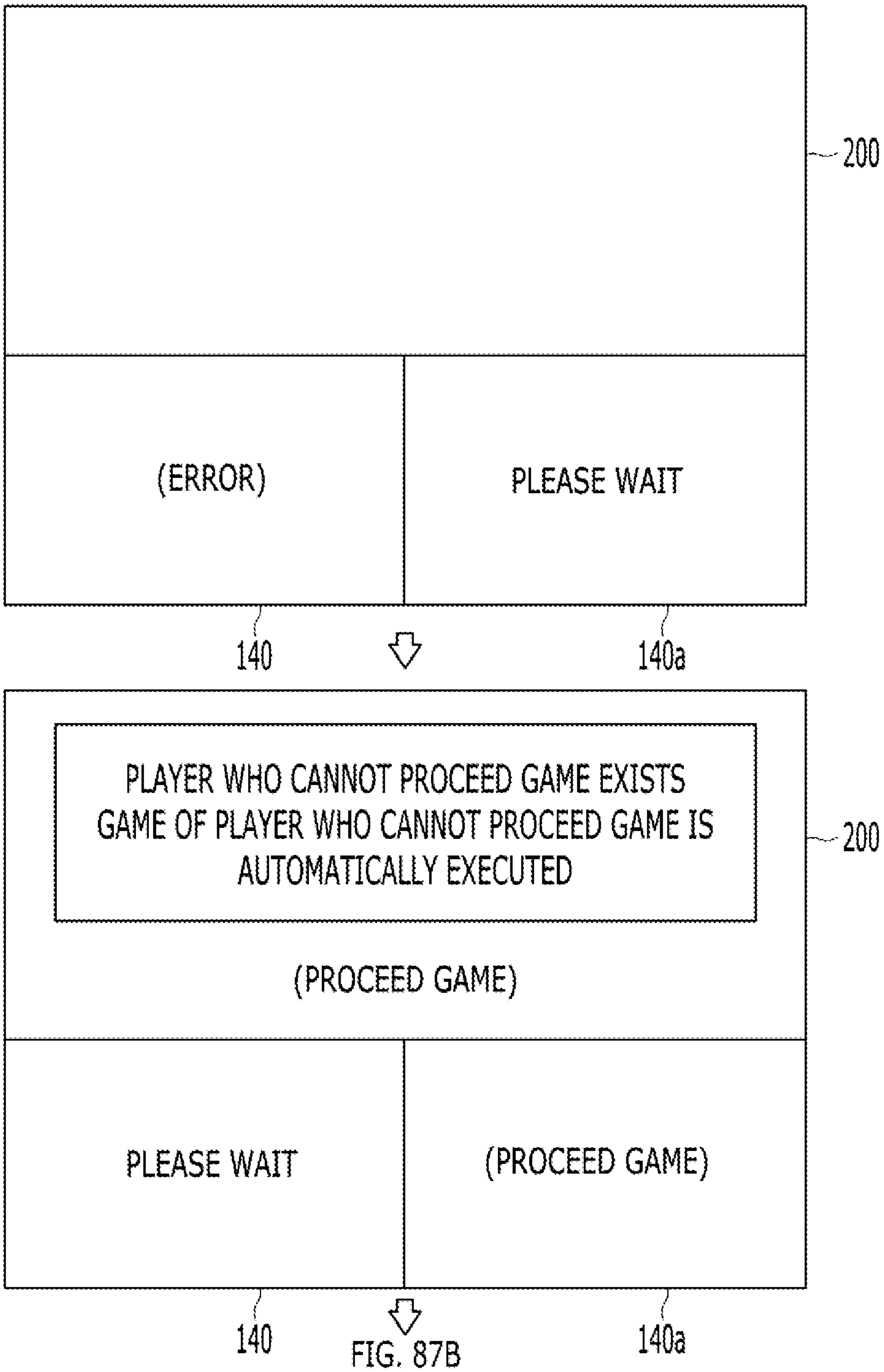
FIG. 87A and FIG. 87B show an example of a rendering picture at an error of a versus event.
Figure 87B:
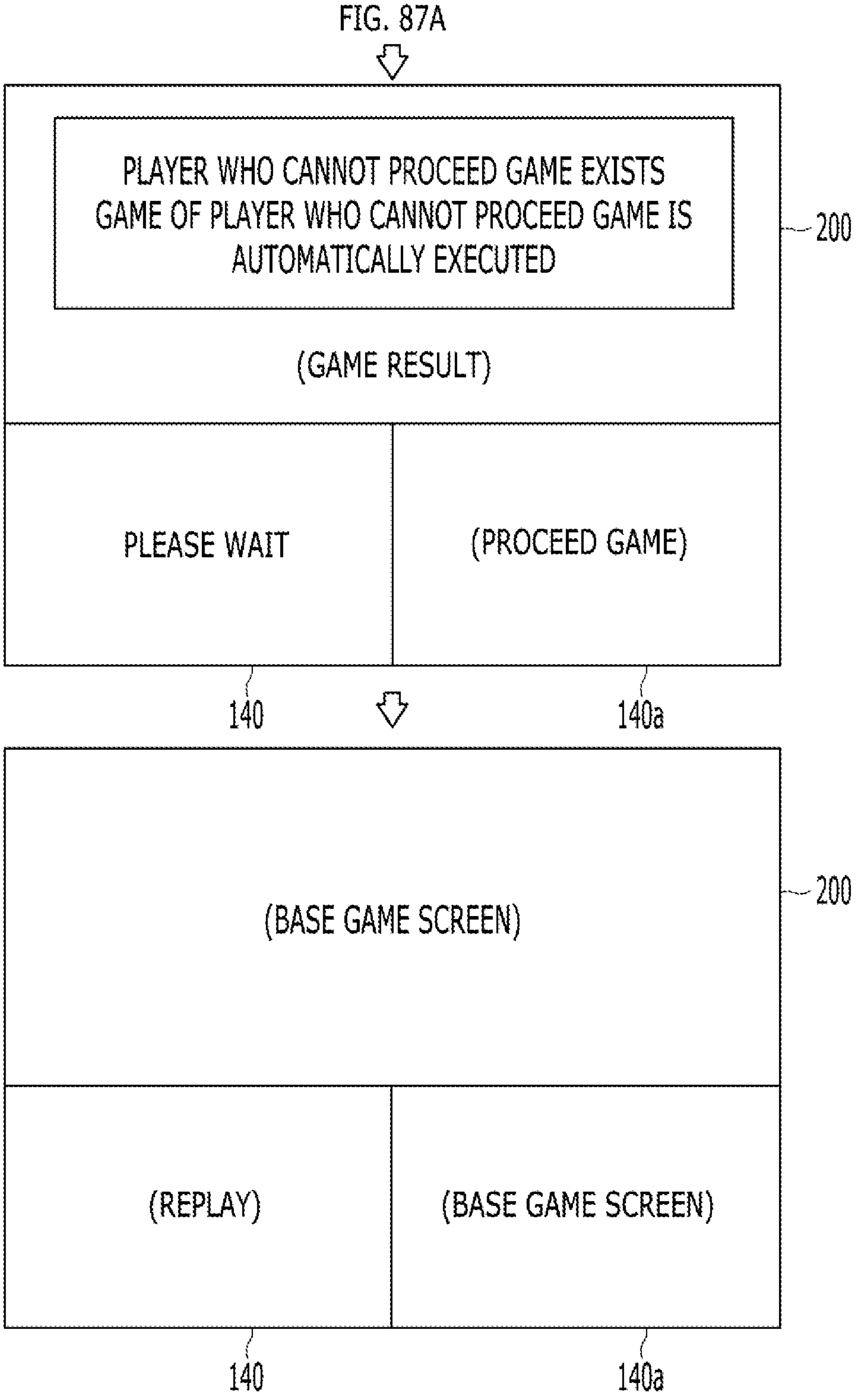

FIG. 87A and FIG. 87B show an example of a rendering picture at an error of a versus event.

When the versus event is performed, an error may occur at any of the gaming machine 100 and the neighbor gaming 100*a*. For example, when the error occurs at the gaming machine 100, the main display 140*a* of the neighbor gaming machine 100*a* displays "PLEASE WAIT" as shown in FIG. 87A. Next, the neighbor gaming machine 100*a* executes a game of the versus event normally, and the controller automatically performs a game of the versus event for the gaming machine 100. That is, the option is automatically selected or the action is automatically performed for the player of the gaming machine 100, in the versus event. In this case, the common display 200 notifies that a player who cannot proceed a game exists and a game of the player who cannot proceed the game is automatically executed. Further, the main display 140 of the gaming machine 100 displays "PLEASE WAIT."

After the versus event ends, the common display 200 and the main display 140*a* of the neighbor gaming machine 100*a* display a game result including "WIN" or "LOSE" and a payout, as shown in FIG. 87B. The common display 200 and the main display 140*a* of the neighbor gaming machine 100*a* return a base game. The main display 140 of the gaming machine 100 replays the versus event. After the replay of the versus event ends, the main display 140 of the gaming machine 100 return a base game.

As described above, embodiments of the present invention, the gaming machine 100 or the gaming system 10 can provide the player with the versus event for competing with the neighbor player, thereby attracting the player's interest. Further, since the entry right for the versus event is determined by the drawing and is stored until the entry right is exhausted by executing the versus event, the gaming machine 100 or the gaming system 10 can make the player continuously play the game to obtain the entry right or to enter for the versus event. Furthermore, while the bonus game using the common display is performed in the neighbor player, the gaming machine 100 or the gaming system 10 does not perform the first type event for only one player. As a result, the bonus game of the neighbor player can be unaffected by the player.

Mysterious Bonus Game

FIG. 88A and FIG. 88B show examples of mysterious bonus determination tables for a mysterious bonus game according to an embodiment of the present invention.

According to an embodiment of the present invention, a mysterious bonus game is randomly triggered while a player plays a bonus game. A trigger of the mysterious bonus game is randomly determined each time a bonus round of the bonus game is executed.

In a certain embodiment, a triggering probability of the mysterious bonus game may depend on a current position on the map and an entry right of the versus event. That is, the gaming machine 100 may store two mysterious bonus determination tables in a memory. The gaming machine 100 performs drawing of the mysterious bonus game based on the mysterious bonus determination tables of pattern 1 when the player does not have the entry right of the versus event, and performs drawing of the mysterious bonus game based on the mysterious bonus determination tables of pattern 2 when the player has the entry right of the versus event. Examples of the mysterious bonus determination tables of patterns 1 and 2 are shown in FIG. 88A and FIG. 88B, respectively. As shown in FIG. 88A and FIG. 88B, each mysterious bonus determination table stores mappings between each position of each map and a triggering probability of a corresponding position. Further, as shown in FIG. 88A and FIG. 88B, the triggering probability of the mysterious bonus game when the player has the entry right is higher than the triggering probability of the mysterious bonus game when the player does not have the entry right.

In a certain embodiment, a payout of the mysterious bonus game may be determined by a product of a default credit value of a payout for the mysterious bonus game and a magnitude of a BET amount.

In a certain embodiment, the mysterious bonus game may include various events, for example, a Roc's egg event and a Roc shooting event. When the mysterious bonus game is triggered, any one event may be randomly selected from among the various events.

Roc's Egg Event

Figures 89A, 89B:
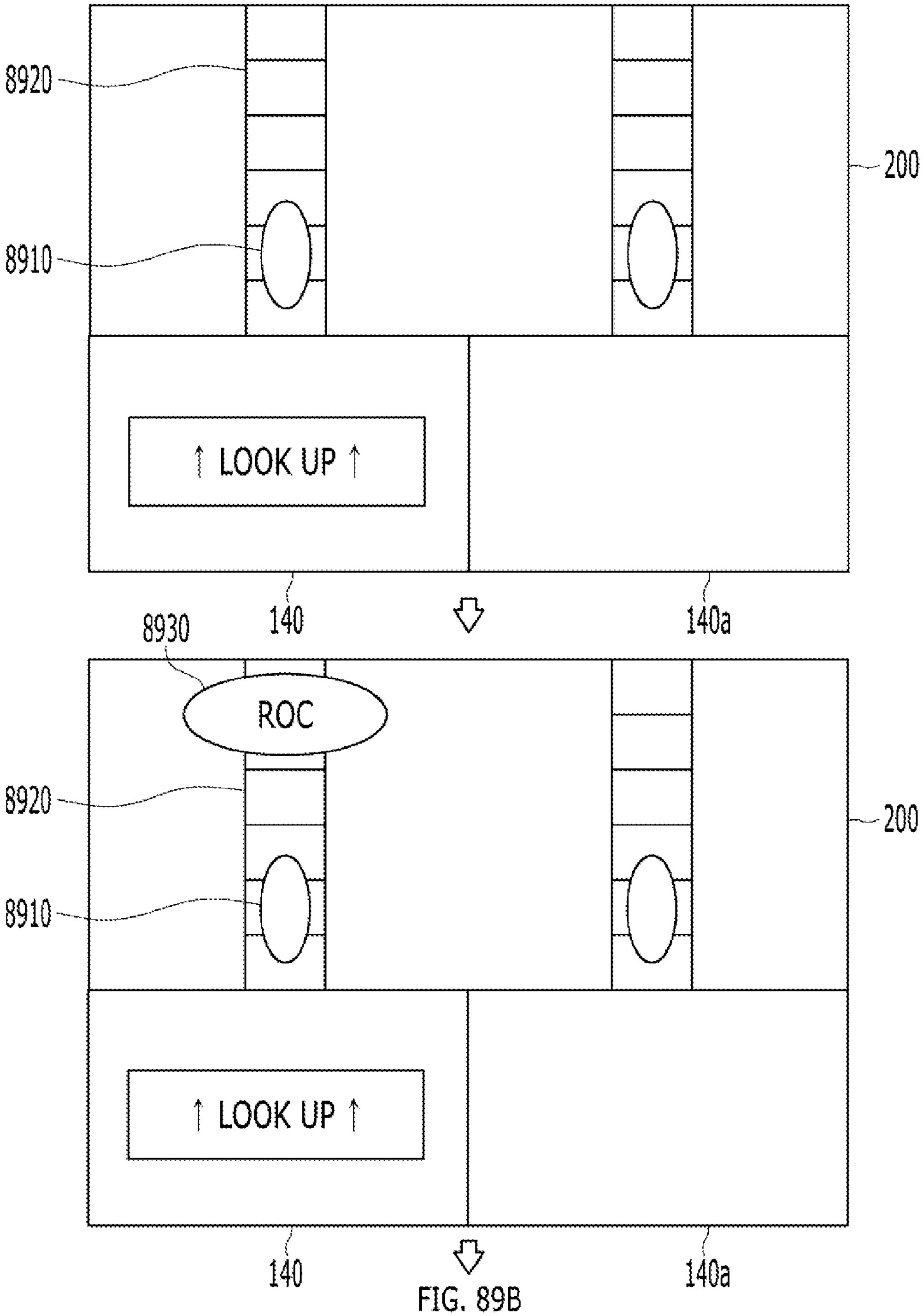
FIG. 89A and FIG. 89B show an example of a rendering picture at a Roc's egg event determined in a mysterious bonus game.
Figure 89B:
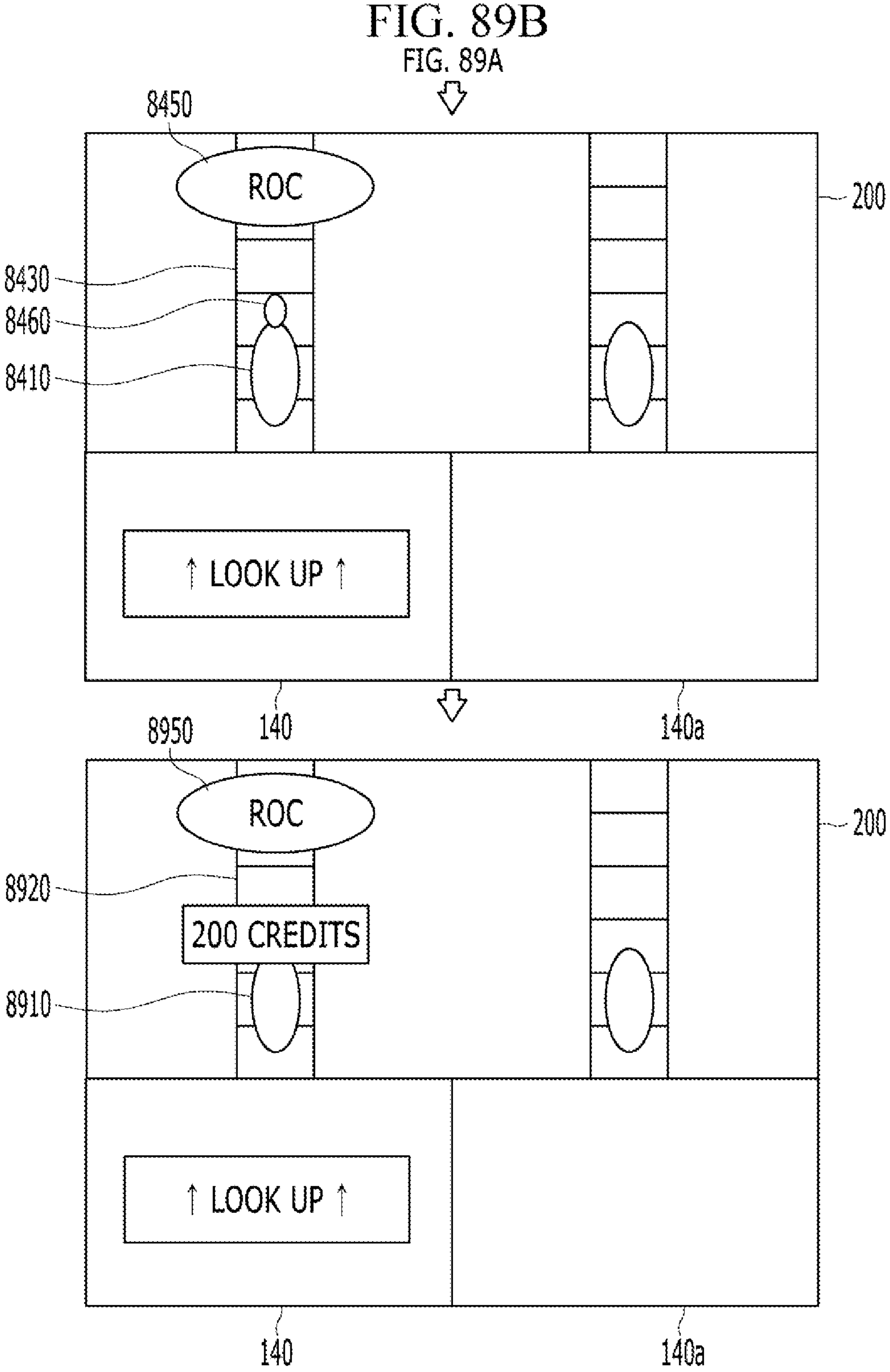

FIG. 89A and FIG. 89B show an example of a rendering picture at a Roc's egg event determined in a mysterious bonus game.

When the mysterious bonus game is triggered in a certain bonus round of the bonus game and a Roc's egg event is selected as the mysterious bonus game, the main display 140 renders effects that a screen is closed by shutters, and displays "LOOK UP." Next, the common display 200 renders effects that the Roc 8910 appears on a map 8920 at which the character 8930 of the gaming machine 100 is located, as shown in FIG. 89A. Subsequently, the common display 200 renders effects that the RoC 8910 thinks whether to take action on the character 8930. In this case, the main display 140 displays "LOOK UP."

Next, the common display 200 renders effects that the Roc 8910 drop an egg 8940 to the characters 8930 as shown in FIG. 89B. Subsequently, the common display 200 renders effects that the egg 8940 is cracked, a payout appears from the cracked egg 8940, and the character 8930 is pleased. Further, the main display 140 displays the payout. The mysterious bonus game ends, and the common display 200 and the main display 140 display a screen of the certain bonus round prior to the mysterious bonus game.

On the other hand, while the mysterious bonus game is executed in the gaming machine 100, the neighbor gaming machine 100*a* maintains a game that is executed by the neighbor player.

In a certain embodiment, the gaming machine 100 may randomly determine a payout of the Roc's egg event based on a payout determination table storing a plurality of payouts and a selection probability of each payout.

Roc Shooting Event

FIG. 90A, FIG. 90B, FIG. 90C, FIG. 90D and FIG. 90E show an example of a rendering picture at a Roc shooting event determined in a mysterious bonus game.

When the mysterious bonus game is triggered in a certain bonus round of the bonus game and a Roc shooting event is selected as the mysterious bonus game, the main display 140 renders effects that a screen is closed by shutters, and displays "LOOK UP." Next, the common display 200 renders effects that the Roc 9010 appears on a map 9020 at which the character 9030 of the gaming machine 100 is located. Subsequently, the common display 200 renders effects that the RoC 9010 thinks whether to take action on the character 9030.

Figures 90A, 90B:
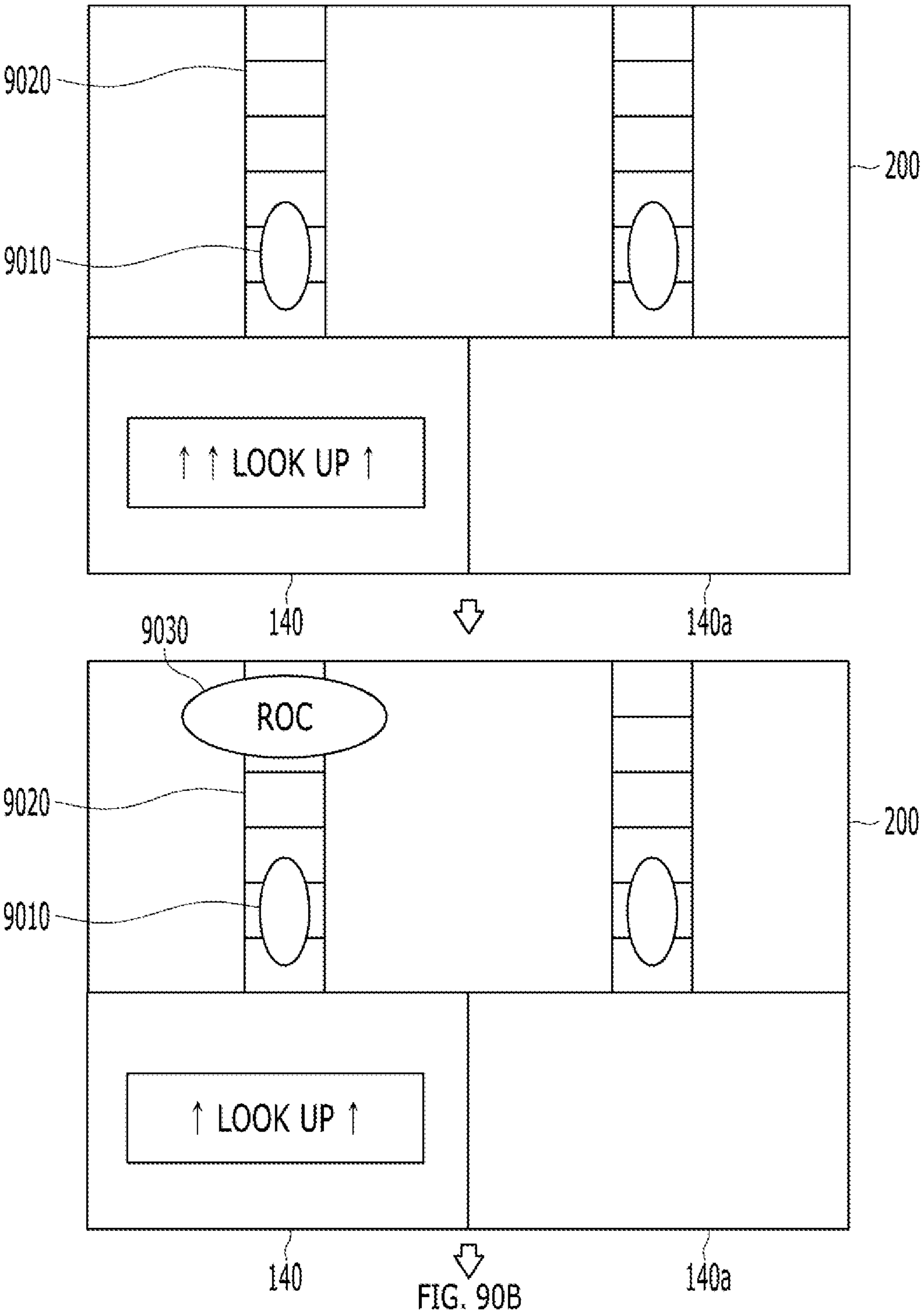
FIG. 90A, FIG. 90B, FIG. 90C, FIG. 90D and FIG. 90E show an example of a rendering picture at a Roc shooting event determined in a mysterious bonus game.
Figure 90B:
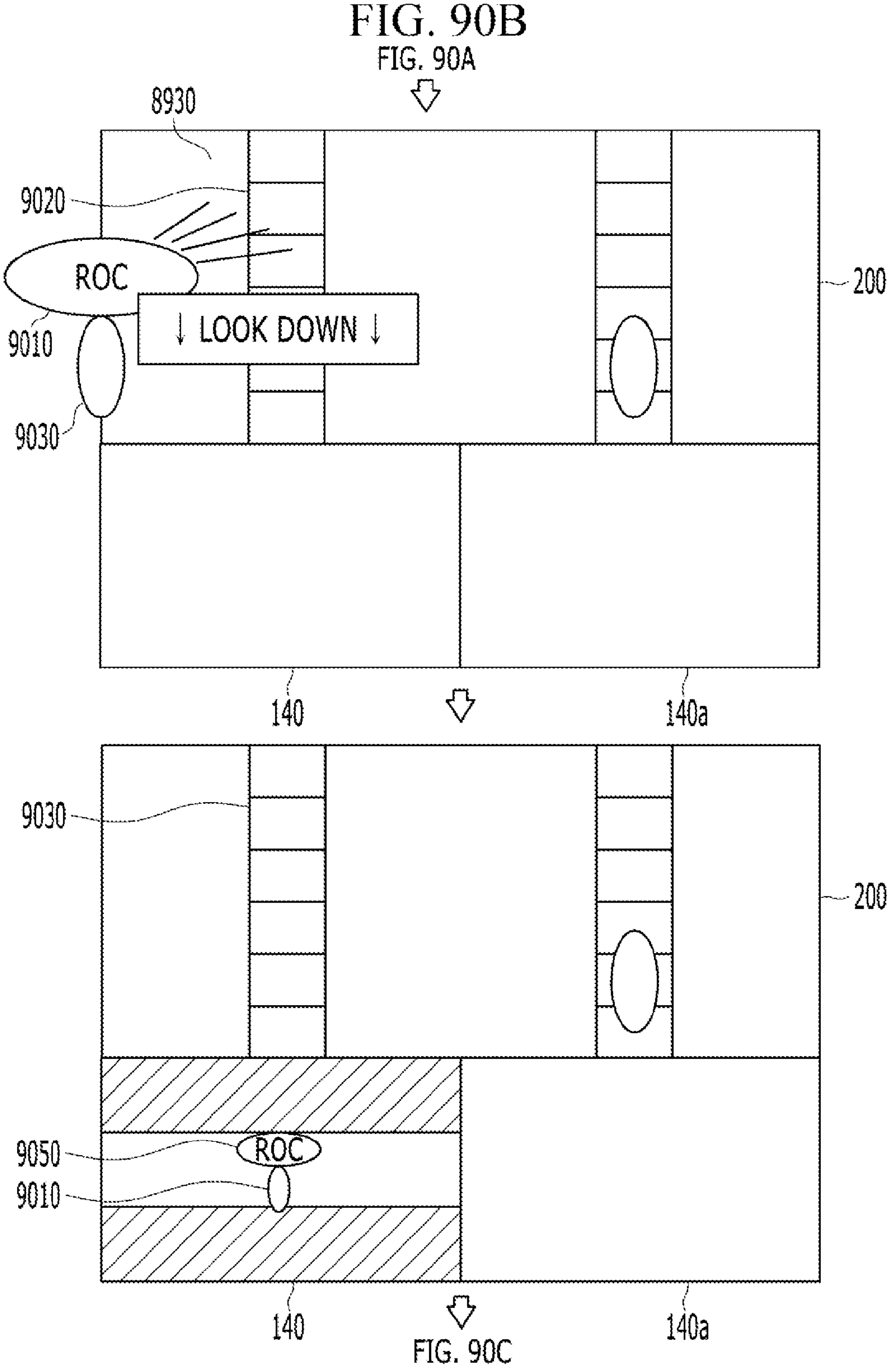

Next, the common display 200 renders effects that the Roc 9010 takes the character 9030 away, and displays "LOOK DOWN" on the map 9020, as shown in FIG. 90B. Subsequently, the main display 140 renders effects that the closed screen is open and the Roc 9010 and the character 9030 appear.

Figure 90C:
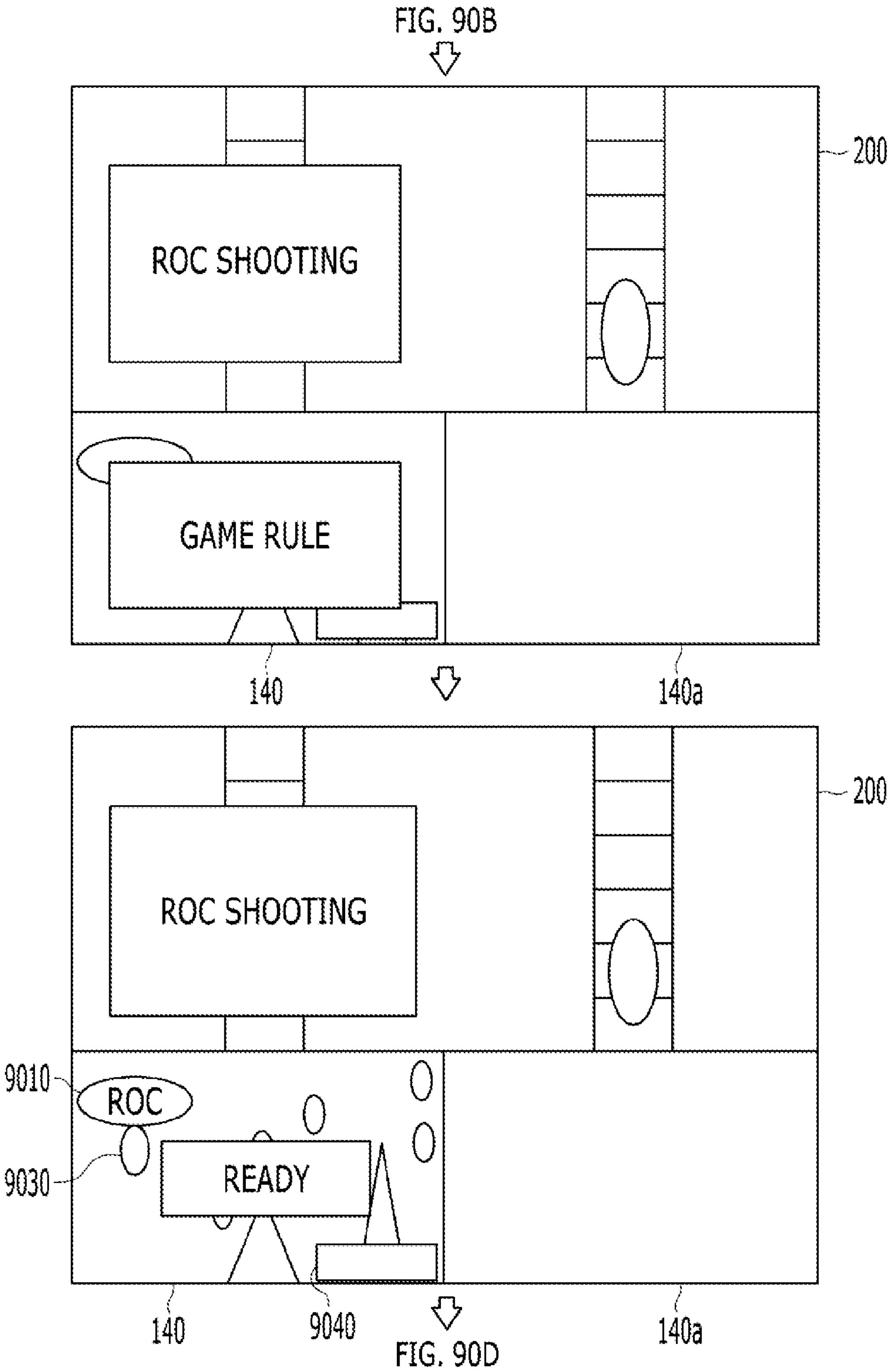

Next, the common display 200 displays a title of the Roc shooting event on the map 9020, and the main display 140 displays a game rule, as shown in FIG. 90C. Subsequently, the main display 140 displays "READY" and then "START" to starts a game. Further, the main display 140 displays a bonus win display section 9040.

Figure 90D:
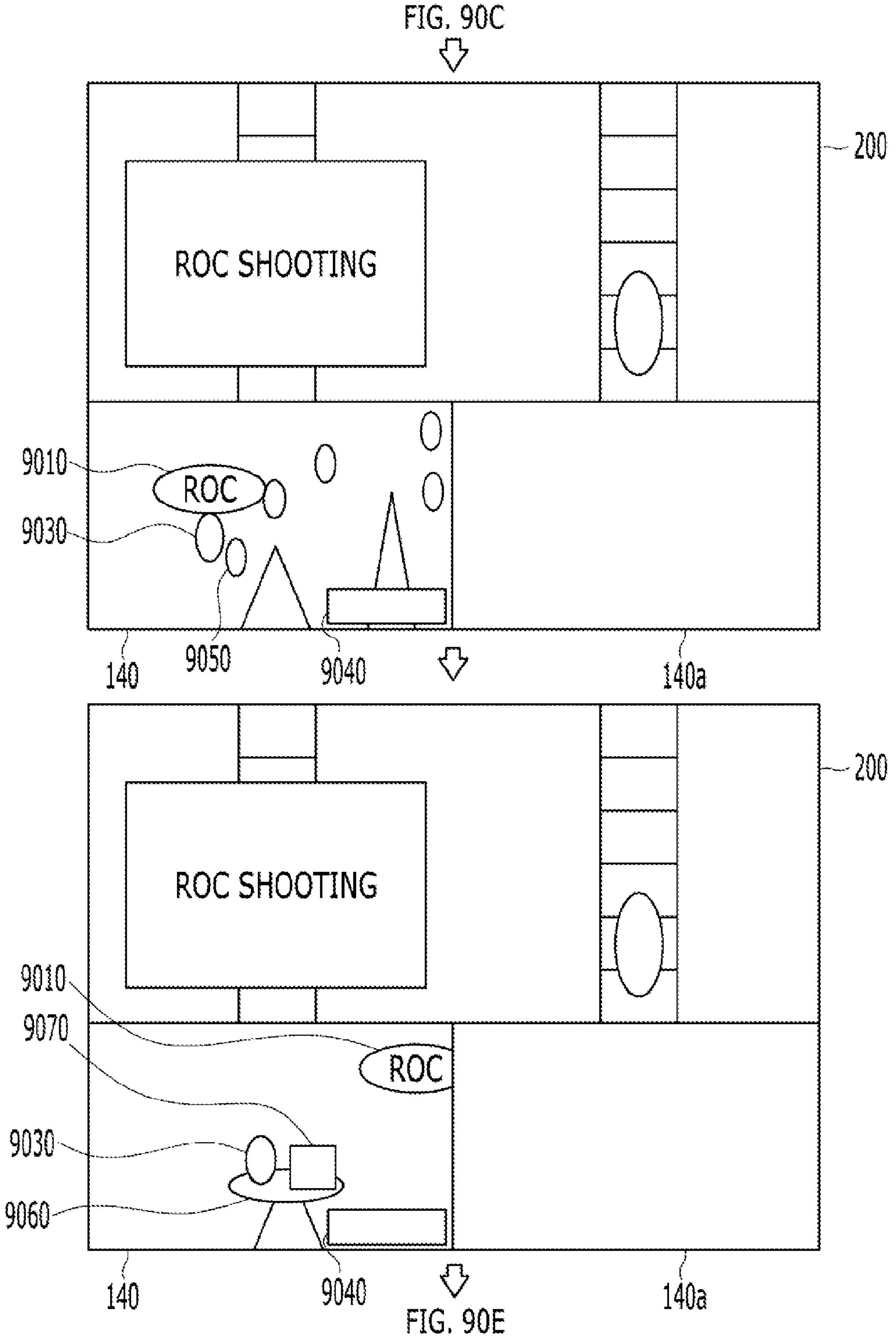
Figure 90E:
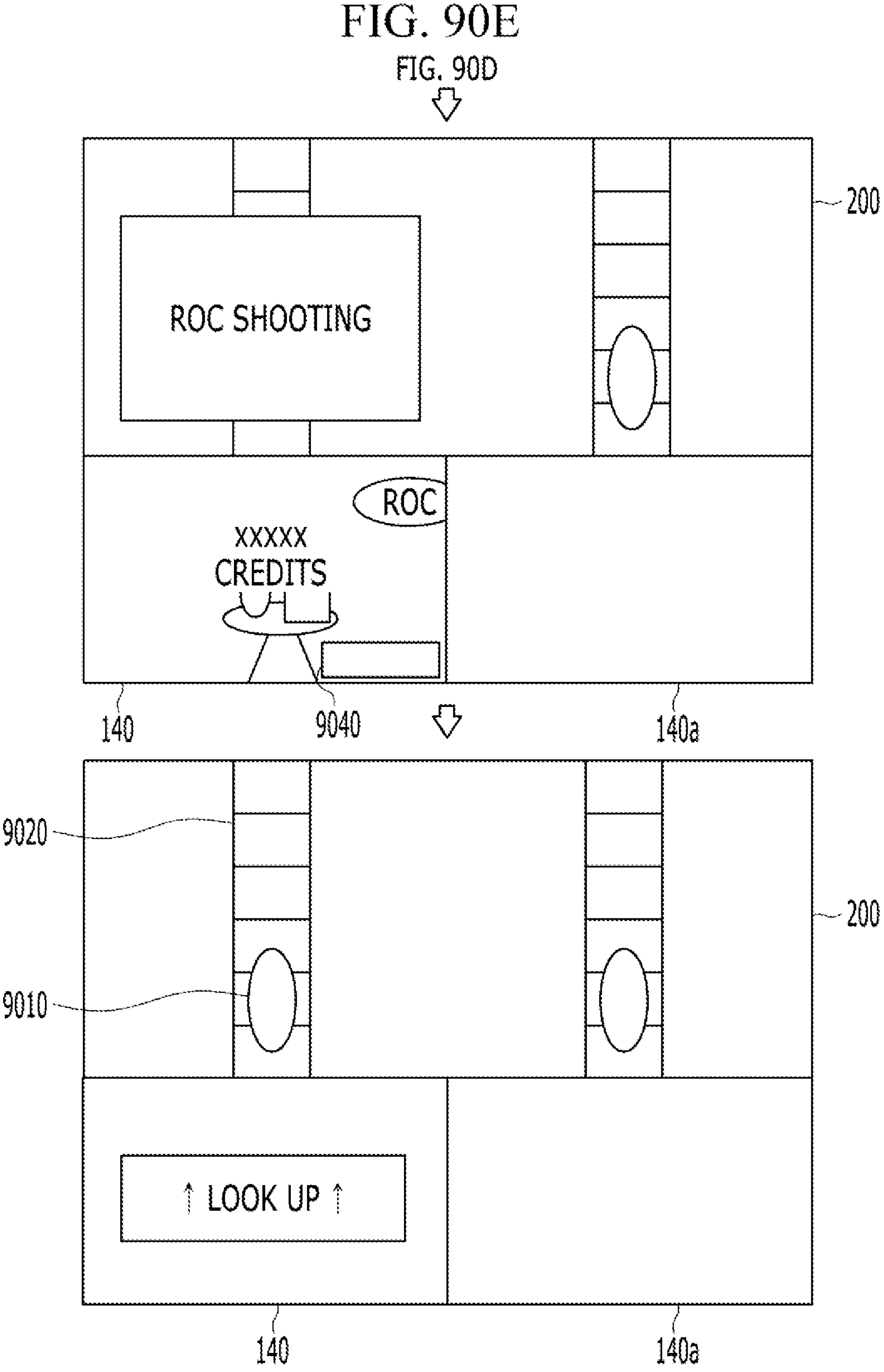

When the game starts, the Roc 9010 gradually descends. Each time the player presses a spin button (153 of FIG. 3), the Roc rises little by little. As shown in FIG. 90D, the main display 140 displays a plurality of coins 9050. Each time the character 9030 touches any one of the plurality of coins 9050, the touched coin is vanished and a payout appears from the vanished coin. Further, credits of the payout are added to the bonus win display section 9040. Finally, the main display 140 renders effects that the Roc 9010 drops the character 9030 on an island 9060 having a treasure box 9070 and flies away. Subsequently, the main display 140 renders effects that the character 9030 opens the treasure box and is pleased, and a payout appears from the treasure box. Next, the main display 140 and the common display 200 display a total payout corresponding to a sum of the payout from the treasure box and payouts accumulated to the bonus win display section 9040, as shown in FIG. 90E. The mysterious bonus game ends, and the common display 200 and the main display 140 display a screen of the certain bonus round prior to the mysterious bonus game.

On the other hand, while the mysterious bonus game is executed in the gaming machine 100, the neighbor gaming machine 100*a* maintains a game that is executed by the neighbor player.

In a certain embodiment, as described with reference to FIG. 82A and FIG. 82B, the gaming machine 100 may randomly determine the total payout, and distribute the total payout to the coins obtained by the player and the treasure box.

In a certain embodiment, even though the mysterious bonus game is triggered in the gaming machine 100, the neighbor player of the neighbor gaming machine 100*a* may perform the mysterious bonus game together with the player. In this case, the Roc's egg event described with reference to FIG. 84A and FIG. 84B or the Roc shooting event described with reference to FIG. 85A to FIG. 85E may be performed as the mysterious bonus game.

As described above, according to embodiments of the present invention, since the player can obtain a mysterious bonus game in a certain bonus round, the player can continuously play a plurality of bonus rounds. Further, since the triggering probability of mysterious bonus game becomes higher the when the player has the entry right of the versus event, the gaming machine can provide another profit instead of performing drawing of the entry right.

Jackpot Challenge

Figure 91:
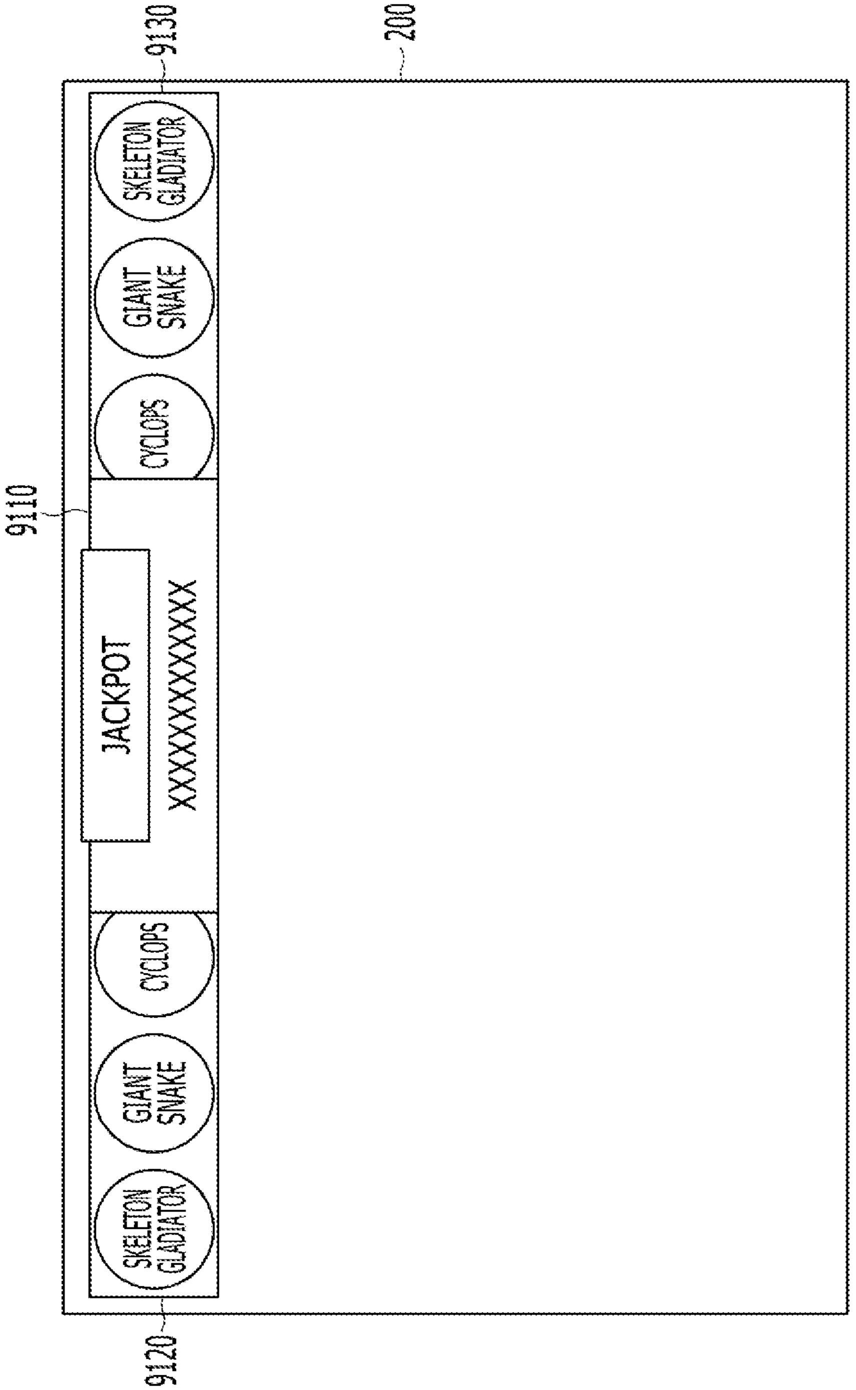
FIG. 91 show an example of a display picture for a jackpot challenge according to an embodiment of the present invention.
Figure 92A:
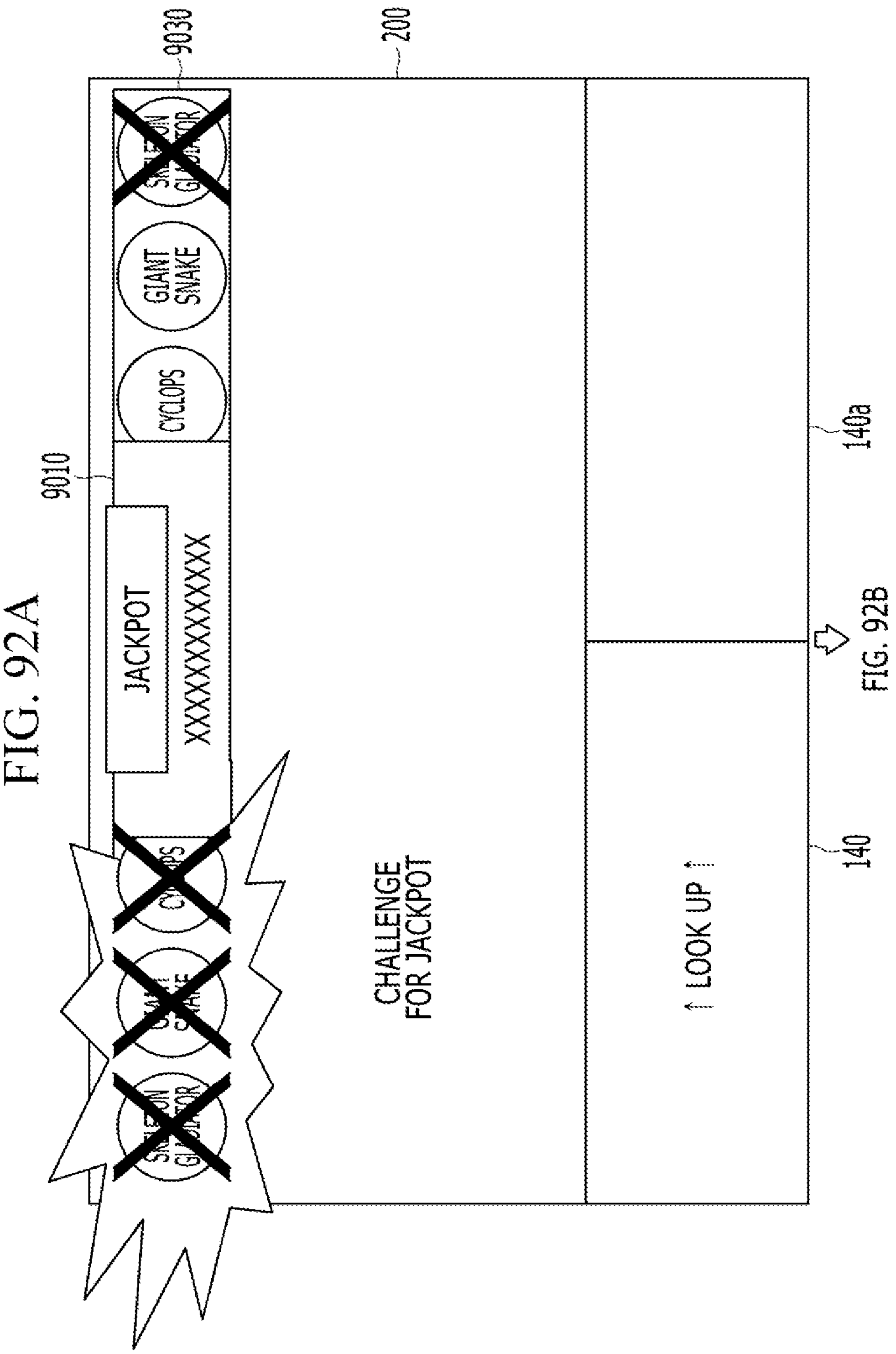
FIG. 92A, FIG. 92B and FIG. 92C show an example of a rendering picture at a trigger of a jackpot challenge according to an embodiment of the present invention.
Figure 92B:
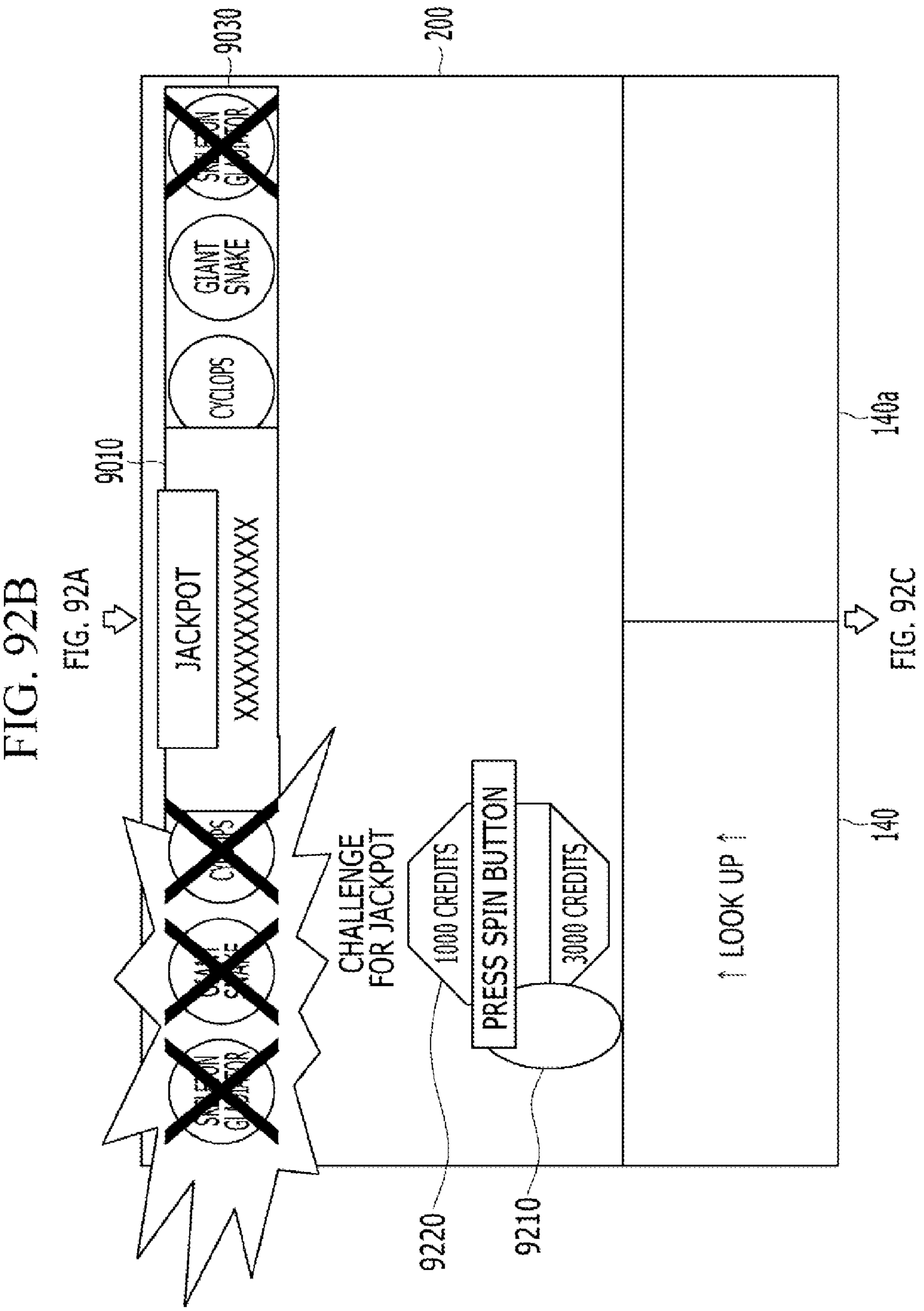
Figure 92C:
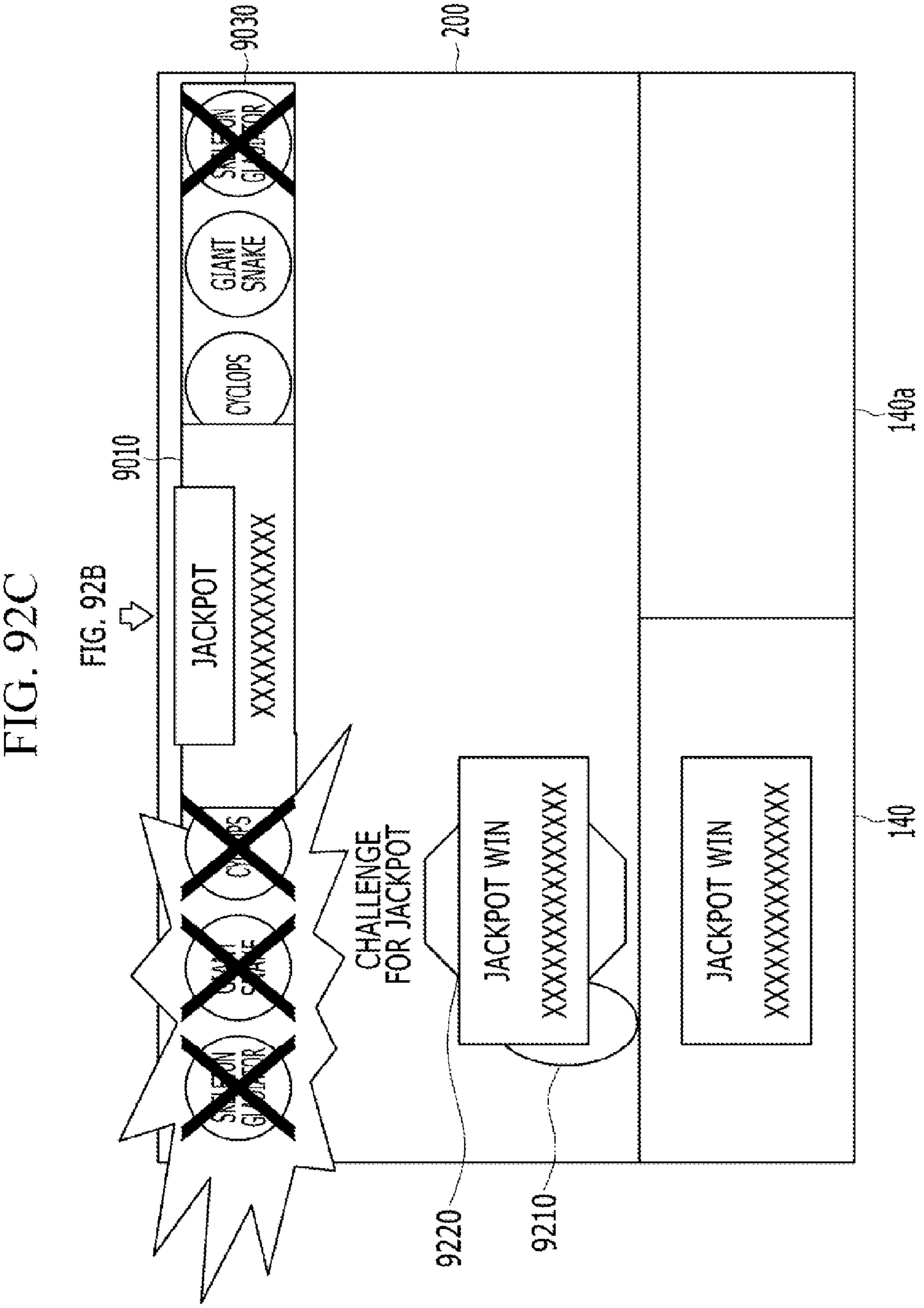

FIG. 91 show an example of a display picture for a jackpot challenge according to an embodiment of the present invention, FIG. 92A, FIG. 92B and FIG. 92C show an example of a rendering picture at a trigger of a jackpot challenge according to an embodiment of the present invention, and FIG. 93 shows an example of a payout determination table for a jackpot challenge shown in FIG. 92A to FIG. 92C.

According to an embodiment of the present invention, when a predetermined condition is satisfied in a certain gaming machine, a jackpot challenge is provided to a player of the certain gaming machine. The predetermined condition may be to obtain plural types of icons. In this case, the common display includes a jackpot payout section 9110, an icon section 9120 for a gaming machine 100, and an icon section 9130 for a neighbor gaming machine 100*a*, as shown in FIG. 91. Each icon section 9120 or 9130 includes a plurality of icon areas corresponding to the plural types of icons. The plural types of icons may be an icon of a skeleton gladiator, an icon of a giant snake, and an icon of the Cyclops that can be obtained in the treasure box events 3, 4 and 5 or the battle events 1, 2 and 3 of the bonus game. As shown in FIG. 91, when a player obtains a certain icon, for example the icon of the skeleton gladiator in the bonus game, a corresponding icon area of the icon section 9130 is marked.

As shown in FIG. 92A, when all icon areas of a certain icon section 9120 are marked, the jackpot challenge is performed in the gaming machine 100 corresponding to the certain icon section 9120. The common display 200 displays "CHALLENGE FOR JACKPOT" on a top display portion of the gaming machine 100, and the main display 140 of the gaming machine 100 displays "LOOK UP."

Next, the common display 200 displays a character 9210 and a jackpot roulette 9220 on the top display portion of the gaming machine 100, and notifies the player to press a spin button (153 of FIG. 3), as shown in FIG. 92B. The jackpot roulette includes a plurality of payouts. The plurality of payouts include a progressive payout. A predetermined percentage (for example, 0.50%) of BET amounts betted in a plurality of gaming machines is accumulated to be the progressive payout, and an initial value of the progressive payout may be 50000 credits. When the player presses the spin button 153, the common display 200 renders effects that the character 9210 spins the jackpot roulette 9220 and is excited.

The roulette 9220 stops to select any one of the plurality of payouts as a payout. The common display 200 and the main display 140 display credits of the selected payout. When a progressive payout is selected, the common display 200 and the main display 140 display "JACKPOT WIN." Further, the common display 200 renders effects that character 9210 is pleased according to the magnitude of the selected payout.

In a certain embodiment, the gaming machine 100 may randomly determine the payout of the jackpot challenge based on an average BET per round. In detail, the gaming machine 100 calculates a sum of BET amounts betted by the player in all rounds of the basic game and all bonus rounds of the bonus game until the jackpot challenge is performed, and calculates the number of rounds executed until the jackpot challenge is performed. Next, the gaming machine 100 divides the sum of BET amounts by the number of rounds to calculate an average BET amount per round, and divides the average BET amount per round by default credits of one BET amount to calculate the average BET per round. Next, the gaming machine 100 selects any one of an integer part of the average BET per round and a next integer of the integer part of the average BET per round as an integer value. At this time, the gaming machine 100 selects the next integer of the integer part of the average BET per round as the integer value with a probability corresponding to a fractional part of the average BET per round, and selects the integer part of the average BET per round as the integer value with a probability corresponding to a difference between one and the fractional part of the average BET per round.

Further, the gaming machine 100 may store a payout determination table for the jackpot challenge in a memory. An example of the payout determination table for the jackpot challenge is shown in FIG. 93. As shown in FIG. 93, the payout determination table for the jackpot challenge includes a plurality of payouts and a selection probability of each payout for each average BET per round. Accordingly, the gaming machine 100 may randomly determine the payout of the jackpot challenge based on the average BET per round changed to an integer value. For example, when the average BET per round changed to the integer value is 5 BETs, the gaming machine determines the payout of the jackpot challenge to the progressive payout with a probability of 15%. Accordingly, in the payout determination table, the higher the average BET per round is, the higher the selection probability of the progressive payout is.

As described above, according to embodiments of the present invention, since the player can challenge a jackpot when obtaining all icons of a plurality of opponent characters that are provided in some rounds, the player can continuously play a plurality of rounds. Further, since whether the progressive payout of the jackpot challenge is provided or not is determined by the average BET per round, the player can expect to receive the progressive payout if betting high BETs in each round.

Explain of Game Rule

According to an embodiment of the present invention, the gaming machine may display a movie corresponding to a real play of an event to explain a game rule of the event. Game rules of the Roc shooting event and the boating event are described as examples.

Game Rule of Roc Shooting Event

Figure 94:
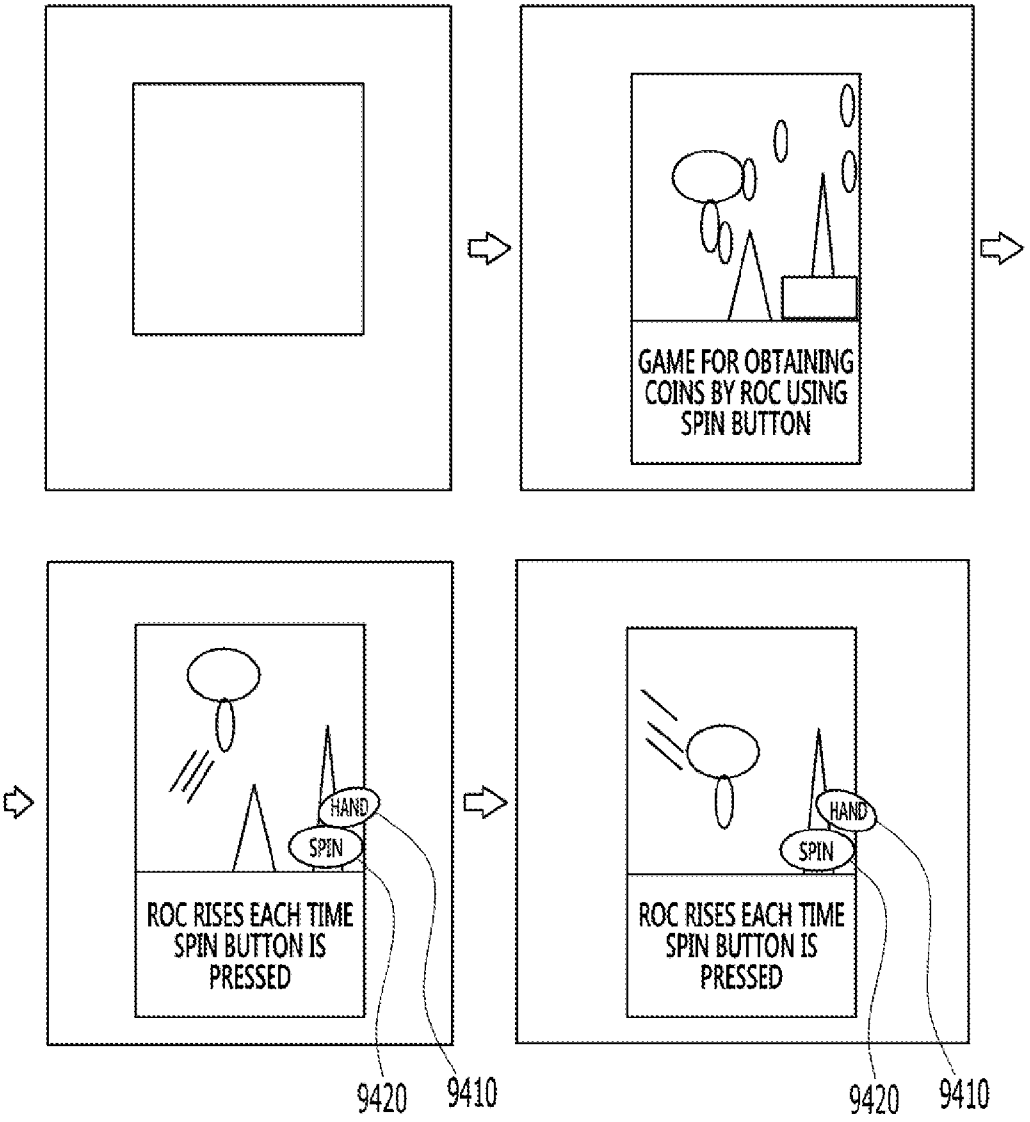
FIG. 94 shows an example of a rendering picture for explaining a game rule of a Roc shooting event.

FIG. 94 shows an example of a rendering picture for explaining a game rule of a Roc shooting event.

As shown in FIG. 94, the main display 140 plays a movie corresponding to a real play of the Roc shooting event to explain a game rule. The main display 140 briefly explains a game rule of the Roc shooting event in text. For example, the main display 140 sequentially displays "GAME FOR OBTAINING COINS BY ROC USING SPIN BUTTON," "ROC RISES EACH TIME SPIN BUTTON IS PRESSED," and "ROC DESCENDS UNLESS SPIN BUTTON IS PRESSED." Further, the main display 140 plays a movie that the Roc with a character touches a coin and obtain a payout while displaying "GAME FOR OBTAINING COINS BY ROC USING SPIN BUTTON." Next, the main display 140 displays a hand 9410 pressing a spin button 9420 and plays a movie that the Roc rises in accordance with the press of the spin button 9420 while displaying "ROC RISES EACH TIME SPIN BUTTON IS PRESSED." Further, the main display 140 displays the hand 9410 that does not press the spin button 9420 and plays a movie that the Roc descends while displaying "ROC DESCENDS UNLESS SPIN BUTTON IS PRESSED."

Game Rule of Boating Event

Figure 95:
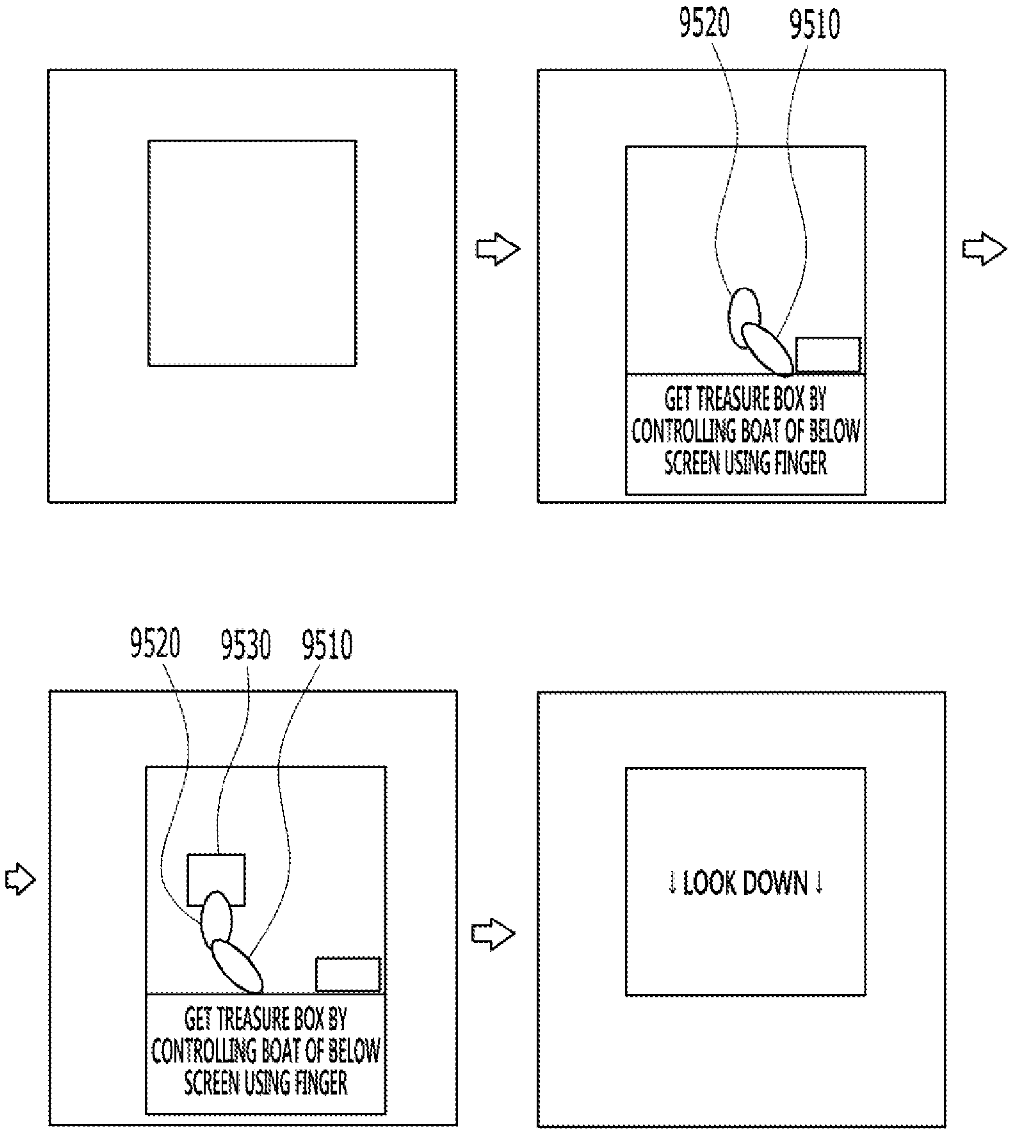
FIG. 95 shows an example of a rendering picture for explaining a game rule of a boating event.

FIG. 95 shows an example of a rendering picture for explaining a game rule of a boating event.

As shown in FIG. 95, the common display 200 plays a movie corresponding to a real play of the boating event to explain a game rule. The common display 200 briefly explains a game rule of the boating event in text. For example, the common display 200 displays "GET TREASURE BOX BY CONTROLLING BOAT OF BELOW SCREEN USING FINGER." Further, the common display 200 plays a movie that a boat 9520 touched by a finger 9510 moves from side to side and the boat hits a treasure box 9530 to provide a payout.

Gaming Process

Next, a gaming method in the gaming machine according to an embodiment of the present invention will be described with reference to FIG. 96 to FIG. 105.

Base Game Process

Figure 96:
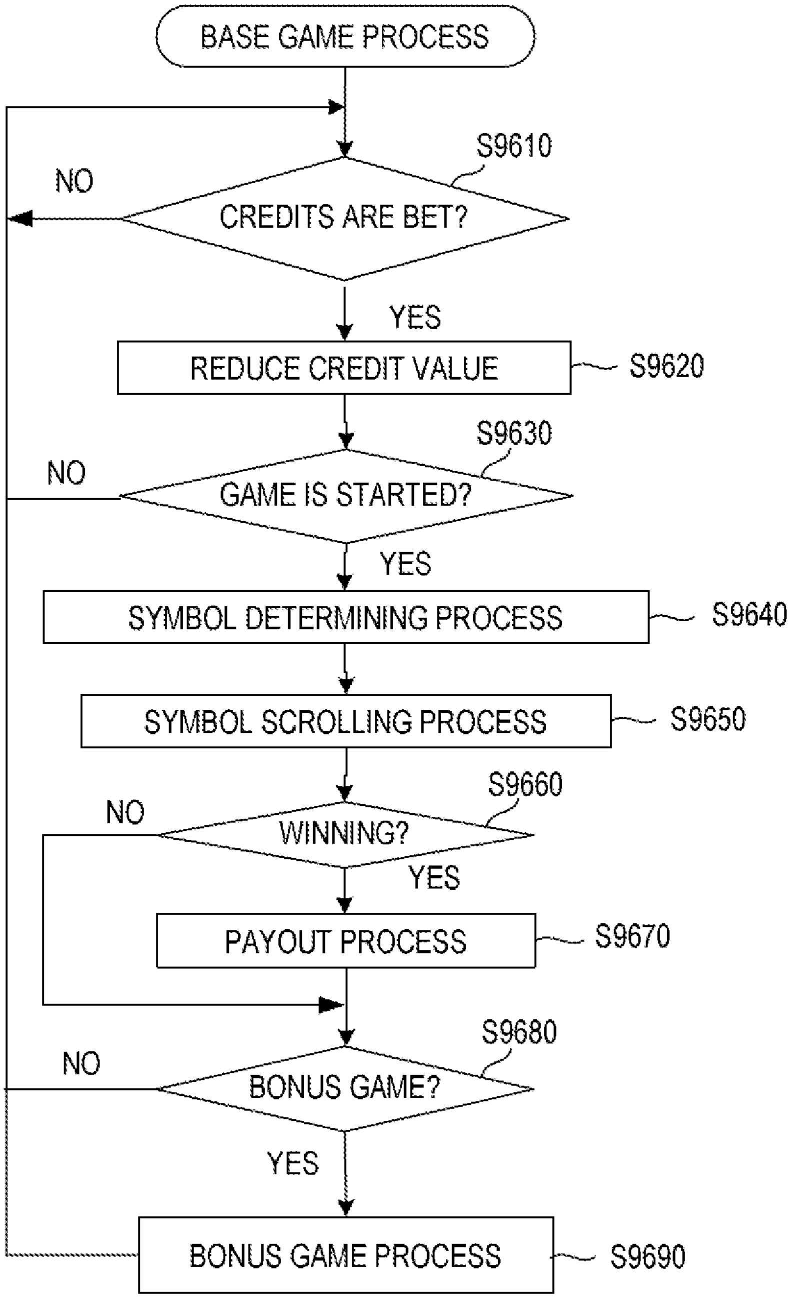
FIG. 96 is a flowchart of a base game process according to an embodiment of the present invention.

FIG. 96 is a flowchart of a base game process according to an embodiment of the present invention.

According to an embodiment of the present invention, a controller, i.e., a control unit (610*a* of FIG. 7) of the gaming machine 100 executes the base game process as shown in FIG. 96 to execute the base game. The base game process shown in FIG. 96 corresponds to one round of the base game. A plurality of rounds for the base game may be repeated.

Referring to FIG. 96, in the base game process, the controller determines whether credits are bet (S9610). In this process, the controller may determine whether a signal output from any one of BET×1, BET×2 BET×3, BET×4, and BET×5 switch circuits (617*d* of FIG. 7) is received by pressing any one of BET×1, BET×2 BET×3, BET×4, and BET×5 buttons (152*a*, 152*b*, 152*c*, 152*d*, and 152*e* of FIG. 5). When the credits are not bet (S9610: NO), the step S9610 is re-executed and the gaming machine is under a standby state until credits are bet.

In the meantime, when the credits are bet (S9610: YES), a credit value stored in a RAM (612 of FIG. 7) is reduced corresponding to the number of credits bet (S9620). In addition, if the number of credits bet is larger than the credit-value stored in the RAM 612, the process of reducing the credit value is not carried out and the process proceeds to the step S9630.

Next, the controller determines whether the base game is started by a spin button (153 of FIG. 3). If the base game is not started (S9630: NO), the process is returned to the step S9610. In addition, if the base game is not started (for example, if the game is not started and an instruction to end the game is input), the subtraction result from the step S9620 is canceled.

If the base game is started (S9630: YES), the controller executes a symbol determining process (S9640). In other words, the controller generates a random number for each of reels (711 to 715 of FIG. 9) of a display window (700 of FIG. 9), and determines symbols to be displayed (i.e., to be stopped) in each of the reels 711 to 715 of the display window 700 based on the random number. Accordingly, a combination of symbols to be stopped on paylines is determined. At this time, the controller may determine the symbols displayed in each of the reels 711 to 715 referring to data (for example, a table shown in FIG. 12) stored in a memory. The memory may be a RAM (612 of FIG. 7) or a storage device (613 of FIG. 7). The data represents mappings between the symbols displayed in each reel and the range of random numbers and are stored in table form.

Then, a scroll process of scroll-displaying the symbols in a main display (140 of FIG. 3) is executed (S9650). In the scroll process, the symbols are scrolled in the direction indicated by an arrow symbol and then the symbols determined in the step S9640 are stopped (i.e., rearranged) in the display window 700.

Next, on the basis of the combination of symbols rearranged in the display window 700, the controller determines whether the combination is a winning combination or not (S9660). When the combination is the winning combination (S9660: YES), a payout process is executed (S9670). In other words, if the combination is the winning combination, the controller calculates credits to be paid out according to a type of the winning combination. The credits are determined by multiplying a basic payout value (a basic credit value) corresponding to the winning combination by a magnitude of the BET amount betted in the step 9610. The basic payout value may be predefined as shown in FIG. 13.

When the payout process in the step S9670 is executed or the combination is not the winning combination (S9660: NO), the controller continues to determine whether a bonus game is triggered (S9680). Specifically, the controller determines that the bonus game is triggered when special symbols (for example, BONUS symbols) of a number higher than the predetermined number (for example, three) are rearranged. If the bonus game is not triggered (S9680: NO), the process of the step S9610 is executed.

When the bonus game is triggered, the gaming machine 100 executes a bonus game process (S9690). According to an embodiment of the present invention, a controller of the gaming machine 100 may execute the bonus game process (S9690) as shown in FIG. 97 or FIG. 98.

Bonus Game Process

Figure 97:
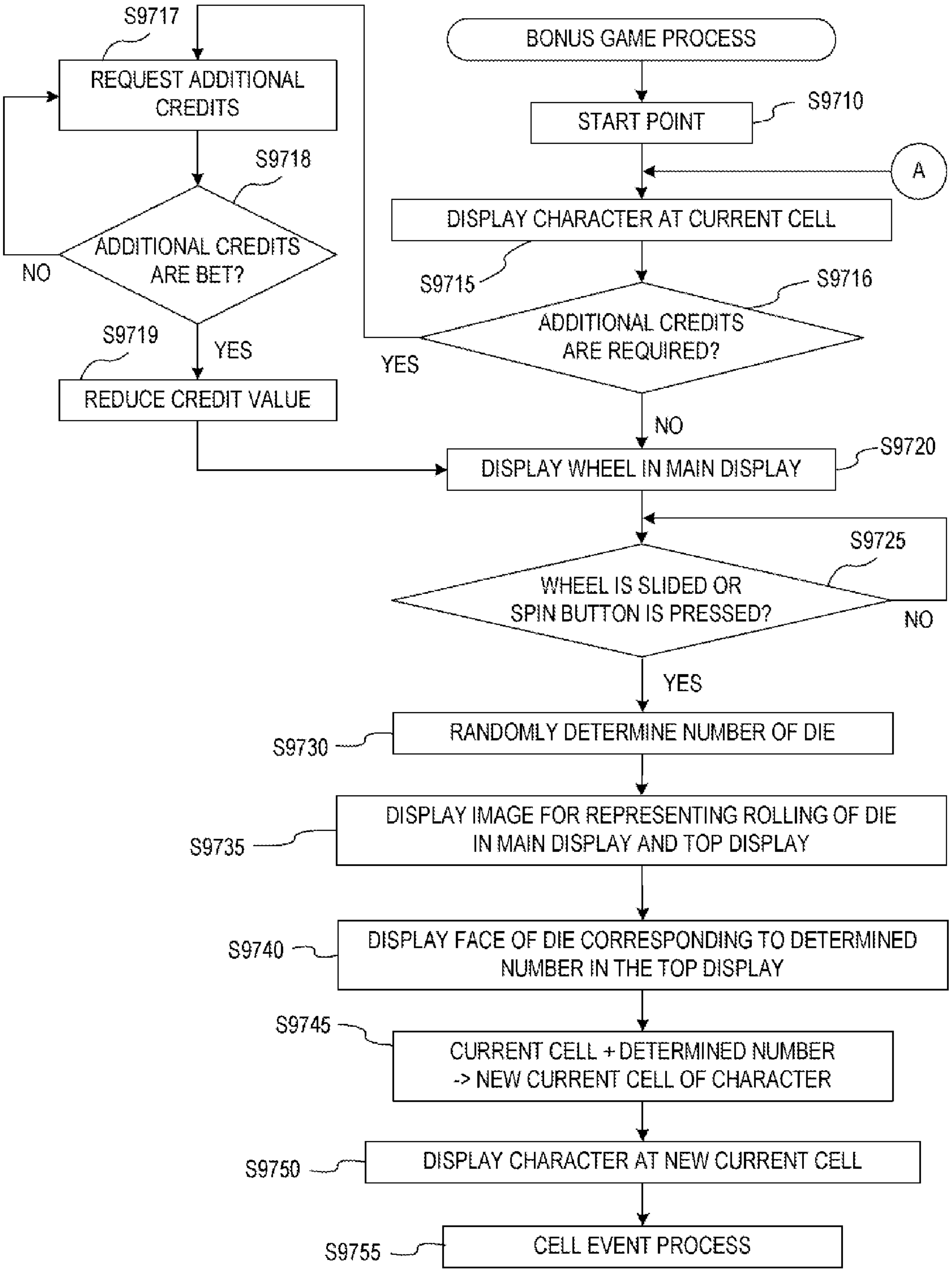
FIG. 97 is a flowchart of a bonus game process according to an embodiment of the present invention.
Figure 98:
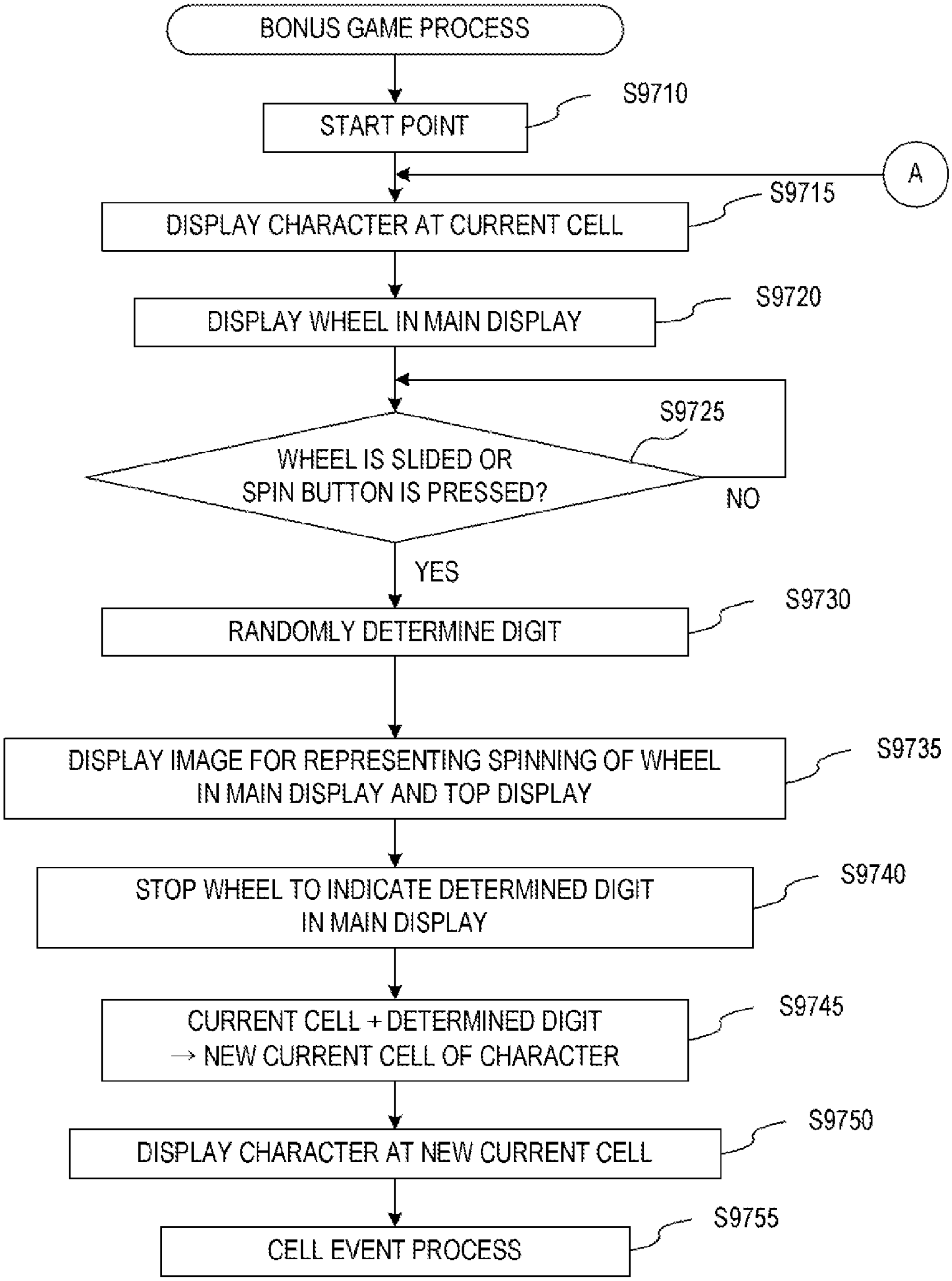
FIG. 98 is a flowchart of a bonus game process according to another embodiment of the present invention.

FIG. 97 is a flowchart of a bonus game process according to an embodiment of the present invention, and FIG. 98 is a flowchart of a bonus game process according to another embodiment of the present invention.

A controller for executing the bonus game process may be a control unit (610*a* of FIG. 7) and/or a common control unit (640 of FIG. 7 or FIG. 8).

Referring to FIG. 97, when the bonus game is triggered, the controller initializes a position of a character corresponding to the player to start the bonus game process (S9710). That is, the position of the character is initialized to a start point of a map.

The controller displays the character located at a current cell of the map in a top display (120 of FIG. 3) (S9715). The top display 120 may be a common display (200 of FIG. 4), particularly a top display portion (210 of FIG. 5) of the common display 200. The controller determines whether a current bonus round requires additional credits (S9716). If the current bonus round requires the additional credits (S9716: YES), the controller displays an image for requiring the player to bet the additional credits (S9717). Further, the controller determines whether the additional credits are bet (S9718). The player can bet the additional credits by pressing any one of the BET×1, BET×2 BET×3, BET×4, and BET×5 buttons 152*a*, 152*b*, 152*c*, 152*d*, and 152*e*. When the additional credits are not bet (S9718: NO), the gaming machine 100 is under a standby state until the additional credits are bet.

When the additional credits are bet (S9718: YES), a credit value stored in the RAM 43 is reduced corresponding to the number of credits that are additionally bet (S9719). Next, the controller displays a wheel in a main display 140, and requests the player to spin the wheel (S9720), as shown in FIG. 16. That is, the controller displays a wheel image for spinning the wheel in the main display 140.

If the player slides the wheel with touching an area corresponding to the wheel image in the main display 140 or presses a spin button (153 of FIG. 3) of the gaming machine 100 (S9725: YES), the controller randomly determines a digit (S9730). That is, the controller generates a random number, and determines the digit based on the random number. If the player does not touch and slide the area corresponding to the wheel image and press the spin button 153 (S9725: NO), the controller is under a standby state until the player touches the area corresponding to the die image or presses the spin button 220. Alternatively, if the player does not touch and slide the area corresponding to the wheel image and press the spin button 153 during a predetermined time (S9725: NO), the controller may automatically spin the wheel.

After determining the digit in the step S9730, the controller displays an image representing a status where the wheel that is spinning moves from the main display 140 to the top display 120, as shown in FIG. 17 (S9735). The controller displays in the top display 120 an image that spinning of the wheel stops and the wheel indicates the determined digit, as shown in FIG. 18A and FIG. 18B (S9740). Subsequently, the controller determines a new position of the character as a cell which is moved from the current cell by the determined digit (S9745). The controller moves the character from the current cell of the map to a destination cell corresponding to the new position, and updates the current cell as the destination cell. Further, the controller displays the character located at the updated current cell of the map, as shown in FIG. 18C (S9750).

Next, the controller executes a cell event process of the destination cell (S9755). In the cell event process, the player can receive a payout according to a result of an event set to the destination cell. Further, after the cell event process, the player can perform a next bonus round of the bonus game.

The process of the steps S9715 to S9755 corresponds to one bonus round process in the bonus game process. The bonus round process may be repeated in the bonus game process until the bonus game ends. For example, the bonus game may end when the character arrives at a cell corresponding to a goal point.

According to another embodiment of the present invention, the controller executes the bonus game process (S9690 of FIG. 96) as shown in FIG. 98.

Referring to FIG. 98, in the bonus game process, the controller displays a wheel in a main display and requests the player to spin the wheel (S9720), without a process for requiring the additional credits to be bet. That is, the controller does not perform a process of the steps S9716, S9717, S9718, and S9719.

Figure 99:
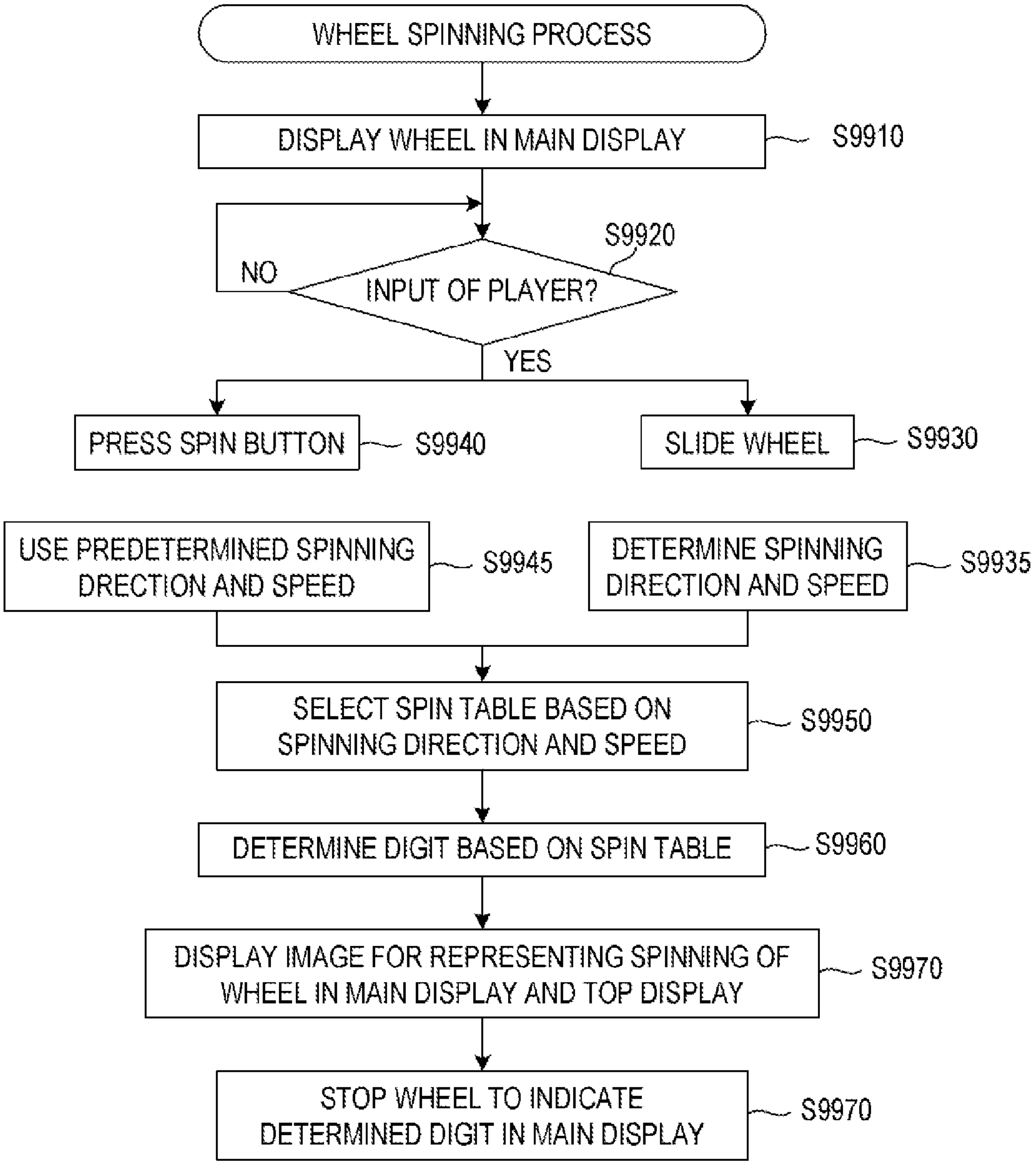
FIG. 99 is a flowchart of a wheel spinning process for a bonus game according to an embodiment of the present invention.

In steps S9720 to S9740, the controller may spin the wheel in accordance with a wheel spinning process show in FIG. 99.

FIG. 99 is a flowchart of a wheel spinning process for a bonus game according to an embodiment of the present invention.

Referring to FIG. 99, after displaying a wheel in a main display 140 (S9910), the controller waits for an input of the player (S9920). When the player touches and slides an area where the wheel is displayed as the input (S9930), the controller determines a spinning direction of the wheel and a spinning speed of the wheel (S9935). The spinning direction may be determined by a sliding direction of the player. That is, when the player slides the finger in a clockwise direction or a rightward direction, the wheel spins in the clockwise direction. When the player slides the finger in a counterclockwise direction or a leftward direction, the wheel spins in the counterclockwise direction. Further, the controller may determine the spinning speed of the wheel based on a speed at which the player slides the finger with touching the area. The spinning speed may be proportional to the speed at which the player slides the finger. Accordingly, the player can feel like he or she spins a real wheel to select the number of free rounds.

When the player presses a spin button (153 of FIG. 3) as the input (S9940), the controller determines a spinning direction of the wheel and a spinning speed of the wheel to a predetermined speed and a predetermined direction, respectively (S9945). For example, the predetermined speed may be the high speed, and the predetermined direction may be the clockwise direction.

Next, the controller selects any one spin table from among a plurality of spin tables based on the determined spinning direction and the determined spinning speed (S9950). Each of the plurality of spin tables corresponds to a combination of the spinning speed and the spinning direction as shown in FIG. 19, and represents a mapping between each a plurality of digits and a selection probability of each digit. Further, the controller randomly determines the digit based on the selected spin table (S9960).

The controller renders effects that the wheel which is spinning at the determined speed and in the determined direction moves from the main display 140 to the top display 120 (S9970). Subsequently, the controller stops the wheel to indicate the determined digit (S9980).

On the other hand, the wheel may start to spin when the player takes off his or her finger from the area of the main display. Further, when a period during which the player slides the finger with touching the area exceeds a predetermined time, the wheel may start to spin even though the player does not take off the finger from the area. Furthermore, when the player touches the finger on the area during a period that is shorter than a predetermined time, the wheel does not start to spin even though the player takes off the finger from the area.

Next, a cell event process according to an embodiment of the present invention is described with reference to FIG. 100.

Figure 100:
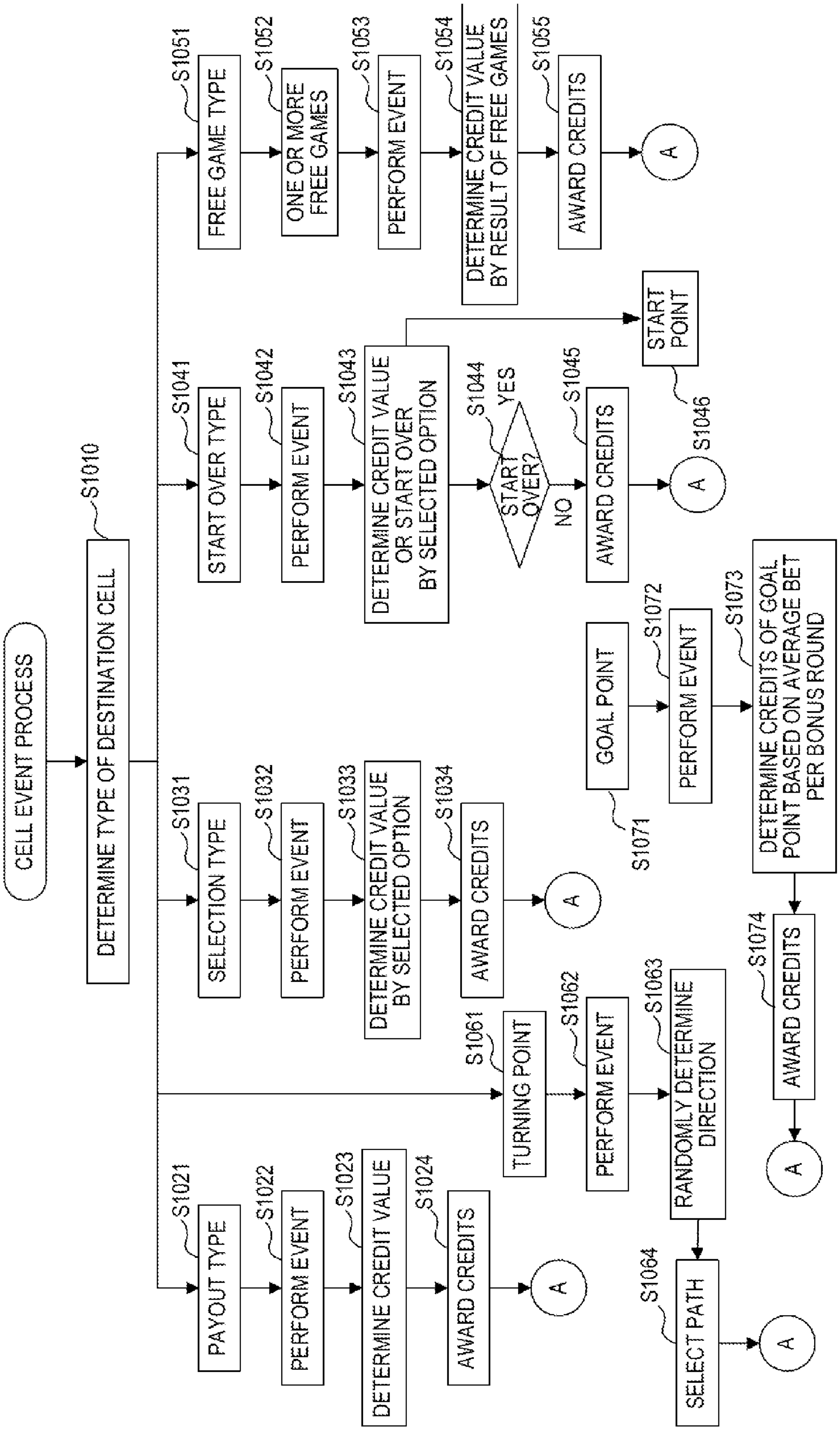
FIG. 100 is a flowchart of a cell event process of a bonus game according to an embodiment of the present invention.

FIG. 100 is a flowchart of a cell event process of a bonus game according to an embodiment of the present invention.

Referring to FIG. 100, the controller determines whether an event set to a destination cell (i.e., an updated current cell) is a payout type, a random payout type, a selection type event, a start over type, a free game type, a turning point, or a goal point (S1010).

If the event is the payout type event (S1021), the controller performs the payout type event set to the destination cell (S1022). The payout type event may be any one of treasure box events 1, 2, 3, 4 and 5, battle events 1, 2 and 3, a coconut catching event, a jar roulette event, and a coconut palm kicking event, and the controller may perform the payout type event as described with reference to FIG. 22 to FIG. 40. Further, the controller determines credits be awarded to the player according to a credit value determined by the payout type event (S1023). The credits be awarded to the player may be determined by multiplying the determined credit value by a current BET. Subsequently, the controller awards the credits to the player (S1024). Next, the controller performs a process that begins from the step S9715 of FIG. 97 or FIG. 98 again.

If the event is the selection type event (S1031), the controller performs the selection type event set to the destination cell (S1032). The selection type events may be any one of a propose event, a treasure map event, a king's award event, a goods trade event, a mining event, a treasure box discovery event, a fishing event, and a caving event, and the controller may perform the payout type event as described with reference to FIG. 41A to FIG. 55D. While performing the selection type event, the controller provides a plurality of options to be selected by the player. When the player selects at least one option from among the plurality of options, the controller determines credits be paid out to the player according to a credit value of the selected option (S1033). The credits be awarded to the player may be determined by multiplying the determined credit value by the current BET. Subsequently, the controller awards the credits to the player (S1034). Next, the controller performs a process that begins from the step S9715 of FIG. 97 or FIG. 98 again.

If the event is the start over type event (S1041), the controller performs the start over type event set to the destination cell. The start over type event may be any one of a bridge event, a storm event, a big ball event, and a monkey repel event, and the controller may perform the start over type event as described with reference to FIG. 56A to FIG. 60B. While performing the start over type event, the controller provides a plurality of options to be selected by the player. When the player selects at least one option from among the plurality of options, the controller determines whether the selected option is a start over option or not (S1043). If the selected option is not the start over option (S1044: NO), the controller determines credits be paid out to the player according to a credit value of the selected option (S1044). The credits be awarded to the player may be determined by multiplying the determined credit value by the current BET. Subsequently, the controller awards the credits to the player (S1045). If the selected option is the start over option (S1044: YES), the controller moves the character to the start point (S1046). Next, the controller performs a process that begins from the step S9715 of FIG. 97 or FIG. 98 again.

If the event is the free game type event (S1051), the controller provides one or more free games to the player (S1052). The controller performs the event of the free game (S1053). The free game type event may be any one of an expanded WILD free game event, a scattered WILD free game event, and a WILD re-spin free game event, and the controller may perform the free game type event as described with reference to FIG. 61A to FIG. 70. Subsequently, the controller determines credits be paid out to the player according to a result of the one or more free games (S1054). The credits be paid out to the player may be determined by multiplying the credit value that are accumulated in the one or more free games by the current BET. Subsequently, the controller awards the credits to the player (S1055). Next, the controller performs a process that begins from the step S9715 of FIG. 97 or FIG. 98 again.

If the event is the turning point type (S1061), the controller performing a turning point event (S1062). While performing the turning point event, the controller displays a plurality of directions in the main display 140, and randomly determines any one direction from among the plurality of directions (S1063). Subsequently, the controller selects a path corresponding to the determined direction, and moves the character along the selected path (S1064). Next, the controller performs a process that begins from the step S9715 of FIG. 97 or FIG. 98 gain.

If the event is the goal point type (S1071), the controller performs a goal point event (S1072). While performing the goal point event, the controller randomly determines a goal point payout (S1073). In this case, the controller randomly determines the goal point payout in accordance with a probability determined by based on an average BET per bonus round (S1073). Subsequently, the controller awards credits of the goal point payout to the player (S1074).

As described above, according to an embodiment of the present invention, the player can continuously play a plurality of rounds in the bonus game and receive an award according to the goal point when the bonus game ends by an arrival of the goal point such that the gaming machine can continuously attract the player's interest. Further, since the award of the goal point is determined by the average BET per bonus round, the player can expect to receive a great award if betting high BETs in each bonus round.

Versus Event Process

According to an embodiment of the present invention, a versus event is randomly triggered while the player plays a game.

Figure 101:
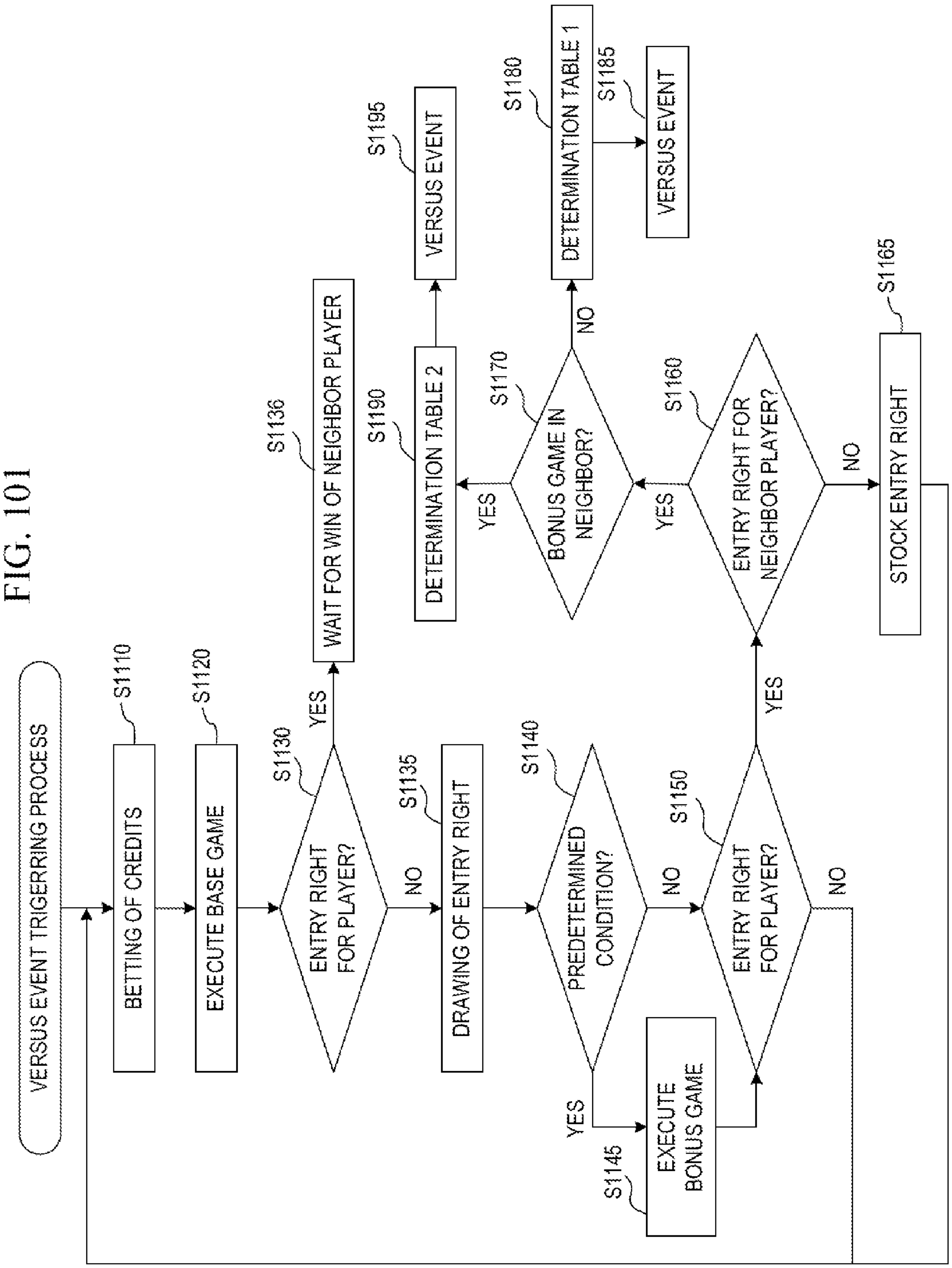
FIG. 101 is a flowchart of a versus event triggering process according to an embodiment of the present invention.

FIG. 101 is a flowchart of a versus event triggering process according to an embodiment of the present invention, and FIG. 102A and FIG. 102B show examples of versus event determination tables for a versus event triggering process shown in FIG. 101.

Referring to FIG. 101, the player of a gaming machine 100 bets credits to play a base game (S1110), and executes the base game (S1120). That is, a controller of the gaming machine 100 executes the base game to scroll reels (711 to 715 of FIG. 9).

When the base game is executed, the controller determines whether the entry right for the player is stored to a memory, for example a RAM (612 of FIG. 6 or 642 of FIG. 7) (S1130). That is, the controller determines whether the player has an entry right for entering the versus event. In a certain embodiment, a versus event flag may be stored in the memory of the gaming machine 100. The versus event flag may be set to "ON" when the player of the gaming machine 100 has the entry right. The versus event flag may be set to "OFF" when the player of the gaming machine 100 does not have the entry right.

If the entry right for the player is not stored (S1130: NO), the controller performs drawing of the entry right for the player (S1135). As shown in FIG. 74, the controller performs drawing of the entry right for the player based on the BET amount of the base game and the versus event determination table. That is, the winning probability of the entry right is proportional to the BET amount. Accordingly, the higher the BET amount is, the higher the winning probability of the entry right is. If the entry right for the player is stored (S1130: YES), the controller does not perform drawing of the entry right for the player and waits until the neighbor player of the neighbor gaming machine 100*a* wins the entry right (S1136).

If a result of the base game satisfies a predetermined condition (S1140: YES), the controller executes a bonus game (S1145). After the bonus game ends or if the result of the base game does not satisfy the predetermined condition (S1140: NO), the controller determines whether the player wins the entry right in the step S1135 (S1150). If the player has the entry right, that is, the player wins the entry right in the drawing of the entry right (S1150: YES), the controller determines whether the neighbor player of the neighbor gaming machine 100*a* has the entry right for entering the versus event (S1160).

If the neighbor player has the entry right (S1160: YES) when the player has the entry right, the controller determines a status of the neighbor gaming machine (S1170). That is, the controller determines whether a base game is executed in the neighbor gaming machine or a bonus game is executed in the neighbor gaming machine (S1170). When the bonus game is not executed in the neighbor gaming machine, the controller randomly selects a versus event based on a versus event determination table 1 (S1180), and triggers and executes the selected versus event (S1185). When the bonus game is executed in the neighbor gaming machine, the controller randomly selects a versus event based on a versus event determination table 2 (S1190), and triggers and executes the determined versus event (S1195). As such, if both the versus event flag for the player and the versus event flag for the neighbor player are set to "ON", the controller triggers the versus event. After the versus event ends, the player can start another base game.

If the neighbor player does not have the entry right (S1160: NO), the controller does not trigger the versus event and stores the entry right of the player to the memory (S1165). Further, if the player does not have the entry right (S1150: NO), the controller does not trigger the versus event. If the versus event is not triggered, the player can start another base game.

In the steps S1170 and S1180, the controller uses different versus event determination tables according to the state of the gaming machine 100*a* which is neighbor to the gaming machine 100 that wins the entry right. For example, the controller uses the versus event determination table 1 shown in FIG. 102A when the bonus game is not executed in the neighbor gaming machine 100*a*, and uses the versus event determination table 2 shown in FIG. 102B when the bonus game is executed in the neighbor gaming machine 100*a*. In the versus event determination table 2, the Roc's egg event and the Roc shooting event are not selected differently from the versus event determination table 1. In the Roc's egg event and the Roc shooting event, after any one of two characters is selected, the versus event is performed for only the selected character using the common display 200. That is, the Roc's egg event and the Roc shooting event are similar to events that are performed by one player not two players. Accordingly, while the bonus game using the common display 200 is performed in the neighbor player, the controller does not perform the Roc's egg event or the Roc shooting event for only one player. As a result, the bonus game of the neighbor player can be unaffected by the player.

Mysterious Bonus Process

According to an embodiment of the present invention, a mysterious bonus game is randomly triggered while the player plays a bonus game.

Figure 103:
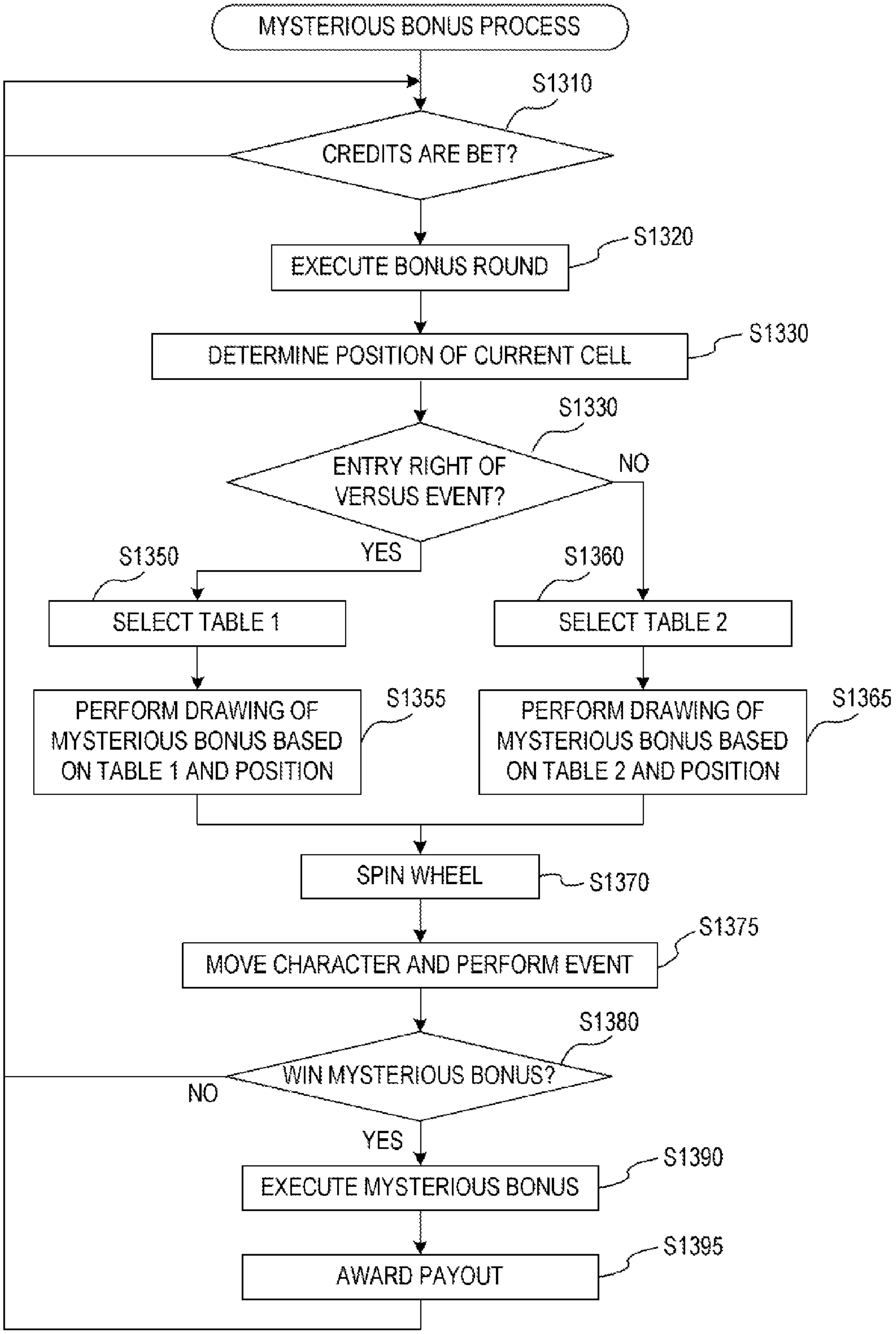
FIG. 103 is a flowchart of a mysterious bonus game triggering process according to an embodiment of the present invention.

FIG. 103 is a flowchart of a mysterious bonus game triggering process according to an embodiment of the present invention.

Referring to FIG. 103, the player of a gaming machine 100 bets credits to play a bonus round of a bonus game (S1310), and executes the bonus round (S1320).

When the bonus round is executed, the controller determines a position of a current cell at which a character for the player is located in the executed bonus round (S1330). Further, the controller determines whether the gaming machine 100 (i.e., the player) executing the bonus round stores an entry right of a versus event (S1340).

When the gaming machine 100 has the entry right (S1340: YES), the controller selects a mysterious bonus determination table 1 from among a plurality of mysterious bonus determination tables (S1350). Subsequently, the controller performs drawing of a mysterious bonus game based on the mysterious bonus determination table 1 and the position of the current cell (S1355).

When the gaming machine 100 does not the entry right (S1340: NO), the controller selects a mysterious bonus determination table 2 from among a plurality of mysterious bonus determination tables (S1360). Subsequently, the controller performs drawing of a mysterious bonus game based on the mysterious bonus determination table 2 and the position of the current cell (S1365).

Next, the controller spins a wheel of the bonus round to determine a digit (S1370). The controller moves the character from the current cell to a destination cell by the determined digit, and performs an event set the destination cell (S1375). As such, after performing the bonus round, the controller triggers executes the mysterious bonus game (S1390) when the player wins the mysterious bonus game in the drawing of the step S1355 or S1365 (S1380: YES). Subsequently, the controller awards a payout to the player according to a result of the mysterious bonus game (S1395).

Jackpot Challenge Process

According to an embodiment of the present invention, a jackpot challenge process is triggered when a predetermined condition is satisfied.

Figure 104:
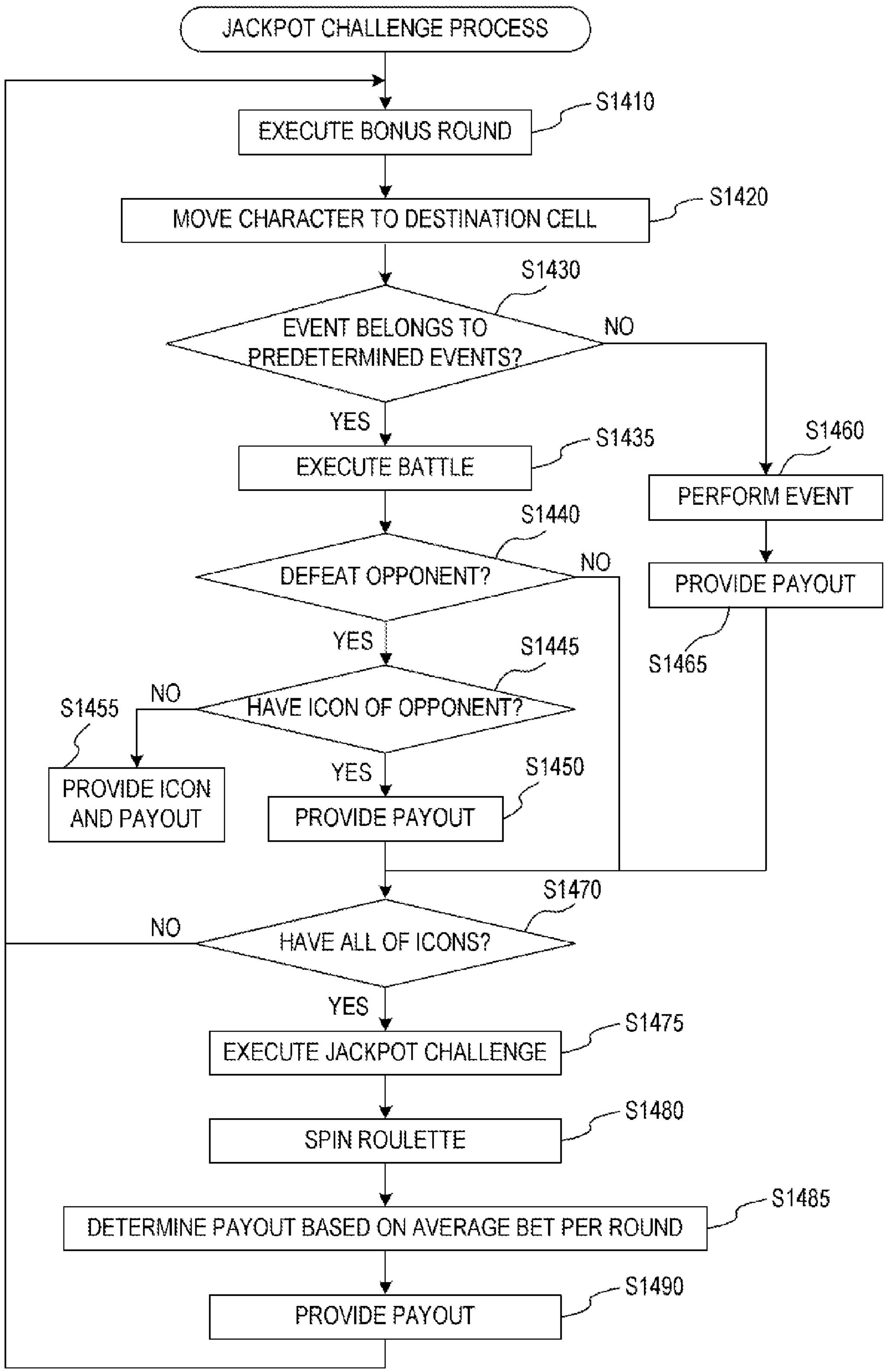
FIG. 104 is a flowchart of a jackpot challenge triggering process in a bonus game according to an embodiment of the present invention.

FIG. 104 is a flowchart of a jackpot challenge triggering process in a bonus game according to an embodiment of the present invention.

Referring to FIG. 104, a player of a gaming machine 100 bets credits and executes a bonus round of a bonus game (S1410). The controller moves the character from the current cell to a destination cell by a digit that is determined in the bonus round (S1420). The controller determines whether an event set to a destination cell belongs to predetermined events (S1430). The predetermined events may be treasure box events 3, 4 and 5, and battle events 1, 2 and 3 described with reference to FIG. 28 to FIG. 33, and are events capable of an icon of an opponent character such as Cyclops, a giant snake, or a skeleton gladiator.

When the event set to the destination cell belongs to the predetermined events (S1430: YES), the controller executes a battle between the character of the player and the opponent character of the event on the main display 120 (S1435). The controller determines whether the character defeats the opponent character or the opponent character defeats the character (S1440). When the character defeats the opponent character (S1440: YES), the controller determines whether the player has already obtained the icon of the defeated opponent character (S1445). When the player has already obtained the icon of the defeated opponent character (S1445: YES), the controller provides a payout of the event to the player (S1450). When the player has already obtained no icon of the defeated opponent character (S1455: NO), the controller provides the icon of the defeated opponent character as well as the payout (S1455).

When the event set to the destination cell does not belong to the predetermined events (S1430: NO), the controller perform the event (S1460) and provides a payout to the player according to a result of the event (S1465).

Next, the controller determines whether the player has all of icons of the plurality of opponent character (for example, all of icons of Cyclops, the giant snake, and the skeleton gladiator) (S1470). When the player has all of icons of the plurality of opponent character (S1470: YES), the controller triggers and executes a jackpot challenge (S1475). In the jackpot challenge, the controller displays roulette on the top display 120 or the common display 200 and spins the roulette (S1480). The controller determines a payout of the jackpot challenge based on a selection probability determined by an average BET per round, and stops the roulette to indicate the determined payout (S1485). In this case, as higher the average BET per round is, higher a probability of a progressive payout to be selected is. Next, the controller awards the determined payout to the player (S1490).

Treasure Box Determining Process

According to an embodiment of the present invention, any one treasure box event is determined from among treasure box events 1, 2, 3, 4, and 5, based on a position at which a character of the player is located.

Figure 105:
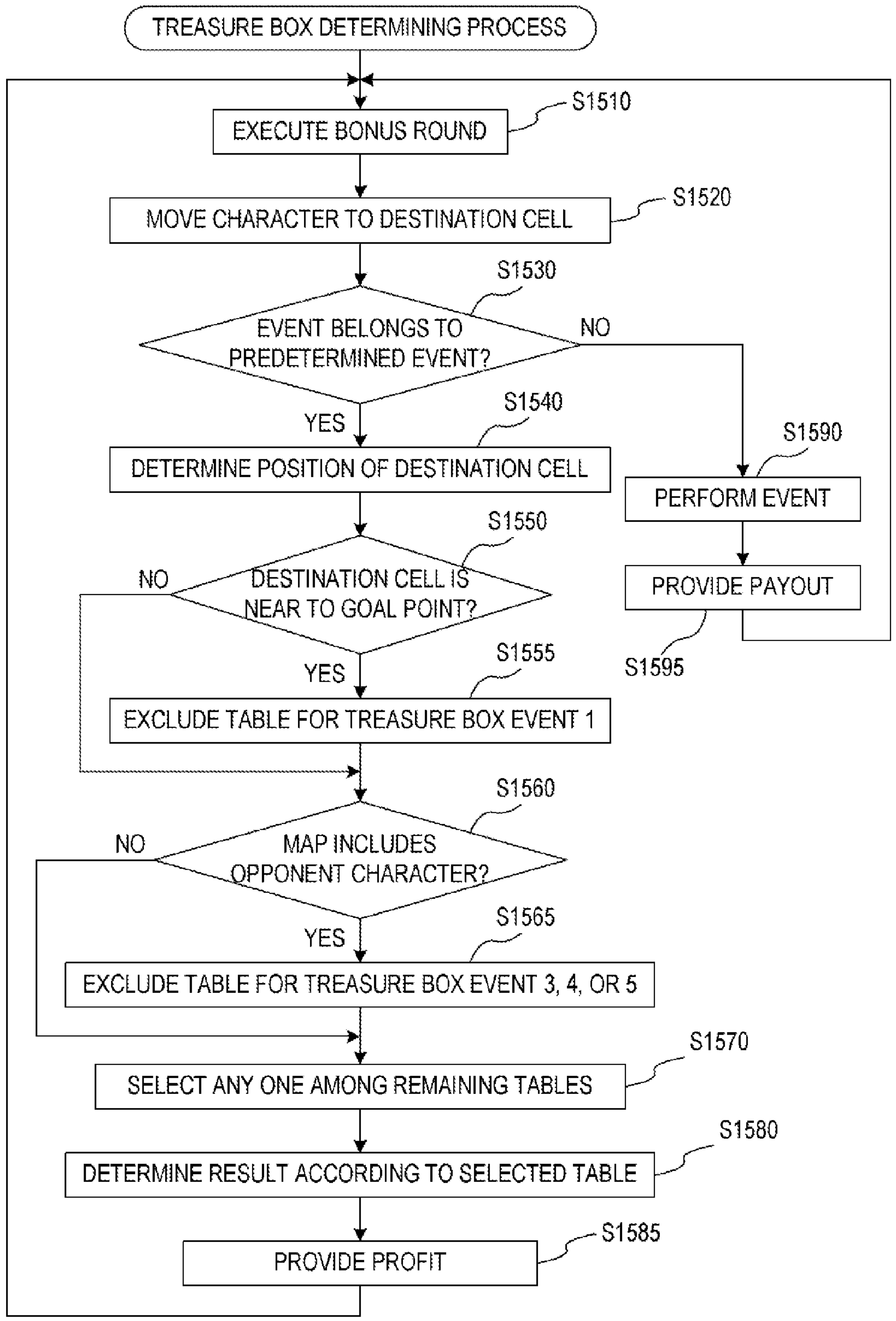
FIG. 105 is a flowchart of a treasure box determining process in a bonus game according to an embodiment of the present invention.

FIG. 105 is a flowchart of a treasure box determining process in a bonus game according to an embodiment of the present invention.

Referring to FIG. 105, a player of a gaming machine 100 bets credits and executes a bonus round of a bonus game (S1510). The controller moves the character from the current cell to a destination cell by a digit that is determined in the bonus round (S1520). The controller determines whether an event set to a destination cell belongs to a predetermined event (S1530). The predetermined event may be a treasure box event.

When the event belongs to the predetermined event (S1530: YES), the controller determines a position of the destination cell (S1540). The controller determines whether the destination cell is near to a goal point of a map (S1550). That is, the controller determines whether the destination cell belongs to a predetermined numbers of cells that are nearest to the goal point. When the destination cell is near to the goal point (S1550: YES), the controller excludes a payout termination table for a treasure box event 1 from a plurality of payout termination tables that correspond to the treasure box events 1, 2, 3, 4, and 5, respectively (S1555). Further, the controller determines whether a part of the map that is displayed at the destination cell includes at least one opponent character (S1560). When the part of the map includes at least one opponent character (S1560: YES), the controller excludes a payout termination table for a treasure box event that corresponds to the at least one opponent character from among treasure box events 3, 4, and 5, from the plurality of payout termination tables (S1565).

The controller selects any one payout determination table from among payout determines tables except for the payout determines table excluded in the steps S1555 and S1565 (S1570). Next, the controller randomly determines a result of the event according to the selected payout determination table (S1580), and provides a profit corresponding to the result to the player (S1585).

On the other hand, when the event belongs to the predetermined event (S1530: NO), the controller performs the event (S1590), and provides a payout according to a result of the performed event (S1595).

As described with reference to FIG. 22 to FIG. 33, the payout determination table of the treasure box event 1 includes as a result the golden rudder event for moving the character to the goal point. Since there is no need to directly move the character to goal point in the destination cell that is near to the goal point, the payout determination table of the treasure box event 1 is excluded. Further, the treasure box event 3, 4, or 5 appears a corresponding opponent character from the treasure box. When the part of map displayed in the main or common display includes a cell on which a certain opponent character is depicted, the player cannot be interested in the appearance of the opponent character if the same opponent character appears from the treasure box. Accordingly, the payout determination table of the treasure box event corresponding to the certain opponent character is excluded.

Embodiments of the present invention can also be embodied as a computer readable program on a computer-readable recording medium. The computer readable recording medium is any data storage device that can store data that can be read thereafter by a computer. Examples of the computer readable recording medium include ROMs, RAMs, CD-ROMs, magnetic tapes, floppy disks, and optical data storage devices. The computer readable recording medium can also be distributed over a network coupled computer system so that the computer readable code is stored and executed in a distributed fashion.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A gaming machine, comprising:

a first display configured to display a jackpot challenge for providing a progressive payout;

a second display;

a value-addition mechanism configured to receive a physical item associated with a monetary value by which a player is able to add to the gaming machine gaming media to be bet;

an award payout mechanism by which gaming media can be paid out to the player or credited to current credits of the player as an outcome of a game; and a controller configured, as a result of the player having bet gaming media, to execute a base game, to trigger a bonus game when a result of the base game satisfies a predetermined condition, to display a plurality of cells forming courses on the first display when the bonus game is triggered, wherein the plurality of cells forming courses are associated with a plurality of events;

to execute each round of the bonus game, to display a wheel including a plurality of digits on the second display when each round is executed, to determine any one digit from among the plurality of digits when the wheel is slid by the player on the second display, to stop the wheel on the first display to indicate the determined digit, to move a character of a player by the determined digit on the courses, to determine whether an event of a cell at which the character arrives by moving the character by the determined digit in each round belongs to a predetermined type of events among the plurality of events provided by the bonus game, the predetermined type of events being events capable of providing any one icon of a plurality of different icons among the plurality of events, to determine whether a determined event belongs to the predetermined events capable of providing any one icon of a plurality of different icons, to perform the determined event and determine a result of the event, wherein it is determined whether to award an icon of the event as the result only when the event belongs to the predetermined type of events, to obtain the icon of the event when the result of the event is to award the icon of the performed event to the player, to trigger the jackpot challenge when all of the plurality of different icons are obtained by executing a plurality of rounds of the game, to execute the jackpot challenge to determine whether to award the progressive payout to the player, and to pay out the progressive payout by the award payout mechanism when the controller determines to award the progressive payout to the player.

2. The gaming machine of claim 1, wherein the controller is further configured to receive a bet betted by the player in each round, to determine a selection probability of the progressive payout based on an average bet per round until the jackpot challenge is triggered, and to determine whether to award the progressive payout to the player based on the selection probability.

3. The gaming machine of claim 2, wherein the controller is further configured to calculate the average bet per round based on a value that is obtained by dividing a sum of bets betted by the player until the jackpot challenge is triggered by a number of the rounds executed until the jackpot challenge is triggered.

4. The gaming machine of claim 3, wherein the controller is further configured to calculate the average bet per round by dividing the value by predetermined credits corresponding to a default bet.

5. The gaming machine of claim 1, wherein the controller is further configured to receive a bet betted by the player in each round, to determine a selection probability of the progressive payout based on a sum of bets betted by the player until the jackpot challenge is triggered, and to determine whether to award the progressive payout to the player based on the selection probability.

6. The gaming machine of claim 1, wherein the first display is further configured to display a plurality of icon areas that correspond to the plurality of different icons, respectively, and wherein the controller is further configured to fill a corresponding icon area of the icon areas with an obtained icon when obtaining the icon of the performed event.

7. The gaming machine of claim 1, wherein the controller is further configured to execute a battle between the character of the player and a character corresponding to the icon of the performed event in the second display when the performed event belongs to the predetermined events, and to obtain the icon of the performed event when the character of the player defeats the character corresponding to the icon.

8. The gaming machine of claim 1, wherein the first display is shared by a neighbor gaming machine of the gaming machine.

9. A gaming system, comprising:

a plurality of main displays for a plurality of players, each main display configured to display images of a game for a corresponding player; a common display provided for the main displays;

a value-addition mechanism configured to receive a physical item associated with a monetary value by which the corresponding player is able to add to the gaming system gaming media to be bet;

an award payout mechanism by which gaming media can be paid out to the corresponding player or credited to current credits of the corresponding player as an outcome of the game; and a controller configured, as a result of each of the plurality of players having bet gaming media, to execute a base game for each player, when a result of the base game for a certain player satisfies a predetermined condition, to trigger a bonus game of the certain player, to display a plurality of cells forming courses on the common display when the bonus game is triggered, wherein the plurality of cells forming courses are associated with a plurality of events, to execute each round of the bonus game, to display a wheel including a plurality of digits on the main display when each round is executed, to determine any one digit from among the plurality of digits when the wheel is slid by the certain player on the main display, to stop the wheel on the common display to indicate the determined digit, to move a character of the certain player by the determined digit on the courses, to determine whether an event of a cell at which the character arrives by moving the character by the determined digit in each round belongs to a predetermined type of events among the plurality of events provided by the bonus game, the predetermined type of events being events capable of providing any one icon of a plurality of different icons among the plurality of events, to perform the event and determine a result of the event, wherein it is determined whether to award an icon of the event as the result only when the event belongs to the predetermined type of events, to award the icon of the event to a player of the event when the result of the event is to award the icon of the event, to trigger a jackpot challenge for a certain player when the certain player obtains all of the plurality of different icons by executing a plurality of rounds of the game, to execute the jackpot challenge on the common display to determine whether to award a progressive payout to the certain player, and to pay out the progressive payout by the award payout mechanism when the controller determines to award the progressive payout to the certain player.

10. The gaming system of claim 9, wherein the controller is further configured to receive a bet betted by the certain player in each round, to determine a selection probability of the progressive payout based on an average bet per round of the certain player until the jackpot challenge is triggered, and to determine whether to award the progressive payout to the certain player based on the selection probability.

11. The gaming system of claim 9, wherein the controller is further configured to receive a bet betted by the certain player in each round, to determine a selection probability of the progressive payout based on a sum of bets betted by the certain player until the jackpot challenge is triggered, and to determine whether to award the progressive payout to the certain player based on the selection probability.

12. The gaming system of claim 9, wherein the common display is further configured to display a plurality of icon areas each of the player, the plurality of icon areas corresponding to the plurality of different icons, respectively, and wherein the controller is further configured to fill a corresponding icon area of the icon areas for the player of the performed event with an obtained icon when the icon of the performed event awarded to the player of the performed event.

13. The gaming system of claim 9, wherein the controller is further configured to execute a battle between the character of the player and a character corresponding to the icon of the performed event in the main display for the player of the performed event when the performed event belongs to the predetermined events, and to obtain the icon of the performed event when the character of the player defeats the character corresponding to the icon.

14. A gaming method by a controller of a gaming machine including a value-addition mechanism configured to receive a physical item associated with a monetary value by which a player is able to add to the gaming machine gaming media to be bet and an award payout mechanism by which gaming media can be paid out to the player or credited to current credits of the player as an outcome of a game, the method comprising, as a result of the player having bet gaming media:

executing a base game;

triggering a bonus game when a result of the base game satisfies a predetermined condition;

displaying a plurality of cells forming courses on a first display when the bonus game is triggered, wherein the plurality of cells forming courses is associated with a plurality of events;

executing each round of the bonus game;

displaying a wheel including a plurality of digits on a second display when each round is executed;

determining any one digit from among the plurality of digits when the wheel is slid by the player on the second display;

stopping the wheel on the first display to indicate the determined digit;

moving a character of the player by the determined digit on the courses;

determining whether an event of a cell at which the character arrives by moving the character by the determined digit in each round belongs to a predetermined type of events among the plurality of events provided by the bonus game, the predetermined type of events being events capable of providing any one icon of a plurality of different icons among the plurality of events;

performing the event and determining a result of the event, wherein it is determined whether to award an icon of the event as the result only when the event belongs to the predetermined type of events;

obtaining the icon of the event when the result of the event is to award the icon of the event to the player;

triggering a jackpot challenge when all of the plurality of different icons are obtained by executing a plurality of rounds of the game;

executing the jackpot challenge to determine whether to award a progressive payout to the player; and paying out the progressive payout by the award payout mechanism when the controller determines to award the progressive payout to the player.

15. The method of claim 14, further comprising:

receiving a bet betted by the player in each round;

determining a selection probability of the progressive payout based on an average bet per round until the jackpot challenge is triggered; and determining whether to award the progressive payout to the player based on the selection probability.

16. The method of claim 14, further comprising:

receiving a bet betted by the player in each round;

determining a selection probability of the progressive payout based on a sum of bets betted by the player until the jackpot challenge is triggered; and determining whether to award the progressive payout to the player based on the selection probability.

17. The method of claim 14, further comprising:

displaying on the first display a plurality of icon areas that correspond to the plurality of different icons, respectively; and filling a corresponding icon area of the icon areas with an obtained icon when obtaining the icon of the performed event.

18. The method of claim 14, further comprising executing a battle between the character of the player and a character corresponding to the icon of the performed event when the performed event belongs to the predetermined events, and obtaining the icon of the performed event when the result of the performed event is the character corresponding to the icon defeated by the character of the player defeats.

* * * * *